(12) United States Patent
Nixon et al.

(10) Patent No.: US 12,271,165 B2
(45) Date of Patent: Apr. 8, 2025

(54) SMART SEARCH UI

(71) Applicant: FISHER-ROSEMOUNT SYSTEMS, INC., Round Rock, TX (US)

(72) Inventors: Mark J. Nixon, Thorndale, TX (US); Peter Hartmann, Austin, TX (US); Anthony Amaro, Jr., Cedar Park, TX (US); Mary Grace Francisco, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 0 days.

(21) Appl. No.: 18/326,227

(22) Filed: May 31, 2023

(65) Prior Publication Data

US 2023/0394045 A1 Dec. 7, 2023

Related U.S. Application Data

(60) Provisional application No. 63/347,905, filed on Jun. 1, 2022.

(51) Int. Cl.
*G05B 15/02* (2006.01)
*G05B 19/418* (2006.01)
(Continued)

(52) U.S. Cl.
CPC ....... *G05B 15/02* (2013.01); *G05B 19/41865* (2013.01); *G06F 16/24542* (2019.01);
(Continued)

(58) Field of Classification Search
CPC .................. G06F 16/24575; G06F 16/248
See application file for complete search history.

(56) References Cited

U.S. PATENT DOCUMENTS 11,636,118 B2   4/2023  Nixon et al.
2009/0198488 A1*  8/2009  Vigen ............ G06F 40/30
                                                        704/9
(Continued)

FOREIGN PATENT DOCUMENTS

GB   2 590 123 A   6/2021
GB   2 590 761 A   7/2021
GB   2 591 540 A   8/2021

OTHER PUBLICATIONS

U.S. Appl. No. 18/326,327, filed May 31, 2023.
(Continued)

*Primary Examiner* — Jay A Morrison
(74) *Attorney, Agent, or Firm* — MARSHALL, GERSTEIN & BORUN LLP

(57) ABSTRACT

To provide enhanced search capabilities in a process control system, a knowledge repository is generated that includes both contextual data and time series data. The contextual data organizes process plant-related data according to semantic relations between the process plant-related data and the process plant entities. When a user submits a process plant search query related to process plant entities within a process plant, search results are obtained by identifying a data set from the knowledge repository. The contextual data categorizes process parameters so that users can search for a particular process parameter category. Users can tag previous searches to execute them once again at a later time. Users can also execute queries for predicted or future states of process plant entities, batch queries regarding batch processes, soft sensor analytics and monitoring applications, parameter lifecycle applications, perturbation applications, step testing applications, or batch provisioning and scheduling applications using the knowledge repository.

30 Claims, 53 Drawing Sheets

(51) Int. Cl.
    *G06F 16/2453*     (2019.01)
    *G06F 16/2455*     (2019.01)
    *G06F 16/2457*     (2019.01)
    *G06F 16/248*     (2019.01)
    *G06F 16/33*     (2019.01)
    *G06F 16/334*     (2025.01)

(52) U.S. Cl.
    CPC .. *G06F 16/24568* (2019.01); *G06F 16/24575* (2019.01); *G06F 16/248* (2019.01); *G06F 16/3344* (2019.01); *G05B 2219/32077* (2013.01)

(56) References Cited

U.S. PATENT DOCUMENTS

| | | | |
|---|---|---|---|
| 2012/0109789 A1* | 5/2012 | Bhatt | G06Q 10/0875 |
| | | | 705/29 |
| 2013/0212214 A1 | 8/2013 | Lawson et al. | |
| 2015/0081357 A1* | 3/2015 | Akita | G06Q 10/0631 |
| | | | 705/7.12 |
| 2016/0350365 A1* | 12/2016 | Subramaniam | G06F 16/2423 |
| 2017/0242923 A1* | 8/2017 | Viro | G06F 16/953 |
| 2021/0089592 A1 | 3/2021 | Nixon et al. | |
| 2021/0089593 A1 | 3/2021 | Nixon et al. | |
| 2022/0277048 A1 | 9/2022 | Nixon et al. | |
| 2024/0046165 A1* | 2/2024 | Yang | G06Q 10/06 |

OTHER PUBLICATIONS

U.S. Appl. No. 18/326,146 filed on May 31, 2023.
Combined Search and Examination Report for Application No. GB230813.4, dated Dec. 4, 2023.
Combined Search and Examination Report for Application No. GB2308132.6, dated Dec. 1, 2023.
Combined Search and Examination Report for Application No. GB2308134.2, dated Dec. 1, 2023.

\* cited by examiner

1100B

"Show me all batches running on Unit A"

I found 1 batch running on Unit A.

ID: 240404
Recipe: Proc_saline1
Unit: A
Area: BATCH_A
State: Running
ET: 00:09:35
Failure: [None]

ST: 2021-02-21-00:12:34
Description: This is a description
Process Cell: Mixer1
Phase: MIXER
Formula: FORMULA_X
EQ Train: EQTRAN_12
Step State: Running

1500

1502

```
# list 'Operating' parameters whose value is different form the configured value
r .Query ( """(
   r 1(func:anyoftext(Group, "Operating"))  {

ConfigValue ( expand_all_} }
      Value ( expand_all_} }
   }
}"""}
# r
[ p for p in r["r1"] if not sm.isConfigMatchesRuntime(p) }
```

[{ '_id": "InfoSources/INFOSOURCES/Modules/EMS_MFT_ILOCK_FO/RESET_IN",
  "Group": Operating",
  "ConfigValue": { "CV.Bool": True},
  "Value": { "Timestamp": "2021-03-26T07:03:45Z",
  "CV.Bool": False,
  "_id": "InfoSources/INFOSOURCES/Modules/EMS_MFT_ILOCK_FO/RESET_IN/Value",
  "Status": "OK" }},  } 1510

[{ '_id": "InfoSources/INFOSOURCES/Modules/EMS_MFT_ILOCK_FO/DOWNLOAD",
  "Group": Operating",
  "ConfigValue": { "CV.Bool": True},
  "Value": { "Timestamp": "2021-03-26T07:03:45.5Z",
  "CV.Bool": False,
  "_id": "InfoSources/INFOSOURCES/Modules/EMS_MFT_ILOCK_FO/DOWNLOAD/Value",
  "Status": "OK" }},  } 1512

{ '_id' : "InfoSources/INFOSOURCE1/Modules/II10201/AI1/MODE",
  "Group": Operating",
  "ConfigValue": { Target": "Auto",
  "Actual": "Auto",
  "Normal": "Auto",
    "Permitted" :  " 005_P, MAN_P, AUTO_P, 005_A,MAN_A,AUTO_A"},
  "Value": { "Timestamp": "2021-03-26T07:03:14Z",
    '_id' : "InfoSources/INFOSOURCE1/Modules/II10201/AI1/MODE/Value",
  "Status": "OK" }},
  "Actual": "???",
  "Normal": "Auto",
    "Permitted" : " AUTO,MAN,005",
    "Target": " AUTO"} },  } 1514

```
# list parameter whose ACTUAL value is not NORMAL
r=sm.query(""" {
    r1(func:type(<Types/DeltaV/Parameters/MODE>) ) {
      _id
      Value {
         Actual
         Normal
      }
    }
}""")
[ p for p in r['r1'] if 'Value' in p and p['Value']['Actual'] != p['Value']['Normal'] ]
```

[ { ' _id' : 'InfoSources/INFOSOURCE1/Modules/AIC-10-401/PIO1/MODE' ,    ⎯⎯ 1710
    'Value' : {'Actual' : 'IMAN' , 'Normal' : 'CAS' } } ,

[ { ' _id' : 'InfoSources/INFOSOURCE1/Modules/BLN1_UV_3-1/001/MODE' ,    ⎯⎯ 1712
    'Value' : {'Actual' : 'AUTO' , 'Normal' : 'CAS' } } ,

[ { ' _id' : 'InfoSources/INFOSOURCE1/Modules/BLN1_UV_3-2/001/MODE' ,    ⎯⎯ 1714
    'Value' : {'Actual' : 'AUTO' , 'Normal' : 'CAS' } } ,

[ { ' _id' : 'InfoSources/INFOSOURCE1/Modules/BLN1_UV_4-1/001/MODE' ,    ⎯⎯ 1716
    'Value' : {'Actual' : 'AUTO , 'Normal' : 'CAS' } } ,

[ { ' _id' : 'InfoSources/INFOSOURCE1/Modules/BLN1_UV_4-2/001/MODE' ,    ⎯⎯ 1718
    'Value' : {'Actual' : 'AUTO' , 'Normal' : 'CAS' } } ,

[ { ' _id' : 'InfoSources/INFOSOURCE1/Modules/BLN1_UV_4-4/001/MODE' ,    ⎯⎯ 1720
    'Value' : {'Actual' : 'AUTO' , 'Normal' : 'CAS' } } ,

[ { ' _id' : 'InfoSources/INFOSOURCE1/Modules/BLN1_UV_4-6/001/MODE' ,    ⎯⎯ 1722
    'Value' : {'Actual' : 'AUTO' , 'Normal' : 'CAS' } } ,

[ { ' _id' : 'InfoSources/INFOSOURCE1/Modules/BLN2_UV_3-1/001/MODE' ,    ⎯⎯ 1724
    'Value' : {'Actual' : 'AUTO' , 'Normal' : 'CAS' } } ,

[ { ' _id' : 'InfoSources/INFOSOURCE1/Modules/BLN2_UV_3-2/001/MODE' ,

FIG. 17

2300 cracker temp

2302

2310

Reactor Temp  500° — 2320

2312

Regenerator Temp 700° — 2322

2400

```
self.model = pickle.load(open("APImodel.sav"))
self.ts_y_pred = pd.DataFrame(columns = ['time', 'y_pred'])         2402
self.ts_y_pred.set_index('time', inplace = true)    Initialization" load the trained model 2404
param1= 'DOS01_FEED/RP_MASSFLOW'
param2= 'DOS02_FEED/RP_MASSFLOW'       Get recent timeseries of DeltaV parameters
param3= 'MOB50NIR01_CH02/COMPONENT_01_VAL'
param4= 'MOB50NIR01_CH01/COMPONENT_05_VAL'

2406
data_svm = ts[param1, param2]
data_filter= ts[param3, param4]               Data cleaning: remove outliers
data_after_filtration = data_filter[param3].loc[ data_filter[param4]<150]    2408
param5= 'after filtration'
ts[param5] = data_after_filtration            Soft sensor calculation: machine learning based prediction
y_pred = self.model.predict(np.array(data_svm.iloc[0,0]).reshape(1,-1).T)
yy_pred = y_pred.tolist()[0]                  2410
                                              Write results back to DeltaV
sm.write_value('CAMO/PARAM9', yy_pred)
                                       2412
return {                               Return data for visualization
  'ts' : ts,
  'y_pred': yy_pred,
  "ts_y_pred': self.ts_y_pred
}
```

FIG. 24

In [94]: #SIMPLE MODEL
model=sm.OLS(X['MOB50NIR01_CH01/COMPONENT_01_VAL'],X['DOS01_FEED/RP_MASSFLOW']).fit()
prediction=model.predict(X['DOS01_FEED/RP_MASSFLOW']).fit()
model.summary()

Out [94]: OLS Regression Results 2610

| | | | |
|---|---|---|---|
| Dep. Variable: | MOB50NIR01_CH01/COMPONENT_01_VAL | R-squared (uncentered): | 0.998 |
| Model: | OLS | Adj. R-squared (uncentered): | 0.998 |
| Method: | Least Squares | F-statistic: | 1.634e+06 |
| Date: | Fri, 04 Sep 2020 | Prob F-statistic: | 0.00 |
| Time: | 13:23:03 | Log-Likelihood: | -10654. |
| No. Observations: | 3574 | AIC: | 2.131e+04 |
| Df Residuals: | 3573 | BIC: | 2.132e+04 |
| Df Model: | 1 | | |
| Covariance Type: | nonrobust | | |

| | coef | std err | t | P>|t| | [0.025 | 0.975] |
|---|---|---|---|---|---|---|
| DOS01_FEED/RP_MASSFLOW | 99.0077 | 0.077 | 1278.184 | 0.000 | 98.856 | 99.160 |

SMART SEARCH UI

CROSS-REFERENCE TO RELATED APPLICATIONS

This application claims priority to and the benefit of the filing date of U.S. Provisional Patent Application No. 63/347,905, filed on Jun. 1, 2022, entitled "Enhanced Smart Search Capabilities in a Process Control System," the entire disclosure of which is hereby expressly incorporated by reference herein.

TECHNICAL FIELD

The present disclosure relates generally to process plants and to process control systems, and more particularly, to providing enhanced search capabilities for conducting search queries of process plant-related data in process plants/process control systems and displaying search results, and to securing the delivery of process plant-related data from process plants/process control systems to external systems for presenting the process plant-related data on devices which are remote from the process plants.

BACKGROUND

Distributed process control systems, like those used in chemical, petroleum, pharmaceutical, paper product processing, or other process plants, typically include one or more process controllers communicatively coupled to one or more field devices via analog, digital or combined analog/digital buses, or via a wireless communication link or network. The field devices, which may be, for example, valves, valve positioners, switches and transmitters (e.g., temperature, pressure, level and flow rate sensors), are located within the process environment and generally perform physical or process control functions such as opening or closing valves, measuring process parameters such as pressure, temperature, etc., and the like to control one or more process executing within the process plant or system. Smart field devices, such as the field devices conforming to the well-known Fieldbus protocol, may also perform control calculations, alarming functions, and other control functions commonly implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as HART®, WirelessHART®, and FOUNDATION® Fieldbus field devices. The control modules in the controller send the control signals over the communication lines or links to the field devices to thereby control the operation of at least a portion of the process plant or system.

Information from the field devices and the controller is usually made available over a data highway to one or more other hardware devices, such as operator workstations, personal computers or computing devices, data historians, report generators, centralized databases, or other centralized administrative computing devices that are typically placed in control rooms or other locations away from the harsher plant environment. Each of these hardware devices typically is centralized across the process plant or across a portion of the process plant. These hardware devices run applications that may, for example, enable an operator to perform functions with respect to controlling a process and/or operating the process plant, such as changing settings of the process control routine, modifying the operation of the control modules within the controllers or the field devices, viewing the current state of the process, viewing alarms generated by field devices and controllers, simulating the operation of the process for the purpose of training personnel or testing the process control software, keeping and updating a configuration database, etc. The data highway utilized by the hardware devices, controllers and field devices may include a wired communication path, a wireless communication path, or a combination of wired and wireless communication paths.

As an example, the DeltaV™ control system, sold by Emerson Automation Solutions, includes multiple applications stored within and executed by different devices located at diverse places within a process plant. A configuration application, which resides in one or more workstations or computing devices, enables users to create or change process control modules and download these process control modules via a data highway to dedicated distributed controllers. Typically, these control modules are made up of communicatively interconnected function blocks, which are objects in an object oriented programming protocol that perform functions within the control scheme based on inputs thereto and that provide outputs to other function blocks within the control scheme. The configuration application may also allow a configuration designer to create or change operator interfaces which are used by a viewing application to display data to an operator and to enable the operator to change settings, such as set points, within the process control routines. Each dedicated controller and, in some cases, one or more field devices, stores and executes a respective controller application that runs the control modules assigned and downloaded thereto to implement actual process control functionality. The viewing applications, which may be executed on one or more operator workstations (or on one or more remote computing devices in communicative connection with the operator workstations and the data highway), receive data from the controller application via the data highway and display this data to process control system designers, operators, or users using the user interfaces, and may provide any of a number of different views, such as an operator's view, an engineer's view, a technician's view, etc. A data historian application is typically stored in and executed by a data historian device that collects and stores some or all of the data provided across the data highway while a configuration database application may run in a still further computer attached to the data highway to store the current process control routine configuration and data associated therewith. Alternatively, the configuration database may be located in the same workstation as the configuration application.

Generally speaking, a process control system of a process plant includes field devices, controllers, workstations, and other devices that are interconnected by a set of layered networks and buses. The process control system may, be in turn, be connected with various business and external networks, e.g., to reduce manufacturing and operational costs, enhance productivity and efficiencies, provide timely access to process control and/or process plant information, etc. On the other hand, the interconnection of process plants and/or process control systems to enterprise and/or external networks and systems increases the risk of cyber intrusions and/or malicious cyber-attacks that may arise from expected vulnerabilities in commercial systems and applications, such as those used in enterprise and/or external networks. Cyber intrusions and malicious cyber-attacks of process plants, networks, and/or control systems may negatively affect the confidentiality, integrity, and/or availability of information assets, which, generally speaking, are vulnerabilities similar to those of general purpose computing networks. However, unlike general purpose computer networks, cyber intrusions of process plants, networks, and/or control systems may also lead to damage, destruction, and/or loss of not only plant equipment, product, and other physical assets, but also to the loss of human life. For example, a cyber-intrusion may cause a process to become uncontrolled, and thereby produce explosions, fires, floods, exposure to hazardous materials, etc. Thus, securing communications related to process control plants and systems is of paramount importance.

As a result, process plant personnel such as operators typically cannot view process plant-related data indicative of the run-time operation of the process plant from remote sources, such as mobile devices. Furthermore, while process plant personnel interact with operator display applications which provide displays and generate reports regarding the operating state of the control system or the devices within the process plant, the operator display applications typically do not allow users to search for items within the process plant, such as control modules, alarms, the amount of a product being produced over a particular time period, etc. Each data point within a process plant may have several descriptors and aspects, such as a run-time aspect representing a physical measurement or set value, a configuration, a current value, a mode, a range, a status, a quality, and other descriptors for the data point. As a result, the complexity of the process plant-related data within the process plant is enormous making it difficult to search for particular data items within such a large data set. For example, data in the process plant is distributed across subsystems, formatted, structurally organized for transfer/retrieval by other computing logic in the process plant, and structurally optimized for transactional services. However, the data is not structurally optimized for searching and analytics. Searching becomes even more difficult without context that provides a situational awareness of the run-time data.

SUMMARY

Techniques, systems, apparatuses, components, devices, and methods for providing search functionality within the process plant and for remotely receiving and viewing process plant-related data are disclosed herein. The search functionality allows for users to gain access to process plant-related data creating an all-inclusive search scope. By utilizing context included in search queries and/or from a contextual knowledge repository, the search functionality generates meaningful responses to a large variety of search queries. Said techniques, systems, apparatuses, components, devices, and methods may apply to industrial process control systems, environments, and/or plants, which are interchangeably referred to herein as "industrial control," "process control," or "process" systems, environments, and/or plants. Typically, such systems and plants provide control, in a distributed manner, of one or more processes that operate to manufacture, refine, transform, generate, or produce physical materials or products.

To provide search functionality within the process plant, a process plant search query server receives and analyzes process plant search queries from software modules and/or user interface devices, such as operator workstations, mobile devices such as smart phones and tablets, vehicle head units, etc. The process plant search queries may be search queries related to process plant entities within the process plant, such as search queries regarding control modules, alarms, process flow modules, process parameter data for process plant entities, product parameter data for a product generated by the process plant entities, the amount of a product being produced over a particular time period, etc.

The process plant search queries may be provided by users in a natural language format, such as "Show me the alarms at my boiler unit." The process plant search query server then analyzes the process plant search query to identify the subject of the search query (e.g., alarms), modifiers or filters for filtering the search results (e.g., alarms specific to a boiler unit), and to identify the context of the process plant search query (e.g., the user is a plant supervisor for a process plant in Houston, Texas and supervises Plant Area A which has one boiler unit). Then the process plant search query server obtains process plant-related data related to the process plant search query. For example, the process plant search query server may obtain process plant-related data from a knowledge repository. The knowledge repository may include a contextual knowledge repository (e.g., in the form of a graph database) that organizes process plant-related data according to semantic relations between the process plant-related data and the process plant entities. In the example above, the process plant search query server may obtain process plant-related data from the contextual knowledge repository for each of the alarms corresponding to the boiler unit in Plant Area A in the Houston plant. The knowledge repository may also include a temporal repository (e.g., in the form of a time series database) that organizes process and product parameter data temporally. For example, the temporal repository may store a time series of process parameter values for a tank fill level of a particular tank within the process plant from 1:00 pm to 2:00 pm on Dec. 15, 2021.

The process plant search query server then generates a set of process plant search results using the obtained process plant-related data. For example, the set of process plant search results may include six process plant search results each corresponding to a different alarm. The process plant search query server may then provide the set of search results for presentation by the user interface device. For example, the search results may be presented graphically on a user interface or in an audio format via a speaker. In some implementations, each search result includes a selectable link to additional information regarding the search result. For example, a search results display on the user interface device may present the names of each of the alarms (e.g., Alarm A, Alarm B, Alarm C, etc.), where each of the names includes a selectable link to additional information regarding the alarm. When one of the names is selectable, the user interface device may present detailed information regarding the alarm (e.g., the type of alarm, the priority of the alarm, an alarm message, control modules associated with the alarm, etc.). The user interface device may also present a process flow module graphically depicting the alarm and process plant entities corresponding to the alarm. The search result display may also present a preview of the detailed information regarding the alarm, such as thumbnail image of a control module or process flow module that graphically depicts the alarm.

In some implementations, the process plant search results may be ranked and presented in a ranked order on the search results display. For example, the process plant search query server may assign a score to each of the process plant search results according to relevance to the process plant search query. More specifically, the process plant search query server may determine that high priority or critical alarms have higher relevance to the process plant search query than low priority alarms. Accordingly, the process plant search results corresponding to high priority or critical alarms may be ranked above the process plant search results corresponding to low priority alarms. Thus, the process plant search results corresponding to high priority or critical alarms may be presented above the process plant search results corresponding to low priority alarms on the search results display.

Furthermore, the presentation of the process plant search results may be adjusted based on the type, size, and/or capabilities of the user interface device. If the user interface device has a display but does not have a speaker, the process plant search results may be presented graphically. If the user interface device has a speaker but does not have a display, the process plant search results may be presented audibly. Additionally, if the user interface device is a particular type or has a screen size below a threshold size (e.g., a mobile device), the process plant search query server may provide a single process plant search result to display on the user interface device (e.g., the highest ranking process plant search result). On the other hand, if the user interface device has a screen size above the threshold size (e.g., an operator workstation), the process plant search query server may provide the set of process plant search results to display on the user interface device.

In some implementations, the contextual knowledge repository may include process parameters, such as tank fill levels, pump speeds, temperatures, mass flows, etc. The contextual knowledge repository may include a parameter category for each of the process parameters, such as operating parameters, tuning parameters, equipment parameters, configuration parameters, instantiation parameters, etc. In this manner, a user may search for process parameters by parameter category.

Also in some implementations, a user may store a process plant search query or a set of process plant search results with a search tag. The search tag may be a string of alphanumeric characters which may be used to reference the previous process plant search query or set of process plant search results. For example, after a user enters a search query "Control Modules with Bypass Off," the user may request the store the search query with the search tag "BPOFF." Then when the user or another user enters the string "BPOFF," the contextual knowledge repository or process plant search query server automatically identifies that stored search query "Control Modules with Bypass Off" and obtains search results for the stored search query associated with the tag. Additionally, the user may include additional terms with the tag in the search query, such as "BPOFF Area A." Then the process plant search query server may filter the search results using the additional terms, such as "Area A."

In addition to storing process plant search queries with tags, a user may also store a set of process plant search results with a tag. In this manner, the process plant search query server may obtain the previously retrieved search results in response to receiving a search query including the tag rather than obtaining a new set of search results for a previously stored search query.

Still further, the process control system is configured to receive queries for predicting states of process plant entities. The process control system trains machine learning models using historical process parameter data and/or relationships between process plant entities to predict a state of a particular process plant entity, such as an abnormal condition or a change to the current state of the process plant entity. The process plant search query functionality described herein may be provided within an integrated development environment (IDE) so that a user can customize or train machine learning models, or generate custom algorithms regarding to the process plant data.

In an embodiment, a method for external devices to securely interact with a process control system of a process plant includes obtaining a data set from a knowledge repository that stores process content data related to the industrial process and context data indicative of relationships between the process content data. The obtaining of the data set may be responsive to a query of the knowledge repository, and in an example, an edge gateway system may obtain the data set from the knowledge repository. The method further includes providing, e.g., by the edge gateway system, the data set to an external application executing on one or more computing devices external to cybersecurity barriers of the process control system; receiving, responsive to the provided data set, an instruction corresponding to the runtime industrial process; and causing a modification to at least one of an operation or a data store within the cybersecurity barriers of the process control system in accordance with the received instruction.

In an embodiment, a computing device for users to securely interact with a process control system of a process plant includes one or more processors, one or more tangible, non-transitory, computer-readable memories, one or more user interfaces, and one or more communication interfaces communicatively connecting the computing device with the process control system via a plurality of different communication paths. Additionally, the computing device includes a user interface application. The user interface application includes a set of computer-executable instructions stored on the one or more memories and executable, while the process control system is operating during run-time to control an industrial process, to cause the computing device to receive a data set obtained from a knowledge repository of the process control system. The knowledge repository may store process content data related to the industrial process and received from the process control system via a first communication path of the plurality of different communication paths, where the first communication path is a unidirectional communication path configured to deliver data from process control system, and the knowledge repository may further store context data indicative of relationships between the process content data. The computer-executable instructions are further executable to present the data set on the one or more user interfaces of the computing device; obtain, via the one or more user interfaces and responsive to the presented data set, a user command to modify at least one of an operation or a data store of the process control system; and cause the user command to be transmitted to the process control system via a second communication path of the plurality of different communication paths, where the second communication path is a unidirectional communication path configured to deliver data to the process control system.

BRIEF DESCRIPTION OF THE DRAWINGS

FIG. 15 illustrates yet another example process plant search results display within an IDE including process plant search results in response to a search query related to another process parameter category;

FIG. 17 illustrates yet another example process plant search results display within an IDE including process plant search results in response to a search query related to yet another process parameter category;

FIG. 24 illustrates an example process plant search query within an IDE for predicting a process parameter value using a trained machine learning model;

FIG. 26 illustrates example results of a process parameter value prediction using a trained machine learning model;

DETAILED DESCRIPTION

Figure 1A:
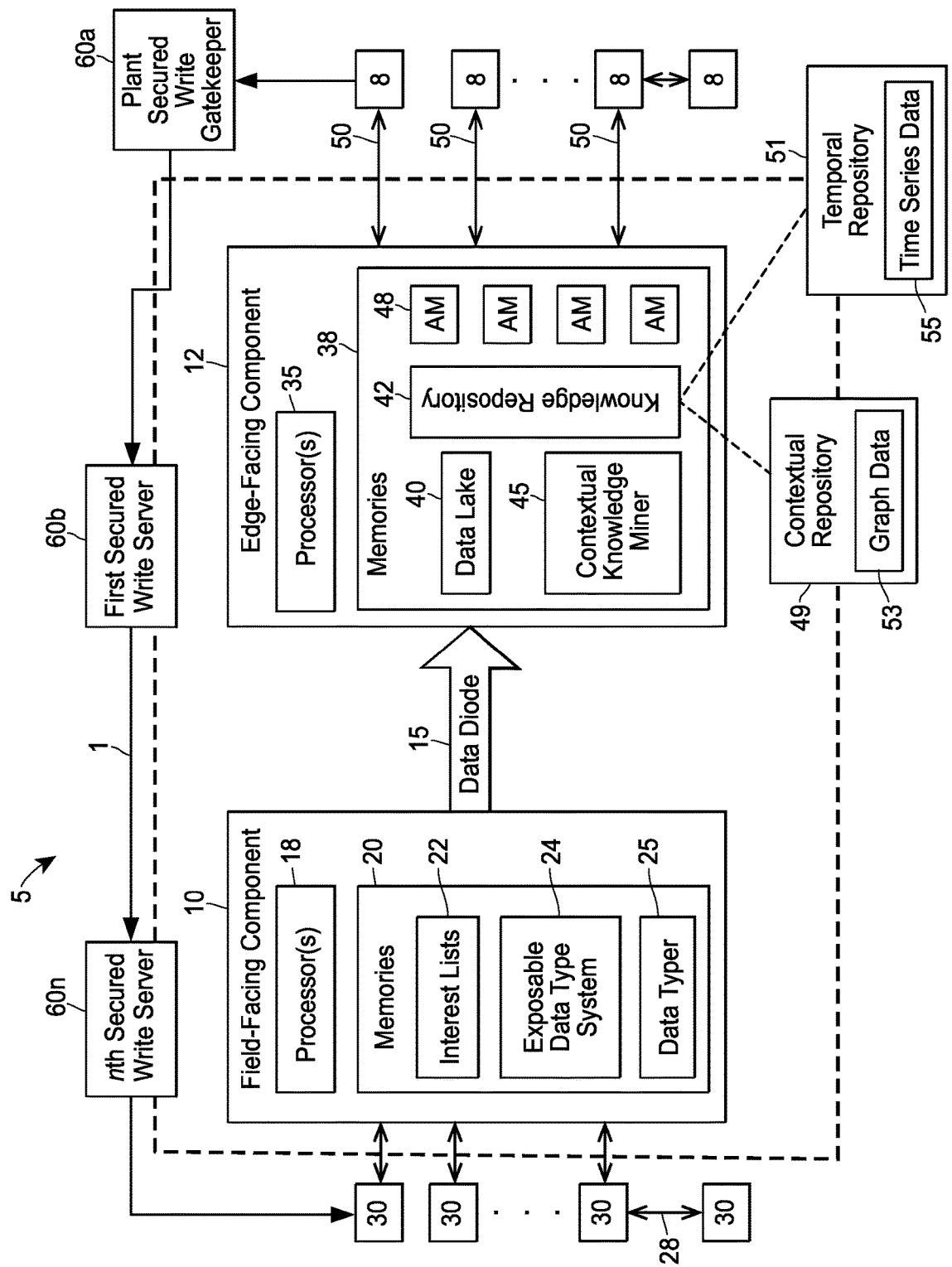
FIG. 1A is a block diagram of an example edge gateway system for a process plant or process control system.

As discussed above, process plant-related data is duplicated and received at a computing device in a secure manner. Once the process plant-related data is received, the process plant-related data may be provided to external sources, such as mobile devices, vehicle head units, etc., which are not authorized to communicate with the process plant or controllers, field devices, or other devices within the process plant. The process plant-related data may be provided to the external sources to present reports, graphical representations of control modules and process flow modules, and other information related to the process plant which process plant personnel typically view at plant workstations. In this manner, process plant personnel may view this information remotely without the risk of unauthorized personnel being able to control devices in the process plant from external sources.

Furthermore, the process plant-related data may be presented as process plant search results in response to process plant search queries generated on user interface devices, which may operate within the process plant (e.g., operator workstations, mobile workstations) or externally (e.g., mobile devices, vehicle head units, desktop or laptop computers, wearable devices, etc.).

Securing process plants and process control systems against cyber intrusions and malicious cyber-attacks typically utilizes a layered or leveled security hierarchy, with at least some of the layers or levels secured by using firewalls and other security mechanisms. Using the Purdue Model for Control Hierarchy logical framework standardized by ISA (International Society of Automation) 95.01—IEC (International Electrotechnical Commission) 62264-1 as an example framework, process control systems generally fall into security levels 0-2 (e.g., levels that have a higher level of trust in the safety and validity of messages, packets, and other communications), and manufacturing, corporate, and enterprise systems generally fall into security levels 3-5 (e.g., levels that have a lower level of trust). For example, process plant systems, networks, and devices at security levels 0-3 may be protected against threats from enterprise networks at security levels 4-5, and/or from any external networks higher than security level 5 exploiting the enterprise networks, e.g., by using a demilitarized zone (DMZ) and/or one or more firewalls. However, as more and more services and applications that operate on process plant-related data are moved to execute remotely, e.g., on networks and systems outside of or external to the process plant (e.g., at security levels 4 and/or 5 within the enterprise or business), and/or even on networks and systems that are external to the enterprise or business (e.g., above security level 5, via the Internet or other public network), stronger techniques for preventing process plant systems, networks, and devices from being compromised are needed.

The novel systems, components, apparatuses, methods, and techniques described herein address these and other security issues related to process plants and their networks, and in particular are directed to the secure delivery of process plant-related data to one or more external systems that are consumers of the process plant-related data. That is, the novel systems, components, apparatuses, methods, and techniques described herein provide one or more cybersecurity barriers and/or mechanisms which protect the process plant against cyber intrusions and cyberattacks while allowing consumable data and information to be obtained by devices, applications, and other types of process plant data and information consumers which are disposed outside (e.g., external to) the protective plant cybersecurity barriers and/or mechanisms.

To illustrate, FIG. 1A is a block diagram of an example edge gateway system 1 which securely delivers process plant-related data from a process plant 5 to one or more external systems 8. The edge gateway system 1 includes a field-facing component 10 that is communicatively connected to an edge-facing component 12 via a data diode 15. The field-facing component 10 includes one or more processors 18 and one or more non-transitory memories or data storage devices 20 storing at least one set of data and at least one set of computer-executable instructions, where the at least one set of computer-executable instructions are executable by the one or more processors 18. For example, as illustrated in FIG. 1A, the one or more memories 20 of the field-facing component 10 store respective data sets such as one or more interest lists 22, an exposable data type system 24, and optionally other data sets (not shown). The one or more memories 20 of the field-facing component 10 further store computer-executable instructions for a data typer 25, and may store other sets of computer-executable instructions (not shown). The field-facing component 10 is communicatively connected to one or more process plant communications networks, data networks, and/or links 28, which may include any number of wired and/or wireless communications networks, data networks, and/or links that communicatively connect various devices and/other data sources 30 which are associated with the process plant 5 and which generate data, e.g., while the process plant 5 is operating to control an industrial process. More detailed descriptions of embodiments of the field-facing component 10 of the edge gateway system 1 and its subcomponents are provided elsewhere within this disclosure. For example, the data sources 30 that communicate with the field-facing component 10 are described in more detail below with reference to FIG. 2.

The edge-facing component 12 of the edge gateway system 1 includes one or more processors 35 and one or more non-transitory memories or data storage devices 38 storing at least one set of data and at least one set of computer-executable instructions, where the at least one set of computer-executable instructions are executable by the one or more processors 35. For example, as illustrated in FIG. 1A, the one or more memories 38 of the edge-facing component 12 store respective data sets corresponding to a data lake 40 and a knowledge repository 42, and the one or more memories 38 of the edge-facing component 12 store at least a partial copy 24B or duplicate of the exposable data type system 24A of the field-facing component 10, respective computer-executable instructions for a contextual knowledge miner and one or more access mechanisms 48 for the knowledge repository 42. Of course, although not shown in FIG. 1A, the one or more memories 38 of the edge-facing component 12 may store other sets of data and/or other sets of computer-executable instructions. As also illustrated in FIG. 1A, the edge-facing component 12 of the edge gateway system 1 is communicatively connected to one or more external systems 8 via one or more external communications networks, data networks, and/or links 50. The one or more external communications networks, data networks, and/or links 50 may include any number of wired and/or wireless communications networks, data networks, and/or links, and may include any number of private and/or public networks and/or links. The one or more external systems 8 may include any number of public computing systems and/or private computing systems, which may be respectively implemented using any suitable technology, such as banks of servers, cloud computing systems, and the like, and on which various applications (e.g., third-party applications, websites, etc.) may execute. More detailed descriptions of embodiments of the edge-facing component 12 and its subcomponents are provided elsewhere within this disclosure. For example, the contents of the data lake 40 are described in more detail below with reference to FIG. 3.

As shown in FIG. 1A, the field-facing component 10 and the edge-facing component 12 are interconnected via a data diode 15 (although in some implementations of the edge gateway system 1 (not shown), the data diode 15 may be omitted and the field-facing component 10 and the edge-facing component 12 are in direct connection, or are an integral, unitary logical and/or physical component). At any rate, as shown in FIG. 1A, the data diode 15 includes one or more transmission media via which data (e.g. electronic data) is transported from the field-facing component 10 to the edge-facing component 12, where the data diode 15 is the only communicative connection between the field-facing component 10 and the edge-facing component 12. In a preferred embodiment, the data diode 15 is unidirectional, so that any and all types of data (e.g., signaling data, control data, administrative data, payload data, etc.) flows only from the field-facing component 10 to the edge-facing component 12, and does not flow (and indeed, in some embodiments, is not physically able to flow) from the edge-facing component 12 to the field-facing component 10. That is, the data diode 15 may be physically and/or logically configured to prevent any and all types of data (e.g., signaling data, control data, administrative data, payload data, etc.) from flowing from the edge-facing component 12 to the field-facing component 10. In an example, the unidirectional data diode 15 is implemented using an optical fiber link or cable. In another example, software and/or hardware of the unidirectional data diode 15 may be otherwise configured to prevent the flow of any type of data (e.g., signaling data, control data, administrative data, payload data, etc.) from the edge-facing component 12 to the field-facing component 10. For instance, physical ports of the edge-facing component 12 that would otherwise receive data from the one or more external systems 8 may be blocked, disabled, and/or omitted.

Generally speaking, the edge gateway system 1 securely connects and/or bridges the process plant 5 and associated systems at lower-numbered security levels with one or more systems 8 at higher-numbered security levels. For example, with reference to the Purdue Model (or other similar security hierarchy), the data sources 30 and the networks/links 28 via which the edge gateway system 1 obtains process-plant related data may be at lower-numbered security levels (e.g., security level 0 through security level 2), and may include, for example, process control systems, configuration systems, analytics systems, communication/networking systems, asset management systems, diagnostic and/or testing tools and/or systems, commissioning tools and/or systems, user devices and/or operator interfaces, historian systems, batch systems, and other systems, networks, and/or applications associated with the process plant 5. Accordingly, for ease of discussion herein, and not for limitation purposes, the term "process plant" is used to collectively refer to the physical process plant as well as to other systems associated with and in communicative connection with the physical process plant that generate and/or communicate data of lower-numbered levels of security.

At the edge gateway system 1 of FIG. 1A, the field-facing component 10 that obtains and initially processes the process plant-related data generated by the process plant 5 may be at security level 2 to security level 3, and the data diode 15 and edge-facing component 12 may be at security level 3. The one or more external systems 8 may be at security level 4 or higher, and may include any number of public and/or private systems and various applications executing thereon, such as enterprise applications, third-party applications, publicly-available applications, websites, etc. As such, the edge gateway system 1 securely delivers data generated by process plant-related systems, networks, and/or applications 5 at lower-numbered levels of security to systems, networks, and/or applications 8 at higher-numbered levels of security.

In particular, as shown in FIG. 1A, the field-facing component 10 of the edge gateway system 1 obtains or collects data from data sources 30 in accordance with one or more interest lists 22 stored at the field-facing component 10. Interest lists 22 indicate specific process plant-related data that is generated by the process plant 5 in relation to the plant 5 operating to control an industrial process, wherein the indicated process plant-related data is allowed to be exposed (e.g., is exposable) to the external systems, networks, and/or applications 8. As such, interest lists 22 included in the edge gateway system 1 provide an initial level of field-facing security against protected data being inadvertently released from the process plant 5 to external systems 8. Interest lists 22 may indicate specific data-of-interest and/or combinations thereof, such as runtime data, event data, historical data, configuration data, and/or any other type of process plant-related data that is generated by devices, components, and/or systems of and/or related to the process plant 5 at lower-numbered levels of security (e.g., at security levels 0-2). Interest lists 22 may be configured and/or defined via an Interest Studio (not shown in FIG. 1A), which is described in more detail elsewhere within this disclosure.

Further, at the field-facing component 10, the data typer 25 respectively types obtained interest list data in accordance with the exposable data type system 24. Generally speaking, the exposable data type system 24 defines a system of data types (including data definitions, names, values, fields, structures, classes, objects, etc.) that are exposed or otherwise made available to the external systems 8. Additionally, the exposable data system 24 defines mappings, conversions, groupings, and/or other arrangements of process plant-related data types into the exposable data types so that process plant-related data content may be utilized and understood by the external systems 8. The term "process plant-related data types," as utilized herein, generally refers to data types (e.g., data definitions, names, values, fields, structures, classes, objects, etc.) that have been defined and/or configured for use by applications, devices, components, systems, and/or networks of the process plant 5. In an embodiment, the exposable data type system 24 may be configured via the Interest Studio (e.g., in a manner such as described elsewhere within this disclosure). At any rate, the exposable data system 24 allows the external systems 8 to interpret process plant-related data that is generated by the process plant 5 and associated lower security level systems without the external systems 8 needing to be aware of any internal data configurations of the plant 5, and without having to query and/or initiate communications with and/or send responses to the process plant 5. As such, the exposable data type system 24 and data typer 25 of the edge gateway system 1 further protect the process plant 5 from possible security breaches from external systems 8. The exposable data type system 24 and the data typer 25 are described in more detail elsewhere in this disclosure.

At least due to the use of the exposable data type system 24 and the data typer 25, the data diode 15 may be a truly unidirectional data diode. Currently known data diodes provide for unidirectional flow of content data, but allow for bi-directional flow of signaling, control, and/or administrative data, such by allowing acknowledgements and/or error conditions to be communicated from a content data-receiving end to the content data-sending end. However, the data diode 15 of the edge gateway system 1 may be truly unidirectional in that no types of data flow from its content data-receiving end to its content data-sending end. Indeed, in embodiments, the data diode 15 is physically configured to prevent any type of data (e.g., signaling, control, administrative, content, etc.) from being delivered from the edge-facing component 12 to the field-facing component 10, e.g., such as in embodiments in which the data diode 15 is implemented via optical transmission media. As such, due to at least the truly unidirectional nature of the data diode 15, the data diode 15 of the edge gateway system 1 still further protects the process plant 5 from possible security breaches from external systems 8.

In situations where data does need to be written back into the process plant 5 from an external system 8, the external system 8 communicates with n intermediate secured write servers 60a-60n to protect the plant 5 against cybersecurity threats. As illustrated in FIG. 1A, at least one of the secured write servers 60a-60n may be serve as a plant secured write gatekeeper 60a for the plant 5, where the secured write gatekeeper receives, on behalf of the set of intermediate secured write servers 60a-60n, data directly from external data sources. Generally speaking, each secured write server 60a-60n may separately validate the data and/or determine that a user of the external system 8 is authorized to write to the process plant 5, and either forward on (e.g., towards the process plant 5) the data or take some mitigating action. That is, each intermediate server may respectively validate the write request and/or the user or application that generated the write request. For example, each secured write server 60a-60n may validate the write request and/or the source that generated the write request by determining whether the data to be written is within an acceptable range of values, e.g., based on the type of data, a context of the data, an identity of the source or user that provided the data, etc. Then, if the data is validated and the user is authorized to write to the process plant 5, the secured write server 60a may forward the data to another secured write server 60b to double check that the data is validated, to validate the data in another manner, and/or to authorize the user. In other implementations, each secured write server 60a-60n may perform a same or different type of validation/authorization check on the data. Once a threshold number of secured write servers 60a-60n have validated/authorized the data write, the data may be securely written to a data source 30 within the process plant. Generally speaking, at least one of the intermediate secured write servers 60a-60 n may be pre-designated as an intermediate server.

At the edge-facing component 12 of the edge gateway system 1, the typed, content data that is received from the field-facing component 10 via the data diode 15 is stored in the data lake 40. The contextual knowledge miner 45 mines the data lake 40 to discover relationships between various content data stored in the data lake 40, and generates/modifies/updates the knowledge repository 42 so that the knowledge repository 42 includes indications of both the received content data as well as the discovered relationships. As such, the knowledge repository 42 stores both process plant-related content data (e.g., run-time data, event data, historical data, and/or other types of data provided by the process plant 5), as well as context data that is indicative of relationships between provided process plant-related content data, conditions corresponding to the generation, delivery, and/or reception of the process plant-related content data within the process plant 5, and/or other types of contexts of the process plant-related content data. Knowledge that is stored in the knowledge repository 42 is exposable (e.g., is made available) to the one or more external systems 8.

More specifically, the knowledge repository 42 may include both a contextual knowledge repository 49 (e.g., in the form of a graph database 53) that organizes process plant-related data according to semantic relations between the process plant-related data and the process plant entities. The graph database 53 may represent process plant entities, process parameters, and/or other process plant-related data as nodes and relationships between the process plant entities, process parameters, etc., as edges. This is described in more detail below with reference to FIG. 7.

The knowledge repository 42 may also include a temporal or time-based repository 51 (e.g., in the form of a time series database 55) that organizes process and product parameter data temporally. For example, the temporal repository 51 may store a time series of process parameter values for a tank fill level of a particular tank within the process plant from 1:00 pm to 2:00 pm on Dec. 15, 2021. In some implementations, the graph data and time series data may be included in separate databases 53, 55. In other implementations, the graph data indicative of relationships between process plant-related data and the time series data indicative of process parameter values over time may be included in the same database.

The knowledge repository 42 may be used to provide search results responsive to process plant search queries and batch queries related to particular batch processes in the process plant 5. The knowledge repository 42 may also be used to generate machine learning models for predicting future states of process plant entities within the process plant 5. Additionally, the knowledge repository 42 may be used to provide knowledge/relationship data for various applications that analyze process plant-related data within the process plant 5, such as soft sensor analytics and monitoring applications, parameter lifecycle applications, perturbation applications, step testing applications, or batch provisioning, scheduling, and/or control applications.

Still further, the knowledge repository 42 may be used to constrain the operations of processes in the process plant. For example, relationships in the knowledge repository 42 may be used to constrain a parameter rate of change, equipment selection, batch executive operation, or any other suitable processes. More specifically, the relationships in the knowledge repository 42 may indicate a high likelihood of a failure when a value for a particular process parameter changes by more than a threshold amount over a threshold time period. Accordingly, an operator may be provided with a particular range of set point values in which the operator can change the process parameter value over the threshold time period. The operator may not be allowed to deviate from the acceptable range of values.

Indeed, the edge-facing component 12 provides one or more access mechanisms 48 via which the external systems 8 may access at least some of the knowledge stored in the knowledge repository 42. Each access mechanism may respectively include yet another level of protection against possible security breaches from the external systems 8. For example, access mechanisms 48 may be implemented using application programming interfaces (APIs), containers, servers, etc. to aid in preventing external systems from unauthorized access of the knowledge repository 42 and/or of the process plant 5. Further, access mechanisms 48 may be respectively configured to obtain different types of data and/or information from the different architectures or structures of various portions of the knowledge repository 42. For example, a first access mechanism 48 may be configured to optimize the duration and/or efficiency of a retrieval of graph data 53 included in the contextual repository 49 of the knowledge repository 42, and a second access mechanism 48 may be configured to optimize the duration and/or efficiency of a retrieval of time-series data 55 included in the temporal repository 51 of the knowledge repository 42. The edge-facing component 12 of the edge gateway system 1 and its subcomponents are discussed in more detail elsewhere in this disclosure.

Generally speaking, the features, components, and architecture of the edge gateway system 1 provide access of external systems 8 to process plant-related data in a highly secure manner and without impacting the performance of the process plant 5, e.g., by providing secure access mechanisms to process-plant related data stored in the knowledge repository 42. Additionally, as the edge gateway system 1 contextually provides process plant-related data to the external systems 8, e.g., provides process plant-related content data within the context of the configuration of the process plant 5, external systems 8 may more quickly and easily find and consume process-plant related data. Further, the edge gateway system 1 allows for a multiplicity of different types of applications to safely and easily operate on the contextual knowledge corresponding to the process plant 5, such as mobile connectivity applications, advanced analytical applications, open-systems technology applications (e.g., Node.JS, Docker, Linux, etc.), custom applications, IoT applications, IIoT applications, business and/or enterprise applications (e.g., Excel, Power BI, etc.), and/or other types of applications. Still further, the edge gateway system 1 is easily adaptable to aggregate process plant-related data from multiple process plants and discover related aggregated knowledge therefrom, as well as to aggregate data from external systems at higher levels of security (such as weather systems, supply chain systems, financial systems, etc.) and discover related aggregated knowledge therefrom.

Figure 1B:
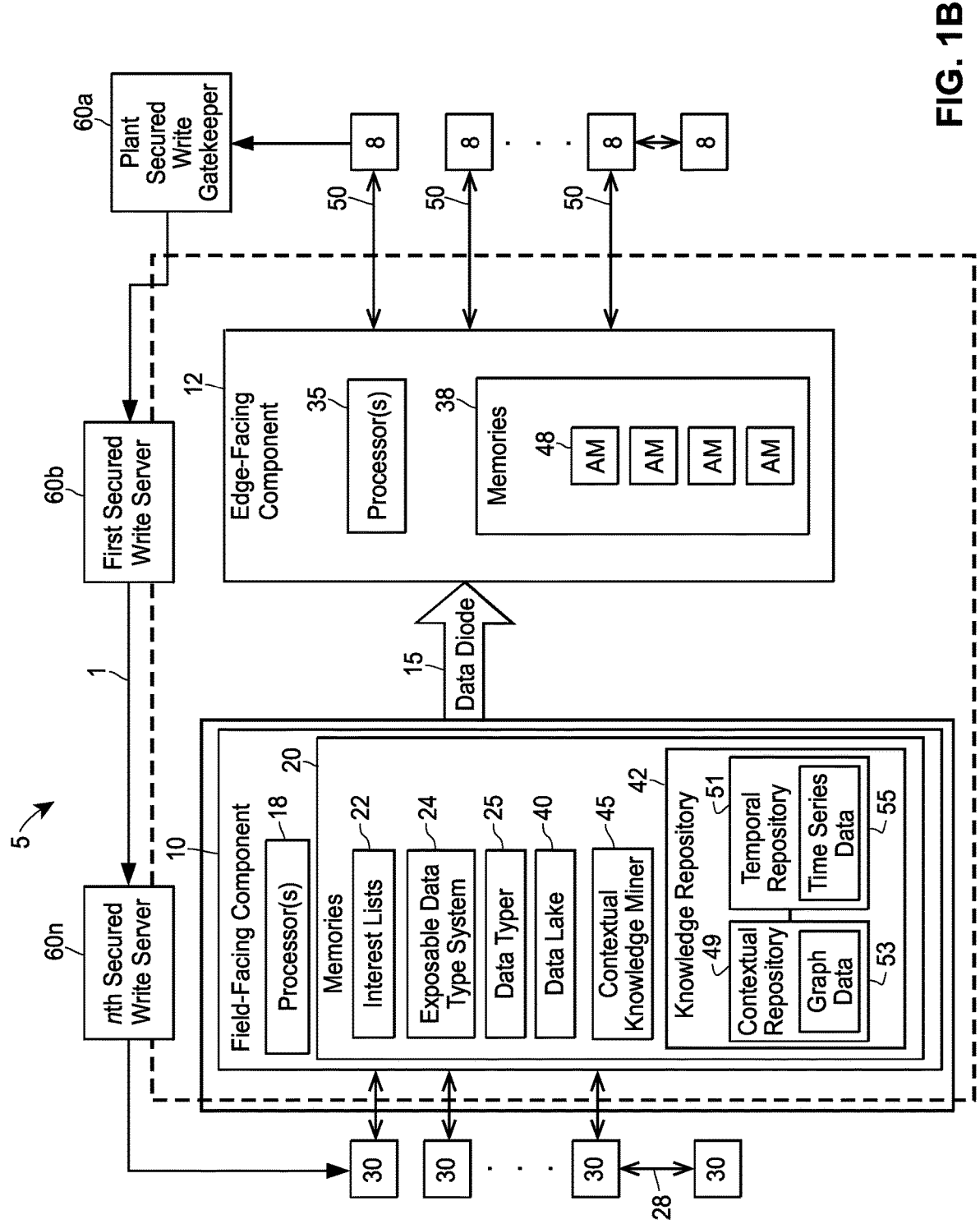
FIG. 1B is a block diagram of an example field gateway system for a process plant or process control system.

While the data lake 40, contextual knowledge miner 45, and knowledge repository 42 are illustrated as being within the edge-facing component 12 in FIG. 1A, one or several of these components may be additionally or alternatively included in the field-facing component 10 as shown in FIG. 1B. In the embodiment illustrated in FIG. 1B, the one or more memories 20 of the field-facing component 10 store respective data sets corresponding to a data lake 40 and a knowledge repository 42. The one or more memories 20 of the field-facing component 10 also store at least a partial copy or duplicate of the data from the data sources 30, respective computer-executable instructions for a contextual knowledge miner 45 and one or more access mechanisms for the knowledge repository 42. Of course, although not shown in FIG. 1B, the one or more memories 20 of the field-facing component 10 may store other sets of data and/or other sets of computer-executable instructions.

In other implementations, a first data lake, first contextual knowledge miner, and/or first knowledge repository may be included in the one or more memories 20 of the field-facing component 10 and a second data lake, second contextual knowledge miner, and/or second knowledge repository may be included in the one or more memories 38 of the edge-facing component 12.

In some implementations, the field-facing component 10 may provide raw data to the data lake 40 in the edge-facing component 12 via the data diode 15. The contextual knowledge miner 45 may then generate/modify/update the knowledge repository 42 using the raw data from the data lake 40. For example, the contextual knowledge miner 45 may update the knowledge repository 42 using event-based updates, such as operator actions, queries, faults, batch execution data, batch configuration data, non-process plant disturbances, shift/personnel changes, etc.

In other implementations, the field-facing component 10 generates a first knowledge repository using a first data lake and first contextual knowledge miner at the field-facing component 10. The field-facing component 10 then provides the knowledge data/relationships from the first knowledge repository to the edge-facing component 12 via the data diode 15. The edge-facing component 12 may then generate/modify/update a second knowledge repository at the edge-facing component using the knowledge data/relationships received from the first knowledge repository at the field-facing component 10.

Figure 2:
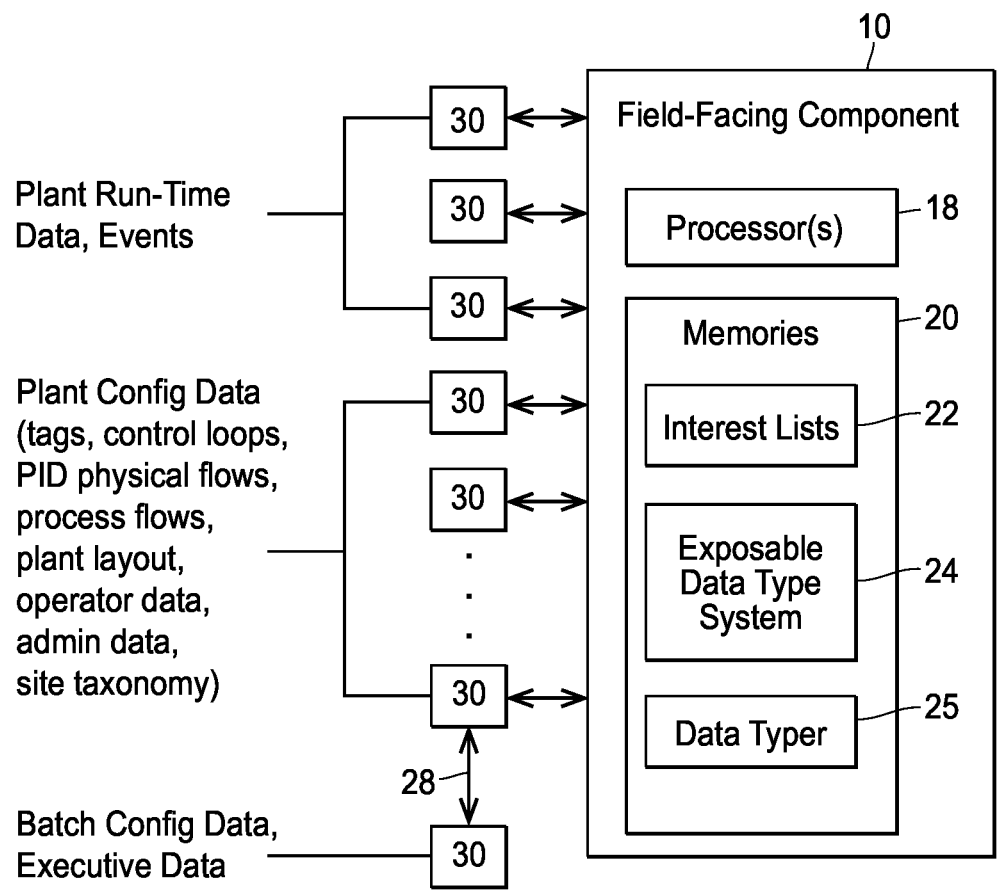
FIG. 2 is a detailed block diagram of the example field-facing component of FIG. 1A or 1B.

FIG. 2 is a detailed block diagram of the example field-facing component 10 of FIG. 1A or 1B. The field-facing component 10 obtains data from various data sources 30 associated with the process plant 5. The types of data generated by the data sources 30 include plant run-time data, such as time series data for process parameters and plant event data, such as alarms, warnings, equipment failures, excessive dead band, dead time, etc. The data types also may include plant configuration data for example from the configuration database, such as tags, control loops, PID physical flows, process flows, plant layouts, operator shift data, operator permissions data, administrator data, a site taxonomy of terms used at a particular site, etc. For example, the field-facing component 10 may receive FHX files and/or PID data from the data sources 30 indicating configurations of process plant entities the process plant. The plant configuration data may be used to initialize the data lake 40 and report update events. Additionally, the data types may include batch configuration data and executive data which also may be used to initialize the data lake 40 and report update events. For example, the contextual knowledge miner 45 may update the knowledge repository 42 using event-based updates, such as operator actions, queries, faults, batch execution data, batch configuration data, non-process plant disturbances, shift/personnel changes, etc. While these are a few example data types, the field-facing component 10 may receive additional or alternative types of data from the data sources 30 and may receive any suitable process plant-related data.

Figure 3:
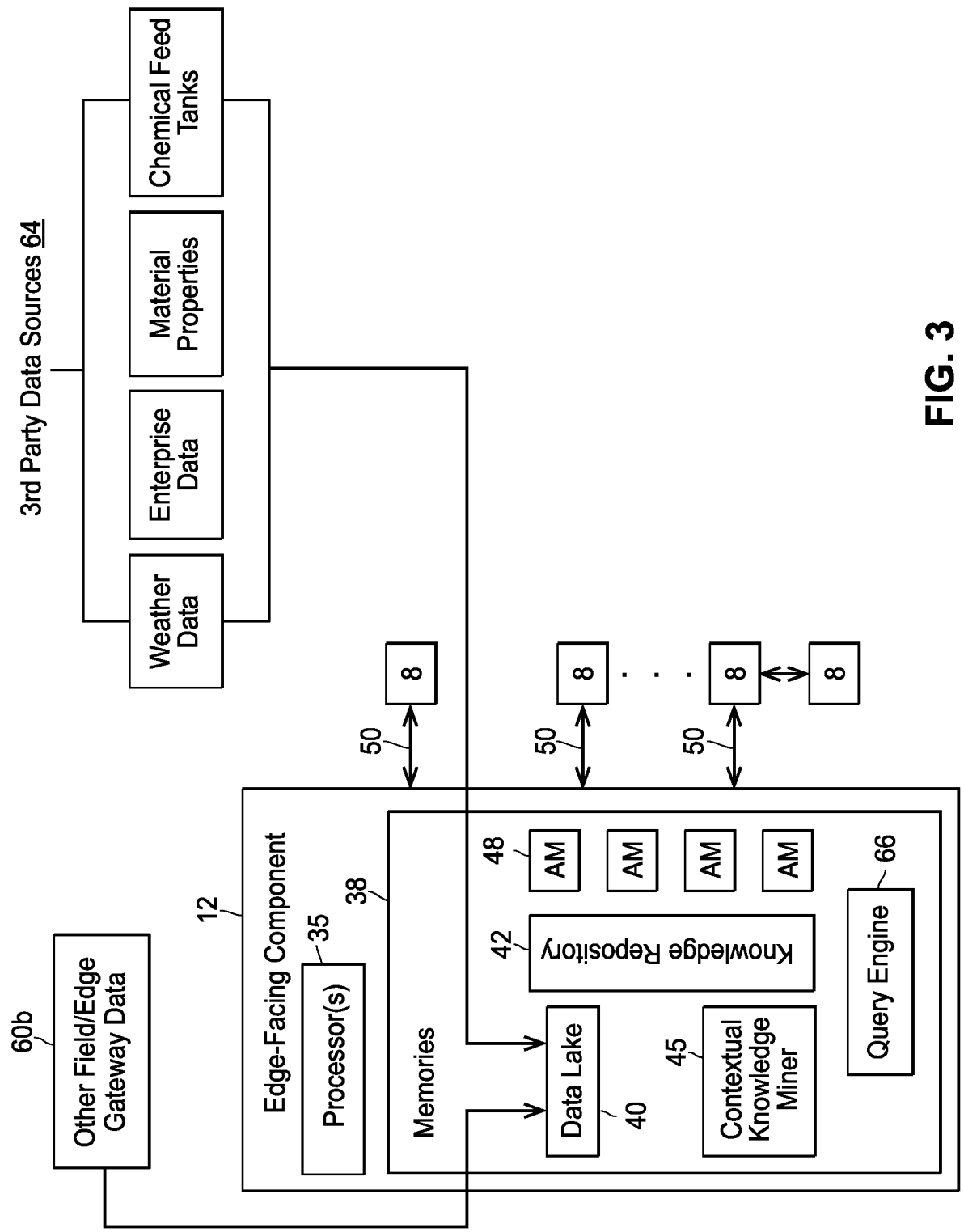
FIG. 3 is a detailed block diagram of the example edge-facing component system of FIG. 1A or 1B.

FIG. 3 is a detailed block diagram of the example edge-facing component 12 of FIG. 1A or 1B. As mentioned above, the edge-facing component 12 may include a data lake 40. The content data in the data lake 40 may include data from the field-facing component 10, such as a local copy or duplicate of the exposable data type system 24A of the field-facing component 10. Additionally, the content data in the data lake 40 may include data from external sources, such as data from other field-facing components or edge-facing components 62 in the process plant 5 or in another process plant. The field-facing components or edge-facing components 62 from other process plants may include their own knowledge repositories and may provide knowledge data/relationships from the other process plants. Additionally or alternatively, at least some field-facing components or edge-facing components 62 from other process plants may not include their own knowledge repositories and may instead provide raw data from the other process plants to the edge-facing component 12. The edge-facing component 12 can then organize the raw data from the other process plants into knowledge data/relationships using the contextual knowledge miner 45. For example, the other process plants may provide configuration files such as FHX files to the edge-facing component 12, and the contextual knowledge miner 45 may identify relationships between process plant entities in the other process plants based on the configuration files.

In other implementations, the edge-facing component 12 may be a multi-plant edge-facing component 12 for multiple process plants which receives data from multiple field-facing components corresponding to the multiple process plants or a multi-plant field-facing component 10. Moreover, the external sources may include third-party data sources 64 which provide third-party data related to the process plant 5, such as weather data or other data related to potential disturbances that may affect the process plant 5, enterprise data, supply chain data, data related to the material properties of materials in the process plant 5, data from chemical feed tanks, etc.

Figure 8:
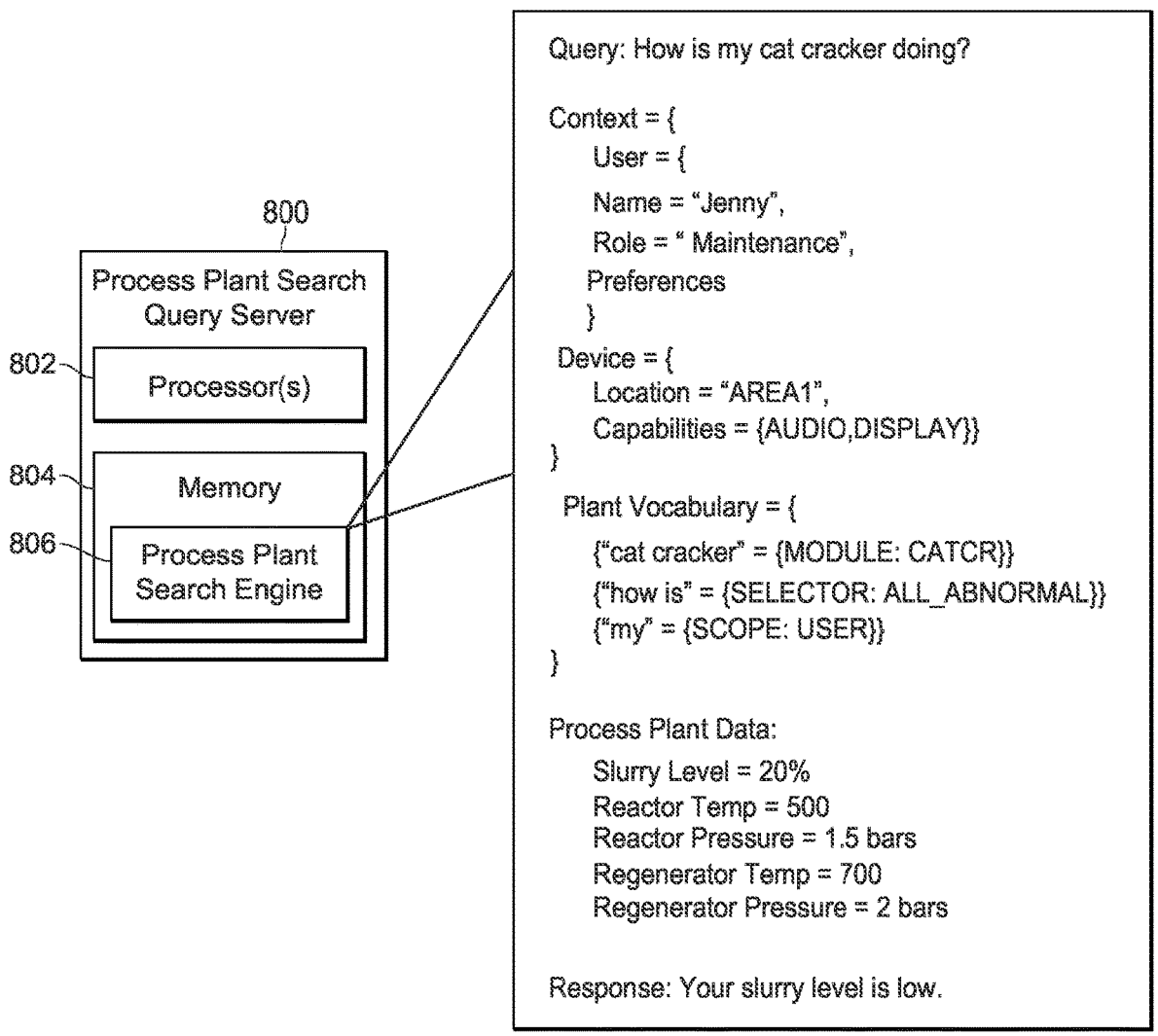
FIG. 8 illustrates a block diagram of an example process plant search query server.

The edge-facing component 12 may also include a query engine 66 for querying the knowledge repository 42. In other implementations, the query engine 66 is included in a separate server from the edge-facing component 12. For example, the query engine 66 may be a process plant search engine in a process plant search query server as shown in FIG. 8. In yet other implementations, such as when the knowledge repository 42 is included in the field-facing component 10, the query engine 66 may be included in the field-facing component 10, and/or the field-facing component 10 may include a first query engine for querying a first knowledge repository in the field-facing component, and the edge-facing component 12 may include a second query engine for querying a second knowledge repository in the edge-facing component.

In any event, the query engine 66 obtains process plant search queries from external systems 8, such as user interface devices external to the process plant 5 (e.g., mobile devices, desktop computers, laptop computers, wearable devices, vehicle head units, etc.). The query engine 66 then obtains (e.g., via one or more access mechanisms 48) process plant-related data relevant to a process plant search query from the knowledge repository 42 and generates process plant search results based on the obtained process plant-related data. The query engine 66 may obtain a process plant search query in a natural language format and may analyze the process plant search query using natural language processing techniques, described in more detail below. For example, the query engine 66 may utilize a site taxonomy to map particular terms in the query to process plant entities. In some embodiments, to service a single query from an external system 8, a single access mechanism 48 may be utilized to obtain the requested information. In some embodiments, multiple access mechanisms may be utilized to obtain the information requested via a single, externally-generated query.

Figure 4:
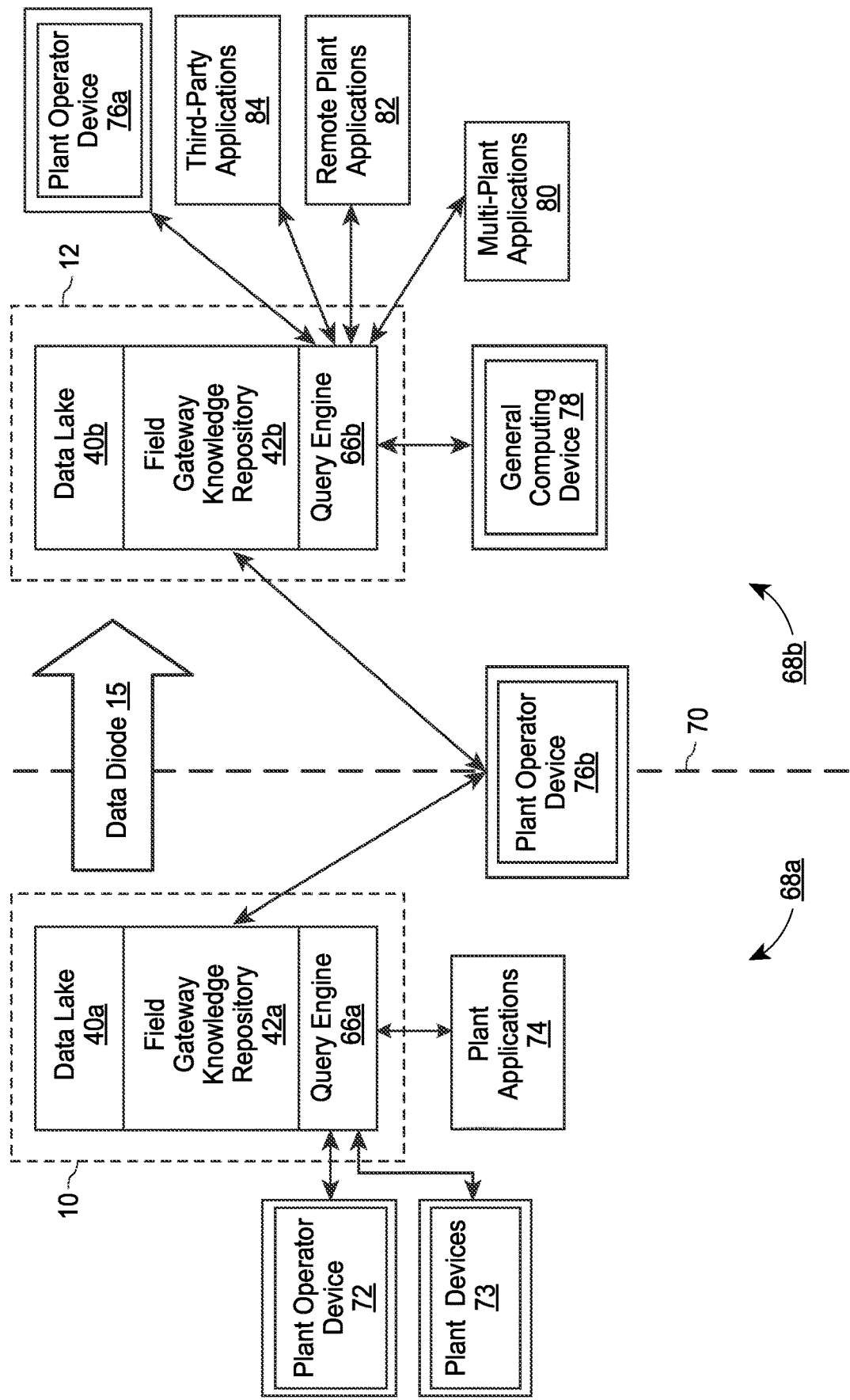
FIG. 4 is a block diagram of example software and hardware components internal and external to the process plant that communicate with the field-facing component and edge-facing component, respectively.

FIG. 4 illustrates example computing devices and applications that are disposed within 68a and external to 68b the cybersecurity barriers and/or mechanisms 70 protecting the process plant 5, and that can communicate with the knowledge repository and/or query engine at the field-facing component 10 and/or the edge-facing component 12. Computing devices and/or applications disposed within 68a the cybersecurity protections 70 of the process plant 5 may communicate with a first knowledge repository 42a and/or query engine 66a at the field-facing component 10, e.g., to obtain data and/or information stored in the first knowledge repository 42a. Such "internal" devices and/or applications can include, for example, a plant operator device 72 (e.g., an operator workstation, portable user interface, device, mobile workstation, etc.), a plant device 73 such as a controller, analyzer, router, field device, and/or other processing/computing devices associated with the process plant 5, and/or plant applications 74 executing on the plant operator device 72 and/or on the plant device 73. At least some of the data and information stored in the field gateway knowledge repository 42a may have been mined from a field gateway data lake 40a, e.g., in manners such as discussed elsewhere herein. The plant applications 74 may include soft or smart sensor analytics and monitoring applications, parameter lifecycle applications, perturbation applications, step testing applications, batch query applications, batch provisioning, scheduling, and control applications, or any suitable applications for analyzing process plant-related data within the process plant 5. These applications are described in more detail below.

Remote computing devices and/or applications disposed outside of or external to 68b the cybersecurity barriers and/or mechanisms 70 protecting the process plant 5 may communicate with a second knowledge repository 42b and/or query engine 66b at the edge-facing component 12, e.g., to obtain data and/or information stored in the second knowledge repository 42b. At least some of the data and information stored in the edge gateway knowledge repository 42b may have been mined from an edge gateway data lake 40b, e.g., in a manner such as previously discussed.

Such "external" devices and/or applications which may obtain information and/or knowledge from the second knowledge repository 42b can include, for example, a plant operator device 76a (e.g., an operator workstation, portable user interface, device, mobile workstation, etc.), a general engineering/computing device 78, multi-plant applications 80 executing on a general engineering/computing device 78 and/or other devices, remote plant applications 82 executing on a remote computing device, or third-party applications 84 executing on a third-party computing device or other general engineering/computing devices, to name a few. The general engineering/computing device 78 and/or the plant operator device 76a may be a computing device of an agent of the process plant 5 (such as a mobile device, laptop, tablet, vehicle computing device, or other type of remote computing device operated by an operator, configuration engineer, or other agent associated with the process plant 5). Additionally or alternatively, one or more of the applications 80, 82, 84 may be executing on a computing device which is operated by an operator, configuration engineer, and/or other agent of the process plant 5. In these situations, at least some of the applications 80, 82, 84 may include user interface applications, web client and/or other type of remotely-executing applications, downloaded applications, etc.

In example implementations, the multi-plant applications 80 may include parameter lifecycle applications which analyze process parameters and/or other data across multiple process plants. The remote plant applications 82 may include similar applications as the plant applications 74, where the remote plant applications 82 are executed on computing devices which are remote from the process plant 5, so that for example, an operator can view process plant-related data from her home, vehicle, or other remote location. These applications 80, 82 may include soft sensor applications, analytics applications, monitoring applications, parameter lifecycle applications, perturbation applications, step testing and/or other types of testing and/or diagnostic applications, batch query applications, batch provisioning, batch scheduling, and/or batch control applications, continuous process control applications, user interface applications, other types of process control and/or plant-applications, enterprise applications, web-client applications, downloaded applications, and/or other types of remotely-executing applications.

The third-party applications may include applications from (e.g., provided by) third-party organizations separate from the process plant or plants. These applications may invoke an API to access the process plant-related data in the knowledge repository 42*b*. For example, a distributor, retailer, transporter, etc. may execute a distributor/retailer/transporter application which invokes an API to view the state of a product produced by a manufacturer at the process plant 5 before it is shipped. In this manner, the distributor, retailer, transporter, etc. may receive real-time updates of the status of the product as it is being manufactured or the time when it will be ready to be shipped.

In some implementations, some computing devices and/or applications may communicate with both the first knowledge repository 42*a* and/or query engine 66*a* at the field-facing component 10, as well as with the second knowledge repository 42*b* and/or query engine 66*b* at the edge-facing component 12. These computing devices and/or applications may be configured and/or authorized to communicate with both the field-facing component 10 and the edge-facing component 12. For example, a plant operator device 76 (e.g., an operator workstation) may communicate with both the first and second knowledge repositories 42*a*, 42*b* and the first and second query engines 66*a*, 66*b*. In this manner, the plant operator device 76 may receive process plant-related data from within the process plant 5 and process plant-related data which includes data from external data sources, such as other process plants or third-party data sources, as described above with reference to FIG. 3.

As mentioned above, data from the process plant 5 is transmitted unidirectionally from the process plant 5 through a data diode 15 to the edge-facing component 12 so that any and all types of data (e.g., signaling data, control data, administrative data, payload data, etc.) flows only from the field-facing component 10 to the edge-facing component 12, and does not flow (and indeed, in some embodiments, is not physically able to flow) from the edge-facing component 12 to the field-facing component 10. To write data back into the process plant 5 from an external computing device or application 78-84 (and in some instances from a plant operator device 76 or other computing device or application 72-74 within the process plant 5), a series of n intermediate servers may validate the data and ensure that the user/application/computing device requesting to write the data to the process plant is authorized to perform the write operation. That is, process plant data and information may flow out of the process plant cybersecurity barriers and mechanisms to the edge gateway data lake 40*b* and edge gateway knowledge repository 42*b* via a first communication path (e.g., the data diode 15), and selected plant-related data and information may be written back into the process plant via a second, secured communication path (e.g., via the n intermediate servers, upon validation). As such, the communication path for outward data flow and the communication path for inward data flow may be separate and distinct, and thus may be individually or respectively secured in different manners to protect the process plant 5 from cybersecurity attacks and risks.

Figure 5A:
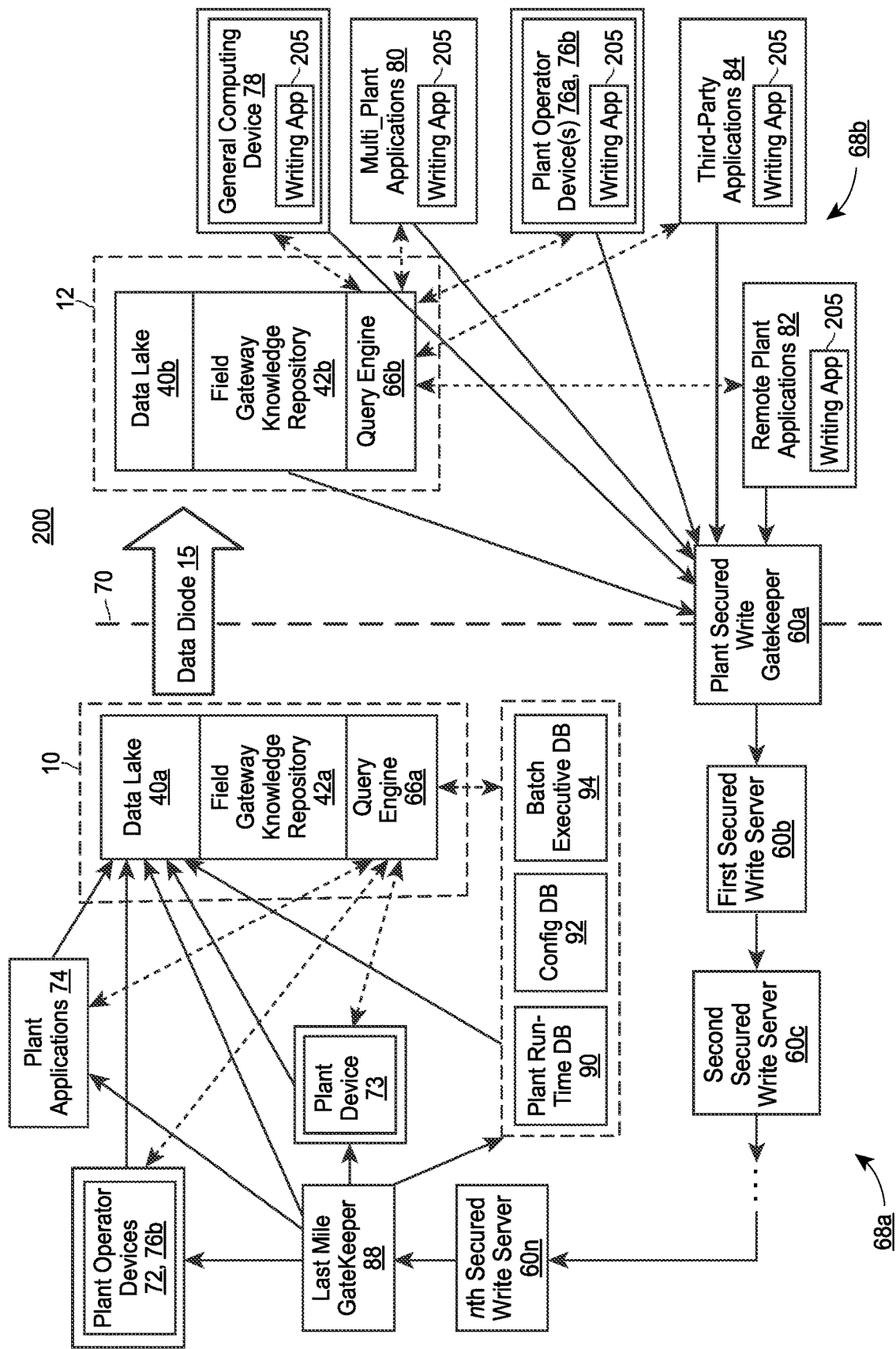
FIG. 5A is a detailed block diagram of secure write components which allow for internal and remote computing devices to securely write data and information to the field-facing component, the edge-facing component, and/or other components of a process control system or process plant.

To illustrate, FIG. 5A is a detailed block diagram of an example secured write architecture or system 200 that allows for external and/or remote computing devices and applications disposed outside of (e.g., external to) 68*b* the cybersecurity barriers and mechanisms protecting a process plant 5 from cyber-attacks, risks, and compromises to securely write data and/or information to data stores, devices, applications, and/or other components of the process plant 5 disposed within 68*a* the cybersecurity barriers and mechanisms 70 protecting the process plant 5. That is, the example secured write system 200 allows for a secured, reverse flow of data and information across the cybersecurity barriers and mechanisms 70 protecting the process plant 5. For ease of discussion, and not for limitation purposes, the architecture 200 is discussed with simultaneous reference to FIGS. 1A, 1B, and 2-4.

FIG. 5A depicts various components, data stores, devices, and applications which are disposed within 68*a* the cybersecurity barriers and/or mechanisms 70 protecting the plant 5. For example, the field-facing component 10 (including the data lake 40*a*, the field gateway knowledge repository 42*a*, and a query engine 66*a*) is disposed within 68*a* the cybersecurity barriers 70 of the process plant 5, the edge-facing component 12 (including the data lake 40*b*, the field gateway knowledge repository 42*b*, and the query engine 66*b*) is disposed outside of (e.g., external to) 68*b* the cybersecurity barriers 70 of the process plant 5, and the data diode 15 unidirectionally delivers data from the field-facing component 10 and/or other devices disposed within 68*a* the cybersecurity barriers 70 of the process plant 5 to the edge-facing component 12.

As shown in FIG. 5A, various internally-disposed devices 72, 73 and applications 74 are disposed within 68*a* the cybersecurity barriers 70 of the plant 5. At least some of the internally-disposed devices 72, 73 and/or applications 74 may be included in a process control system, an analytics system, a diagnostic system, an asset management system, a simulation system, and/or other systems of and/or associated with the process plant 5. The internally-disposed devices and applications 72, 73, 74 may access and/or obtain the data and information stored in the field gateway knowledge repository 42*a* via the query engine 66*a* (as denoted in FIG. 5A by the arrowed, dashed lines). Generally speaking, the query engine 66*a* corresponding to the field-facing component 10 shown in FIG. 5A may be similar to the query engine 66 corresponding to the edge-facing component 12 shown in FIG. 3. Further, the internally-disposed devices and applications 72, 74 may add data and/or information to the data lake 40a disposed within the cybersecurity barriers 70 (e.g., as denoted by the arrowed, solid lines in FIG. 5A) and/or to the data lake 40b disposed outside of the cybersecurity barriers 70 via the data diode 15 (not explicitly denoted in FIG. 5A), e.g., for analysis and mining of knowledge in conjunction with other contents of the data lake 40a, 40b in manners such as discussed elsewhere within this document. Still further, various other applications and data sources of the process plant 5 disposed within 68a the plant's cybersecurity barriers 70 (e.g., such as a process plant run-time database 90, a process plant configuration database 92, a batch executive database 94, and/or other components of the plant's process control system and/or other systems associated with the process plant 5) may add data and/or information to the data lake 40a (e.g., as denoted by the arrowed, solid lines in FIG. 5A), and/or to the data lake via the data diode 15 (not explicitly denoted in FIG. 5A), e.g., for analysis and mining of knowledge in conjunction with other contents of the data lake 40a, 40b, such as by using at least some of the techniques discussed herein.

FIG. 5A also depicts various components, devices, and applications which are disposed external to 68b the cybersecurity barriers and/or mechanisms 70 protecting the plant 5. For example, the edge gateway knowledge repository 42b and various externally-disposed devices and applications 76a, 76b, 78, 80, 82, 84 are disposed outside of or external to 68g the cybersecurity barriers 70 of the plant 5. As previously discussed, the externally-disposed devices and applications 76a, 76b, 78, 80, 82, 84 may access the data and information stored in the edge gateway knowledge repository 42b via the query engine 66b (as denoted by the arrowed, dashed lines in FIG. 5A) to securely access data generated by the process plant 5 and information related thereto. Additionally, the externally-disposed devices and applications 76a, 76b, 78, 80, 82, 84 may add data and/or information to the data lake 40b (not explicitly denoted in FIG. 5A) of the edge-facing component 12, e.g., for analysis and mining of knowledge in conjunction with other contents of the data lake 40b, e.g., in manners such as discussed elsewhere within this document.

At least one of the externally-disposed devices and applications 76a, 76b, 78, 80, 82, 84 can include one or more writing applications 205. Generally speaking, as categorically utilized herein, a "writing" application 205 is an application which generates data and/or information which is to be provided (e.g., "written") to a device, application, memory, data store, and/or component disposed within 68a the cybersecurity barriers 70 of the process plant 5, e.g., to thereby modify an operation performed by the process plant 5 and/or its associated systems (e.g., process control system, diagnostic system, analytics system, etc.) disposed within 68a the cybersecurity barriers 70, and/or to thereby modify a data store or a database of the process plant disposed within 68a the cybersecurity barriers 70. A writing application 205 may write or provide data and/or information to the process plant 5 while the process plant 5 is executing to control an industrial process during run-time, and in some cases, may write or provide data to dynamically modify, during run-time, a presently or currently executing industrial process. A writing application 205 can be an operator or user interface application, an analytics application, a soft sensor application, a smart sensor application, a remotely-executing process control system application, a third-party application, and the like. In some implementations, a writing application 205 may be service or other utility function which other applications can utilize to perform a secure write into the process plant 5. Further, a writing application 205 can be implemented as a web client, a stand-alone application executing on a host device or devices, etc. In some implementations, a writing application 205 and/or another application invoking the writing application 205 may obtain a data set from the edge gateway or edge facing component 12, e.g., by utilizing the query engine 66b to obtain data and/or information from the edge gateway knowledge repository 42b, and the writing application 205 and/or the invoking application may generate data or information based on (e.g., responsive to) the obtained data set, where the generated data or information is to be written or provided to one or more devices, components, applications, and/or data stores disposed within 68a the cybersecurity barriers 70 of the process plant 5. It is understood that although the writing applications 205 shown in FIG. 5A are categorically referenced by the single reference number 205 for ease of discussion, one or more different writing applications 205 and/or instances thereof can execute on the same and/or different devices 76a, 76b, 78, 80, 82, 84.

Examples of types of data and information which are to be written or provided by writing applications 205 disposed outside of the cybersecurity barriers 70 of the process plant 5 to devices, components, applications, and/or data stores disposed within the cybersecurity barriers 70 of the process plant 5 abound. For example, a writing application 205 may generate data and/or information (e.g., responsive to knowledge obtained from a query 66b of the edge gateway knowledge repository 42b) that is to be stored in a data store or database of the process plant 5, thereby modifying the data store or database. Data which is to be written by an external writing application 205 to a data store within the cybersecurity barriers 70 may be new data which is to be added to a data store (such as a result of an analysis, diagnostic, or test; operator notes; a new or additional trigger condition; data that is to be historized and/or logged, etc.), or may be a change to existing data within a data store (such an updated parameter value, an update to a configuration, an update to a limit, an update to a boundary condition, etc.). In some situations, data that is written by an external writing application 205 to a data store disposed within 68a the cybersecurity barriers 70 may cause a change in the run-time operations of the process plant 5. For example, when an external writing application 205 (such as a user interface application or an analytics application) writes or provides a change to a configuration of a control routine stored in the configuration database 92 of the process control system of the plant 5, run-time operations of the control routine would be modified accordingly upon instantiation and execution of the changed control routine. In another example, when an external writing application 205 (such as a user interface application or a soft sensor application) writes or provides a change to the scheduling of the execution of an internal diagnostic routine of the process control system, the schedule of the run-time execution of the diagnostic would be modified accordingly. In yet another example, when an external writing application 205 (such as a user interface application) defines a new triggering condition for a particular operation of the process control system, the new triggering condition may be stored in a corresponding data store and the particular operation would be triggered to execute upon an occurrence of the new triggering condition.

In some situations, an external writing application 205 may provide data or information to an application executing within the cybersecurity barriers 70 of the process plant 5, which may, in turn, cause a modification to the behavior or operations of the executing application and/or an associated application. For example, an operator may, via an external user interface application 205, respond to an alarm or alert generated by the process control system, and the response to the alarm or alert may be written or provided to the run-time application which generated the alarm or alert and/or to the associated display view application executing within the cybersecurity barriers 70 of the plant 5, e.g., to thereby cancel or disable the alarm or alert and indicate as such on an operator display view within the process plant 5. In another example, an external writing application 205 may change a limit or boundary condition of an application being executed by the process control system, thereby causing the application to modify its behavior in accordance with the changed limit or boundary condition. In yet another example, an external writing application 205 may be a service or other type of utility which may be utilized by other applications to perform a secured write to a data store and/or application within the process plant 5 as desired. Thus, external data and/or information may be written or provided to user interface applications and/or other applications executing within the cybersecurity barriers 70 of the plant 5.

In some situations, the data or information provided by the external writing application 205 to applications executing within the cybersecurity barriers 70 of the plant 5 may be an instruction or command to change or affect the current run-time behavior of the process plant 5 and/or to change or affect other aspects of the process plant 5, e.g., dynamically and in-line with run-time operations. For example, a user interface application may receive (e.g., from a user) or a monitoring application may issue a command or instruction to display a prompt for a batch process which is being executed by the process plant 5, may receive or issue a command to start or stop the execution of a batch or continuous process which is being controlled within the process plant 5, etc. In situations in which a user interface receives a user-generated command, the user-generated command may be received via auditory means (e.g., a microphone) or mechanical means (e.g., a keyboard, a touch screen, a mouse, etc.) using natural language, which may then be natural language-processed by the external writing application 205, the edge gateway system 12, and/or the plant secured write gatekeeper 60a to format the command into a syntax which is known to and/or understood by components and/or processors within the process plant 5. A more detailed description of natural language processing of user commands and user queries is provided elsewhere in this document.

Generally speaking, and as illustrated in FIG. 5A, an external writing application 205 provides data and/or information which is to be written to a device, component, application, and/or data store within the cybersecurity barriers 70 of the process plant 5 to a plant secured write gatekeeper 60a. The gatekeeper 60a serves as an initial secured write server and cybersecurity barrier 70 for a "reverse" flow of data or information into the process plant 5. The plant write gatekeeper 60a may provide several security functions to protect and guard the process plant 5 from a cybersecurity perspective. For example, the plant secured write gatekeeper 60a may automatically store a log of all data and/or information which was requested by external write applications 205 to be provided or written to devices, components, applications, and/or data stores within the process plant 5, along with corresponding identities of requesting external write applications 205, time stamps, etc. The plant secured write gatekeeper 60a may validate and/or authorize (e.g., may perform one or more validation and/or authorization procedures on) the data, information, and/or requesting party of the requested write, and may allow or prevent the requested write based on the results of the validation and/or authorization. That is, the plant secured write gatekeeper 60a may allow data and/or information which an external writing application 205 requests to write to the process plant 5 to flow into the process plant environment (e.g., behind the cybersecurity barriers 70) based on various validation and/or authorization criteria, such as the identity of the writing application and/or security credentials thereof, the identity of a user or operator who requested the write (if any) and/or respective security credentials of the user or operator, a type of data or information that is requested to be written, a context of the data or information, an expected range and/or other expected characteristics of the data or information (e.g., based on the data/information type, the context of the data or information, the user, the time/date of requested write, etc.), and/or other validation and/or authorization criteria. Indeed, in some situations, the plant write gatekeeper 60a may determine the context of the data or information and/or the expected range and/or other characteristics of the data and/or information that is requested to be written based on information in the field gateway knowledge repository 42a and/or the edge gateway knowledge repository 42b.

When the plant secured write gatekeeper 60a is not able to validate the write request and/or authorize a user or requestor of the write request, the plant write gatekeeper 60a may perform one or more security mitigation procedures. For example, the plant write gatekeeper 60a may log or record information indicative of the requested write, may prevent the data and/or information provided by the requested write from being written to and/or forwarded to any other device, component, or application disposed within the cybersecurity barriers 70 of the plant 5 (including any of the secured write servers 60b-60n and the last mile gatekeeper 88), may generate an alarm, an alert, and/or a notification to a pre-designated user interface or device, etc. Although FIG. 5A depicts the plant secured write gatekeeper 60a using a single box, it is understood that the plant secured write gatekeeper 60a can be implemented by one or more computing devices, memories, and/or processors having one or communicative connections to the writing applications 205 and, in some cases, to the field gateway knowledge repository 42a and/or its query engine 66 and/or the edge gateway knowledge repository 42b and/or its query engine 66b. For example, the plant secured write gatekeeper 60a may access information and/or contexts stored in one or more of the knowledge repositories 42a, 42b to validate data, users, requesting parties, devices, and/or applications, and/or other characteristics of a secured write request.

When the plant secured write gatekeeper 60a is able to successfully validate the write request and/or authorize a user or requestor of the write request, the plant secured write gatekeeper 60a may forward the request to a next (e.g., first) secured write server 60b, which performs a respective validation and/or authorization procedure on various information included in and/or associated with the write request. The validation and/or authorization procedure(s) performed by the first secured write server 60b may or may not be the same validation and/or authorization procedure(s) performed by the plant secured write gatekeeper 60a. When the first secured write server 60b is able to successfully validate and/or authorize the secured write request, the first secured write server 60b may forward the request to a next (e.g., a second) secured write server 60c, which in turn performs a respective validation and/or authorization procedure on the same or different information included in and/or associated with the write request. Upon a successful validation and/or authorization at the second secured write server the second secured write server 60c forwards the request to a next secured write server, and so on, through an nth secured write server 60n. In this manner, as each secured write server 60a-performs an independent, stand-alone validation procedure and/or authorization procedure on the write request, any possible risk which may be introduced by the secured write request is significantly reduced. A total number n of secured write servers and a designation of which types of validation procedures and/or authorization procedures are performed by each of the secured write servers may be pre-defined and configurable so that a provider of the system 200 may customize a degree and/or level of security for inbound or reverse data and information flow as desired.

Should any next secured write server 60b-60n be unable to successfully validate and/or authorize a write request (e.g., due to failure or inconsistency of results of the validation and/or authorization procedure, due to failure or sub-optimal performance and/or resources of the secured write server 60b-60n, due to a timeout or occurrence of an abnormal condition, etc.), the secured write server 60b-60n may initiate one or more security mitigation procedures, e.g., in a manner similar to that discussed above with respect to the plant secured write gatekeeper 60a. For example, the server 60b-60n at which the validation and/or authorization procedure(s) were not able to be successfully performed may log or record the unsuccessful event and associated characteristics, may raise an alert, alarm, and/or notify personnel, etc., and the server 60b-60n will not forward the write request to any other servers and/or devices disposed within the cybersecurity barriers 70 of the process plant 5 (of course, except for those specifically associated with cybersecurity mitigation, not shown in FIG. 5A).

On the other hand, if a write request is successfully validated and/or authorized by each of the n secured write servers, the write request may be then forwarded to a last mile gatekeeper 88. The last mile gatekeeper 88 may perform a final validation and/or authorization procedure on the write request, if desired. Moreover, the last mile gatekeeper 88 may route or forward the external data which was originally provided by an external writing application 205 to one or more recipient applications and/or to one or more data stores disposed within 68a the cybersecurity barriers 70 of the plant 5 to thereby modify the recipient application(s) and/or data stores, e.g., in manners such as discussed elsewhere herein. For example, the external data may be written to a run-time database 90 of the plant 5, to a configuration database 92 of the plant 5, to a batch executive database 94 of the plant, and/or to other databases or data stores, such as analytics databases, historian databases, logging databases, personnel databases, etc. In some situations, the external data may be additionally and/or alternatively written or provided to one or more recipient devices and/or applications, such as plant operator devices, operator interfaces, controllers, batch executives, analytics routines, system logging routines, diagnostics, simulation programs, and the like. When the process plant 5 includes a field gateway knowledge repository 42a, the external data may be written to an associated data lake 40a, e.g., for analysis and mining of related knowledge, and eventual transfer to and storage in the field gateway knowledge repository 42a.

Although FIG. 5A depicts the plant secured write gatekeeper 60a as being a separate and distinct component from the edge gateway system 1 or edge-facing component 12 (which includes the data lake 40b, external gateway knowledge repository 42b, and query engine 66b), this is for purposes of clarity of illustration only and is not limiting. Indeed, in some implementations, the plant secured write gatekeeper 60a may be integrally included in the edge gateway system 1 or the edge-facing component 12. Accordingly, in these implementations, process plant data and information may flow out of the process plant cybersecurity barriers 70 via a first communication path associated with the edge gateway system 1 or edge-facing component 12 (e.g., the data diode 15), and selected plant-related data and information may be written or flow back into the process plant 5 via a second, secured communication path associated with the edge gateway system 1 or edge-facing component (e.g., via the plant secured write gatekeeper 60a). As such, the edge gateway system 1 and/or edge-facing component 12 may provide and maintain respective, separate and distinct communication paths therein for outward data flow and for inward data flow; however, the communication paths have different architectures and are differently and independently secured to protect the process plant 5 from cybersecurity attacks and risks.

Figure 5B:
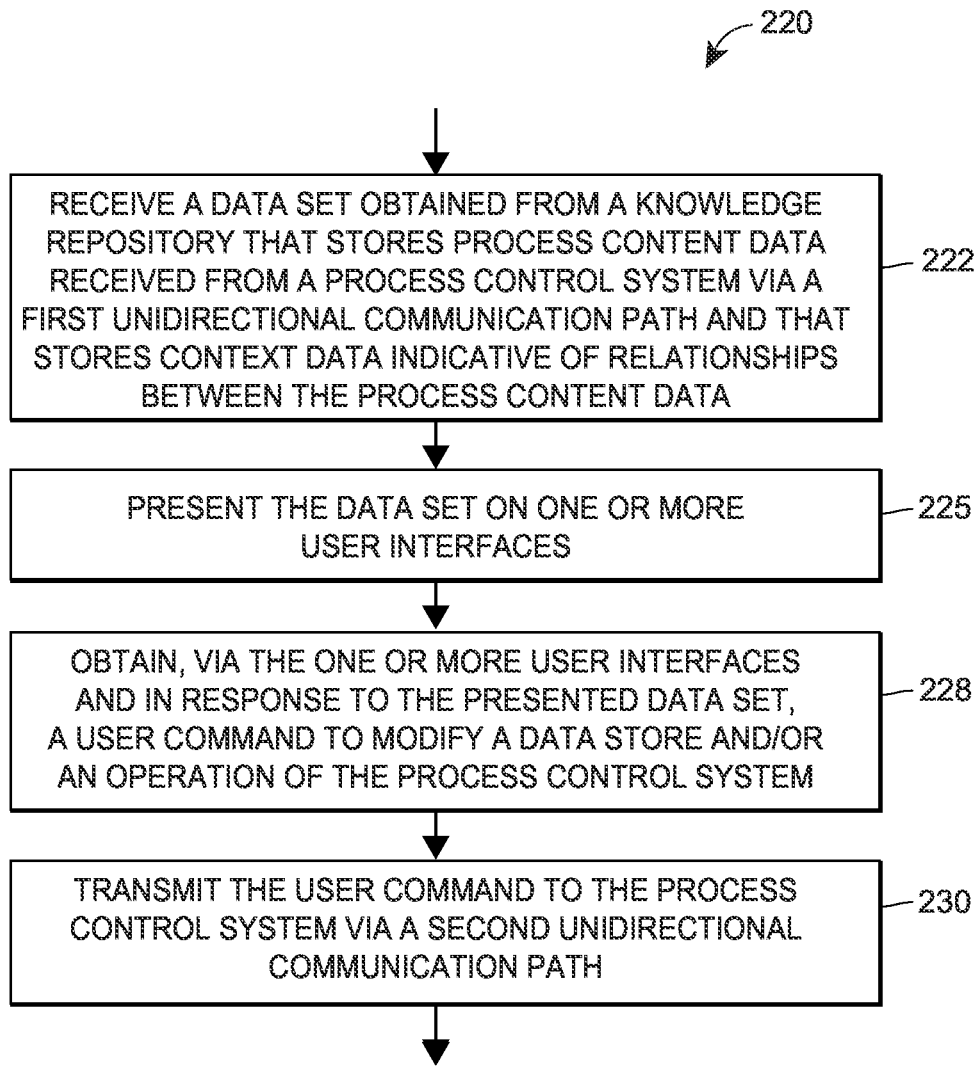
FIG. 5B depicts a flow diagram of an example method for users to securely interact with a process control system of a process plant.

FIG. 5B depicts a flow diagram of an example method 220 for users to securely interact with a process control system of a process plant. The method 220 may be performed by an external device or application operated by a user or other person associated with an industrial process plant, e.g., while a process control system of the process plant is executing during run-time to control an industrial process. For example, referring to FIGS. 4 and 5A to illustrate, at least a portion of the method 220 may be performed by the computing devices 76a, 76b, 78, by one of the applications 80, 82, 84, 205 and/or by another computing device or application disposed outside of (e.g., externally to) 68b the cybersecurity barriers 70 of the process plant 5. Generally speaking, the device or application which executes at least a portion of the method 220 may be communicative connection with one or more components of the system 1 of FIG. 1A, FIG. 1B, FIG. 3, or FIG. 4, e.g., during runtime of an industrial process being controlled by the process control system of the process plant. For example, the device or application which executes at least a portion of the method 220 may be in communicative connection with an edge-facing component or edge gateway system 12. The device or application executing at least a portion of the method 220 may be communicatively connected with the cyber-protected components of the process plant (e.g., components disposed within the cybersecurity barriers 70 of the plant) via at least two communication paths and/or interfaces, which may be separate, distinct, and independent paths or interfaces. For example, as illustrated in FIG. 5A, the computing device 76a, 76b, 78 or application 80, 82, 84, 205 may obtain data or information provided by the process control system and/or other components or data sources 30 of the process plant via a first communication path (e.g., a data/information outflow path, such as the edge gateway system 12 including the data diode 15 and edge gateway knowledge repository 42b), and may provide data or information to the process control system and/or other components of the process plant via a second communication path (e.g., a data/information inflow path, such as the plant secured write gatekeeper 60a, and optionally the secured write servers 60b-60n and last mile gatekeeper 88).

Additionally, the device or application which executes at least a portion of the method 220 may include one or more user interfaces via which the user can interact with the device or application, e.g., via which the user may view, read, or otherwise consume information provided by the device or application, and/or via which the user may write or enter information to the device or application. As such, the device which executes at least a portion of the method 220 or the device on which an application executes at least a portion of the method 220 may be a user interface device operated by an operator or other personnel associated with the plant 5, and/or the application may be a user interface application utilized by the operator or other personnel associated with the plant 5. For example, the user interface application may be a web client or some other type of user interface application executing on the computing device. Further, in some embodiments, the method 220 may include more, less, and/or alternate steps than depicted in FIG. 5B. For ease of illustration and not for limitation purposes, the method 220 is discussed below with simultaneous reference to FIGS. 1A, 1B, 3, 4, and 5A.

At a block 222, the method 220 may include receiving a data set obtained from a knowledge repository of the process control system. For example, the block 222 may include receiving a data set obtained (e.g., via the query engine 66*b*) from the knowledge repository 42*b* of the edge-facing component 12. The knowledge repository 42*b* may store process content data generated by and/or related to the industrial process, and the knowledge repository 42*b* may also store context data indicative of relationships between the process content data. The process content data may have been received by the knowledge repository 42*b* from the process control system via a unidirectional communication path configured to deliver data and information from the process plant 5, e.g., the data diode 15, for example.

In embodiments, receiving 222 the data set may be responsive to a query which was transmitted from the computing device to a query engine associated with the knowledge repository, e.g., the query engine 66*b* associated with the edge gateway knowledge repository 42*b*. In these embodiments, the user interface application or another application executing on the computing device may transmit a query to the query engine, where the search query indicates a request for knowledge, data, and/or information stored in the knowledge repository 42*b*, and the data set may be responsive to the query.

For example, an application executing on the computing device may autonomously or automatically generate and transmit a search query requesting knowledge, data, and/or information which the requesting application is to utilize during its execution. The requesting application may be an application which does not inherently provide any user interface and/or which executes without any in-line user input (such as an analytics application, a monitoring application, a soft sensor, a multi-plant application, a remote process plant application, or another type of process plant application). For instance, a monitoring application may generate and transmit a request for a current status or state which is to be utilized by the monitoring application, or an analytics application may generate and transmit a request for certain data associated with occurrences of a detected condition.

In another example, a user (such as an operator) may enter a user query via the user interface application executing at the computing device, and the query transmitted to the query engine may be based on the user query. In some situations, the user query may be a natural language query. For example, the user may use natural language to generate a user query by using his or her voice (e.g., via a microphone), or by using mechanical or textual means (e.g., via a keyboard, a touch screen, a mouse, etc.). The user query may be natural language-processed by the generating user interface application, the query engine 66*b*, and/or other components of the edge gateway system 12 into a search query which has a syntax utilized by the query engine 66*b* to access the knowledge repository 42*b* and obtain data and/or information therefrom, e.g., an "repository access" query or "access" query. That is, a repository access query or access query of the knowledge repository may be generated from the user query or other type of query transmitted from the computing device to the query engine. A more detailed description of the natural language processing (NLP) of user queries and commands is provided elsewhere within this document.

At any rate, at a block 225, the method 220 may include presenting the data set on the one or more user interfaces of the computing device. For example, the data set may be provided to a user interface application and/or may be transmitted to a user interface device so that the data set may be presented on a screen, delivered via audio output, visually projected, etc.

At a block 228, the method 220 may include obtaining, via the one or more user interfaces, a user command to modify at least one of an operation or a data store of the process control system or process plant. Typically, the user command is responsive to the presented data set. For example, a user may view and consider the presented data set, and may generate a subsequent or responsive user command based on his or her consideration of the presented data set. The user command may be entered by the user via the user interface application executing at the computing device and/or executing remotely. In some situations, the user command may be a natural language command. For example, the user may use natural language to generate a user command by using his or her voice (e.g., via a microphone), or by using mechanical or textual means (e.g., via a keyboard, a touch screen, a mouse, etc.). The user command may be natural language-processed by the generating user interface application, the plant secured write gatekeeper 60*a*, and/or other components of the edge gateway system 12. A more detailed description of the natural language processing (NLP) of user queries and commands is provided elsewhere within this document.

Generally speaking, the user command may be a command to modify a data store within the process plant 5 and/or to modify an operation performed by process plant 5. For example, the user command may be a command to write a data value to the data store, such as to write a new data value to the data store, to update a current data value stored in the data store to another data value, etc. In some situations, the new or updated data value may cause a modification to an operation of the process plant. For example, if the user command is a command to update a data value of a configuration, the operation performed by the process plant by using the instantiation of the configuration may be modified based on the updated configuration data value. For instance, the user command may be a command to modify a configuration of a control routine executed by the process control system of the process plant, or a configuration of a display view of the process control system. In another example, if the new data value is a new trigger condition for a particular operation (e.g., a notification or other type of operation), the execution of the particular operation may be modified to trigger upon an occurrence of the new trigger condition.

In some situations, the modified operation of the process plant may include a modified operation of an application which is executing within the cybersecurity barriers 70 of the process plant 5. For example, the user command may be a command to display a particular data value on one or more user interface applications executing within the cybersecurity barriers 70 of the process plant, the user command may be a response to an alert or an alarm generated by a corresponding application executing within the cybersecurity barriers 70 of the process plant, and the like. In some situations, user commands may be issued to modify runtime operating behaviors of continuous processes and/or of batch processes controlled by the process plant. For example, a user command may be a command to start or stop the execution of a batch industrial process, to display a prompt for a batch industrial process, to start or stop a portion of a continuous industrial process, to modify boundary conditions of a continuous process, etc.

At a block 230, the method 220 may include transmitting the user command to the process control system via a second communication path while the process control system is controlling the industrial process. The second communication path may be different, distinct, independent, and/or separate from the first communication path. For example, the second communication path may be a unidirectional communication path configured to deliver data and/or information to the process plant 5. The second communication path may include the plant secured write gatekeeper 60a and may exclude the data diode 15, for instance. In embodiments, both the first and the second communication paths may be provided by an edge gateway system 12 of the process plant 5, albeit in a separate and distinct manner, such as those previously described. In other embodiments, the first communication path may be provided by an edge gateway system 12 of the process plant 5 and the second communication path may be provided via a different component or system associated with the process plant 5. For example, the second communication path may include the plant secured write gatekeeper 60a, and the plant secured write gatekeeper 60a may be excluded from the edge gateway system 12, e.g., in manner such as previously described.

Of course, although not illustrated in FIG. 5B, the method 220 may include additional steps. For example, in some embodiments, the method 220 may further include receiving a response to the transmitted user command. The response may be received via the first communication path (e.g., via the data diode 15), for instance. In some embodiments, respective instances of the method 220 may be executed by both a user interface application and an application which does not provide any user interface (such as an analytics application, a soft sensor application, a smart sensor application, a remotely-executing process control system application, etc.), where both applications are executing on the same external computing device.

Figure 5C:
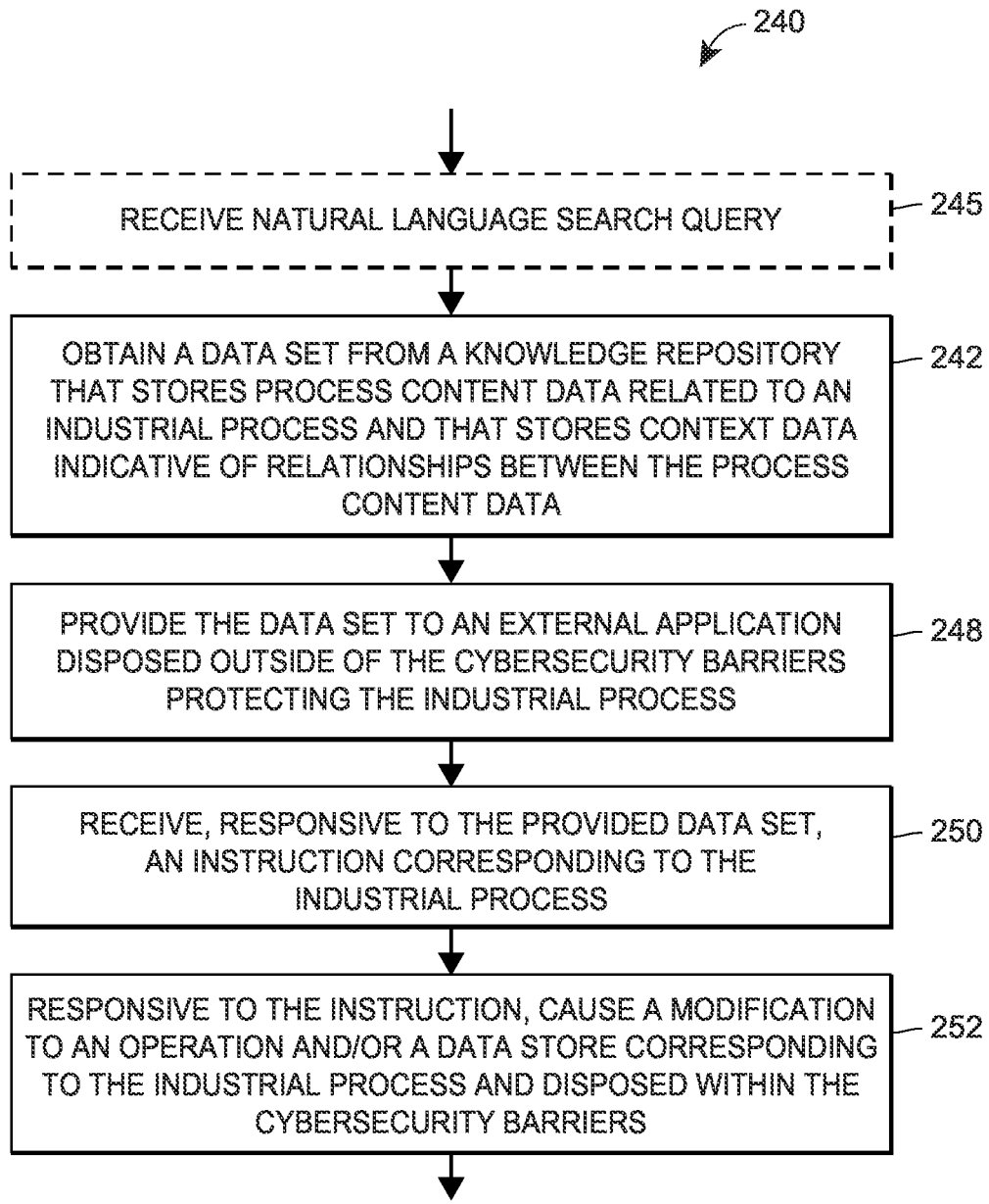
FIG. 5C depicts a flow diagram of an example method for external devices and/or external applications to securely interact with a process control system of a process plant.

FIG. 5C depicts a flow diagram of an example method 240 for external devices and/or external applications to securely interact with a process control system of a process plant. The method 240 may be performed by one or more components of the system 1 of FIG. 1A, FIG. 1B, FIG. 3, or FIG. 4, or by one or more components of the secured write system 200 of FIG. 5A. For example, at least a portion of the method 240 may be performed by an edge-facing component or edge gateway system 12, e.g., during runtime of an industrial process being controlled by the process control system. In some embodiments, the method 240 may execute in conjunction with at least a portion of the method 220 of FIG. 5B. Further, the method 240 may include more, less, and/or alternate steps than depicted in FIG. 5C. For ease of illustration and not for limitation purposes, the method 240 is discussed below with simultaneous reference to FIGS. 1A, 1B, 3, 4, 5A, and 5B.

At a block 242, the method 240 may include obtaining a data set from a knowledge repository storing process content data related to the industrial process and context data indicative of relationships between the process content data. For example, the method 240 may include obtaining 242 the data set from a knowledge repository 42a or 42b, and the obtaining 242 of the data set may be responsive to a query of the knowledge repository 42a, 42b (e.g., a "repository" query, "repository access" query, or "access" query, as interchangeably utilized herein) via respective query engines 66a, 66b. For example, the query engines 66a, 66b may utilize one or more access mechanisms 48 to access the respective contextual repository 49 and/or the respective temporal repository 51 of the knowledge repository 42a, 42b to thereby obtain the data set. The data set may include data values and optionally may include information related to the data values.

In some embodiments, the method 240 may optionally include receiving and processing 245 a search query, and obtaining 242 the data set from the knowledge repository is responsive to the received search query. For example, the search query may be received 245 from an external application (such as one of the applications 80, 82, 84) and the obtained data set (block 242) may include a response to the received search query and optionally may include related information. In some situations, the syntax of the received search query may be different than a syntax of the repository access queries which directly access the knowledge repository 42b to obtain data. In these implementations, the method 240 may further include generating the repository access query based on the received search query (not shown in FIG. 5C). For example, when the received search query is a natural language search query or a query of a particular communication protocol, the method 240 may include generating the repository access query based on the received search query, such as by translating, interpreting, mapping, transforming, converting, or applying some other suitable technique to the received search query. In some situations, a single received search query may be transformed into multiple repository access queries of the knowledge repository 49, 51.

Figure 5D:
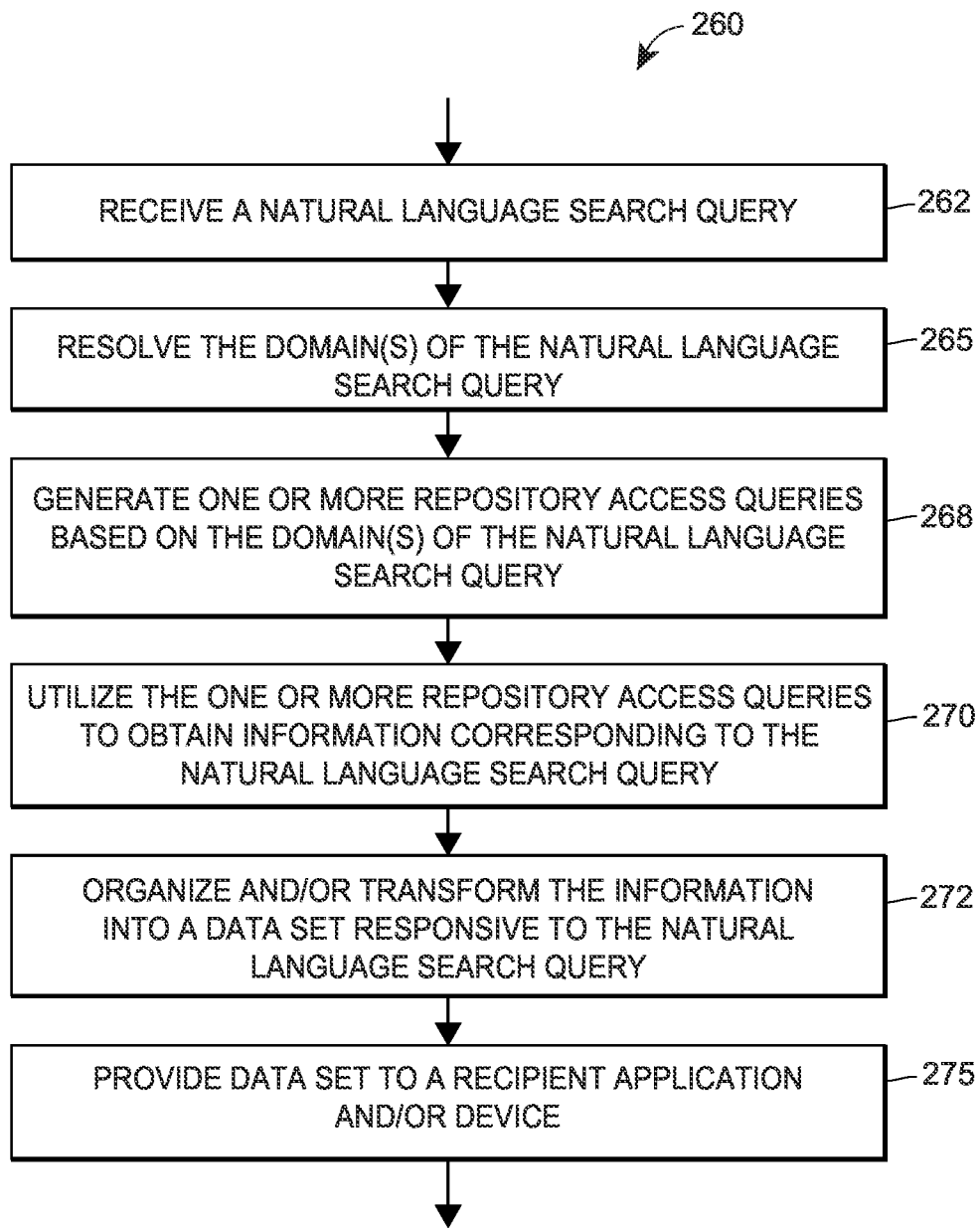
FIG. 5D depicts a flow diagram of an example method for generating one or more repository access queries based on a search query.

To illustrate, FIG. 5D depicts a detailed flow diagram of an example method 260 for generating one or more repository access queries based on a search query. In embodiments, the method 260 may be performed by one or more "external" devices and/or components disposed outside of 68b the cybersecurity barriers 70 of the process plant 5, such as the edge gateway 12, one or more components of the edge gateway 12 (such as the query engine 66b and/or another application executing at the edge gateway 12), a user interface application via which the search query was received, another application executing at an external device 76a, 76b, 78, another external application 80, 82, 84, or a combination thereof. In other embodiments, the method 260 may be performed by one or more "internal" devices and/or components disposed within 68a the cybersecurity barriers 70 of the process plant 5, such as the field gateway 10, one or more components of the field gateway 10 (such as the query engine 66a and/or another application executing at the field gateway 10), a user interface application 74 via which the search query was received, another application executing at a plant device 73 or plant operator device 72, 76b, another plant application 74, or a combination thereof. For clarity of illustration, though, and not for limitation purposes, the method 260 is described below by using an example embodiment in which the search query is a natural language search query received via a user interface associated with the process plant 5. It is understood, though, that the techniques described in conjunction with the method 260 are easily applicable to search queries of syntaxes and/or formats other than that of natural language, such as syntaxes and/or formats of various communication and/or computer protocols and/or languages.

Generally speaking, embodiments of the method 260 may execute in conjunction with at least a portion of the method 220 of FIG. 5B and/or at least a portion of the method 240 of FIG. 5C. For example, the method 260 may be performed upon receiving 245 a search query from a user interface application or from another type of application, as shown in FIG. 5C. Further, the method 260 may include more, less, and/or alternate steps than depicted in FIG. 5D. For ease of illustration and not for limitation purposes, the method 260 is discussed below with simultaneous reference to FIGS. 1A, 1B, 3, 4, 5A, and 5B.

At the block 262, the method 260 includes receiving a natural language search query for information associated with the process plant 5, where the natural language search query is provided by a user (e.g., by a person) via a user interface. The natural language search query may be of a voice format (e.g., entered by the user via a microphone or other suitable device), or the natural language query may be of a textual format (e.g., entered by the user via a keyboard, touchscreen, mouse, or other suitable device). The user interface may execute on an internal or external computing device with respect to the cybersecurity barriers 70 of a process plant 5, and the user interface may be provided by a user interface application or another application which is in communicative connection with the user interface.

At a block 265, the method 260 includes resolving one or more domains of the natural language search query. As utilized herein, and typically, a domain is associated with the process plant 5. Examples of domains associated with the process plant 5 may include a module, a block, a batch name, or some other logical or physical process control entity and/or type of data whose definition is stored at the process plant 5 or within the cybersecurity barriers 70 of the process plant 5. For example, one or more domains may be provided by, defined, and/or stored in a process control system; a configuration database, an asset management database; a database; indicating work shifts, personnel identities, authorizations, skill levels, makeups of teams, and/or other characteristics of plant personnel; or some other data store. In some embodiments, resolving 265 the domain (or domains) of the received natural language search query may include resolving the domain(s) at least partially based on a site-specific or plant-specific taxonomy. For example, a site- or plant-specific taxonomy (which may include classifications, categorizations, and/or conventions utilized for names and/or other types of identifiers of data types and of logical and/or physical process control entities or components) can be pre-defined and stored, and the method 260 may utilize the pre-defined taxonomy to resolve the domain(s) of the received natural language search request. In some embodiments, resolving 265 the domain (or domains) of the natural language search query may include resolving the domain(s) at least partially based on data obtained from third party data sources or stores 64, such as weather data, enterprise data, material properties data, chemical feed tank data, and/or data generated by other process plants or sites, to name a few.

In embodiments in which resolving 265 the domain of the natural language search query is performed externally 68*b* with respect to the cybersecurity barriers 70 of the process plant 5, resolving 265 the domain(s) of the search query may include accessing and utilizing the contents of the edge gateway knowledge repository 42*b* to determine one or more domains. For example, definitions of physical and/or logical process entities and types of data, as well as site- or plant-specific taxonomies and other domain-related data may have been delivered from the process plant 5 across the data diode 15 to the edge gateway data lake 40*b*, and may have been analyzed and mined in conjunction with other data included in the data lake 40*b*. The delivered data and any additional information gleaned or otherwise acquired from the analysis and mining may be stored in an organized manner in the edge gateway knowledge repository 42*b*, such as in manners such as discussed elsewhere herein. As such, information which the method 260 utilizes to resolve 265 the domain(s) of an externally-generated natural language search query may include accessing the edge gateway knowledge repository 42*b* to obtain said information, without having to communicate across the cybersecurity barriers 70 and risk compromising the plant 5 from a cybersecurity perspective. Thus, the external devices and/or applications executing the method 260 can obtain data and/or information which is stored in the process plant by obtaining a copy or transformation of said data which is stored in the edge gateway knowledge repository 42*b*.

Whether executed within 68*a* or outside of 68*b* the cybersecurity barriers 70 of the process plant 5, in some embodiments of the method 260, the block 265 may be omitted. Typically, though, the method 260 may include the block 265, as executing the block 265 may bound a size of a universe of the knowledge repository 42*a*, 42*b* which is to be searched, e.g., based on the resolved domain(s)), thereby resulting in a quicker, more efficient search for the information corresponding to the received search request.

At a block 268, the method 260 may include generating, based on the domain(s) of the natural language search query, one or more repository access queries to directly access the contents of the target knowledge repository 42*a*, 42*b*. For example, generating 268 the one or more repository access queries can include translating, interpreting, mapping, converting, and/or applying one or more other suitable transformation techniques to the received search query, where the applied technique(s) are associated with the determined domain(s) of the received search query. In some cases, the block 268 includes generating multiple repository access queries for a single search query. For example, a received natural language search query "Which operator shifts are correcting a particular error condition occurring in Module X the mostly quickly?" may result in the generation 268 of a first repository access query corresponding to a first domain corresponding to Module X, a second repository access query corresponding to a second domain corresponding to the occurrence of the particular error condition, and a third repository access query corresponding to an operator shift. In some situations, the results of a first repository access query may be utilized to generate a further repository query; that is, at least one of multiple repository access queries may be conditionally generated or formulated based on the output of another repository access query.

At a block 270, the method 260 may include utilizing the one or more repository access queries to obtain, from a knowledge repository 42*a*, 42*b*, information corresponding to the natural language search query. For example, the one or more repository access queries may be utilized to obtain data and/or information corresponding to the natural language query from the knowledge repository 42*a*, 42*b*. When the one or more repository access queries include multiple access queries, the queries may be applied to the subject repository 42*a*, 42*b* in parallel or sequentially. In some situations, at least some of the knowledge access queries may be conditionally applied to obtain desired information. For example, a first knowledge access query may obtain information indicative of a yield of a certain range, and a second knowledge access query may obtain information indicative of different operator shifts during which the yield of the certain range was achieved. In some situations, the initial output of multiple repository access queries may be collectively processed to obtain the desired information. For example, a statistical technique may be applied to outputs of multiple repository access queries to generate desired information. Generally speaking, obtaining the information from the knowledge repository 42*a*, 42*b* is responsive to the one or more repository access queries corresponding to the domain(s) of the natural language query.

At a block 272, the method 260 may include organizing the information into a data set responsive to the natural language search query. For example, the information may be formatted into a desired data set format, which may include a numerical and/or a natural language format. At a block 275, the method 260 may include providing the data set to a recipient application and/or device. For example, the data set may be provided to the application which generated the natural language search query, and/or the data set may be provided to another application, which may be an "internal" application executing within 68*a* the cybersecurity barriers 70 of the process plant 5, or may be an "external" application executing outside of 68*b* the cybersecurity barriers 70 of the process plant 5.

Generally speaking, at least some techniques utilized by the method 260 for natural language queries may be applied to other types of natural language inputs, as when the user command to modify at least one of an operation or data store of the process plant discussed with respect to block 228 of FIG. 5B is a natural language user command. For example, the natural language user command may be received in a manner similar to receiving 262 a natural language search query, and resolving the domain(s) of natural language user command may be performed in a manner similar to resolving 265 the domain(s) of the natural language search query. With natural language user commands, though, instead of the blocks 268-275, the method 260 may instead include transforming the natural language user command based on the resolved domain(s) into a syntax or format that is utilized by or otherwise known to the plant secured write gatekeeper 60*a* (not shown). For instance, the method 260 may include transforming, based on the resolved domain(s) of the natural language user command, the user command of the natural language format or domain into one or more commands of a communication and/or computer protocol or language which is utilized by the plant secured write gatekeeper 60*a*.

Returning now to FIG. 5C, at a block 248, the method 240 may include providing the data set to an external application executing on one or more computing devices external to cybersecurity barriers of the process control system. For example, at the block 248, the method 240 may include providing the obtained data set to one or more applications 80, 82, 84, to one or more applications executing on the device 76*a*, 76*b*, 78, and/or to one or more applications being executed by the processor(s) of the edge gateway system 12 itself. The external application may be, for example, a user interface application (e.g., which is executing on a computing device of an agent of the process control system or process plant 5), a remote process control system application executing on one or more remote computing devices, an enterprise application executing on one or more remote computing devices (where the enterprise application is provided by an enterprise associated with the process control system), or a third-party application provided by a third-party. The external application to which the data set is provided may or may not be the application which generated the search query (block 245). Further, the device on which the external application executes may be a mobile or a stationary device. Additionally or alternatively, the external application may be a soft or smart sensor application, a web client application, or another type of application.

At a block 250, the method 240 may include receiving, responsive to the provided data set, an instruction corresponding to the runtime industrial process. The instruction may be received from, for example, a remote process control system application (e.g., a smart or soft sensor application, monitoring application, analytics application, etc.), an enterprise application executing on one or more remote computing devices, a user interface application, or a third-party application provided by a third-party. For example, the instruction may be received from one of the applications 80, 82, 84. As such, the instruction may have been manually generated by a user (e.g., via a user interface application) or may have been automatically or autonomously generated by an executing application, which may or may not have or be communicatively connected to any user interface. The application from which the instruction is received may or may not be the application to which the data set was provided (block 248), and may or may not be the application from which an initial, associated search query was received (block 245).

In some situations, receiving 250 the instruction corresponding to the runtime industrial process includes receiving a command to modify a runtime operating behavior of an industrial process being controlled by the process control system. The command may relate to a batch industrial process, such as a command to stop or start an execution of a batch process being controlled by the process control system, a command to display a prompt for a batch process being controlled by the process control system, a command to stop or start an execution of a portion of a continuous process being controlled by the process control system, etc. The command may relate to a continuous industrial process, such as command to modify a portion of the execution of the continuous industrial process and/or to initiate, start, stop, or modify another process relating to the continuous industrial process (such as an analytic, diagnostic, monitoring, reporting, and/or other type of process).

In some situations, receiving 250 the instruction corresponding to the runtime industrial process includes receiving a command to modify a data store corresponding to the industrial process being controlled by the process control system. The data store may be a historization or long term data store, a configuration database, a cache or local data store utilized by an application, a data store related to the process plant 5 (such as an asset management data store, a report or logging data store, etc.), and/or other types of data stores associated with the process plant 5.

As such, at a block 252, the method 240 may include causing a modification to a data store within the cybersecurity barriers of the process control system in accordance with the received instruction. For example, the received instruction may be a command to write a data value to the process control system, and the modification may include the writing of the data value to the data store or to an application executing within the cybersecurity barriers 70 protecting the process plant 5. The data value that is to be written may have been determined based on the provided data set. For example, if the external application to which the data set was provided is a user interface application, upon viewing the provided data set a user may provide, via the user application, an instruction to write one or more data values determined based on the provided data set to the process control system, e.g., to a data store, to another user interface application, to a process control application, etc. In another example, if the external application to which the data set was provided is a soft sensor application or other type of remotely executing process control application, the external application may analyze the provided data set, determine one or more data values based on the analysis, and provide an instruction to write the determined one or more data values to the process control system, e.g., to a data store, to another user interface application, to a process control application, etc.

In some situations, the writing of the data value may cause or result in a modification to an operation of the process control system. For example, if the written data value is a change to a parameter value utilized by a process control loop, the process control loop may execute in accordance with the changed parameter value. In another example, if the written data value is an additional triggering condition for some action, the action may be triggered upon the occurrence of the additional triggering condition.

Generally speaking, when the command to write the data value to the process control system includes a command to change a current data value stored in the data store of the process control system, the modification may include the changing of the current data value to the data value indicated by the command. When the command to write the data value to the process control system includes a command to store a new data value at the process control system, the modification may include the storing of the new data value. Further, when the command to write the data value to the process control system includes a command to display the data value on a user interface of the process control system, the modification may include the display of the data value on one or more user interfaces of the process control system. Further, when the command to write the data value to the process control system includes a response to an alert or an alarm generated by the process control system, the modification may include a providing of the response to the alert or the alarm to the process control system application that generated the alert or the alarm; and when the command to write the data value to the process control system includes a command to store an indication of a triggering condition that, upon occurrence, causes the process control system to generate a notification, the modification may include the storage, in the data store, of an indication of the triggering condition.

In some situations, receiving 250 the instruction corresponding to the runtime industrial process includes receiving a command to modify a runtime operating behavior of the industrial process being controlled by the process control system, such as a command to stop or start an execution of a batch process being controlled by the process control system, a command to display a prompt for a batch process being controlled by the process control system, a command to stop or start an execution of a portion of a continuous process being controlled by the process control system, etc. In these situations, the block 252 may include causing a corresponding modification to an operation performed by the industrial process, e.g., starting or stopping execution, displaying a prompt, etc. In some situations, the modification may be applied while the industrial process is executing in run-time.

Generally speaking, causing 252 the modification to the operation and/or to the data store associated with the industrial process and disposed within the cybersecurity barriers 70 of the industrial plant may include transmitting an indication of the modification to a recipient application and/or data store disposed within the plant's cybersecurity barriers via a plurality of intermediate servers, such as in manners described elsewhere within this disclosure. For example, the indication of the modification may be transmitted to a plant secured write gatekeeper 60a for validation and delivery via other secured write servers 60b-60n to the recipient application and/or data store disposed within the cybersecurity barriers 70.

In some embodiments (not shown), the method 240 may further include updating at a knowledge repository associated with the process control system to include (i) additional content data indicative of at least one of the query, the data set, the instruction, or the modification, and (ii) additional context data indicative of respective relationships between the at least two of the query, the data set, the instruction, or the modification. For example, additional content data indicative of the query, the data set, the instruction and/or the modification may be added to the data lake 40a and/or 40b, mined in conjunction with other data stored within the data lake 40a and/or 40b to determine additional context data, and stored into the respective knowledge repository 42a, 42b. In some instances, the additional context data may be indicative of respective relationships between different types of the additional content data, such as respective relationships between the query and the data set, the query and the modification, the data set and the instruction, and/or any two or more different types of data included in the additional content.

Figure 6:
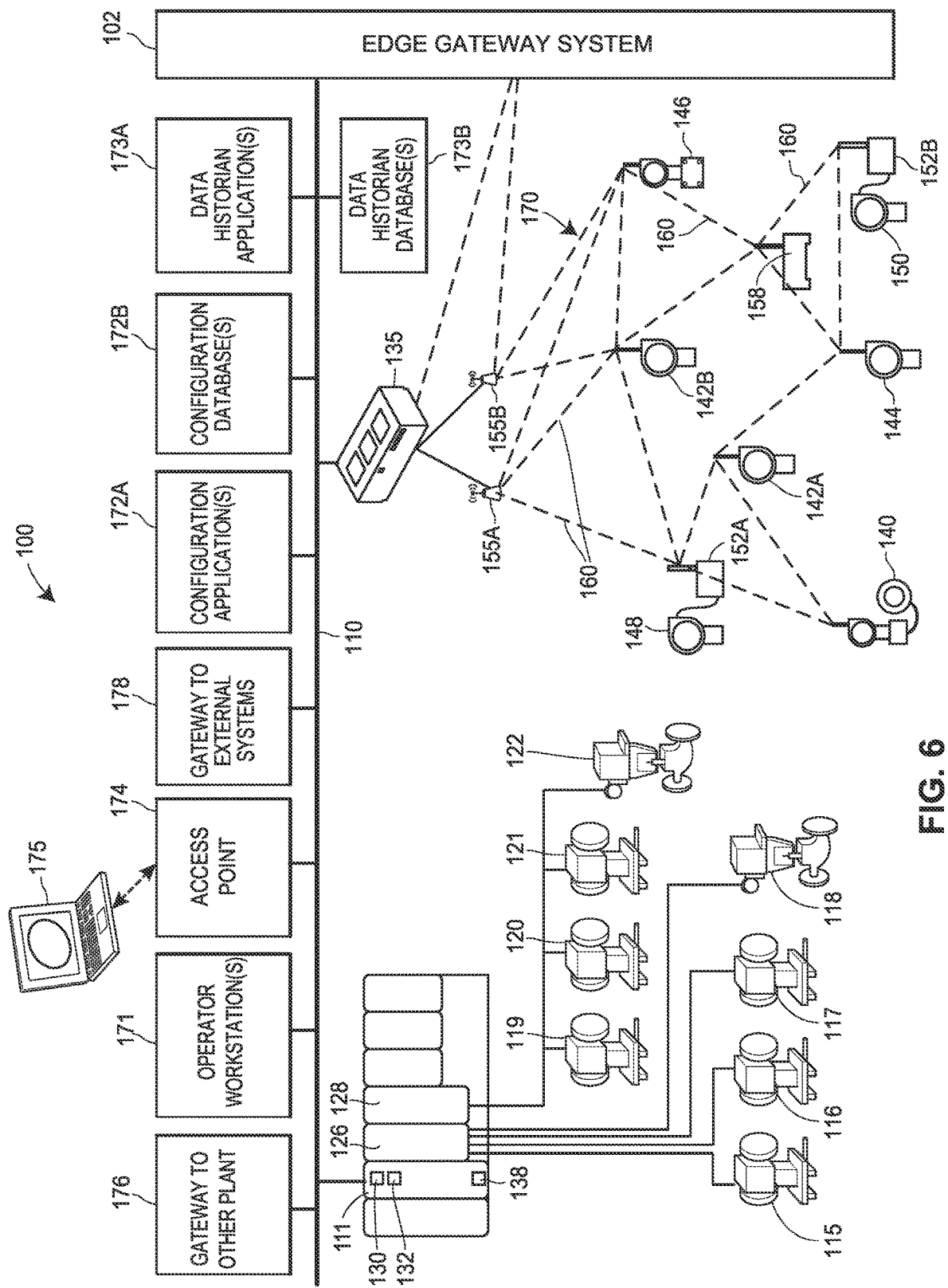
FIG. 6 is a block diagram of an example process plant that illustrates, inter alia, interconnections between various example components of the process plant or process control system, the process control system itself, and other example systems and/or networks.

FIG. 6 is a block diagram of an example process plant 100 which is configured to control an industrial process during on-line or run-time operations, and from which process plant-related may be securely delivered via embodiments of the edge gateway system 1. For example, the process plant 5 of FIG. 1A may include at least portions of the process plant 100 of FIG. 6. As shown in FIG. 6, the process plant 100 is communicatively connected to an edge gateway system 102, which may be an embodiment of the edge gateway system 1 of FIG. 1A, for example.

The process plant 100 (which is also interchangeably referred to herein as a process control system 100 or process control environment 100) includes one or more process controllers that receive signals indicative of process and/or other types of measurements made by field devices, process this information to implement a control routine, and generate control signals that are sent over wired or wireless process control communication links or networks to other field devices to control the operation of an industrial process in the plant 100. Typically, at least one field device performs a physical function (e.g., opening or closing a valve, increasing or decreasing a temperature, taking a measurement, sensing a condition, etc.) to control the operation of the process. Some types of field devices communicate with controllers by using I/O devices. Process controllers, field devices, and I/O devices may be wired or wireless, and any number and combination of wired and wireless process controllers, field devices and I/O devices may be included in the process plant environment or system 100.

For example, FIG. 6 illustrates a process controller 111 that is communicatively connected to wired field devices 115-122 via input/output (I/O) cards 126 and 128, and that is communicatively connected to wireless field devices 140-146 via a wireless gateway 135 and a process control data highway or backbone 110. The process control data highway 110 may include one or more wired and/or wireless communication links, and may be implemented using any desired or suitable or communication protocol such as, for example, an Ethernet protocol, an IP or other packet protocol, etc. In some configurations (not shown), the controller 111 may be communicatively connected to the wireless gateway 135 using one or more communications networks other than or in addition to the backbone 110, such as by using any number of other wired or wireless communication links that support one or more communication protocols, data protocols, and/or industrial automation protocols, e.g., Wi-Fi or other IEEE 802.11 compliant wireless local area network protocol, mobile communication protocol (e.g., WiMAX, LTE, or other ITU-R compatible protocol), Bluetooth®, HART®, WirelessHART®, HART-IP, Profibus, FOUNDATION® Fieldbus, etc.

The controller 111, which may be, by way of example, the DeltaV™ controller sold by Emerson Process Management, may operate to implement a batch process or a continuous process using at least some of the field devices 115-122 and 140-146. In an embodiment, in addition to being communicatively connected to the process control data highway 110, the controller 111 is also communicatively connected to at least some of the field devices 115-122 and 140-146 using any desired hardware and software associated with, for example, standard 4-mA devices, I/O cards 126, 128, and/or any smart communication protocol such as the FOUNDATION® Fieldbus protocol, the HART® protocol, the WirelessHART® protocol, etc. In FIG. 6, the controller 111, the field devices 115-122 and the I/O cards 126, 128 are wired devices, and the field devices 140-146 are wireless field devices. Of course, the wired field devices 115-122 and wireless field devices 140-146 could conform to any other desired standard(s) or protocols, such as any wired or wireless protocols, including any standards or protocols developed in the future.

The process controller 111 of FIG. 6 includes a processor 130 that implements or oversees one or more process control routines 138 (e.g., that are stored in a memory 132). The processor 130 is configured to communicate with the field devices 115-122 and 140-146 and with other nodes that are communicatively connected to the controller 111. It should be noted that any control routines or modules described herein may have parts thereof implemented or executed by different controllers or other devices if so desired. Likewise, the control routines or modules 138 described herein which are to be implemented within the process control system 100 may take any form, including software, firmware, hardware, etc. Control routines may be implemented in any desired software format, such as using object oriented programming, ladder logic, sequential function charts, function block diagrams, or using any other software programming language or design paradigm. The control routines 138 may be stored in any desired type of memory 132, such as random access memory (RAM), or read only memory (ROM). Likewise, the control routines 138 may be hard-coded into, for example, one or more EPROMs, EEPROMs, application specific integrated circuits (ASICs), or any other hardware or firmware elements. Thus, the controller 111 may be configured to implement a control strategy or control routine in any desired manner.

The controller 111 implements a control strategy using what are commonly referred to as function blocks, where each function block is an object or other part (e.g., a subroutine) of an overall control routine and operates in conjunction with other function blocks (via communications called links) to implement process control loops within the process control system 100. Control based function blocks typically perform one of an input function, such as that associated with a transmitter, a sensor or other process parameter measurement device; a control function, such as that associated with a control routine that performs PID, fuzzy logic, etc. control; or an output function which controls the operation of some device, such as a valve, to perform some physical function within the process control system 100. Of course, hybrid and other types of function blocks exist. Function blocks may be stored in and executed by the controller 111, which is typically the case when these function blocks are used for, or are associated with standard 4-20 mA devices and some types of smart field devices such as HART® devices, or may be stored in and implemented by the field devices themselves, which can be the case with FOUNDATION® Fieldbus devices. The controller 111 may include one or more control routines 138 that may implement one or more control loops which are performed by executing one or more of the function blocks.

The wired field devices 115-122 may be any types of devices, such as sensors, valves, transmitters, positioners, etc., while the I/O cards 126 and 128 may be any types of I/O devices conforming to any desired communication or controller protocol. In FIG. 6, the field devices 115-118 are standard 4-20 mA devices or HART® devices that communicate over analog lines or combined analog and digital lines to the I/O card 126, while the field devices 119-122 are smart devices, such as FOUNDATION® Fieldbus field devices, that communicate over a digital bus to the I/O card 128 using a FOUNDATION® Fieldbus communications protocol. In some embodiments, though, at least some of the wired field devices 115, 116 and 118-121 and/or at least some of the I/O cards 126, 128 additionally or alternatively communicate with the controller 111 using the process control data highway 110 and/or by using other suitable control system protocols (e.g., Profibus, DeviceNet, Foundation Fieldbus, ControlNet, Modbus, HART, etc.).

In FIG. 6, the wireless field devices 140-146 communicate via a wireless process control communication network 170 using a wireless protocol, such as the WirelessHART® protocol. Such wireless field devices 140-146 may directly communicate with one or more other devices or nodes of the wireless network 170 that are also configured to communicate wirelessly (using the wireless protocol or another wireless protocol, for example). To communicate with other nodes that are not configured to communicate wirelessly, the wireless field devices 140-146 may utilize a wireless gateway 135 connected to the process control data highway 110 or to another process control communications network. The wireless gateway 135 provides access to various wireless devices 140-158 of the wireless communications network 170. In particular, the wireless gateway 135 provides communicative coupling between the wireless devices 140-158, the wired devices 115-128, and/or other nodes or devices of the process control plant 100. For example, the wireless gateway 135 may provide communicative coupling by using the process control data highway 110 and/or by using one or more other communications networks of the process plant 100.

Similar to the wired field devices 115-122, the wireless field devices 140-146 of the wireless network 170 perform physical control functions within the process plant 100, e.g., opening or closing valves, or taking measurements of process parameters. The wireless field devices 140-146, however, are configured to communicate using the wireless protocol of the network 170. As such, the wireless field devices 140-146, the wireless gateway 135, and other wireless nodes 152-158 of the wireless network 170 are producers and consumers of wireless communication packets.

In some configurations of the process plant 100, the wireless network 170 includes non-wireless devices. For example, in FIG. 6, a field device 148 of FIG. 6 is a legacy 4-20 mA device and a field device 150 is a wired HART® device. To communicate within the network 170, the field devices 148 and 150 are connected to the wireless communications network 170 via a respective wireless adaptor 152A, 152B. The wireless adaptors 152A, 152B support a wireless protocol, such as WirelessHART, and may also support one or more other communication protocols such as Foundation® Fieldbus, PROFIBUS, DeviceNet, etc. Additionally, in some configurations, the wireless network 170 includes one or more network access points 155A, 155B, which may be separate physical devices in wired communication with the wireless gateway 135, or may be provided with the wireless gateway 135 as an integral device. The wireless network 170 may also include one or more routers 158 to forward packets from one wireless device to another wireless device within the wireless communications network 170. In FIG. 6, the wireless devices 140-146 and 152-158 communicate with each other and with the wireless gateway 135 over wireless links 160 of the wireless communications network 170, and/or via the process control data highway 110.

In FIG. 6, the process control system 100 includes one or more operator workstations 171 that are communicatively connected to the data highway 110. Via the operator workstations 171, operators may view and monitor run-time operations of the process plant 100, as well as take any diagnostic, corrective, maintenance, and/or other actions that may be required. At least some of the operator workstations 171 may be located at various, protected areas in or near the plant 100, e.g., in a back-end environment of the plant 100, and in some situations, at least some of the operator workstations 171 may be remotely located, but nonetheless in communicative connection with the plant 100. Operator workstations 171 may be wired or wireless computing devices.

The example process control system 100 is further illustrated as including a configuration application 172A and configuration database 172B, each of which is also communicatively connected to the data highway 110. As discussed above, various instances of the configuration application 172A may execute on one or more computing devices (not shown) to enable users to create or change process control modules and/or other types of modules, and download these modules via the data highway 110 to the controllers 111 and/or other devices of the process control system 100, as well as enable users to create or change operator interfaces via which in operator is able to view data and change data settings within process control routines. The configuration database 172B stores the created (e.g., configured) modules and/or operator interfaces. Generally, the configuration application 172A and configuration database 172B are centralized and have a unitary logical appearance to the process control system 100, although multiple instances of the configuration application 172A may execute simultaneously within the process control system 100, and the configuration database 172B may be implemented across multiple physical data storage devices. Accordingly, the configuration application 172A, configuration database 172B, and user interfaces thereto (not shown) comprise a configuration or development system 172 for control and/or display modules. Typically, but not necessarily, the user interfaces for the configuration system 172 are different than the operator workstations 171, as the user interfaces for the configuration system 172 are utilized by configuration and development engineers irrespective of whether or not the plant 100 is operating in real-time, whereas the operator workstations 171 are utilized by operators during real-time operations of the process plant 100 (also referred to interchangeably here as "run-time" operations of the process plant 100).

The example process control system 100 includes a data historian application 173A and data historian database 173B, each of which is also communicatively connected to the data highway 110. The data historian application 173A operates to collect some or all of the data provided across the data highway 110, and to historize or store the data in the historian database 173B for long term storage. Similar to the configuration application 172A and configuration database 172B, the data historian application 173A and historian database 173B are centralized and have a unitary logical appearance to the process control system 100, although multiple instances of a data historian application 173A may execute simultaneously within the process control system 100, and the data historian 173B may be implemented across multiple physical data storage devices.

In some configurations, the process control system 100 includes one or more other wireless access points 174 that communicate with other devices using other wireless protocols, such as Wi-Fi or other IEEE 802.11 compliant wireless local area network protocols, mobile communication protocols such as WiMAX (Worldwide Interoperability for Microwave Access), LTE (Long Term Evolution) or other ITU-R (International Telecommunication Union Radiocommunication Sector) compatible protocols, short-wavelength radio communications such as near field communications (NFC) and Bluetooth, or other wireless communication protocols. Typically, such wireless access points 174 allow handheld or other portable computing devices (e.g., user interface devices 175) to communicate over a respective wireless process control communication network that is different from the wireless network 170 and that supports a different wireless protocol than the wireless network 170. For example, a wireless or portable user interface device 175 may be a mobile workstation or diagnostic test equipment that is utilized by an operator within the process plant 100 (e.g., an instance of one of the operator workstations 171). In some scenarios, in addition to portable computing devices, one or more process control devices (e.g., controller 111, field devices 115-122, or wireless devices 135, 140-158) also communicate using the wireless protocol supported by the access points 174.

In some configurations, the process control system 100 includes one or more gateways 176, 178 to systems that are external to the immediate process control system 100. Typically, such systems are customers or suppliers of information generated or operated on by the process control system 100. For example, the process control plant 100 may include a gateway node 176 to communicatively connect the immediate process plant 100 with another process plant. Additionally or alternatively, the process control plant 100 may include a gateway node 178 to communicatively connect the immediate process plant 100 with an external public or private system, such as a laboratory system (e.g., Laboratory Information Management System or LIMS), an operator rounds database, a materials handling system, a maintenance management system, a product inventory control system, a production scheduling system, a weather data system, a shipping and handling system, a packaging system, the Internet, another provider's process control system, or other external systems.

It is noted that although FIG. 6 only illustrates a single controller 111 with a finite number of field devices 115-122 and 140-146, wireless gateways 35, wireless adaptors 152, access points 155, routers 1158, and wireless process control communications networks 170 included in the example process plant 100, this is only an illustrative and non-limiting embodiment. Any number of controllers 111 may be included in the process control plant or system 100, and any of the controllers 111 may communicate with any number of wired or wireless devices and networks 115-122, 140-146, 135, 152, 155, 158 and 170 to control a process in the plant 100.

As shown in FIG. 6, and simultaneously referring to FIG. 1A for clarity of illustration and not for limitation purposes, the process plant 100 is communicatively connected to an edge gateway system 102, which may be an embodiment of the edge gateway system 1 of FIG. 1A. For example, the process plant 100 may communicatively connect to the field-facing component of the edge gateway system 1 via one or more process plant communication networks, data networks, and/or links, either directly and/or via respective gateways of the process plant 100. For instance, the field-facing component 10 of the edge gateway system 1 may be communicatively connected to the process plant 100 via the networks 110, 170, via gateways 135, 176, 178, and/or via other networks, links, and/or gateways associated with the process plant, via which the field-facing component 10 receives or obtains data generated by various data sources 30 associated with the process plant 100.

Generally speaking, the data sources 30 and the networks/links 28 via which the edge gateway system 1 obtains process-plant related data may be at lower levels of the Purdue Model or similar security hierarchy (e.g., Level 0 through Level 2), and may include controllers, field devices, I/O cards, and other types of process control devices. Further, it is understood that the set of data sources 30 associated with the process plant is not limited to only process control devices that directly generate first-order process data, but may additionally or alternatively include any device or component within and/or associated with the process plant 100 that generates process data and/or other types of data as a result of the process plant 100 controlling the on-line process. For example, the set of data sources 30 may include modules, alarms, event historians, batch systems and/or historians, diagnostic devices or components that generate diagnostic data, network routing devices or components that transmit information between various components and/or devices of the process plant 100, an asset management system, a configuration system, an analytics system, mobile devices, and the like. Indeed, any one or more of the components shown in FIG. 6 (e.g., components 111, 115-122, 126, 128, 135, 140-146, 152, 155, 158, 160, 170, 171-176, 178) and other components that are not shown in FIG. 6 may be a data source 30 that generates process plant-related data which may be provided for consumption by one or more external systems 8 via the edge gateway system 1, 102.

Figure 7:
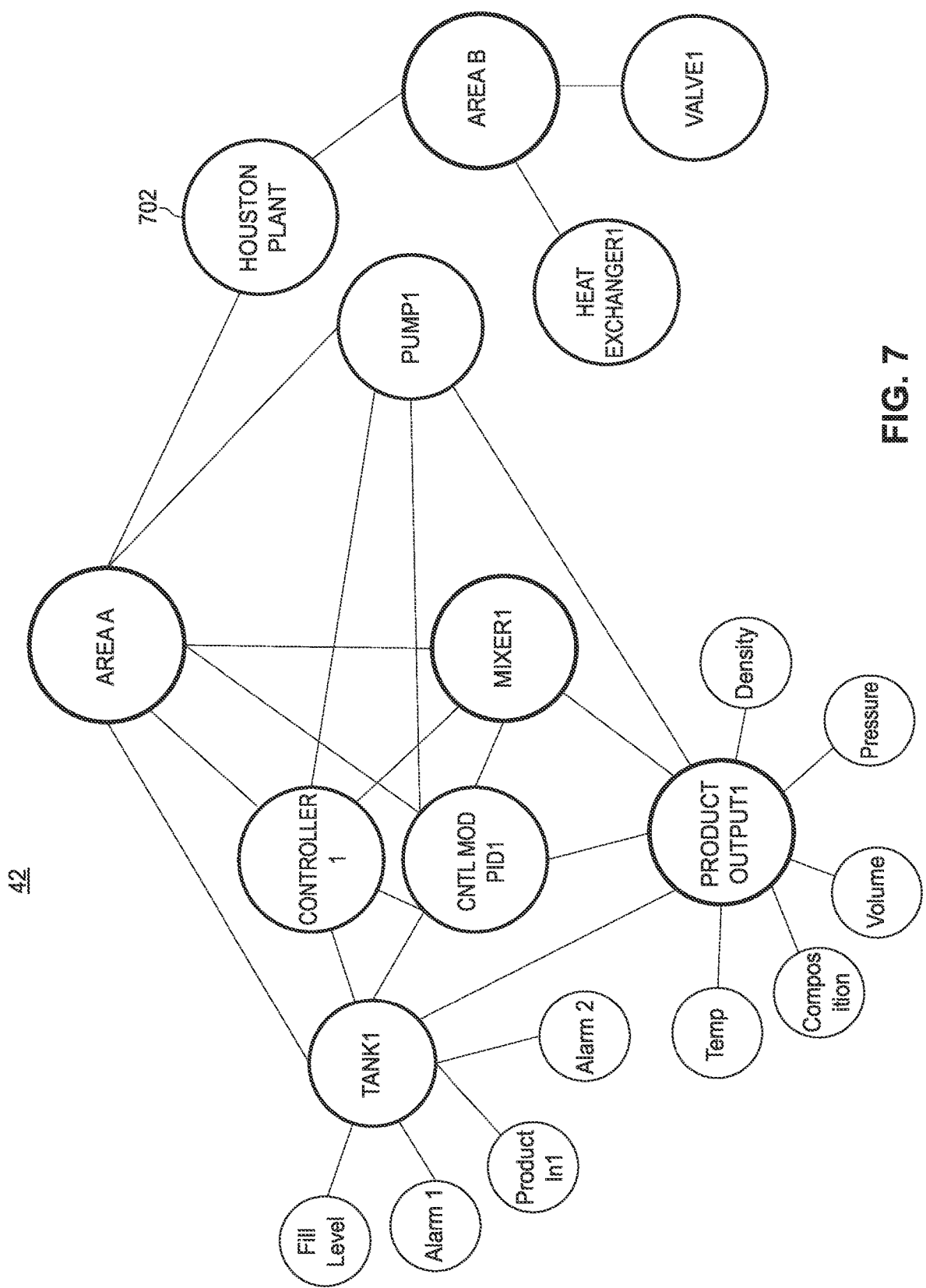
FIG. 7 illustrates a graphical representation of an example contextual knowledge repository storing process plant-related data for a process plant or process control system.

FIG. 7 illustrates a graphical representation of an example contextual knowledge repository 49, such as the contextual knowledge repository 49 described with reference to FIG. 1A. The example contextual knowledge repository 49 stores relationships or connections between process plant-related data and process plant entities, such as controllers, field devices, I/O devices, or any other devices within a process plant which perform physical functions to control the process, such as a valve, a tank, a mixer, a pump, a heat exchanger, etc. Process plant entities may include physical or logical elements.

The knowledge/relationship data included in the contextual knowledge repository 49 may include categories of particular process parameters (e.g., operating parameters, tuning parameters, equipment parameters, configuration parameters, instantiation parameters, etc.), search tags associated with previous process plant search queries or previous sets of search results, and machine learning models for predicting future states of process plant entities. The knowledge/relationship data may also include taxonomies mapping terms used by plant personnel to specific pieces of equipment or process parameters.

Additionally, the knowledge/relationship data may include plant personnel information, shift information, schedule information, and process plant entities that the plant personnel is responsible for during each particular shift. For example, the knowledge/relationship data may indicate that Jenny is operating a particular mixer from 12 p.m. to 8 p.m. and Bob is operating the mixer from 8 p.m. to 12 a.m. The knowledge/relationship data may also include products associated with a particular set of process plant entities which are used to generate the products, product parameters for the products, and process parameters for the particular set of process plant entities.

Moreover, the knowledge/relationship data may include upstream and downstream process plant entities in a continuous or batch process, and process parameters associated with the process plant entities. The knowledge/relationship data may also include relationships between process plant entities which are not necessarily involved in the same process. For example, due to proximity between the process plant entities, when a temperature in a first process plant entity rises the temperature in a second process plant entity rises proportionally. This relationship may be included in the knowledge/relationship data even if the two process plant entities are not involved in manufacturing the same product. While these are a few examples of knowledge/relationship data which may be included in the contextual knowledge repository 49, any suitable knowledge/relationship data related to the process plant 100 may be included in the contextual knowledge repository 49.

As mentioned above, the contextual knowledge repository 49 may be stored at the edge-facing component 12 of the edge gateway system 1 and may include a local copy or duplicate of the process plant-related data generated within the process plant 100. In this manner, the edge-facing component 12 may provide process plant-related data from the contextual knowledge repository 49 to external systems 8 which do not have authorized access to communicate with the process plant 100 in a highly secure manner and without impacting the performance of the process plant 100. For example, the edge-facing component 12 may provide process plant-related data from the contextual knowledge repository 49 to mobile devices, vehicle head units, desktop computers, laptop computers, wearable devices, etc., which are not within the process plant 100 and are not authorized to communicate with devices or components that control on-line operation of the process plant 100.

In other implementations, the contextual knowledge repository 49 may be stored in a computing device that communicates with devices or components within and/or associated with the process plant 100 (e.g., the field-facing component 10). These devices or components generate process data/or other types of data as a result of the process plant 100 controlling the on-line process. In these implementations, the process plant-related data is not provided through a unidirectional data diode, and devices which receive process plant-related data from the contextual knowledge repository 49 may communicate with the devices or components within and/or associated with the process plant 100 that generated the process plant-related data to control on-line operation of the process plant 100. In this scenario, only devices authorized to interact with process control devices may receive process plant-related data from the contextual knowledge repository 49 (e.g., operator workstations, mobile workstations, etc.). In yet other implementations, a first knowledge repository 42a may be stored at the field-facing component and a second knowledge repository 42b may be stored at the edge-facing component 12.

In any event, in FIG. 7, process plant-related data (e.g., process parameter data, product parameter data, configuration data, maintenance data, event data, historical data, environmental data, analysis data such as laboratory measurements. etc.) and process plant entities (e.g., controllers, field devices, process plants, process plant areas, tanks, pumps, mixers, heat exchangers, reactors, regenerators, control modules, function blocks, process flow modules, etc.) are represented by nodes or circles and relationships or connections between process plant-related data and/or process plant entities are represented by edges or lines connecting the circles. For example, a first process plant entity 702 represents the Houston process plant. The first process plant entity 702 is connected to areas within the process plant (e.g., Plant Area A, Plant Area B) based on the areas being within the Houston process plant. Each area is connected to devices and/or components within the area, such as controllers, field devices, control modules, process plant equipment, etc. More specifically, Plant Area A is connected to CONTROLLER1, CNTL MOD PID1, TANK1, MIXER1, and PUMP1 each of which are located within Plant Area A or control process plant equipment in Plant Area A. Plant Area B is connected to HEAT EXCHANGER1 and VALVE1 each of which are located within Plant Area B.

CONTROLLER1 is then connected to CNTL MOD PID1 based on CONTROLLER1 executing the control module CNTL MOD PID1. CONTROLLER1 is also connected to TANK1, MIXER1, and PUMP1 based on CONTROLLER1 controlling each of these pieces of process plant equipment. Additionally, CNTL MOD PID1 is connected to TANK1, MIXER1, and PUMP1 based on CNTL MOD PID1 being a control module that controls each of these pieces of process plant equipment. Further, CNTL MOD PID1 is connected to PRODUCT OUTPUT1 based on CNTL MOD PID1 causing PRODUCT OUTPUT1 to be generated based on control of TANK1, MIXER1, and PUMP1. PRODUCT OUTPUT1 may be gasoline for example. Moreover, TANK1 and PRODUCT OUTPUT1 are connected to process parameter data and product parameter data, respectively corresponding to TANK1 and PRODUCT OUTPUT1. More specifically, TANK1 is connected to process parameter data representing the fill level of TANK1, Alarm 1 and Alarm 2 each representing alarms corresponding to TANK1, and Product In1 which is a product provided as an input into TANK1 (e.g., kerosene). PRODUCT OUTPUT1 is connected to product parameter data representing the temperature, volume, density, pressure, and chemical composition of PRODUCT OUTPUT1.

While the contextual knowledge repository 49 stores a small amount of process plant-related data, this is for ease of illustration only. The contextual knowledge repository 49 may store indications of any number of process plant entities and any suitable amount of process plant-related data for each of the process plant entities across several process plants. In this manner, users may be able to receive data from multiple process plants so that the user may search over multiple sites. In addition to providing the process plant-related data from the contextual knowledge repository 49 as search results, the process plant-related data may be used for plant commissioning, particularly to resolve ambiguous naming conventions. In any event, the process plant-related data may include several types of disparate data such as configuration data, run-time data, maintenance data, analysis data, environmental data such as regulatory reporting data, diagnostic data, economic data for the process plant such as costs of equipment and materials, projected values of products produced by the plant, the amount of a product which is produced by the process plant over a particular time period, projected revenues and profit margins, etc., or any other suitable data related to the process plant.

To generate the contextual knowledge repository 49, the contextual knowledge miner 45 mines the data lake 40 to discover relationships between various content data stored in the data lake 40, and generates/modifies/updates the contextual knowledge repository 49 accordingly. For example, the contextual knowledge miner 45 may mine the data lake 40 to identify additional process parameter data for process parameters corresponding to TANK1. Then the contextual knowledge miner 45 may update the contextual knowledge repository 49 to include a connection between TANK1 and the additional process parameter data. In some implementations, when a change is made to the plant configuration such as a user adding a new control module to the process control system, the user may provide an instruction (e.g., via a user control at the user interface device) to the contextual knowledge miner 45 to regenerate the contextual knowledge repository 49 with the new plant configuration. In some scenarios, the user may provide an instruction to the contextual knowledge miner 45 to update the contextual knowledge repository 49 with the new plant configuration by adding only the changes to the plant configuration to the contextual knowledge repository 49. In other implementations, the contextual knowledge miner 45 may automatically analyze updates to the contextual knowledge repository 49 for example, when downloads to the on-line process plant occur, and determine whether to update the existing contextual knowledge repository 49 with changes to the plant configuration, or for example, if the changes are structural in nature, to regenerate the contextual knowledge repository 49 with the new plant configuration. The contextual knowledge repository 49 may also store time data regarding when plant configuration changes were added. For example, when a new or updated control module is downloaded to the on-line process plant, the contextual knowledge repository 49 may include the date and time of the download. Accordingly, a contextual record of the plant state when each plant configuration change occurs may be maintained based on the contextual knowledge repository 49. While the contextual knowledge repository 49 is depicted as a graph structure this is merely an exemplary embodiment and the entities in the contextual knowledge repository 49 may be connected in any suitable manner.

Process Plant Search Queries

As mentioned above, access mechanisms 48 within the edge-facing component 12 may provide process plant-related data to external systems 8. One example of an access mechanism may be a process plant search query server which obtains process plant search queries from external systems 8, such as user interface devices external to the process plant 100 (e.g., mobile devices, desktop computers, laptop computers, wearable devices, vehicle head units, etc.). The process plant search query server then obtains process plant-related data relevant to a process plant search query from the knowledge repository 42 and generates process plant search results based on the obtained process plant-related data. More generally, the process plant search query server may obtain a request for process plant-related data from an application or other computing device, obtain at least some of the process plant-related data from the knowledge repository 42 in response to the request, and provide the obtained process plant-related data to the application or other computing device. In some implementations, the request is a process plant search query, and the process plant search query server provides a subset of the process planted-related data to the application or other computing device as search results in response to the process plant search query.

FIG. 8 illustrates a block diagram of example process plant search query server 800. The process plant search query server 800 server may be implemented as hardware having a processor 802, a memory 804 that executes a process plant search engine 806, and a communication unit for communicating with external systems 8 via one or more external communications networks, data networks, and/or links. The one or more external communications networks, data networks, and/or links may include any number of wired and/or wireless communications networks, data networks, and/or links, and may include any number of private and/or public networks and/or links. In other implementations, the process plant search query server 800 may be implemented as software for executing the process plant search engine 806 on the hardware of the edge-facing component 12.

In some implementations, the process plant search query server 800 is an access mechanism 48 of the edge-facing component 12. In these implementations, the process plant search query server 800 obtains process plant-related data from the knowledge repository 42 which is a local copy or duplicate of the process plant-related data generated within the process plant 100. Accordingly, the process plant search query server 800 does not directly interact with the process plant-related data generated within the process plant 100, and cannot communicate with controllers and/or other devices in the process plant 100 to control on-line operation of the process plant 100. In other implementations, the process plant search query server 800 is not part of the edge-facing component 12 and is a server device communicatively coupled to the process plant 100 and configured to communicate with controllers and/or other devices in the process plant 100 to control on-line operation of the process plant 100.

In any event, the process plant search engine 806 receives a process plant search query from a user interface device. The process plant search query may be any search query related to a process plant-related data and/or related to process plant entities within the process plant. For example, the process plant search query may be, "How is my cat cracker doing?" The process plant search engine 806 then analyzes/parses the process plant search query to identify the subject of the search query, context for the search query, and/or other information in the search query which may be used to filter a data set responsive to the search query. More specifically, the process plant search engine 806 may obtain indications of subjects and filters from a grammar module or plant vocabulary database included in the process plant search query server 800 or communicatively coupled to the process plant search query server 800. The grammar module or plant vocabulary database may store several subjects of process plant search queries and filters which modify the subjects to filter the search results. The grammar module or plant vocabulary database may also store several mappings of terms from process plant search queries which correspond to each subject and/or filter, such as synonyms or nicknames for the subject or filter. For example, for the subject "MODULE: CATCR," the grammar or plant vocabulary may store the corresponding terms, "cat cracker," "cat cracker module," "cat cracker control module," "catalytic cracking module," "fluid catalytic cracking module," etc. The grammar module or plant vocabulary database may generate the mappings using the taxonomies from the knowledge repository 42. The taxonomies may indicate that a particular process plant entity is referred to using one name in a particular process plant or geographic region and using another name in another process plant or geographic region. The process plant search engine 806 may then identify the subject based on the process plant or geographic region in which the process plant query is provided.

The process plant search engine 806 may also identify that the process plant search query was provided in a natural language format, for example, based on terms such as "how is" and "my." As a result, the process plant search engine 806 recognizes the conversational nature of the process plant search query which may be used as context for follow-up queries by the user. For example, because the process plant search engine 806 recognizes the process plant search query as conversational, if the user provides an additional process plant search query, such as, "What is the efficiency?" the process plant search engine 806 identifies based on the context, that the additional process plant search query is for the efficiency regarding the cat cracker and not another module. In response to identifying a natural language format of a process plant search query, the process plant search engine 806 uses the process plant search query as context for additional process plant search queries by the user within a threshold time period of the process plant search query (e.g., five minutes, ten minutes, an hour, etc.).

The process plant search engine 806 may then match each of the terms in the process plant search query to one of the subjects or filters. In some implementations, the process plant search engine 806 first identifies one or more terms within the process plant search query which correspond to the subject of the process plant search query. Then the process plant search engine 806 identifies filters which correspond to the remaining terms as well as context which may be used to filter the data set further. The process plant search engine 806 may identify an exact match of one or more terms in the process plant search query to a subject included in the grammar module or plant vocabulary database.

In other implementations, the process plant search engine 806 identifies a likelihood that one or more terms in the process plant search query correspond to a subject from several candidate process plant search query subjects included in the grammar module or plant vocabulary database. Then the process plant search engine 806 identifies the subject and corresponding terms having the highest likelihood. For example, the process plant search engine 806 may compare a first term in the process plant search query to each of the candidate process plant search query subjects in the grammar module or plant vocabulary database and identify likelihoods that the first term corresponds to each of the candidate process plant search query subjects. Then the process plant search engine 806 may compare a first and second term in the process plant search query to each of the candidate process plant search query subjects in the grammar module or plant vocabulary database and identify likelihoods that the first and second term correspond to each of the candidate process plant search query subjects. The process plant search engine 806 may also compare the second term alone to each of the subjects in the grammar module or plant vocabulary database and identify likelihoods that the second term corresponds to each of the candidate process plant search query subjects.

The process plant search engine 806 may continue to compare each of the terms alone and in combination to identify a set of one or more terms having the highest likelihood of corresponding to one of the candidate process plant search query subjects in the grammar module or plant vocabulary database. As shown in FIG. 8, the process plant search engine 806 identifies the terms "cat cracker" as corresponding to the subject "MODULE: CATCR."

The process plant search engine 806 then identifies filters from the grammar module or plant vocabulary database which correspond to the remaining terms. The filters may be used to filter the data set obtained in response to the identified subject. In this example, the process plant search engine 806 may obtain a set of process plant-related data included in the knowledge repository 42 having connections to MODULE:CATCR. The filters may be used to remove process plant-related data from the set. As with the subject, the process plant search engine 806 may identify an exact match of one or more remaining terms in the process plant search query to a filter included in the grammar module or plant vocabulary database. In other implementations, the process plant search engine 806 identifies a likelihood that one or more remaining terms in the process plant search query correspond to a filter included in the grammar module or plant vocabulary database. Then the process plant search engine 806 identifies the filter and corresponding remaining terms having the highest likelihood or a likelihood above a likelihood threshold.

The process plant search query may include several filters each having a different set of one or more remaining terms with a likelihood of corresponding to the filter above a likelihood threshold. As shown in FIG. 8, the process plant search engine 806 identifies the term "my" as corresponding to the filter "SCOPE: USER." The filter "SCOPE:USER" may be used to filter the set of process plant-related data such that only process plant-related data corresponding to one particular MODULE:CATCR of several entities named MODULE:CATCR in the knowledge repository 42 remains. The particular MODULE:CATCR is the MODULE:CATCR that the user operates, maintains, is responsible for, etc., according to the context, as described in more detail below. The process plant search engine 806 identifies the term "how is" as corresponding to the filter "ALL_ABNORMAL." The filter "ALL_ABNORMAL" may be used to filter the set of process plant-related data such that only process plant-related data indicating an abnormal condition and corresponding to the one particular MODULE:CATCR remains.

As shown in FIG. 8, the example process plant-related data corresponding to the particular MODULE:CATCR that the user operates, maintains, is responsible for, etc., includes a slurry level of 20%, a reactor temperature of 500°, a reactor pressure of 1.5 bars, a regenerator temperature of 200°, and a regenerator pressure of 2 bars. The slurry level in the knowledge repository 42 may include a connection to an abnormal condition for example based on the slurry level being below a threshold slurry level. Accordingly, the process plant search engine 806 may filter the reactor temperature, reactor pressure, regenerator temperature, and regenerator pressure from the set of process plant-related data such that only the slurry level remains.

In addition to identifying subjects and filters for the process plant search query, the process plant search engine 806 identifies context. The context may include user information for the user submitting the process plant search query, such as the name of the user, the name and location of the process plant where the user works, the organizational role of the user within the process plant, preferences for the user, a search history of previous search queries for the user, etc. The process plant search engine 806 may obtain the user information from a user profile for the user included in a user database, for example. The user may provide login information which may be used by the process plant search engine 806 to access the user information. Additionally, the context may include device information for the device in which the user submits the process plant search query, such as the location of the device which may include a location within a process plant or may be an external location, the capabilities of the device (e.g., audio, display, microphone, applications executing on the device, etc.), the type of the device, the size of the device, etc. The location of the device may allow for location-based process plant search queries, such as "Identify the valve in front of me." Moreover, the context may include the time in which the process plant search query is submitted.

The process plant search engine 806 may further filter the set of process plant-related data according to the context. For example, as described above one of the filters corresponding to the process plant search query is "SCOPE:USER." Based on the name and location of the process plant where the user works and the organizational role of the user within the process plant, the process plant search engine 806 may identify the MODULE:CATCR of several instances of MODULE:CATCR in the knowledge repository 42 that the user operates, maintains, is responsible for, etc. For example, the context may indicate that the user works in Area 1 of the Houston plant which has one MODULE:CATCR. Accordingly, the process plant search engine 806 may filter the data set to include only process plant-related data corresponding to the MODULE:CATCR which is in Area 1 of the Houston plant. In other implementations, the user may include the name or location of the process plant in the process plant search query. The process plant search engine 806 may then use the name or location of the process plant as context for further process plant search queries by the user within the same conversation, such as within threshold time period, or for any subsequent process plant search queries by the user. The device context may be used to determine the number of search results for the process plant search engine 806 to return. For example, if the device is a desktop computer, laptop computer, operator workstation, etc., the process plant search engine 806 may return a full set of search results. If the device is a mobile device or vehicle head unit, the process plant search engine 806 may reduce the number of search results to one or some other threshold number.

In any event, the process plant search engine 806 transforms the filtered process plant-related data into process plant search results. In the example described above, the filtered process plant-related data includes a slurry level of 20% for the MODULE:CATCR in Area 1 of the Houston plant. Accordingly, the process plant search engine 806 may generate a search result as an audio response (e.g., via a text to speech engine) or a text response in a natural language format, such as "Your slurry level is low." The process plant search engine 806 may transform a subset of the filtered process plant-related data into a process plant search result by obtaining an introductory statement, such as "Good morning," "Good afternoon," "Happy Holiday!" etc., from the grammar module or plant vocabulary based on the time of day/year and/or the user's name. The process plant search engine 806 may also obtain a natural language response to the process plant search query from the grammar module or plant vocabulary, such as "Your slurry level is . . . " "Abnormal conditions in your cat cracker include . . . " "Your cat cracker is performing well! A few things to watch out for are . . . " In other implementations, the process plant search engine 806 may generate a search result as a link to a process flow module or control module for the MODULE: CATCR in Area 1 of the Houston plant which may highlight the slurry level, or a link to detailed information regarding the slurry level. In this example, the process plant search engine 806 returns a single process plant search result. However, this is merely one example scenario. In other scenarios, the process plant search engine 806 may return any number of process plant search results corresponding to any amount of process plant-related data responsive to the process plant search query.

While "How is my cat cracker doing?" is one example of a process plant search query, the process plant search query server 800 may obtain any suitable process plant search query and generate process plant search results. Other example process plant search queries may include queries regarding a particular mode of operation, queries regarding abnormal conditions or a particular abnormal condition, queries for modules in a specified portion of a module hierarchy, queries for process parameters having a particular name and/or value, queries for modules with alarms or alarms having a particular priority, queries regarding a particular process plant entity or group of process plant entities, queries regarding a product produced by process plant entities, queries regarding events within the process plant, queries regarding configuration data such as queries regarding instances of classes, or any other suitable queries related to the process plant.

Additionally, in some implementations, the user may allow for the process plant search query server 800 to provide unsolicited voice or display information regarding the process plant to the user's user interface device (e.g., by selecting a user control on the user interface device to receive unsolicited process plant-related data). The unsolicited voice or display information regarding the process plant may include critical or safety-related alarm information regardless of the current interactions with the user. The process plant search query server 800 may identify a set of process plant entities for the user. For example, the set of process plant entities may be identified based on the user's organizational role or may be selected by the user. The process plant search query server 800 may then periodically (e.g., every 30 seconds, every minute, every five minutes, etc.) search the knowledge repository 42 for critical or safety-related alarm information related to the identified set of process plant entities. When the process plant search query server 800 identifies critical or safety-related alarm information related to one of the identified set of process plant entities, the process plant search query server 800 provides an indication of the critical or safety-related alarm information to the user interface device in an audio or textual/graphical format regardless of whether the user provided process plant search queries regarding the critical or safety-related alarm information, the set of process plant entities, or provided any process plant search queries at all. For example, the user may provide process plant search queries regarding a boiler unit and distillation column. In response to identifying a critical or safety-related alarm information related to a safety system in an area of the process plant 100 that the user operates, the process plant search query server 800 may interrupt the process plant search query/process plant search results sequence and instead provide the critical or safety-related alarm information related to the safety system to the user interface device.

Additionally, the user may request voice alerts or notification to be provided to the user interface device in response to a particular event or condition occurring within the process plant. The process plant search query server 800 may then periodically or continuously determine whether the particular condition is satisfied or event occurs within the process plant 100. When the particular condition is satisfied or event occurs, the process plant search query server 800 may provide the voice alert or notification to the user interface device without any further requests or process plant search queries by the user. For example, the user may want to know when the process variable value for TT-102 rises above 70%. The process plant search query server 800 may periodically or continuously obtain the process variable value for TT-102, for example from the knowledge repository 42. When the process variable value exceeds 70%, the process plant search query server 800 may provide a voice alert to the user interface device that the process variable value for TT-102 is 71%, for example.

Smart Search User Interfaces

Figure 9:
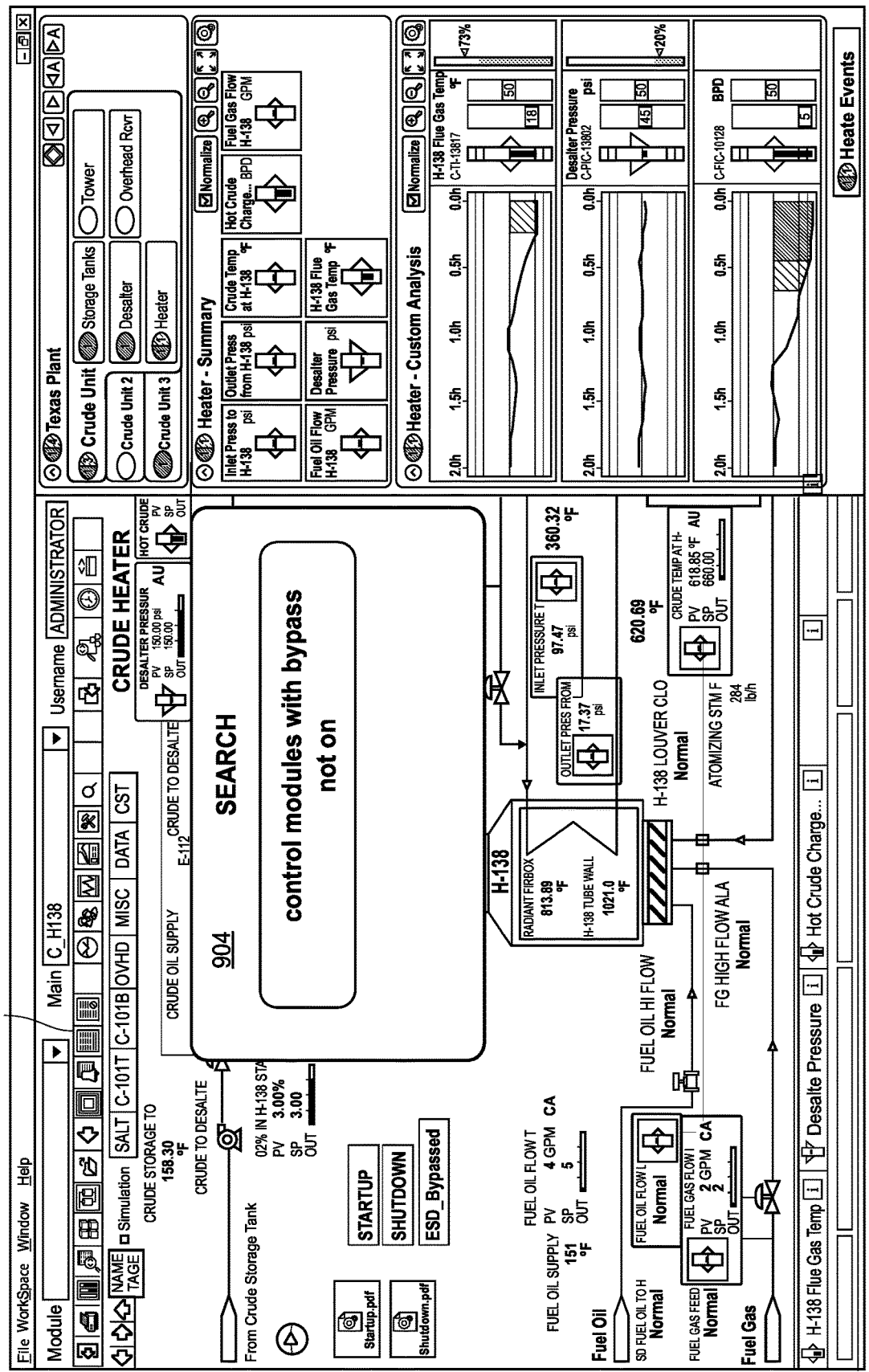
FIG. 9 illustrates an example process plant display including a search bar for entering process plant search queries.

The process plant search query server 800 receives a process plant search query from a user interface device which may be within or external to the process plant 100. FIG. 9 illustrates an example process plant display 900 which may be presented on the user interface device. The user interface device may be communicatively coupled to the process plant 100, such that the user may control devices or components within the process plant 100 via user controls on the process plant display 900. In other implementations, the user interface device is not communicatively coupled to the process plant 100 and the data presented on the process plant display 900 is from a local copy or duplicate of the process plant-related data within the process plant 100. In any event, the process plant display 900 may include a user control 902 such as a search icon, which when selected causes the process plant display 900 to present a search bar 904 for entering process plant search queries. In some implementations, the process plant display 900 is presented via a process plant application or process plant search application executing on the user interface device. The user may enter the process plant search query via text input or audio input via a microphone, such as "control modules with bypass not on." The process plant search query may be related to the graphical information presented in the process plant display 900, such as a control module, faceplate, process flow module, process plant entities, etc. In some implementations, the user interface device may provide an indication of the control module, process flow module, faceplate, process plant entities, etc., included in the process plant display 900 to the process plant search query server 800 as context for the process plant search query. In other scenarios, the process plant search query is not related to the graphical information presented in the process plant display 900.

The process plant application or process plant search application may store previous process plant search queries entered by the user and may include user controls for the user to select one of the previous process plant search queries without having to repeat the text or audio input. In some implementations, the process plant application or process plant search application may automatically resubmit previous process plant search queries periodically or in any suitable manner to receive updated search results.

Figure 10:
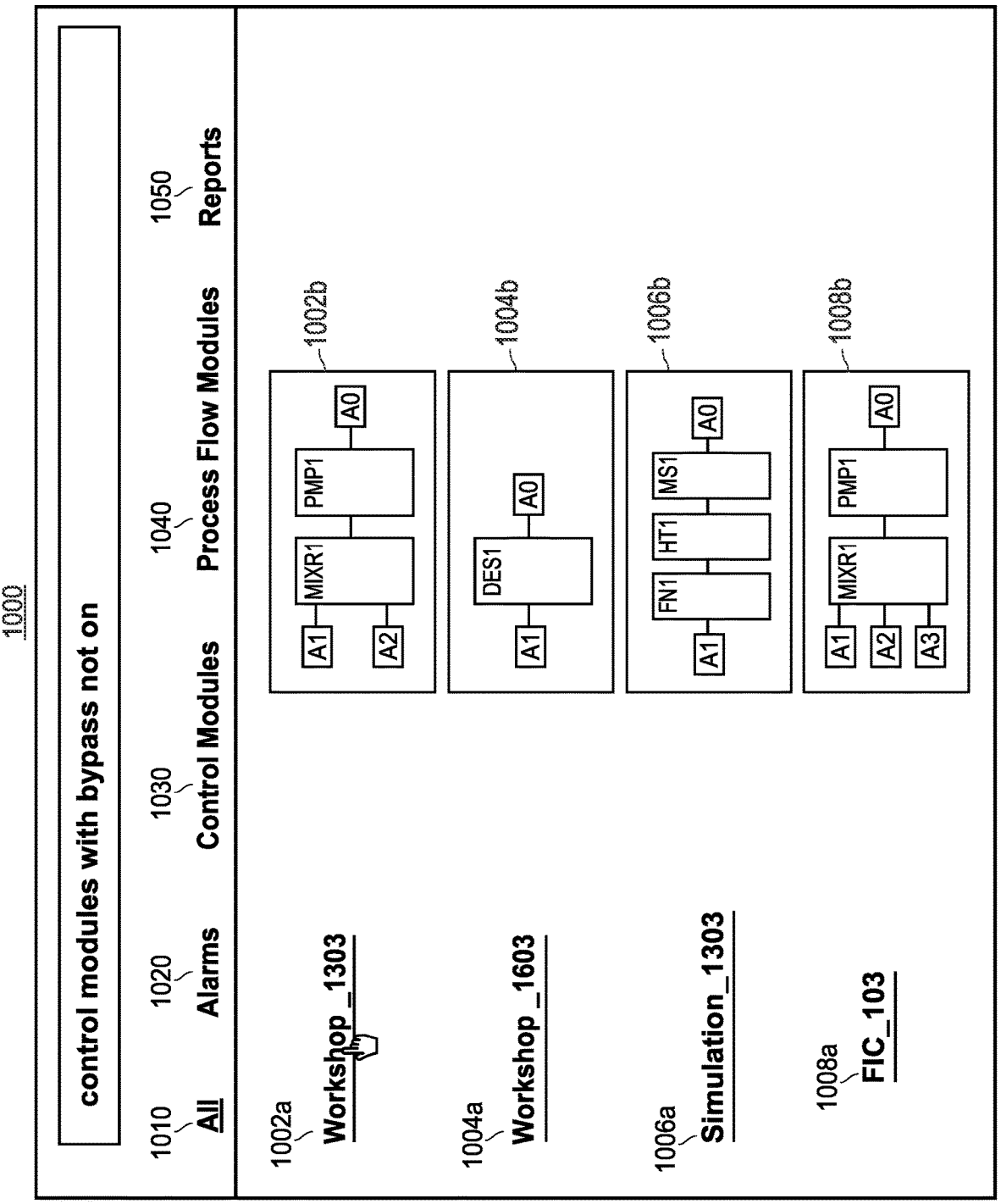
FIG. 10 illustrates an example process plant search results display including process plant search results in response to a process plant search query.

The process plant search query server 800 then receives the process plant search query as well as context for the process plant search query, such as user information, device information, a search history of previous search queries for the user, indications of graphical information presented on the process plant-related data when the process plant search query is submitted, etc. The process plant search query server 800 may then identify the subject of the process plant search query, "control modules with bypass not on" as CRTLMOD from the terms "control modules" in the process plant search query, and may identify a filter as BYPASS: is_not:On from the terms "bypass not on." In some implementations, the process plant search query server 800 may identify additional filters from the context, such as control modules within a particular process plant in which the user operates, maintains, is responsible for, etc., a particular area of the process plant in which the user operates, maintains, is responsible for, etc., a particular area of the process plant in which the user previously inquired about, or a particular area of the process plant currently presented on the user's process plant display 900. In any event, the process plant search query server 800 then identifies each of the control modules with bypass not on from the knowledge repository 42 as well as process plant-related data for each of the identified control modules. The process plant search query server 800 generates a process plant search result for each identified control module/process plant-related data for the control module and provides the process plant search results for display on the user interface in a search results display. An example process plant search results display 1000 which may be presented on the user interface device is illustrated in FIG. 10.

The process plant search results display 1000 includes indications of a set of process plant search results 1002a-1008a in response to the process plant search query, "control modules with bypass not on." Each indication of a process plant search result 1002a-1008a may include a name of the process plant search result (e.g., Workshop_1303) with a link to detailed information regarding the process plant search result. Additionally, each indication of a process plant search result 1002a-1008a may include a thumbnail image or preview 1002b-1008b of the detailed information regarding the process plant search result. For example, the first process plant search result 1002a, Workshop_1303, is a control module and the thumbnail image or preview corresponding to the first process plant search result 1002b is a thumbnail image of a graphical representation of the control module. When the user selects the first process plant search result 1002a (e.g., by clicking on or touch-selecting the indication of the first process plant search result 1002a or the thumbnail or preview corresponding to the first process plant search result 1002b), the user interface device may present a complete view of the graphical representation of the control module in a detailed search result display.

In some implementations, the process plant search query server 800 may select the number of process plant search results to include in the process plant search results display 1000, and/or the order in which the process plant search results are presented, based on factors including, e.g., the size of a display area or display window provided by the user interface device the type of the user interface device, priority levels or other contexts associated with each of the process plant search results, etc. Moreover, in some implementations, the process plant search query server 800 may modify the manner in which the process plant search results are displayed or otherwise presented based on the request upon which the process plant search is based, or the manner in which the request upon which the process plant search is based is received.

For example, if the size of the user interface device, or the size of a display area or display window provided by the user interface device, is less than a threshold size or the device type is a particular type of a predetermined set of device types (e.g., a mobile device, a vehicle head unit, etc.), the process plant search query server 800 may provide a single process plant search result to include in the process plant search results display 1000, or otherwise may provide a reduced number of process plant search results to include in the process plant search results display 1000.

Figure 11A:
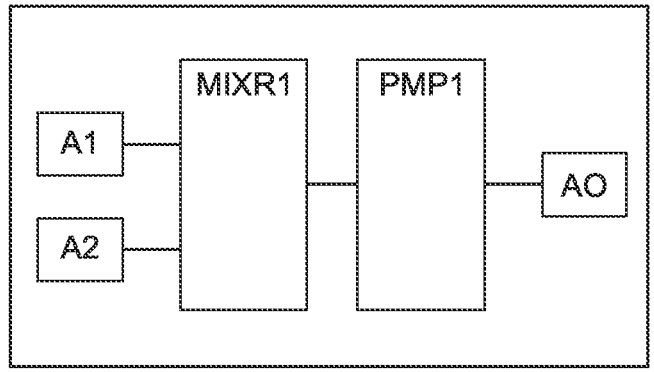
FIG. 11A illustrates another example process plant search results display including a process plant search result in response to a process plant search query.
Figure 11B:
FIG. 11B illustrates yet another example process plant search results display including a process plant search result regarding a batch in response to a process plant search query related to batch processes.
Figure 11C:
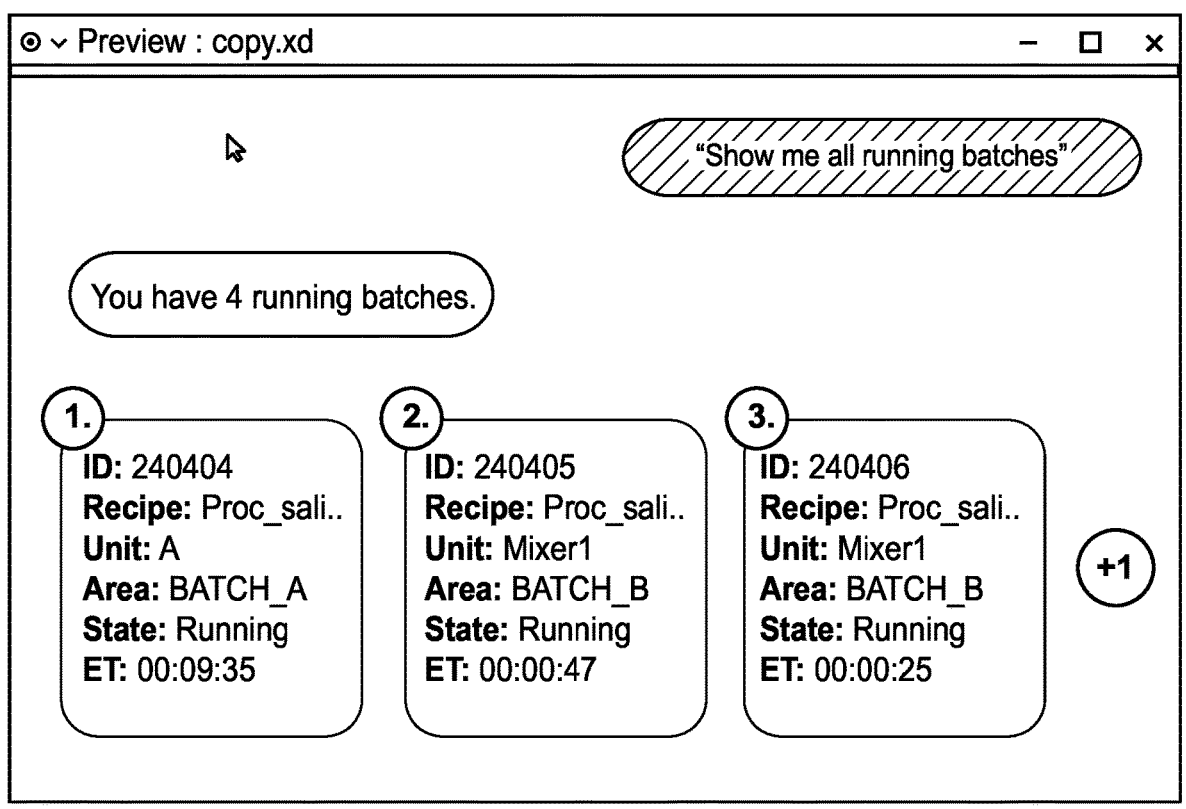
FIG. 11C illustrates an example process plant search results display including multiple process plant search results regarding multiple batches in response to a process plant search query related to batch processes.

FIGS. 11A and 11B illustrate process plant search results displays 1100A and 1100B having a single process plant search result, while FIG. 11C illustrates a process plant search result display 1100C having three displayed process plant search results. Generally speaking, the number of process plant search results provided by the user interface device may be based on the size of the user interface device, or the size of a display area or display window provided by the user interface device. In some examples, the number of process plant search results provided by the user interface device may be based on whether the display are or display window provided by the user interface device is provided via a browser or another application. Moreover, in some examples, the number of process plant search results provided by the user interface device may be based on the relative size of, or percentage/proportion of the user interface device display area used by, a browser window or application window via which the process plant search results are provided.

For example, if the size of the user interface device, or the size of a display area or display window provided by the user interface device is not less than a threshold size or the device type one of a predetermined set of device types, the process plant search query server 800 may provide a set of process plant search results to include in the process plant search results display 1000. In other implementations, the process plant search query server 800 selects a number of process plant search results to include in the process plant search results display 1000 which is in proportion to the size of the user interface device, or the size of a display area or display window provided by the user interface device. For example, the process plant search query server 1000 may provide 10 process plant search results to include in the process plant search results display 1000 when the size of user interface device, or the size of a display area or display window provided by the user interface device, is above a first threshold size but less than a second threshold size. The process plant search query server 800 may provide 20 process plant search results to include in the process plant search results display 1000 when the size of user interface device, or the size of a display area or display window provided by the user interface device, is above a second threshold size but less than a third threshold size, and so on. In yet other implementations, the process plant search results display 1000 includes a first set of process plant search results on a first page, and additional sets of process plant search results on subsequent pages which the user may access via user controls on the process plant search results display 1000, such as back and forward arrows. For instance, FIG. 11C illustrates that three of four process plant search results are displayed on a first page 1100C, while a fourth process plant search result is available on a subsequent page that a user may select using an interactive control ("+1").

In other implementations, the process plant search query server 800 provides the set of process plant search results to the user interface device, and the user interface device adjusts the presentation of the set of process plant search results based on the size of the user interface device, or the size of a display area or display window provided by the user interface device, and/or type of the user interface device. For example, if the user interface device is a mobile device or vehicle head unit, the user interface device may select a single search result of the set of process plant search results to present in the process plant search results display 1000, or otherwise may provide a reduced number of process plant search results to include in the process plant search results display 1000. If the user interface device is a desktop computer or has a size at or above a threshold size, the user interface device may present each of the set of process plant search results in the process plant search results display 1000, or otherwise may provide an increased number of process plant search results to include in the process plant search results display 1000.

In some implementations, the process plant search query server 800 may select the format in which to provide the process plant search results based on the capabilities of the user interface device. If the user interface device has audio capabilities but does not have a display, the process plant search query server 800 may provide the process plant search results to the user interface device in an audio format. If the user interface device has a display but does not have audio capabilities, the process plant search query server 800 may provide the process plant search results to the user interface device in a text/graphical format. If the user interface device has a display and audio capabilities, the process plant search query server 800 may provide the process plant search results to the user interface device in both a text/graphical format and an audio format.

Moreover, in some implementations, the process plant search query server 800 may select the format in which to provide the process plant search results based on the type of request upon which the process plant search is based, or the manner in which the request is received. For example, if the request is received via a user's voice command, the process plant search query server 800 may provide the process plant search results to the user interface device in an audio format. As another example, if the request is received via a typed or otherwise text input command from the user, the process plant search query server 800 may provide the process plant search results to the user interface device in a text/graphical format.

Additionally, the process plant search query server 800 may prioritize, or otherwise modify, the presentation of the process plant search results via process plant search results display 1000 based on contexts such as, e.g., priority levels associated with each of the process plant search results, an alarm status associated with each of the process plant search results, a batch ID or other batch criteria associated with each of the process plant search results, such as a batch runtime, a type of equipment associated with each of the process plant search results, or an area of the plant associated with each of the process plant search results, etc.

In an example, the process plant search query server 800 may prioritize, or otherwise modify, the presentation of the process plant search results via process plant search results display 1000 by selecting a first subset of the process plant search results to be displayed based on a first context associated with the first subset of the process plant search results and selecting a second subset of the process plant search results not to be displayed (or to be displayed only on another page of results) based on a second context associated with the second subset of the process plant search results. For instance, a first subset of process plant search results associated with a first, higher priority level may be displayed, while a second subset of process plant search results associated with a second, lower priority level may not be displayed. As another example, a first subset of process plant search results that are associated with alarms may be displayed, while a second subset of process plant search results that are not associated with alarms may not be displayed. Additionally, as another example, a first subset of process plant search results associated with a first batch ID, or other batch criteria associated with each of the process plant search results, may be displayed, while a second subset of process plant search results associated with a second batch ID or other batch criteria may not be displayed. Furthermore, as another example, a first subset of process plant search results associated with a first type of equipment or piece of equipment may be displayed, while a second subset of process plant search results associated with a second type of equipment or piece of equipment may not be displayed. As another example, a first subset of process plant search results associated with a first area of the plant may be displayed, while a second subset of process plant search results associated with a second area of the plant may not be displayed.

For instance, as shown in FIG. 11B, a subset of process plant search results associated with batches running in a particular unit of the plant (unit A) are displayed, while process plant search results that are not associated with batches running in unit A are not displayed.

Moreover, in an example, the process plant search query server 800 may prioritize, or otherwise modify, the presentation of the process plant search results via process plant search results display 1000 by selecting a first subset of the process plant search results to be displayed in a first location (e.g., a first portion of the screen, such as a top portion of the screen, a first side portion of the screen, etc.) of the process plant search results display 1000 based on a first context associated with the first subset of the process plant search results and selecting a second subset of the process plant search results to be displayed in a second location (e.g., a second portion of the screen, such as a bottom portion of the screen, an opposite side portion of the screen, etc.) of the process plant search results display 1000 based on a second context associated with the second subset of the process plant search results. For instance, a first subset of process plant search results associated with a first, higher priority level may be displayed in a first location, while a second subset of process plant search results associated with a second, lower priority level may be displayed in a second location. As another example, a first subset of process plant search results that are associated with alarms may be displayed in a first location, while a second subset of process plant search results that are not associated with alarms may be displayed in a second location. Additionally, as another example, a first subset of process plant search results associated with a first batch ID, or other batch criteria associated with each of the process plant search results (such as a batch runtime) may be displayed in a first location, while a second subset of process plant search results associated with a second batch ID or other batch criteria may be displayed in a second location. Furthermore, as another example, a first subset of process plant search results associated with a first type of equipment or piece of equipment may be displayed in a first location, while a second subset of process plant search results associated with a second type of equipment or piece of equipment may be displayed in a second location. As another example, a first subset of process plant search results associated with a first area of the plant may be displayed in a first location, while a second subset of process plant search results associated with a second area of the plant may be displayed in a second location.

Additionally, in an example, the process plant search query server 800 may prioritize, or otherwise modify, the presentation of the process plant search results via process plant search results display 1000 by selecting a first subset of the process plant search results to be displayed in a larger size via the process plant search results display 1000 based on a first context associated with the first subset of the process plant search results and selecting a second subset of the process plant search results to be displayed in a smaller size via the process plant search results display 1000 based on a second context associated with the second subset of the process plant search results. For instance, a first subset of process plant search results associated with a first, higher priority level may be displayed in a larger size, while a second subset of process plant search results associated with a second, lower priority level may be displayed in a smaller size. As another example, a first subset of process plant search results that are associated with alarms may be displayed in a larger size, while a second subset of process plant search results that are not associated with alarms may be displayed in a smaller size. Additionally, as another example, a first subset of process plant search results associated with a first batch ID or other batch criteria associated with each of the process plant search results, may be displayed in a larger size, while a second subset of process plant search results associated with a second batch ID or other batch criteria may be displayed in a smaller size. Furthermore, as another example, a first subset of process plant search results associated with a first type of equipment or piece of equipment may be displayed in a larger size, while a second subset of process plant search results associated with a second type of equipment or piece of equipment may be displayed in a smaller size. As another example, a first subset of process plant search results associated with a first area of the plant may be displayed in a larger size, while a second subset of process plant search results associated with a second area of the plant may be displayed in a smaller.

For instance, in an example, the process plant search query server 800 may prioritize, or otherwise modify, the presentation of the process plant search results via process plant search results display 1000 by prioritizing an order in which the process plant search results are provided based on the contexts associated with the identified process data. In some examples, higher priority process plant search results may be ordered higher in a displayed list of process plant search results, which lower priority process plant search results may be ordered lower in the displayed list. Similarly, process plant search results associated with alarms may be ordered higher in a displayed list of process plant search results, while process plant search results not associated with alarms may be ordered lower in a displayed list of process plant search results. Additionally, process plant search results associated with a first batch ID or other batch criteria may be ordered higher in a displayed list of process plant search results, while process plant search results associated with a second batch ID or other batch criteria may be ordered lower in the displayed list of process plant search results. Similarly, process plant search results associated with a first type of equipment or piece of equipment may be ordered higher in a displayed list of process plant search results, while process plant search results associated with a second type of equipment or piece of equipment may be ordered lower in the list. As another example, process plant search results associated with a first area of the plant may be ordered higher in a displayed list of process plant search results, while process plant search results associated with a second area of the plant may be ordered lower in the displayed list.

Additionally or alternatively, the process plant search query server 800 may prioritize, or otherwise modify, the presentation of the process plant search results via process plant search results display 1000 based on characteristics of the request upon which the process plant search is based, such as one or more words associated with the request, one or more phrases associated with the request, one or more indications of tone associated with the request, one or more indications of a level of urgency associated with the request, etc. For instance, the words or phrases associated with the request may indicate whether, e.g., process plant search results associated with a first batch ID or other batch criteria, such as batch runtime, are more important to the user than process plant search results associated with a second batch ID or batch criteria, whether process plant search results associated with a first type of equipment or piece of equipment are more important to the user than process plant search results associated with a second type of equipment or piece of equipment, whether process plant search results associated with a first area of the plant are more important than process plant search results associated with second area of the plant, etc. The process plant search query server 800 may prioritize the process plant search results as discussed above based on the level of importance of the various contexts indicated by the one or more words or phrases of the request. Moreover, indications of tone or urgency may indicate whether, e.g., process plant search results associated with more alarms or otherwise higher priority levels should be prioritized over process plant search results associated with fewer alarms or otherwise lower priority levels.

For instance, as shown in FIG. 11B, a request may include the words "show me all batches running on Unit A." Based on the words of the request, a subset of process plant search results associated with batches running in a particular unit of the plant (unit A) are displayed, while process plant search results that are not associated with batches running in unit A are not displayed. As another example, as shown in FIG. 11C, a request may include the words "show me all running batches." Based on the words of the request, four running batches are selected for display. However, only three of the four running batches are actually displayed, which may be based on factors such as the size of the display 1100C. Furthermore, the order in which the four running batches are prioritized is based on the runtime of each of the batches.

Categorizing Process Parameters

In some implementations, process parameters may be categorized, and the categories may be stored in the contextual knowledge repository 49. For example, each process parameter may be categorized as an operating parameter, tuning parameter, equipment parameter, configuration parameter, instantiation parameter, calculated parameter, etc. Then a user may search for process parameters by parameter category.

Figure 12:
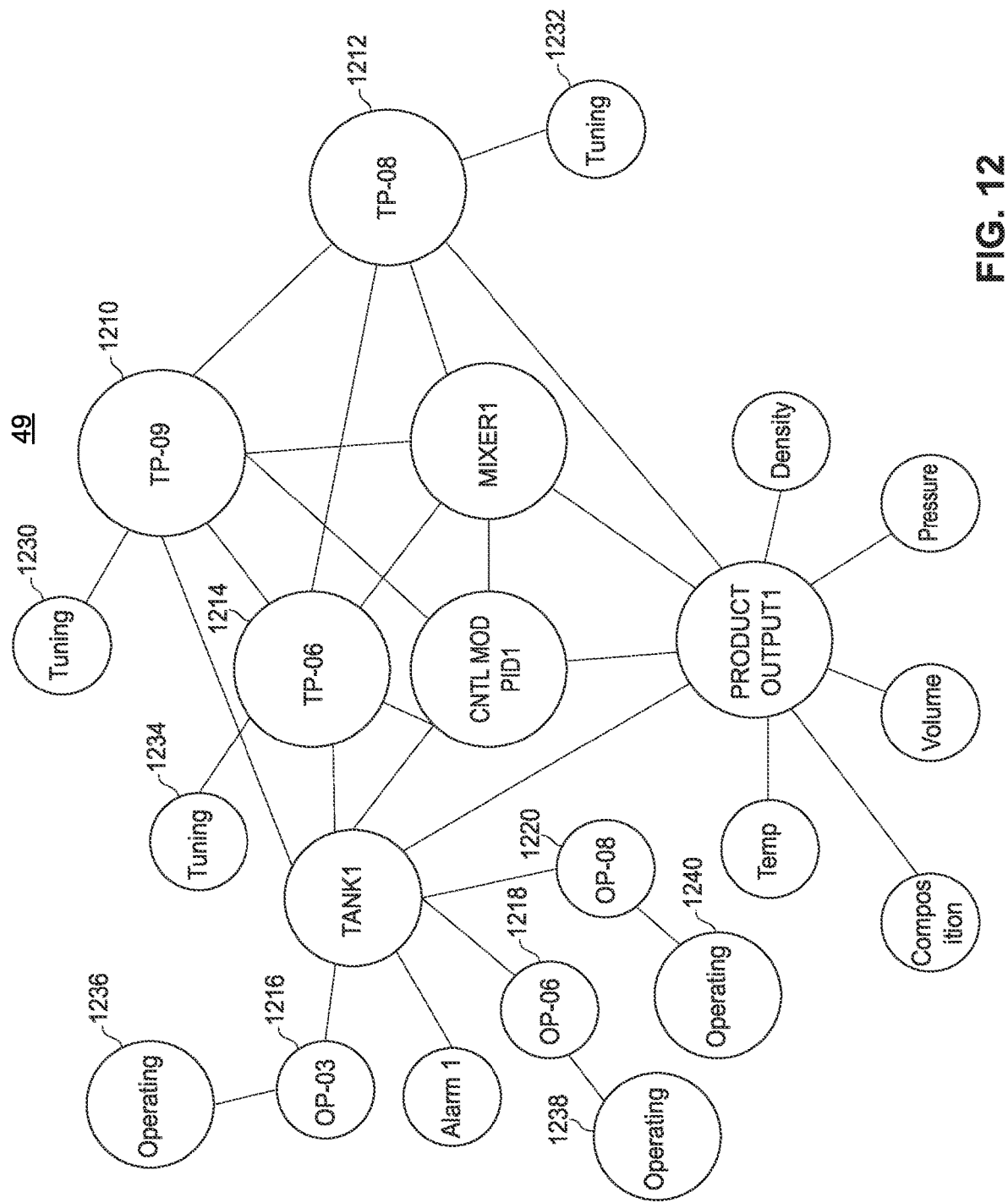
FIG. 12 illustrates another graphical representation of an example portion of a contextual knowledge repository that includes process parameters and process parameter categories for the process parameters.

FIG. 12 illustrates an example portion of the contextual knowledge repository 49 that includes process parameters and process parameter categories for the process parameters. The contextual knowledge repository 49 depicted in FIG. 12 may be a detailed portion of a larger contextual knowledge repository 49 depicted in FIG. 7 and described above which includes additional relationships, process plant entities, and process plant-related data.

As shown in FIG. 12, process parameters 1210-1220 within the contextual repository are each connected with a respective parameter category 1230-1240. For example, parameters TP-09 (ref. no. 1210), TP-08 (ref. no. 1212), TP-06 (ref. no. 1214) are tuning parameters 1230-1234. Parameters OP-03 (ref. no. 1216), OP-06 (ref. no. 1218), and OP-08 (ref. no. 1220) are operating parameters 1236-1240. Some process parameters may be assigned multiple parameter categories. Also in some implementations, a parameter category may be an attribute of a process parameter having its own parameter values. For example, each of the process parameters 1210-1220 may have a mode parameter (which is also a parameter category) each having a particular mode parameter value (e.g., AUTO, CAS, Normal, etc.). In this manner, a user may query for mode parameters and receive search results which include the modes of each of the process parameters 1210-1220.

While FIG. 12 illustrates a few examples of process parameters and respective parameter categories in the contextual knowledge repository 49, this is for ease of illustration only. The contextual knowledge repository 49 may include any suitable number of process parameters each associated with any suitable number of parameter categories.

In some implementations, the process plant search functionality may be provided within an IDE, so that process plant search queries may be performed and process plant search results may be presented within the IDE, such as a web-based IDE which has workflows for data science and machine learning and which provides interactive visualizations of the search results. In this manner, users may customize machine learning models, filter search results and/or time series data, and may customize other aspects of the search functionality.

In some implementations, the system may provide a process plant search module to the IDE for handling process plant search queries within the IDE. For example, the IDE may import a process plant search module to handle process plant search queries and return process plant search results as data frames which can easily be rendered as tables, graphs, charts, or plots.

In other implementations, the system may expose a process plant search application programming interface (API) to the IDE for handling process plant search queries and returning process plant search results to the IDE. For example, the IDE may invoke the process plant search API and provide the process plant search query to the edge gateway system 1 via the process plant search API. The edge gateway system may then obtain a data set responsive to the process plant search query from the knowledge repository 42 (e.g., the contextual knowledge repository 49 and/or the temporal repository 51), and provide a set of process plant search results based on the data set to the IDE via the process plant search API.

In other implementations, the process plant search functionality is provided within plant applications 74, multi-plant applications 80, remote plant applications 82, or third-party applications 84.

Figure 13:
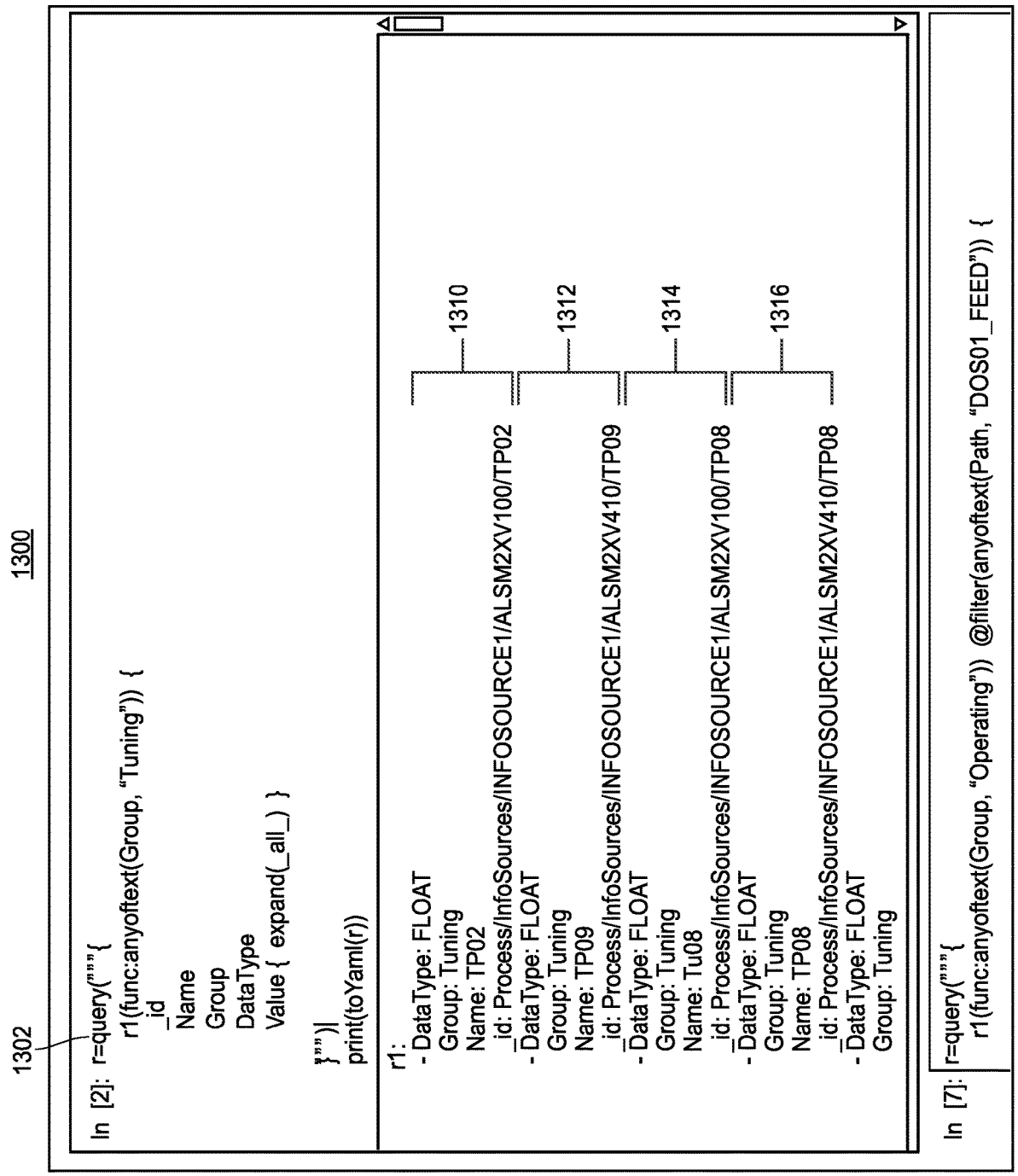
FIG. 13 illustrates an example process plant search results display within an integrated development environment (IDE) including process plant search results in response to a search query related to a particular process parameter category.

FIG. 13 illustrates an example process plant search results display 1300 within an IDE. The process plant search results display 1300 includes a set of process plant search results 1310-1316 in response to a process plant search query 1302 for tuning parameters. The set of process plant search results 1310-1316 includes process parameters corresponding to the tuning parameter category. Each process plant search result includes the parameter category (Tuning), the name of the process parameter (e.g., TP02), and an identifier for the process parameter (e.g., Process/InfoSources/INFOSOURCE1/ALSM2XV100/TP02). While the programming language for the IDE in FIG. 13 is Python, the IDE may support any suitable programming language.

When a user enters the process plant search query 1302 for tuning parameters within the IDE, a process plant search module or process plant search API may communicate with the edge gateway system 1 to retrieve process parameters corresponding to the tuning parameter category from the contextual knowledge repository 49.

Figure 14:
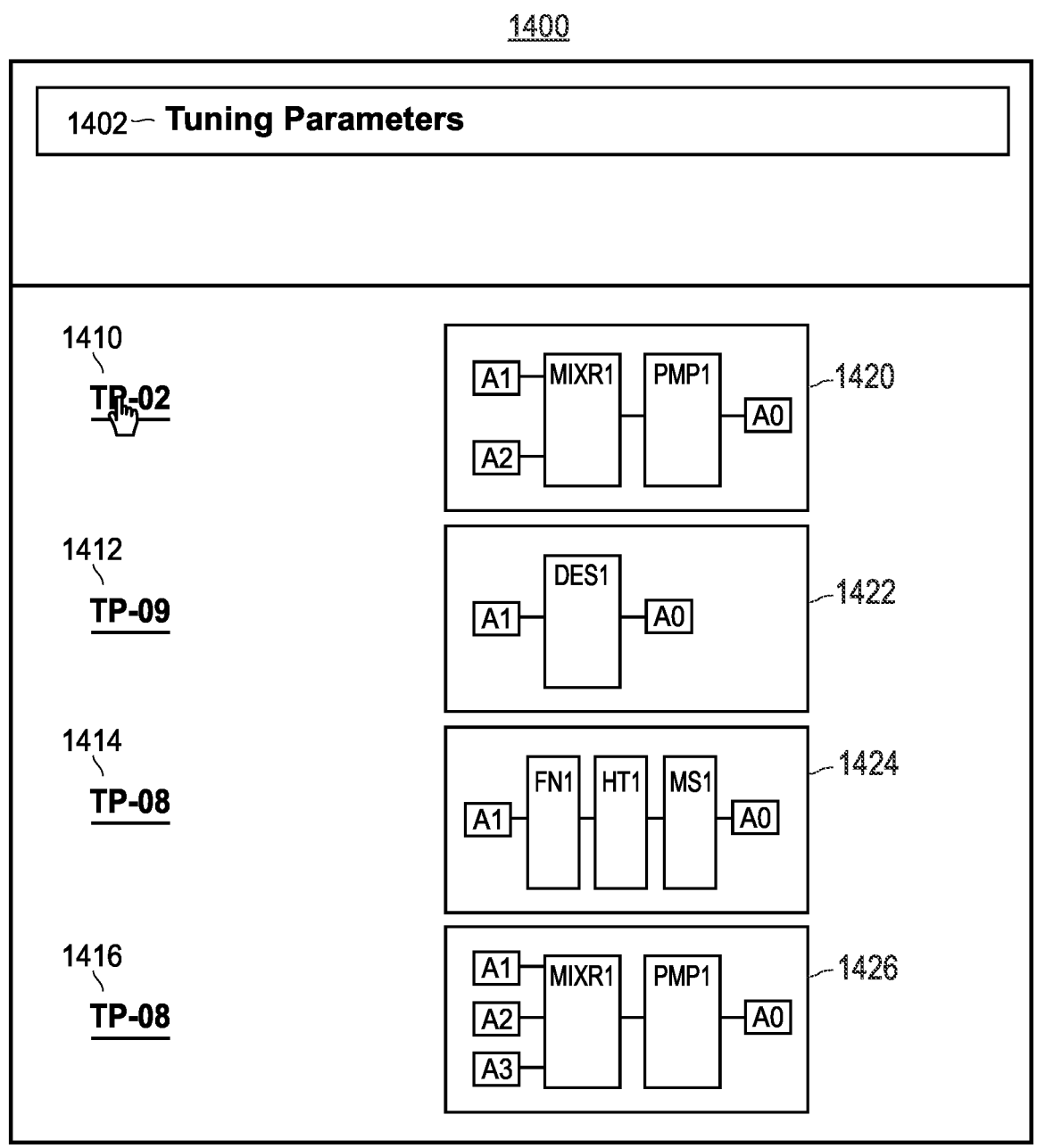
FIG. 14 illustrates another example process plant search results display within a plant application including process plant search results in response to a search query related a process parameter category.

FIG. 14 illustrates another example process plant search results display 1400 within a plant application 74, multi-plant application 80, remote plant application 82, or third-party application 84. The process plant search results display 1400 includes the same set of process plant search results responsive to the same process plant search query 1402 as in FIG. 13 for tuning parameters. In addition to providing the names of each process parameter as search results, the process plant search results display 1400 also presents a thumbnail image or preview 1420-1426 of the detailed information regarding each process plant search result. For example, for each tuning parameter, the process plant search results display presents a thumbnail image or preview of a graphical representation of a control module or function block associated with the tuning parameter.

In addition to querying for process parameters belonging to a particular parameter category, a user may query for process parameters belonging to a particular parameter category having a particular process parameter value or range of values. For example, a user may enter a process plant search query for operating parameters having values that changed from their configured values. In another example, a user may enter a process plant search query for mode parameters having actual values which have deviated from their normal states.

FIG. 15 illustrates an example process plant search results display 1500 within an IDE. The process plant search results display 1500 includes a set of process plant search results 1510-1514 in response to a process plant search query 1502 for operating parameters having values that differ from the configured values. The set of process plant search results 1510-1514 includes process parameters corresponding to the operating parameter category. The set of process plant search results are then filtered to identify only operating parameters having values that differ from their configured values. Each process plant search result includes the parameter category (Operating), the configured value (e.g., True), the current value (e.g., False), and an identifier for the process parameter (e.g., InfoSources/INFOSOURCE1/Modules/BMS_MFT_ILOCK_F0/RESET_IN).

When a user enters the process plant search query 1502 for operating parameters having values that differ from the configured values within the IDE, a process plant search module or process plant search API may communicate with the edge gateway system 1 to retrieve process parameters corresponding to the operating parameter category from the contextual knowledge repository 49. The process plant search module or process plant search API may then filter the process parameters corresponding to the operating parameter category by comparing the value of each operating parameter to its configured value. The current values and the configured values may be stored in the contextual knowledge repository and/or the temporal repository 51.

The process plant search module or process plant search API then identifies the operating parameters having values that differ from the configured values.

Figure 16:
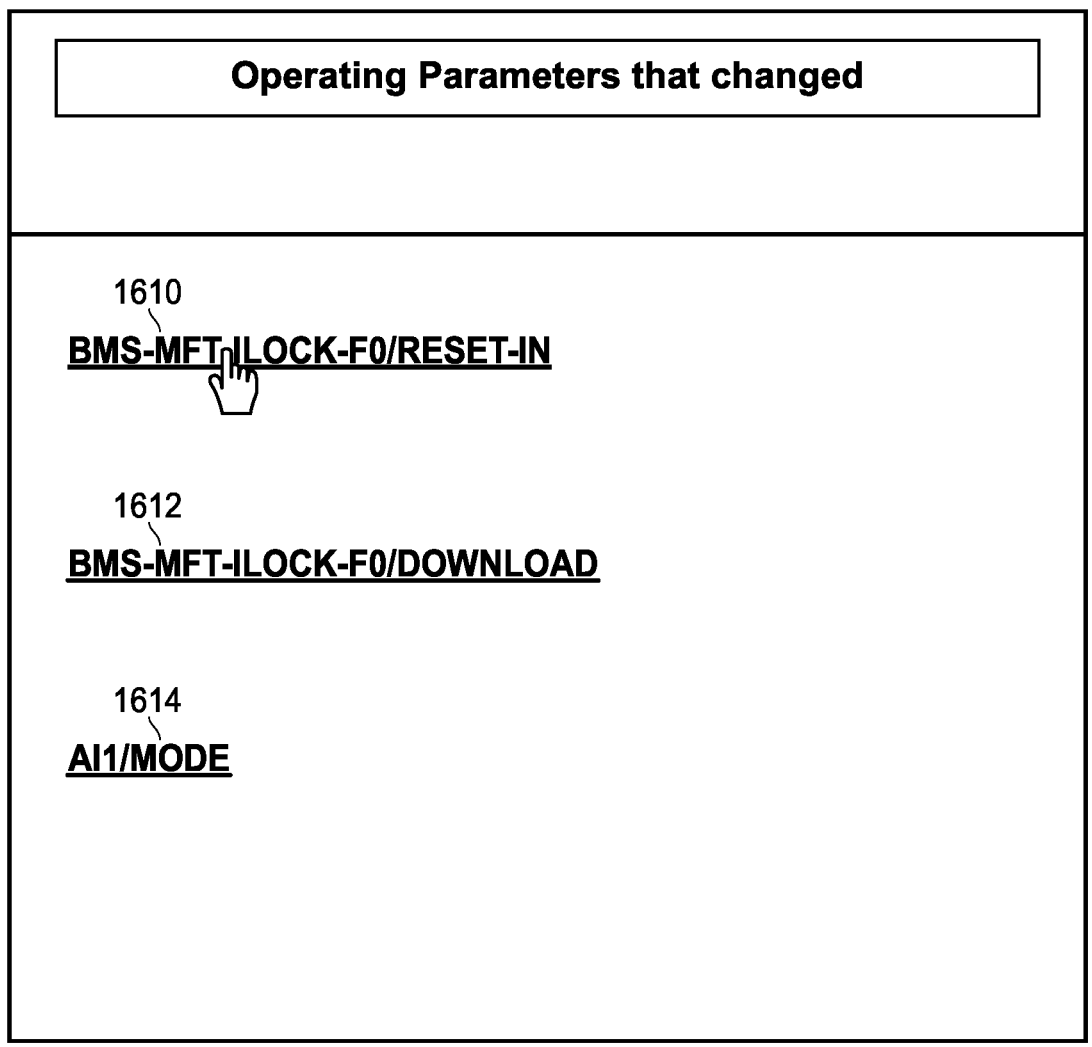
FIG. 16 illustrates another example process plant search results display within a plant application including process plant search results in response to a search query related to the other process parameter category.

FIG. 16 illustrates another example process plant search results display 1600 within a plant application 74, multi-plant application 80, remote plant application 82, or third-party application 84. The process plant search results display 1600 includes the same set of process plant search results 1610-1614 responsive to the same process plant search query 1602 as in FIG. 15 for operating parameters having values that differ from the configured values.

FIG. 17 illustrates another example process plant search results display 1700 within an IDE. The process plant search results display 1700 includes a set of process plant search results 1710-1724 in response to a process plant search query 1702 for mode parameters out of the normal state. The set of process plant search results 1710-1724 includes process parameters corresponding to the mode parameter category. The mode parameter category may be a subcategory of the operating parameter, tuning parameter, equipment parameter, configuration parameter, instantiation parameter categories. More specifically, each of the parameter category types may include a mode parameter. For example, each operating parameter may include a mode parameter, each tuning parameter may include a mode parameter, etc.

In any event, the set of process plant search results are then filtered to identify only mode parameters having values that differ from their normal values. Each process plant search result includes the actual value (e.g., IMAN), the normal value (e.g., CAS), and an identifier for the process parameter (e.g., InfoSources/INFOSOURCE1/Modules/AIC-10-401/PID1/MODE).

When a user enters the process plant search query 1702 for mode parameters out of the normal state within the IDE, a process plant search module or process plant search API may communicate with the edge gateway system 1 to retrieve process parameters corresponding to the operating parameter category from the contextual knowledge repository 49. The process plant search module or process plant search API may then filter the process parameters corresponding to the mode parameter category or subcategory by comparing the actual value of each mode parameter to its normal value. The actual values and the normal values may be stored in the contextual knowledge repository and/or the temporal repository 51. The process plant search module or process plant search API then identifies the mode parameters out of the normal state.

Figure 18:
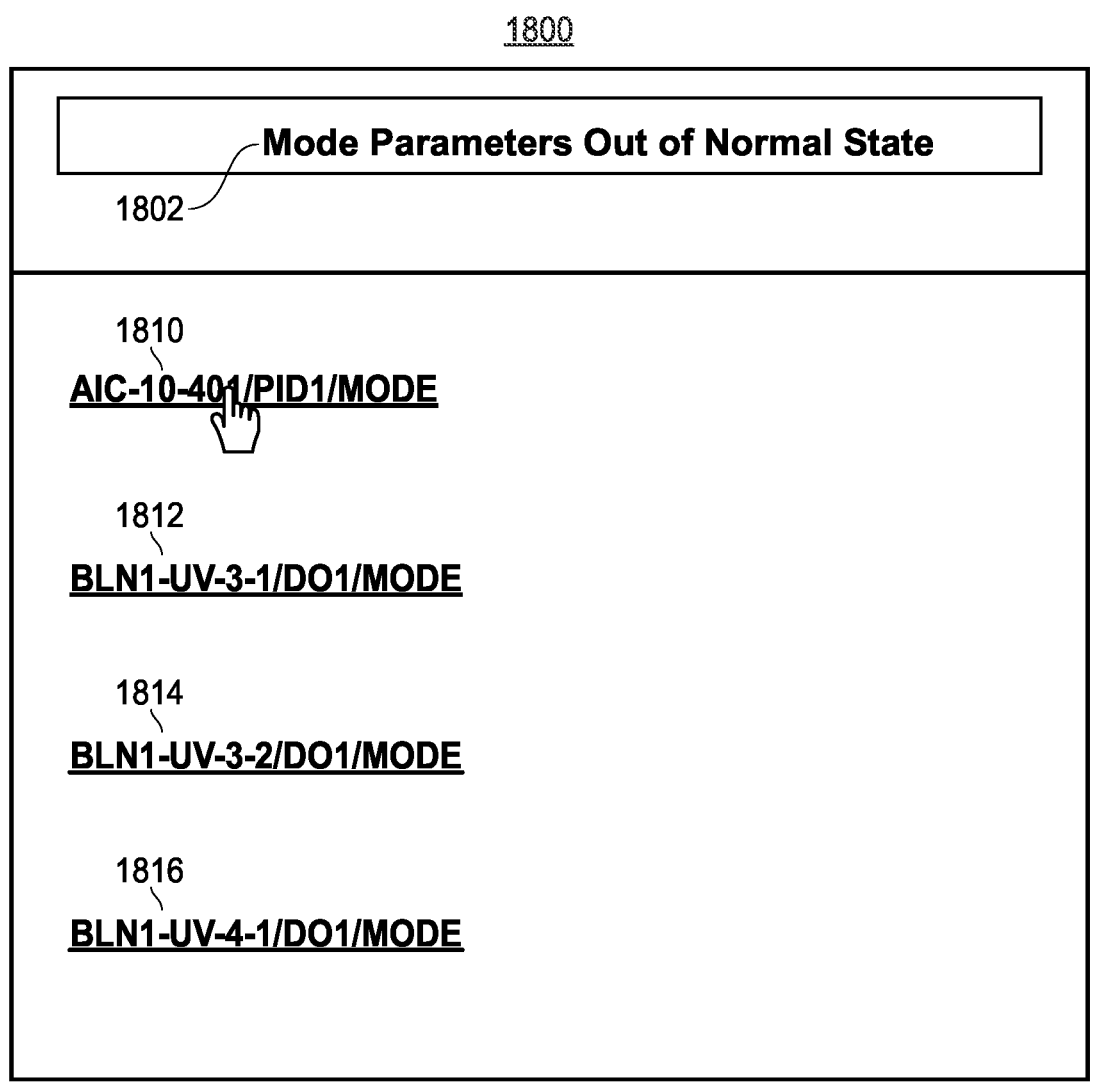
FIG. 18 illustrates another example process plant search results display within a plant application including process plant search results in response to a search query related to the other process parameter category.

FIG. 18 illustrates yet another example process plant search results display 1800 within a plant application 74, multi-plant application 80, remote plant application 82, or third-party application 84. The process plant search results display 1800 includes some of the same process plant search results 1810-1816 responsive to the same process plant search query 1802 as in FIG. 17 for mode parameters out of the normal state.

The user may also query for time series data indicating changes in process parameter values over a particular time period. The process plant search results display may then present the time series data graphically in a table, chart, or graph. In some implementations, the process plant search results display may combine multiple instances of time series data for multiple process parameters into a single table or chart.

Figure 19:
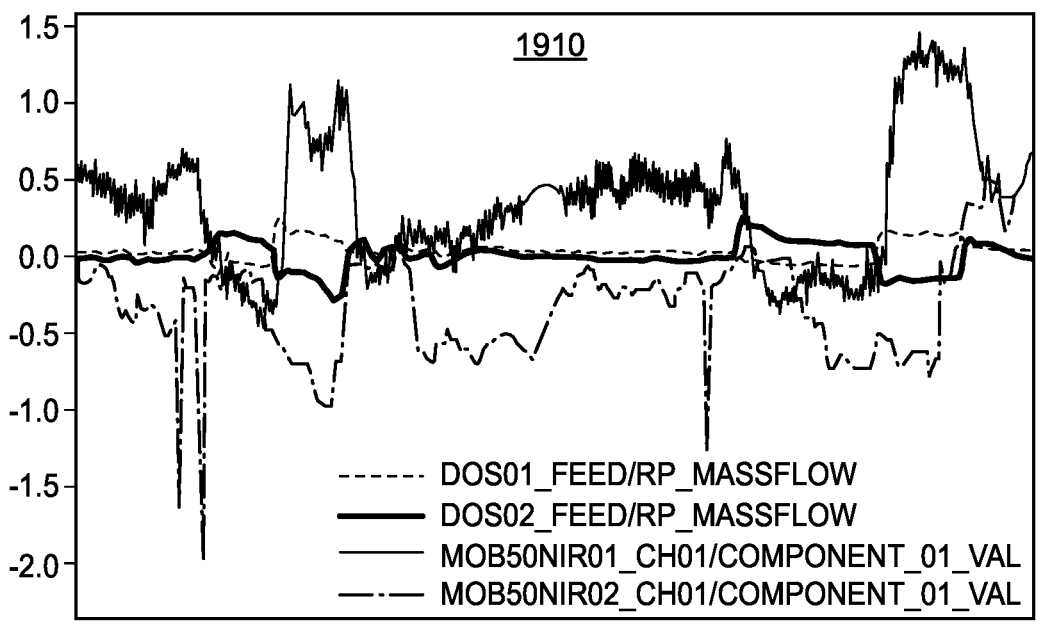
FIG. 19 illustrates a graph display within an IDE including a process plant search result in response to a search query for time series data indicating changes in process parameter values over time.

FIG. 19 illustrates a graph display 1900 within an IDE including a process plant search result 1910 in response to a search query 1902 for time series data indicating changes in process parameter values over time. More specifically, the search query 1902 is for time series data for four process parameters: DOS01_FEED/RP_MASSFLOW, DOS02_FEED/RP_MASSFLOW, MOB50NIR01_CH01/COMPONENT_01_VAL, and MOB50NIR01_CH02/COMPONENT_01_VAL from 7:30 to 8:30 in one second intervals. The time series data for each of the four process parameters are combined and provided in a single chart as a process plant search result 1910.

Figure 20:
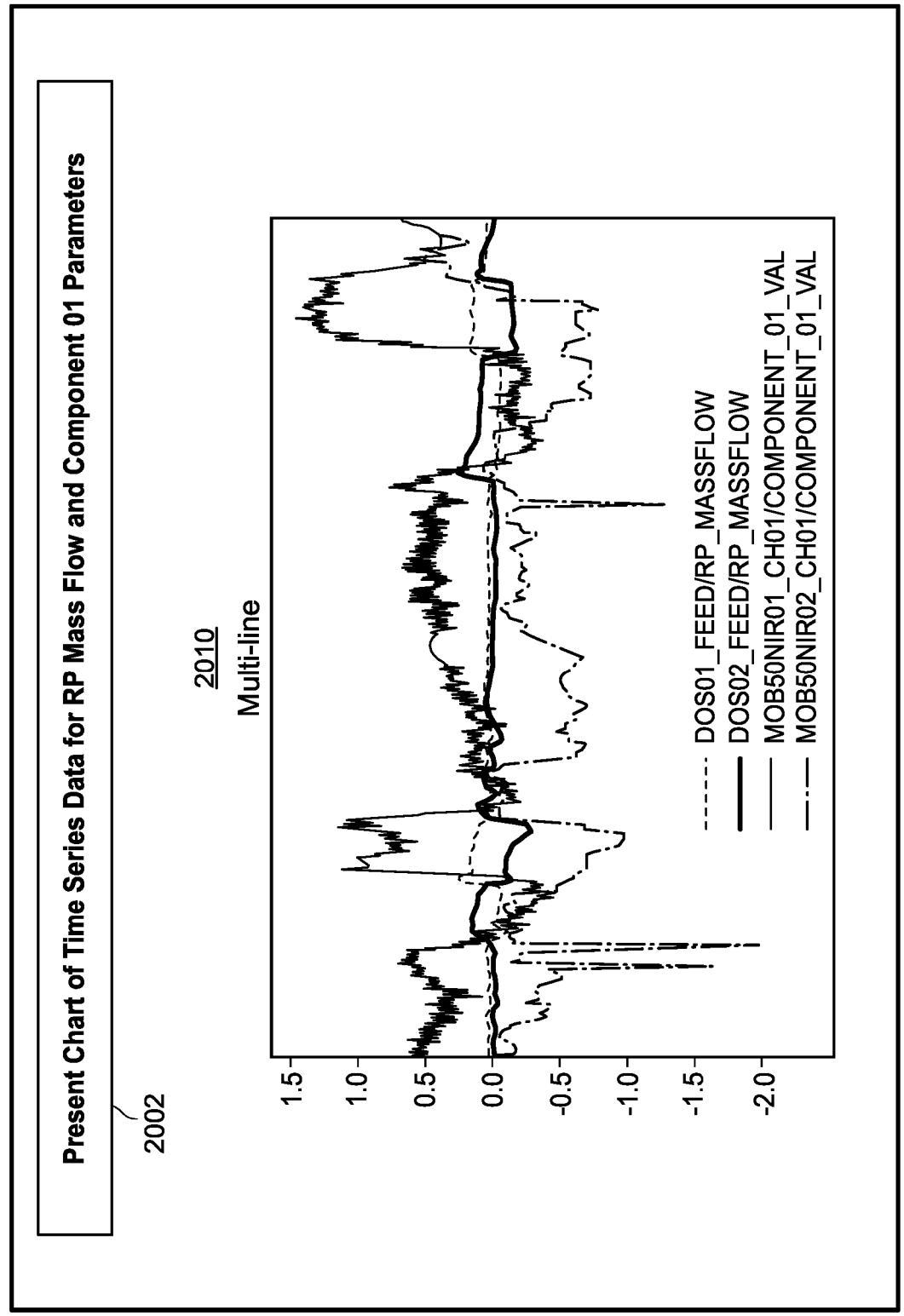
FIG. 20 illustrates another graph display within a plant application including a process plant search result in response to a search query for time series data indicating changes in process parameter values over time.

FIG. 20 illustrates another example process plant search results display 2000 within a plant application 74, multi-plant application 80, remote plant application 82, or third-party application 84. The process plant search results display 2000 includes the same process plant search result 2010 responsive to the same process plant search query 2002 as in FIG. 19 for time series data for DOS 01 and DOS 02 RP Mass Flow parameters and MOB50NIR01 CH01 and CH02 Component 01 parameters.

Process Plant Search Tags

In some implementations, a user may store a previous process plant search query or a previous set of process plant search results with a process plant search tag. Then when the user enters a new process plant search query, the user can include the process plant search tag in the new process plant search query. In this manner, the user may retrieve a set of process plant search results responsive to the previous process plant search query without having to re-enter the process plant search query. The user may also retrieve the previous set of process plant search results without having to re-enter the process plant search query that led to those results and without the risk of receiving different process plant search results in response to the same process plant search query due to changing circumstances in the process plant in the time period since the process plant search query was last entered.

In addition to storing a previous process plant search query or a previous set of process plant search results with a process plant search tag, a user may also store a data set with a process plant search tag. The data set may be a material composition, weather data, time series data, etc. Then the user may include the process plant search tag in a new process plant search query to retrieve the data set.

Moreover, the user may include the process plant search tag and an additional term(s) in the new process plant search query. The process plant search engine 806 may then filter the set of process plant search results responsive to the previous process plant search query or the set of previous process plant search results according to the additional term(s). For example, a process plant search tag may reference a previous process plant search query. When the user enters the process plant search tag and an additional term(s) as a new process plant search query, the process plant search engine 806 may obtain a first set of process plant search results responsive to the previous process plant search query. Then the process plant search engine 806 may filter the first set of process plant search results according to the additional term(s) to generate a second set of process plant search results. The process plant search engine 806 may provide the second set of process plant search results as the new set of process plant search results for display to the user.

To store the previous process plant search query, previous set of process plant search results, or data set with a process plant search tag, the user may select a user control in a process plant search results display to store the previous process plant search query, previous set of process plant search results, or data set and may enter an alphanumeric string as the process plant search tag. Process plant search tags may be stored in the contextual knowledge repository 49 in association with their respective process plant search queries or sets of process plant search results. In some implementations, a process plant search tag may be stored in association with a particular user, such as the user who created the process plant search tag. In this implementation, only the user who created the process plant search tag may reference the process plant search tag in a subsequent process plant search query to receive process plant search results corresponding to the process plant search tag. In other implementations, any user may reference the process plant search tag in a subsequent process plant search query to receive process plant search results corresponding to the process plant search tag. In yet other implementations, a user who creates a process plant search tag may select whether or not the process plant search tag can be referenced by other users.

Figure 21:
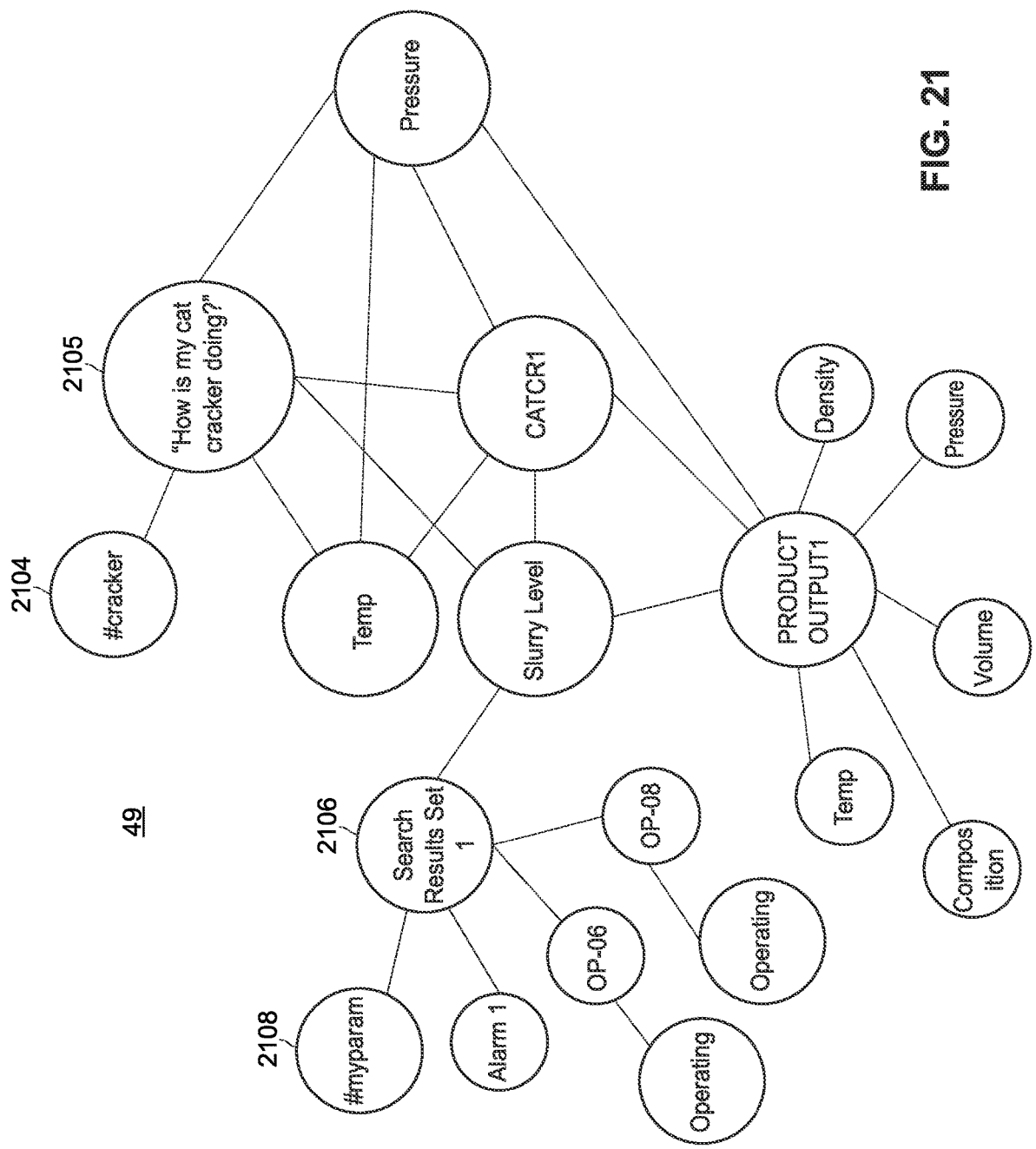
FIG. 21 illustrates yet another graphical representation of an example portion of a contextual knowledge repository that includes previous process plant search queries, previous process plant search results, and search tags referencing the previous process plant search queries or search results.

FIG. 21 illustrates an example portion of the contextual knowledge repository 49 that includes previous process plant search queries entered by users, sets of previous process plant search results responsive to the process plant search queries, and process plant search tags created by users to reference the previous process plant search queries and/or sets of previous process plant search results. The contextual knowledge repository 49 depicted in FIG. 21 may be a detailed portion of a larger contextual knowledge repository 49 depicted in FIG. 7 and described above which includes additional relationships, process plant entities, and process plant-related data.

As shown in FIG. 21, a previous process plant search query "How is my cat cracker doing?" 2102 is connected with a process plant search tag "#cracker" 2104. For example, a user previously entered the process plant search query "How is my cat cracker doing?" 2102 and created the process plant search tag "#cracker" 2104 to re-enter the process plant search query in a subsequent query. As mentioned above, in some implementations other users may also enter the process plant search tag "#cracker" 2104 in subsequent queries to receive process plant search results responsive to "How is my cat cracker doing?" 2102.

Also as shown in FIG. 21, a previous set of process plant search results "Search Results Set 1" 2106 is connected with a process plant search tag "#myparam" 2108. For example, a user previously received "Search Results Set 1" 2106 in response to a previous process plant search query and created the process plant search tag "#myparam" 2108 to retrieve the same set of process plant search results as "Search Results Set 1" 2106. As mentioned above, in some implementations other users may also enter the process plant search tag "#myparam" 2108 in subsequent queries to receive "Search Results Set 1" 2106.

While FIG. 21 illustrates a few examples of previous process plant search queries, sets of previous process plant search results, and process plant search tags in the contextual knowledge repository 49, this is for ease of illustration only. The contextual knowledge repository 49 may include any suitable number of previous process plant search queries, sets of previous process plant search results, and process plant search tags.

Figure 22:
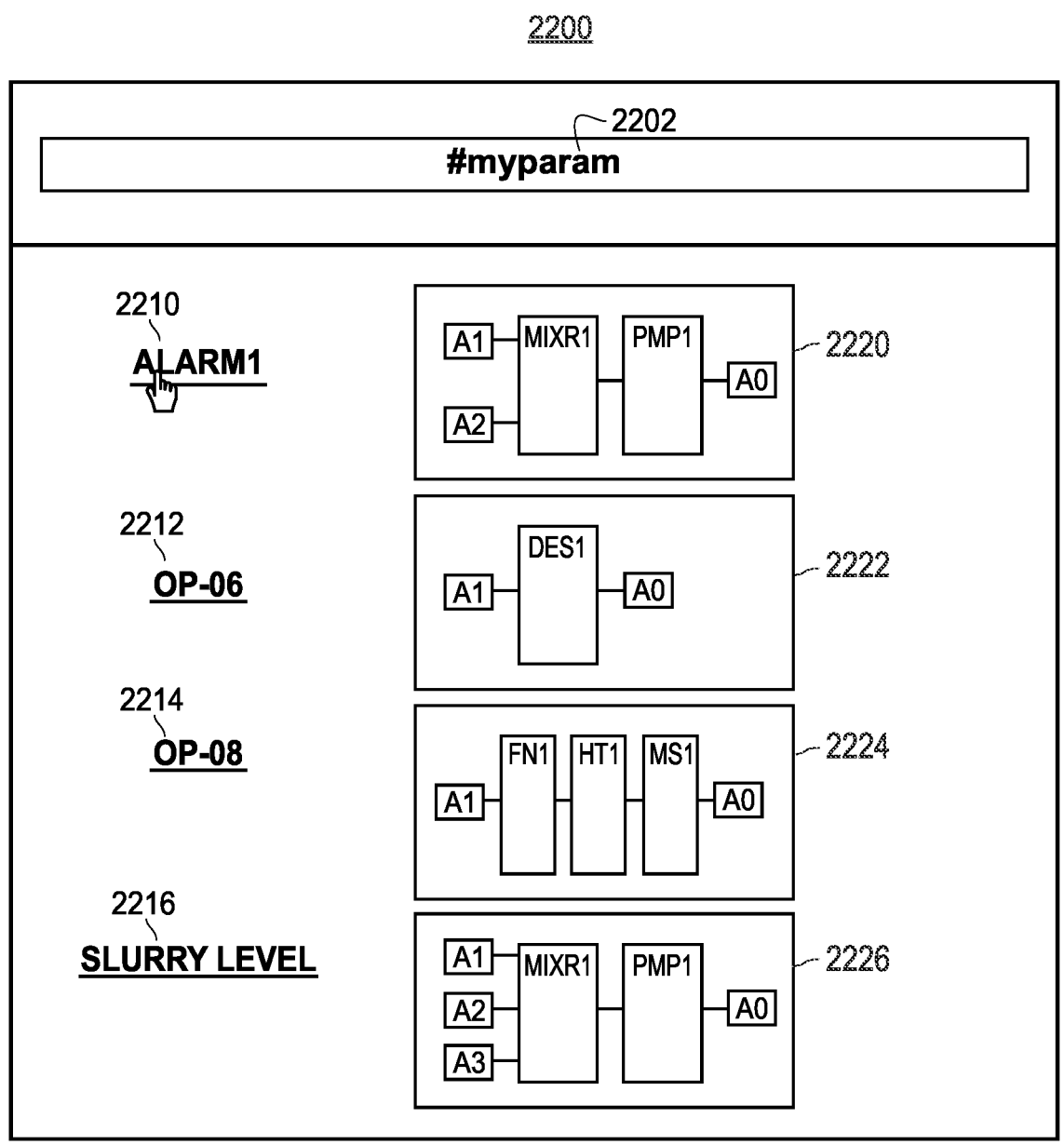
FIG. 22 illustrates an example process plant search results display including process plant search results in response to a search tag referencing a previous process plant search query or set of process plant search results.

FIG. 22 illustrates an example process plant search results display 2200 within a plant application 74, multi-plant application 80, remote plant application 82, or third-party application 84. In other implementations, the example process plant search results display 2200 may be included within an IDE.

The process plant search results display 2200 includes a set of process plant search results 2210-2216 in response to a process plant search query 2202 that includes the process plant search tag "#myparam." The process plant search tag "#myparam" may reference the previous set of process plant search results "Search Results Set 1." Accordingly, the set of process plant search results 2210-2216 includes process parameters within "Search Results Set 1." In addition to providing the names of each process parameter as search results, the process plant search results display 2200 also presents a thumbnail image or preview 2220-2226 of the detailed information regarding each process plant search result. For example, for each process parameter, the process plant search results display 2200 presents a thumbnail image or preview of a graphical representation of a control module or function block associated with the process parameter. In other implementations, the process plant search results display 2200 may present other attributes associated with each process plant search result, such as configured values for each process parameter, time series data for each process parameter, etc. While the process plant search results 2210-2216 in the process plant search results display 2200 are process parameters, the process plant search results may be any suitable process parameter search results, such as process plant entities, control modules, process parameter values, etc.

In some implementations, the user may view process plant search tags via a user control in the process plant search results display 2200. For example, in response to the user entering the character "#," the process plant search results display 2200 may present a drop-down menu of process plant search tags stored by the user or stored by other users who gave permission for the search tag to be referenced by any process plant user. For example, the process plant search results display 2200 may retrieve process plant search tags from the contextual knowledge repository 49 to include in the drop-down menu. In this manner, the user may view available process plant search tags and select one of the tags to include in a process plant search query 2202. The process plant search tags may be descriptive of the sets of process plant search results or process plant search queries to which they correspond. In other scenarios, it may be more difficult to identify a set of process plant search results or a process plant search query corresponding to a particular process plant search tag so that only the user and/or a small group of users working closely with the user know the relationship between the process plant search tag and a corresponding set of process plant search results or process plant search query.

When the user enters a process plant search query that includes a particular special character (e.g., "#") or other identifier associated with process plant search tags, the process plant search engine 806 searches for a matching process plant search tag in the contextual knowledge repository 49. If there is a matching process plant search tag, the process plant search engine 806 obtains the process plant search query or set of process plant search results associated with the process plant search tag in the contextual knowledge repository 49. Then the process plant search engine 806 provides the obtained set of process plant search results or a set of process plant search results corresponding to the obtained process plant search query for display to the user, for example via the process plant search results display 2200. On the other hand, if there is no matching process plant search tag, the process plant search engine 806 may proceed as if the user did not include the particular special character or other identifier and obtain process plant search results from the knowledge repository 42 responsive to the term(s) included in the process plant search query. In other implementations, the process plant search engine 806 may identify process plant search tag(s) closest to the term(s) included in the process plant search query and request the user to indicate whether they intended to enter one of the identified process plant search tag(s).

Figure 23:
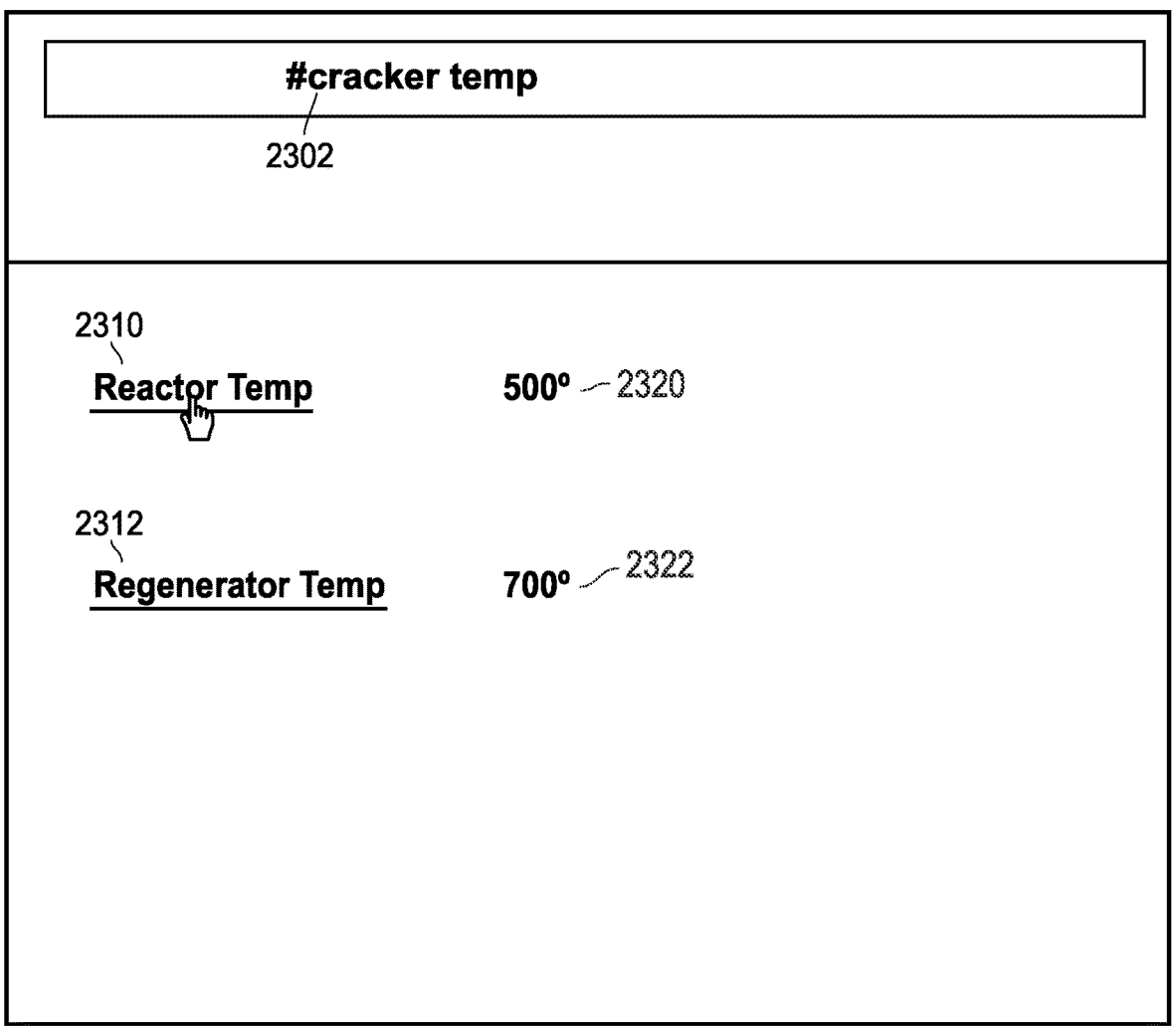
FIG. 23 illustrates another example process plant search results display including process plant search results in response to a search tag and an additional term for modifying the process plant search results.

In some scenarios, the user may include additional term(s) in the process plant search query along with the process plant search tag. The process plant search engine 806 may then filter the set of process plant search results responsive to the previous process plant search query or the set of previous process plant search results according to the additional term(s). FIG. 23 illustrates an example process plant search results display 2300 within a plant application 74, multi-plant application 80, remote plant application 82, or third-party application 84. In other implementations, the example process plant search results display 2300 may be included within an IDE.

The process plant search results display 2300 includes a set of process plant search results 2310-2312 in response to a process plant search query 2302 that includes the process plant search tag "#cracker" and the additional term "temp." The process plant search tag "#cracker" may reference the previous process plant search query "How is my cat cracker doing?" The process plant search engine 806 may analyze the additional term "temp" for example, using the grammar module, taxonomies, and/or plant vocabulary database mentioned above to determine that the process plant search query 2302 is for temperature values related to the cat cracker that the user entering the process plant search query 2302 operates, maintains, is responsible for, etc. The process plant search engine 806 then obtains a set of process plant search results for the previous process plant search query "How is my cat cracker doing?" and filters the set of process plant search results to identify a subset of the process plant search results related to temperature.

Accordingly, the set of process plant search results 2310-2312 includes process parameters for the user's cat cracker having temperature values, such as a reactor temperature parameter 2310, and a regenerator temperature parameter 2312. In addition to providing the names of each process parameter as search results, the process plant search results display 2300 also presents the temperature values 2320-2322 for the respective process parameters 2310-2312.

Learning-Based Provisioning Platform

In addition to searching for process parameters, process parameter values, process plant entities, etc., users may search for predicted states of process plant entities or future process parameter values. Users may generate machine learning models to predict states of process plant entities or may provide process plant search queries where the process plant search engine 806 obtains pre-stored machine learning models (e.g., from the knowledge repository 42) to generate process plant search results or generates a machine learning model based on process plant-related data in the knowledge repository 42.

For example, the process plant search engine 806 trains machine learning models using historical process parameter data and/or relationships between process plant entities to predict a state of a particular process plant entity, such as an abnormal condition or a change to the current state of the process plant entity. The state of the process plant entity may also include states of materials flowing through the process plant entity, such as product quality metric, or states of process parameters corresponding to the process plant entity, such as a mass flow rate of a valve. The machine learning techniques may be provided within an IDE so that a user can customize or train machine learning models.

The process plant search engine 806 may train a machine learning model using historical process parameter data and/or relationships between process plant entities indicated in the knowledge repository 42. For example, to train a machine learning model for predicting a state of a process plant entity, the process plant search engine 806 may obtain indications of previous states of process plant entities from the knowledge repository 42, automatically identify process parameters associated with each of the process plant entities, and obtain historical process parameter values for the identified process parameters at times corresponding to the previous states. The process plant search engine 806 may also identify related process plant entities and process parameters associated with the related process plant entities, and may obtain historical process parameter values for the related process plant entities at times corresponding to the previous states.

In a more specific example, the process plant search engine 806 may obtain an indication of a valve malfunctioning at a particular time, and may identify process parameters associated with the valve, such as the valve travel, valve dead time, the drive signal, the travel set point, the flow rate, etc. at the time in which the valve malfunctioned and/or within a threshold time period before and/or after the valve malfunctioned. The process plant search engine 806 may also identify relationships between the valve and other process plant entities or other process plant-related data at or within a threshold time period before and/or after the valve malfunctioned, such as upstream and downstream process plant entities physically connected to the valve, the material flowing through the valve, the location of the valve within the process plant, the location of the process plant using the valve, etc. In some implementations, the process plant search engine 806 may also identify process parameters associated with the related process plant entities or other process plant-related data. Then the process plant search engine 806 may train a machine learning model to predict a state of a valve using (i) an indication that the particular valve malfunctioned, (ii) historical process parameter data for the identified process parameters associated with the particular valve at the time in which the valve malfunctioned, and (iii) historical process parameter data or other process plant-related data having a relationship with the particular valve. The machine learning model may be trained using several other instances in which valves malfunctioned or experienced other states and corresponding historical process parameter data and other process plant-related data for the valve and for related process plant entities.

In some implementations, for each identified process parameter or other process plant-related data for the process plant entity or having a relationship with the process plant entity, the process plant search engine 806 may perform statistical calculations on the corresponding process parameter values collected over time to generate a process parameter metric. For example, from temperature valves of a material at a valve, the process plant search engine 806 may determine one or more process parameter metrics such as an average temperature of the material at the valve, the standard deviation in the temperature, a 20-second moving average of the temperature, and/or a 20-second decaying average of the temperature where the most recent temperature is weighted the highest and the temperature from 20 seconds earlier is weighted the lowest. The process plant search engine 806 may additionally or alternatively determine an amplitude and frequency in a wave created by the various temperatures collected over time. Still further, the process plant search engine 806 may apply various filters to the temperature values to remove noise and perform additional statistical calculations after the filters are applied.

The process parameter metrics for the process plant entity are then used to train a machine learning model to detect or identify a condition or state occurring at the process plant entity. For example, the process plant search engine 806 uses various machine learning techniques to generate a machine learning model to detect or identify whether a particular condition or state is occurring or is present at a process plant entity. A single machine learning model may be used to detect or identify multiple conditions or states which may occur or be present at a process plant entity, or different machine learning models may be specific to each type of condition or state, and the process parameter metrics may be applied to each machine learning model to detect or identify which condition or state (if any) is occurring or present at the process plant entity. One or more of the machine learning models may be generated by using suitable machine learning techniques such as linear regression, polynomial regression, logistic regression, naïve Bayes, decision trees, random forests, boosting, nearest neighbors, neural networks, etc.

In some cases, each of the historical process parameter values or a set of historical process parameter values corresponding to a particular time window (e.g., an hour) are classified into a subset of process parameter values associated with a particular condition or state which occurred or was present at the corresponding process plant entity during or associated with the time the historical process parameter values were generated. For example, a set of temperature values may be classified into a subset of process parameter values associated with an error at a heat exchanger when the temperature values were collected, e.g., within a threshold time period of an error being identified at the heat exchanger. Additionally, historical process parameter values are classified into another subset of process parameter values associated with normal operation of the process plant entity when no condition occurs or is present at the process plant entity at or around the time the historical process parameter values were generated. The process plant search engine 806 compares a subset of historical process parameter values associated with a condition or state to another subset of historical process parameter values that are not associated with the condition or state to generate a machine learning model. In this manner, the process plant search engine 806 identifies characteristics of the process parameters which indicate that the process plant entity is experiencing a particular condition or state.

Naïve Bayes

In some embodiments, the machine learning technique for generating and/or utilizing a machine learning model is naïve Bayes. For example, the process plant search engine 806 generates a machine learning model for each type of condition or state associated with the process plant entity (e.g., a performance monitoring metric, an error, a leak, dead band, dead time, mechanical wear, etc.). To illustrate, for a particular condition such as a leak at a heat exchanger, the process plant search engine 806 classifies the historical process parameter values associated with heat exchangers and historical process parameter values or other process plant-related data for process plant entities having a relationship with heat exchangers into a first subset of process parameter values that are associated with a heat exchanger leak and a second subset of process parameter values that are not associated with a heat exchanger leak. Then the process plant search engine 806 performs statistical calculations on each of the subsets. For example, for each historical process parameter in the first subset, the process plant search engine 806 calculates an average of the corresponding historical process parameter values and a standard deviation of the corresponding historical process parameter values. The process plant search engine 806 also calculates an average and standard deviation of historical process parameter values corresponding to each historical process parameter in the second subset. In some embodiments, the average for a historical process parameter is weighted, where historical process parameter values collected closer in time to the detection of the condition are weighted higher. For example, if a leak is detected at time t=9 minutes, the pressure value at time t=8 minutes 59 seconds is weighted higher than the pressure value at time t=8 minutes 40 seconds when calculating an average pressure value associated with a leak.

In some cases, the process plant search engine 806 generates the machine learning model using the average and standard deviation for each historical process parameter in the first subset (e.g., those associated with a heat exchanger leak) assuming a Gaussian distribution or any other suitable probability density function. The process plant search engine 806 also generates the machine learning model using the average and standard deviation for each historical process parameter in the second subset (e.g., those not associated with a heat exchanger leak) assuming a Gaussian distribution or any other suitable probability density function.

In an example, the process plant search engine 806 generates the machine learning model from the historical process parameters such as pressure, temperature, and flow rate of a process plant entity such as a heat exchanger and other historical process parameters from process plant entities having a relationship with the process plant entity. In this example, for the machine learning model, the process plant search engine 806 determines an average pressure, a pressure standard deviation, an average temperature, a temperature standard deviation, an average flow rate, and a flow rate standard deviation for pressures, temperatures, and flow rates in the first subset of process parameter values (e.g., those associated with a heat exchanger leak). The process plant search engine 806 then generates a pressure distribution, a temperature distribution, and a flow rate distribution for the first subset accordingly. For the machine learning model, the process plant search engine 806 determines an average pressure, a pressure standard deviation, an average temperature, a temperature standard deviation, an average flow rate, and a flow rate standard deviation for pressures, temperatures, and flow rates in the second subset of process parameter values (e.g., those not associated with a heat exchanger leak). The process plant search engine 806 generates a pressure distribution, a temperature distribution, and a flow rate distribution for the second subset accordingly.

The first and second subsets are then compared with process parameter metrics calculated from on-line process plant data received from the process plant. Based on the comparison, the process plant search engine 806 determines which of the first and second subsets more closely matches the process parameter metrics, e.g., by determining respective measures of similarity or difference and comparing the respective measures. When the process parameter metrics more closely match the first subset, the process plant search engine 806 determines that the process plant entity corresponding to the process parameter metrics (e.g., in this example scenario, a heat exchanger) is experiencing a leak. On the other hand, when the process parameter metrics more closely match the second subset, the process plant search engine 806 determines that the process plant entity corresponding to the process parameter metrics (e.g., in this example scenario, a heat exchanger) is not experiencing a leak. As mentioned above, a process parameter metric is calculated from process parameter values received in a secure manner and collected over time. Thus, using the above techniques, a moving average of temperature values in a heat exchanger (e.g., a temperature metric) may be used to detect a leak at the heat exchanger.

Continuing the example above, the pressure metric (e.g., a decaying average of pressures) is compared to the pressure distribution generated according to the average pressure and pressure standard deviation from the first subset of process parameter values (e.g., those associated with a heat exchanger leak). Based on the comparison, the process plant search engine 806 determines a probability corresponding to the difference (in standard deviations) between the pressure metric and the average pressure for the first subset of process parameter values. The process plant search engine 806 also performs similar steps to determine a probability corresponding to the difference (in standard deviations) between the temperature metric and the average temperature for the first subset of process parameter values and a probability corresponding to the difference (in standard deviations) between the flow rate metric and the average flow rate for the first subset of process parameter values. The probabilities are then combined (multiplied, aggregated, etc.) to determine an overall probability that the determined process parameter metrics correspond to the first subset of process parameter values associated with a heat exchanger leak.

Additionally, the pressure metric, temperature metric, and flow rate metric are compared to the pressure distribution, temperature distribution, and flow rate distribution, respectively, determined based on the second subset of process parameter values (e.g., those not associated with a heat exchanger leak). Based on the comparison, the process plant search engine 806 determines a probability corresponding to the difference (in standard deviations) between the pressure metric and the average pressure for the second subset of process parameter values, a probability corresponding to the difference (in standard deviations) between the temperature metric and the average temperature for the second subset and a probability corresponding to the difference (in standard deviations) between the flow rate metric and the average flow rate for the second subset of process parameter values. The probabilities are combined (multiplied, aggregated, etc.) to determine an overall probability that the process parameter metrics correspond to the second subset of process parameter values which are not associated with a heat exchanger leak.

Subsequently, the overall probability for the first subset is compared to the overall probability for the second subset. When the overall probability for the first subset is higher, the process plant search engine 806 determines that the corresponding process plant entity, e.g., the heat exchanger, is experiencing a leak. Otherwise, the process plant search engine 806 determines that the corresponding process plant entity, e.g., the heat exchanger, is not experiencing a leak. As mentioned above, the process plant search engine 806 may generate machine learning models for each type of condition or state and determine whether the corresponding process plant entity is experiencing each type of condition or state accordingly.

Decision Tree

In other embodiments, the machine learning technique for generating and/or utilizing a machine learning model is a decision tree or a machine learning technique using decision trees, such as random forests or boosting. For example, when the machine learning technique is random forests, the process plant search engine 806 collects several representative samples of each of the process plant data. Using each representative sample, the process plant search engine 806 generates a decision tree for determining a likelihood that a condition or state is occurring at a process plant entity. The process plant search engine 806 then aggregates and/or combines each of the decisions trees to generate a machine learning model, by for example averaging the likelihoods determined at each individual tree, calculating a weighted average, taking a majority vote, etc. In some embodiments, the process plant search engine 806 may also generate decision trees when the machine learning technique is boosting.

Each decision tree includes several nodes, branches, and leaves, where each node represents a test on a process parameter metric (e.g., is the decaying flow rate average greater than 20?), each branch represents the outcome of the test (e.g., the decaying flow rate average is greater than 20), and each leaf represents a likelihood that the process plant entity is experiencing a particular type of condition or state. For example, the branches of the decision tree represent likelihoods the process plant entity will experience an error, a leak, dead band, dead time, mechanical wear, etc. Therefore, the process plant search engine 806 can traverse each decision tree using process parameter metrics from the collected process plant data to determine which conditions, if any, a process plant entity is experiencing. If the likelihood that the process plant entity is experiencing a particular type of condition is above a threshold likelihood (e.g., 0.5, 0.7, etc.), the process plant search engine 806 determines that the process plant entity is experiencing the condition and transmits an indication of the condition to the user interface device and/or to another computing device, service, or application.

For example, the process plant search engine 806 generates a decision tree including a first node that corresponds to whether a 20-second moving average pressure is above 25. If the moving average pressure is not above 25, a first branch connects to a first leaf node which indicates that the likelihood that the process plant entity is experiencing mechanical wear is 0.6. If the 20-second moving average pressure score is above seven, a second branch connects to a second node which corresponds to whether the standard deviation in the temperature is above 10.

If the standard deviation in the temperature is above 10, a third branch connects to a second leaf node which indicates that the likelihood that the process plant entity is experiencing mechanical wear is 0.75. However, if the standard deviation in the temperature is not above 10, a fourth branch connects to a third leaf node which indicates that the likelihood that the process plant entity is experiencing mechanical wear is 0.25. While the decision tree includes three leaf nodes and four branches, this is merely an example for ease of illustration only. Each decision tree may include any number of nodes, branches, and leaves, having any suitable number and/or types of tests on process parameter metrics.

In any event, by combining and/or aggregating several decision trees as in random forests or boosting methods, the process plant search engine 806 identifies the process parameter metrics which are the most important for determining the likelihood that a process plant entity is experiencing a particular type of condition. The most important process parameter metrics are those that most frequently result in early splitting of the decision trees and are most indicative of whether or not a process plant entity is experiencing a condition. Referring to the example decision tree above, the 20-second moving average pressure may be more important than the standard deviation in the temperature, because the standard deviation in the temperature appears lower in the tree than the 20-second moving average pressure. Therefore, in this example, 20-second moving average pressure is the most important process parameter metric.

In some embodiments, process parameter metrics are assigned weights according to their respective levels of importance. The process plant search engine 806 uses the assigned weights when generating the machine learning models. In some scenarios, a process parameter metric which is the least important may be weighted by a factor of 0 or almost 0 to filter out the process parameter metric from the machine learning model.

Regression

In yet other embodiments, the machine learning technique for generating and/or utilizing a machine learning model is a regression analysis, such as logistic regression, linear regression, polynomial regression, etc. For example, in addition to classifying historical process parameter values into respective subsets of process parameter values that are and that are not associated with a particular condition or state, each historical process parameter value is assigned a performance monitoring metric. The performance monitoring metric is indicative of a level of performance or rating of the process plant entity.

Based on the historical process parameter values and corresponding performance monitoring metrics, the process plant search engine 806 generates a machine learning model as an equation which most closely approximates the performance monitoring metrics from the historical process parameter values. In some embodiments, an ordinary least squares method is used to minimize the difference between the value of predicted performance monitoring metrics using the machine learning model and the actual performance monitoring metrics assigned to the historical process parameter values. Additionally, the differences between the values of each predicted performance monitoring metric ($\hat{y}_i$) using the machine learning model and performance monitoring metric ($y_i$) are aggregated and/or combined in any suitable manner to determine a mean square error (MSE) of the regression. The MSE then is used to determine a standard error or standard deviation ($\sigma_\varepsilon$) in the machine learning model, which in turn is used to create confidence intervals.

Using the machine learning model, the process plant search engine 806 applies the process parameter metrics calculated from the process plant data to the equation generated as a result of the regression analysis (e.g., the generated machine learning model). Accordingly, the process plant search engine 806 determines or identifies a performance monitoring metric for the process plant entity.

In some implementations, a user may utilize the machine learning techniques described above within an IDE to customize or train the machine learning models or generate custom algorithms regarding the process plant-related data. FIG. 24 depicts an example process plant search query 2400 within an IDE for predicting a process parameter value using a trained machine learning model.

The example process plant search query 2400 includes several portions 2402-2412: a first portion 2402 for loading a trained machine learning model, a second portion 2404 for obtaining time series data of process parameters to use as inputs to the trained machine learning model, a third portion 2406 for filtering some of the obtained time series data, a fourth portion 2408 for applying the filtered time series data to the machine learning model to generate a machine learning prediction of a process parameter value, a fifth portion 2410 to write the predicted results back to the process plant 100, and a sixth portion 2412 to return the data for providing a visualization of the machine learning prediction to the user.

The example process plant search query 2400 is for predicting the quality of a product using material feed rate parameter values (e.g., DOS01_FEED/RP_MASSFLOW, DOS02_FEED/RP_MASSFLOW) over a threshold time period (e.g., 10 minutes). The material feed rate parameter values are applied to a trained machine learning model (e.g., APImodel.sav) to generate the predicted product quality metric.

The example process plant search query 2400 also requests to filter values in one time series (e.g., param3) when the values in another time series (e.g., param4) exceeding a threshold value (e.g., 150). Additionally, the example process plant search query 2400 requests to write the predicted product quality metric back to the process plant 100 as the value for the process parameter "CAMO/PARAM9." The IDE writes the predicted product quality metric back to the process plant 100 using the secure write back techniques described above.

By allowing the user to customize the algorithm using an IDE, the user may specify which machine learning model to use, may specify the process parameter data to filter, may request to write the predicted results back to the process plant 100, may request to visualize the machine learning prediction, etc. By contrast, by entering a request for a machine learning prediction as process plant search query in a plant application 74, multi-plant application 80, remote plant application 82, or third-party application 84, the process plant search engine 806 may automatically determine which machine learning model to use or may train and generate a new machine learning model. The process plant search engine 806 may also determine which time series data to obtain as inputs for generating the machine learning prediction, and may determine which process parameter data to filter or not to filter at all. Moreover, the process plant search engine 806 may or may not write the predicted results back to the process plant 100.

While the user loads a previously generated and trained machine learning model in the process plant search query 2400, this is merely one example scenario. In other scenarios, the user may train and generate a new machine learning model and may select the training data to use to train the machine learning model and/or the type of machine learning model (e.g., linear regression, polynomial regression, logistic regression, naïve Bayes, decision trees, random forests, boosting, nearest neighbors, neural networks, etc.).

Figure 25:
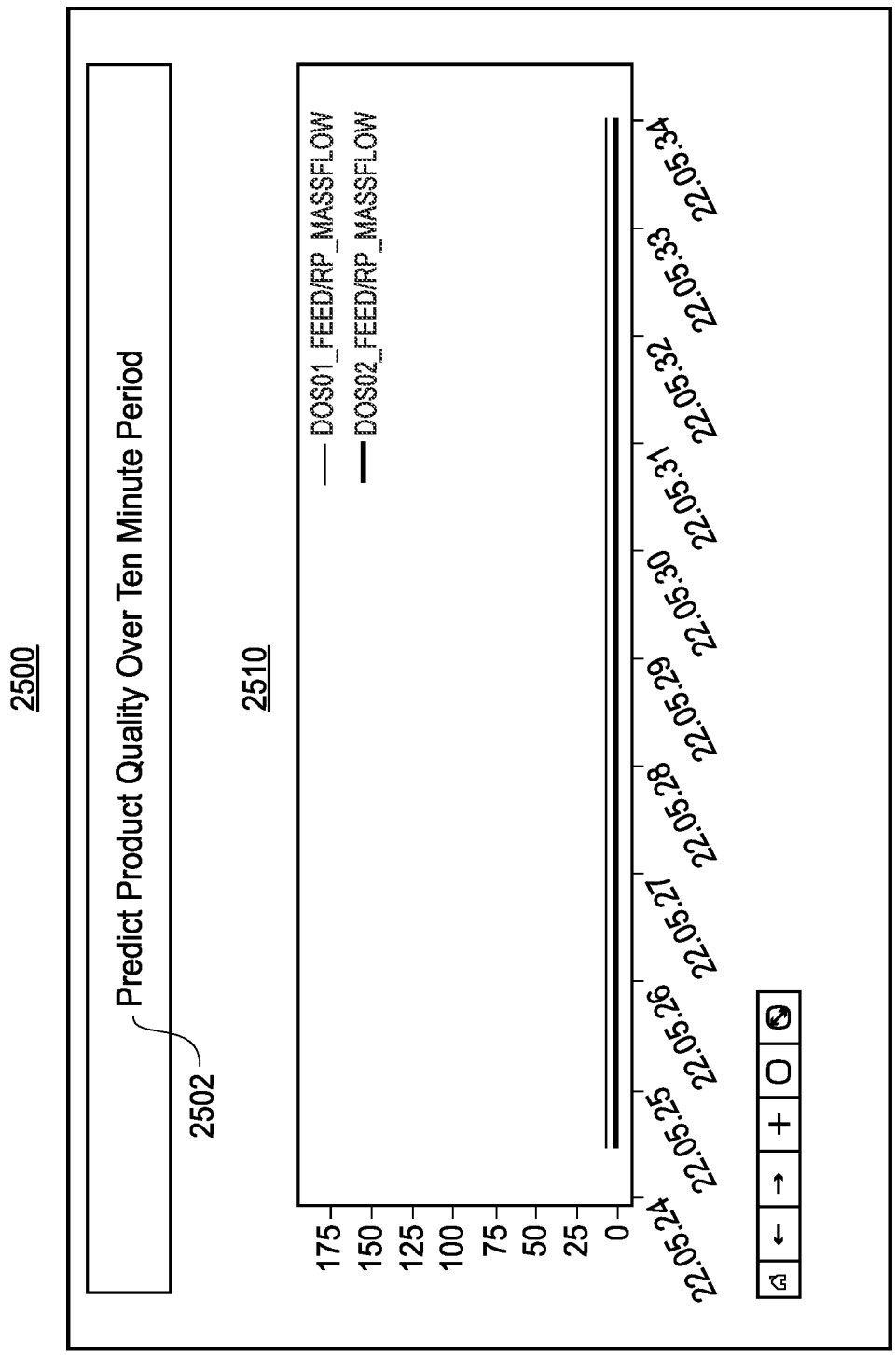
FIG. 25 illustrates an example graph display within a plant application of predicted process parameter values over a particular time period.

FIG. 25 illustrates an example process plant search results display 2500 within a plant application 74, multi-plant application 80, remote plant application 82, or third-party application 84. The process plant search results display 2500 includes a visualization of process plant search results 2510 responsive to a process plant search query 2502 for predicting a product quality metric over a threshold time period (e.g., 10 minutes). The process plant search results 2510 include time series data for material feed rate parameter values (e.g., DOS01_FEED/RP_MASSFLOW, DOS02_FEED/RP_MASSFLOW) used to predict the product quality metric. While the process plant search query 2502 is similar to the process plant search query 2400 in FIG. 24, the process plant search engine 806 does not filter process parameter values for a particular process parameter (e.g., param3) or display the filtered process parameter values, because the user does not request the filtering step in the process plant search query 2502.

In response to the process plant search query 2502, the process plant search engine 806 identifies a request for a prediction of a state of a process plant entity included in the process plant search query 2502 (e.g., a product quality metric for a product flowing through the process plant entity). The process plant search engine 806 then identifies process parameter data (e.g., material feed rate parameter values for DOS01_FEED/RP_MASSFLOW and DOS02_FEED/RP_MASSFLOW) for the process plant entity to apply to a machine learning model.

Still further, the process plant search engine 806 identifies a machine learning model to use which can perform the prediction in the process plant search query 2502 for example, from the knowledge repository 42. The process plant search engine 806 may identify the machine learning model and then adjust the machine learning model in accordance with the process plant search query 2502. For example, the machine learning model may be trained based on process parameters belonging to multiple parameter categories. If the process plant search query 2502 is for a single parameter category, the process plant search engine 806 may filter the process parameters belonging to other parameter categories from the training data and adjust the machine learning model using the filtered training data.

The process plant search engine 806 may also identify context for the process plant search query 2502 and identify filters for adjusting the machine learning model or the process parameter data applied to the machine learning model according to the context. For example, the context may include user information for the user submitting the process plant search query, such as the name of the user, the name and location of the process plant where the user works, the organizational role of the user within the process plant, preferences for the user, a search history of previous search queries for the user, etc. Additionally, the context may include device information for the device in which the user submits the process plant search query, such as the location of the device which may include a location within a process plant or may be an external location, the capabilities of the device (e.g., audio, display, microphone, applications executing on the device, etc.), the type of the device, the size of the device, etc. Moreover, the context may include the time in which the process plant search query is submitted, process plant entities related to the process plant entity in the process plant search query and corresponding process parameter data for those process plant entities, or may include any other suitable contextual information. Then the process plant search engine 806 may adjust the machine learning model or the process parameter data applied to the machine learning model according to the context.

In other implementations, the process plant search engine 806 generates a machine learning model for perform the prediction by obtaining training data for performing the prediction from the knowledge repository 42 and training the machine learning model using the training data.

Then the process plant search engine 806 applies the identified process parameter data to the machine learning to predict the state of the process plant entity and provides an indication of the predicted state as a process plant search result responsive to the process plant search query 2502.

FIG. 26 illustrates another example process plant search query 2602 within an IDE for predicting a process parameter value using a machine learning model, and process plant search results 2610 responsive to the process plant search query 2602. In the example process plant search query 2602, the user generates and trains a new machine learning model as a regression model using process parameter values over a threshold time period for the "MOB50NIR01_CH01/COMPONENT_01_VAL" and "DOS01_FEED/RP_MASSFLOW" process parameters as training data. The user then requests to predict a "DOS01_FEED/RP_MASSFLOW" value at a particular time using the generated machine learning model. The process plant search results 2610 indicate that the predicted "DOS01_FEED/RP_MASSFLOW" is 99.0077 with a standard error of 0.077 by using "MOB50NIR01_CH01/COMPONENT_01_VAL" as a dependent variable in an ordinary least squares regression analysis.

Figure 27:
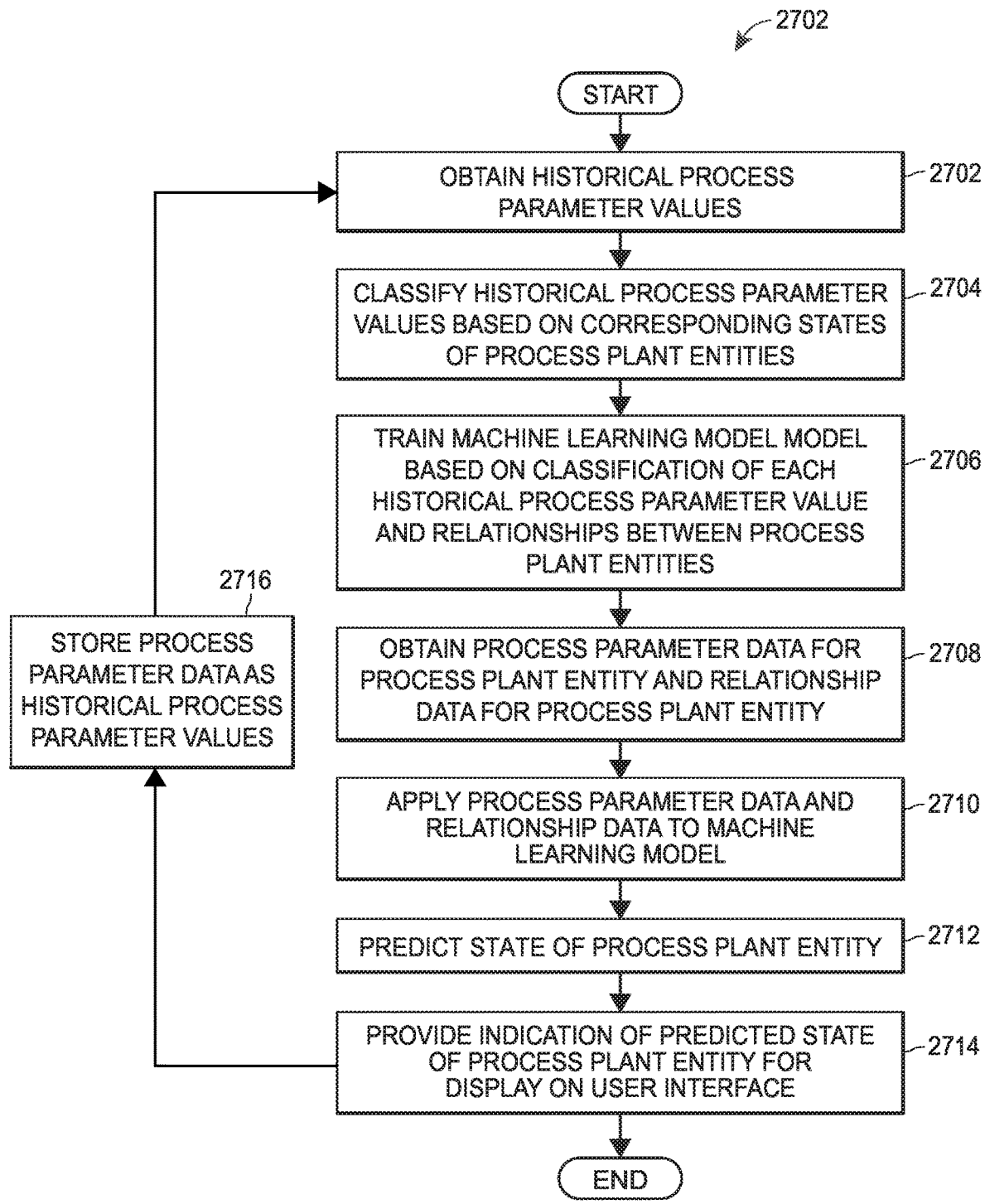
FIG. 27 illustrates a flow diagram of an example method for monitoring a state of a process plant entity using machine learning techniques.

FIG. 27 is a flow diagram of an example method 2700 for monitoring a state of a process plant entity using machine learning techniques. The method 2700 may be executed by an IDE within a plant operator device 72 or a general engineering/computing device 78. In other implementations, the method 2700 may be executed by a plant application 74, multi-plant application 80, remote plant application 82, or third-party application 84 within a plant operator device 72 or a general engineering/computing device 78. The plant operator device 72 or the general engineering/computing device 78 may be communicatively connected to the field-facing component 10 and/or the edge-facing component 12.

At block 2702, historical process parameter values are obtained for several process parameters corresponding to process plant entities (e.g., a valve, a tank, etc.). The historical process parameter values may be obtained from the knowledge repository 42. Each of the historical process parameter values or a set of historical process parameter values corresponding to a particular time window (e.g., an hour) are classified into a subset of process parameter values that are associated with a particular state which occurred at the corresponding process plant entity at or around the time the historical process parameter values were generated (block 2704). For example, a set of temperature values may be classified into a subset of process parameter values associated with an error at a heat exchanger when the temperature values were collected within a threshold time period of an error being identified at the heat exchanger. Additionally, historical process parameter values may be classified into a subset of process parameter values that are associated with normal operation of the process plant entity.

Additionally, relationships may be identified for each process plant entity. For example, the plant operator device 72 or the general engineering/computing device 78 may identify related process plant entities from the knowledge repository 42 and process parameters associated with the related process plant entities, and may obtain historical process parameter values for the related process plant entities at times corresponding to the previous states from the knowledge repository 42. The relationships may include upstream and downstream process plant entities physically connected to the process plant entity, the material flowing through the process plant entity, the location of the process plant entity within the process plant, the location of the process plant using the process plant entity, etc. The historical process parameter values for the related process plant entities or other process plant-related data for the relationships (e.g., material flow data, temperature data at the location of the process plant, etc.) may be referred to as relationship data.

At block 2706, a machine learning model is generated based on the subsets of historical process parameter values and relationship data for the process plant entities, e.g., by using various rules and/or machine learning techniques. The machine learning techniques may include linear regression, polynomial regression, logistic regression, naïve Bayes, decision trees, random forests, boosting, nearest neighbors, neural networks, etc. In some embodiments, a single machine learning model is generated to detect or identify several types of states which may occur or may be present at a process plant entity. In other embodiments, a different machine learning model is generated for each type of state which may occur or may be present at a process plant entity. In some embodiments, process parameter metrics are compared with multiple machine learning models indicative of various states (or the absence thereof) to determine which machine learning model most likely corresponds to the process parameter metrics.

In any event, at block 2708, process parameter data and relationship data for a process plant entity is obtained for example, from the knowledge repository 42. The process parameter data may include process parameter values corresponding to the process plant entity, such as a drive signal, a valve travel, a travel set point, a density, an area, a mass, a volume, a pressure, a temperature, or a flow rate corresponding to a valve or a material flowing through the valve. Generally speaking, process parameter data may be data that is generated as a result of the process plant entity operating to control the industrial process, and may be descriptive of a behavior or operations of the process plant entity. The process parameter data may or may not be generated by the process plant entity itself. For example, valve data may be descriptive of and/or generated by a valve itself (e.g., a measure of how open or closed the valve is), and/or may be descriptive of and/or generated by an actuator of the valve (e.g., how often the actuator applies a particular signal to the valve). For each process parameter, the plant operator device 72 or the general engineering/computing device 78 may receive time series data indicative of the process parameter values over a particular time period.

The relationship data may include process parameter data for process plant entities related to the process plant entity, such as upstream or downstream process plant entities. The relationship data may also include changes in the process parameter data between the process plant entity and process plant entities related to the process plant entity. For example, the relationship data may include changes in parameter values for a material flowing through the process plant entity and a downstream process plant entity or changes in temperature values for a tank and an upstream tank.

Moreover, the relationship data may also include other process plant-related data related to the process plant entity, such as data regarding the material flowing through the process plant entity, data regarding the location of the process plant entity within the process plant (e.g., equipment physically proximate to the process plant entity and corresponding data for the equipment), data regarding the location of the process plant using the process plant entity (e.g., weather data at the process plant location), data regarding the category assigned to each process parameter associated with the process plant entity, etc.

At block 2710, the process parameter data and the relationship data is applied to the machine learning model(s) to predict the state of the process plant entity (block 2712). For example, when the machine learning technique is naïve Bayes, the process parameter data and relationship data is compared to a distribution for a subset of process parameter values and relationship data values associated with a particular state (e.g., mechanical wear) and another distribution for a subset of process parameter values and relationship data values which are not associated with the particular state. The plant operator device 72 or the general engineering/ computing device 78 determines which distribution is more closely matched to the process parameter values and relationship data values and predicts whether or not the process plant entity is in the particular state based on which distribution matches. In another example, when the machine learning technique is decision trees, random forests, or boosting, the plant operator device 72 or the general engineering/computing device 78 traverses the nodes of the decision trees using the process parameter values and relationship data values to predict the state of the process plant entity.

At block 2714, the plant operator device 72 or the general engineering/computing device 78 provides an indication of predicted state of the process plant entity for display on a user interface of the plant operator device 72 or the general engineering/computing device 78. The indication of the predicted state may be an alarm or an error message including the type of predicted state (e.g., dead band, mechanical wear, etc.), the process plant entity in the predicted state, the process parameter values and/or relationship data values used to predict the state, steps to resolve potential issues created by the state, or any other suitable information. The indication of the predicted state may also be a visualization such as a table, graph, or chart indicating predicted state(s) over a time period or indicating likelihoods of being in particular state(s) over the time period.

The indication of the predicted state may also be an indication of a change in the predicted state. More specifically, in some implementations, the plant operator device 72 or the general engineering/computing device 78 automatically identifies changes to the predicted state of the process plant entity, and automatically generates and provides a report of the changes to the predicted state for display on the user interface.

For example, at time $t_1$, the plant operator device 72 or the general engineering/computing device 78 may predict an initial state of the process plant entity using the machine learning techniques described above. Alternatively, the plant operator device 72 or the general engineering/computing device 78 may obtain an indication of the initial state of the process plant entity (e.g., normal operation) from a plant operator, from a default state, or in any suitable manner. Then at time $t_2$ after time $t_1$, the plant operator device 72 or the general engineering/computing device 78 may predict an updated state of the process plant entity using the machine learning techniques described above. When the updated state differs from the initial state, the plant operator device 72 or the general engineering/computing device 78 may automatically generate a report alerting the user that the predicted state of the process plant entity has changed.

In some implementations, the plant operator device 72 or the general engineering/computing device 78 may provide an indication of the predicted state of the process plant entity or a change to a set point value based on the predicted state to the process plant 100. The plant operator device 72 or the general engineering/computing device 78 may write the data to the process plant 100 using the secure write back techniques described above. For example, the plant operator device 72 or the general engineering/computing device 78 may provide the indication of the predicted state or the change to the set point value to n write back servers 60a-60n. Each write back server 60a-60n may validate the data and determine that a user of the external system 8 is authorized to write to the process plant 100. For example, each write back server 60a-60n may determine if the data to be written is within an acceptable range of values. Then if the data is validated and the user is authorized to write to the process plant 100, the write back server 60a may forward the data to another write back server 60*b* to double check that the data is validated. Once a threshold number of secure write back servers 60*a*-60*n* have validated/authorized the data write, the data may be written to the process plant 100.

When the actual state of the process plant entity becomes known (e.g., an operator evaluates the process plant entity to determine its actual state), the process parameter values and relationship data values are added to the historical process parameter values (block 2716), and the machine learning model(s) is/are updated accordingly. For example, the process parameter values and relationship data values for the process plant entity in the identified state are stored in the knowledge repository 42.

Batch Provisioning, Scheduling, and Querying

The enhanced search capabilities described herein may also facilitate provisioning, scheduling, and control of batch processes within a process plant. For example, a batch executive executing a batch control algorithm to control a batch process may submit a query to the knowledge repository 42 for contextual data and/or time-series data for scheduling the batch process. For example, the query may be for state information regarding the states of process plant equipment which may be utilized in a batch process, a schedule of utilization times for the process plant equipment, or any suitable combination of these. Then the batch executive may provision a set of process plant equipment to execute a batch procedure, unit procedure, operation, and/or phase of a batch control recipe in accordance with the utilization times for each piece of process plant equipment. The batch executive may also set a schedule for when to execute the batch procedure, unit procedure, operation, and/or phase of the batch control recipe in accordance with the utilization times for each piece of process plant equipment. The batch executive may be a computing device(s) or an application executing within a computing device(s).

Figure 28:
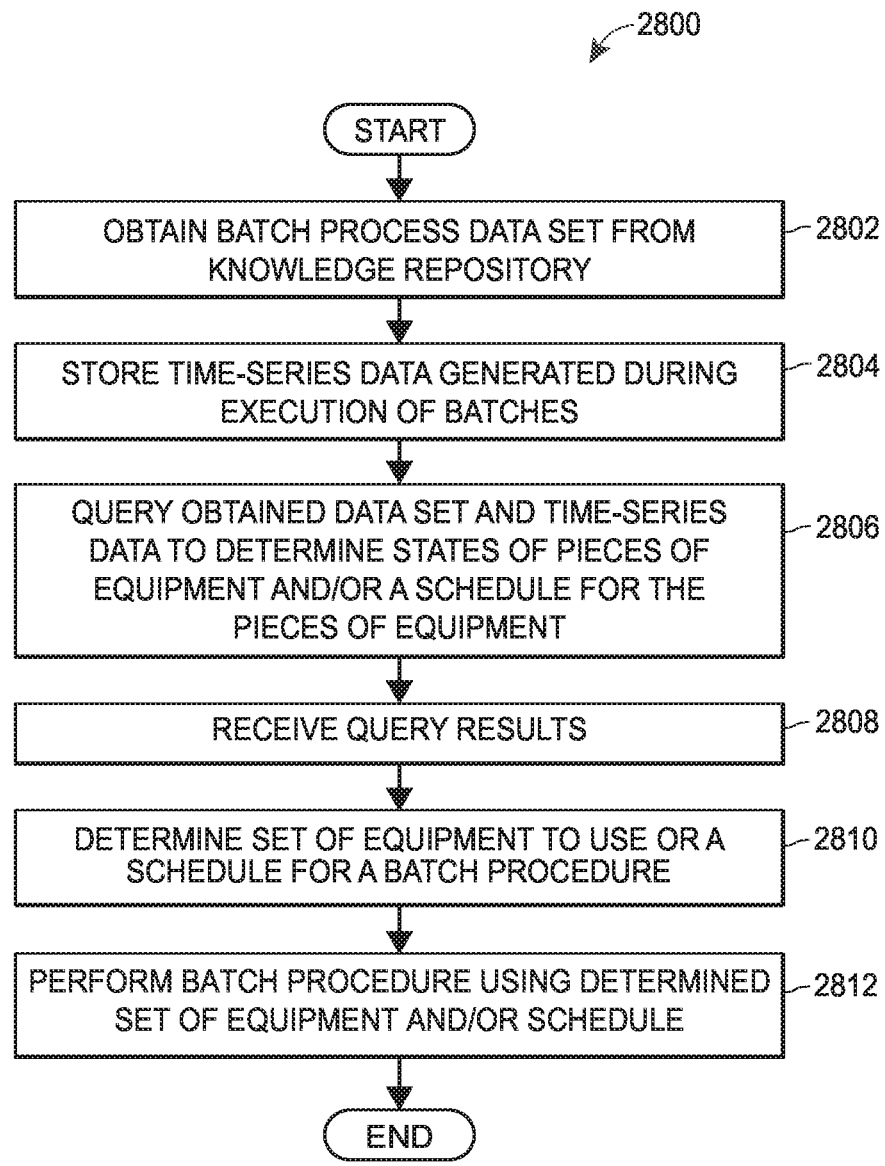
FIG. 28 illustrates a flow diagram of an example method for controlling a batch process.

FIG. 28 is a flow chart depicting an exemplary method 2800 for controlling a batch process using the enhanced search capabilities described herein. The method 2800 may be executed by a computing device, a batch executive which may be a stand-alone computing device or an application executing on a computing device, or any suitable combination of these. At block 2802, a batch process data set is obtained from a knowledge repository 42. The batch process data set may include process data related to batch processes and/or contextual data associated with the process data which may be obtained from the contextual knowledge repository 49. The contextual data may include an alarm status associated with the process data included in a batch process, a batch ID associated with the process data included in a batch process, a type of equipment associated with the process data included in a batch process, an area of the plant associated with the process data included in a batch process, a relationship between a piece of equipment associated with a batch process and one or more other pieces of equipment, relationships between pieces of equipment included in a batch process, pieces of equipment included in particular batch recipes, the raw materials included in particular batch recipes and associated pieces of equipment, equipment utilization information for pieces of equipment associated with batch processes, product quality metrics for products produced by batch processes and their associated pieces of equipment, product production times for products produced by batch processes and their associated pieces of equipment, any suitable combination of these, or any other suitable contextual data.

At block 2804, time-series data generated during the execution of batches is stored in a database, such as the time series database 55. The time-series data may include process parameter values for process parameters related to process plant equipment as a batch process is executing. The time-series data may also include product parameter values for a product being manufactured using the batch process. Additionally, the time-series data may include utilization data for process plant equipment, such as the times in which each piece of process plant equipment is being utilized within batch processes. The time-series data may also include schedule data indicating times at which each piece of process plant equipment is scheduled to be in use as part of a batch or continuous process, and/or times when each piece of process plant equipment is available. The computing device and/or batch executive may obtain both the batch process data and the time-series data from the knowledge repository 42.

Then at block 2806, the computing device and/or batch executive queries the knowledge repository 42, and more specifically, the obtained batch process data and time-series batch data within the knowledge repository 42 for state information regarding the states of pieces of plant equipment which may be utilized in a batch process, a schedule of utilization times for the pieces of process plant equipment, or any suitable combination of these. For example, the computing device and/or batch executive may identify each type of equipment necessary to execute a particular batch process. The query may be for state and/or schedule information for the identified types of process plant equipment. In some implementations, the query is submitted to the process plant search engine 806 which analyzes/parses the query and retrieves batch process data and/or time-series batch data which is responsive to the query from the knowledge repository 42.

The state information may include whether a piece of process plant equipment is currently in use or idle. The state information may also include an indication of how long the piece of process plant equipment has been in use and what the piece of process plant equipment is being used for. In some scenarios, a piece of process plant equipment may become available for use immediately after the piece of process plant equipment finishes a current operation. In other scenarios, the piece of process plant equipment may need to be cleaned or receive other maintenance after finishing a particular operation. By providing information regarding how the piece of process plant equipment is being used, the computing device and/or batch executive may be able to determine whether or not the piece of process plant equipment can be used in the batch process immediately after it becomes available. If the piece of process plant equipment needs a particular amount of downtime for cleaning and/or other maintenance in between operations, the computing device and/or batch executive may factor in the downtime when determining which pieces of equipment to use for the batch process.

The schedule information may include times when each piece of equipment is scheduled to be in use, the batch process, unit process, operation, and/or phase of a batch control recipe that each piece of equipment is scheduled to be used in at each time, the amount of time the each piece of equipment will be used for, etc. For example, the schedule information may indicate that a particular mixer is scheduled to be used in a first batch recipe from 1:00 p.m. to 2:00 p.m. and in a second batch recipe from 3:00 p.m. to 4:00 p.m. on a particular day.

Then the process plant search engine 806 provides the retrieved batch process data and/or time-series batch data to the computing device and/or batch executive as query results (block 2808). In response to receiving the query results, the computing device and/or batch executive determines a set of equipment to use for the batch process, a unit process, an operation, and/or a phase of a batch control recipe (block 2810).

For example, when the batch process requires three types of equipment, the query results may include state and/or schedule information for a first set of process plant equipment corresponding to a first type, state and/or schedule information for a second set of process plant equipment corresponding to a second type, and state and/or schedule information for a third set of process plant equipment corresponding to a third type.

The computing device and/or batch executive may then select a piece of process plant equipment from the first set, a piece of process plant equipment from the second set, and a piece of process plant equipment from the third set based on the state and/or schedule information as the set of equipment for executing the batch process.

Additionally or alternatively, the computing device and/or batch executive may determine a schedule for the batch process, the unit process, the operation, and/or the phase of a batch control recipe based on the query results (block 2810). The computing device and/or batch executive may determine the schedule by determining when each piece of equipment is available for use, and scheduling the batch process at a time when the selected pieces of equipment are available for use.

Using the example above, if the pieces of equipment in the set for executing the batch process are all available in an hour, the computing device and/or batch executive may schedule the batch process to begin in an hour. In addition to scheduling the batch process, the unit process, the operation, and/or the phase of a batch control recipe when each piece of equipment in the set is available, the batch process may be scheduled for a time when at least one piece of equipment is available. The batch process may begin using the first available piece of equipment, and as long as each next piece of equipment in the batch process is available by the time the phase of the batch control recipe involving the previous piece of equipment is complete, the batch process may be scheduled for that time. In this manner, the batch process may be scheduled to minimize wait times for each piece of equipment during the batch procedure or between batch procedures.

Starting from the time when a first piece of equipment in the set becomes available, the computing device and/or batch executive may determine when each phase of the batch control recipe will be complete. The computing device and/or batch executive may then determine whether the piece of equipment for the next phase of the batch control recipe will be available by the time the previous phase is complete. If the corresponding piece of equipment is available for each phase by the time the previous phase is complete, the batch process may begin at the time the first piece of equipment becomes available. Otherwise, the batch process may wait to start until a time when each corresponding piece of equipment is available for each phase by the time the previous phase is complete.

In some implementations, the computing device and/or batch executive determines an optimal set of equipment to use based on the process data related to the batch process, the contexts associated with the process data, and/or the states of each piece of equipment. For example, the computing device and/or batch executive may identify multiple sets of equipment for performing the batch process. The computing device and/or batch executive may then rank the sets of equipment based on one or more factors to selects an optimal set of equipment of the multiple sets of equipment.

For example, the factors may include a wait time until each set of equipment is available for use, a number of raw materials required for each set of equipment to produce the product being made in the batch process, a product quality metric for the product produced by each set of equipment, a production time for producing the product by each set of equipment, etc. The computing device and/or batch executive may combine each of these factors in any suitable manner to generate an overall score for each set of equipment.

In some implementations, the computing device and/or batch executive may assign weights to each of the factors and combine the weighted factors to generate the overall score. For example, if minimizing wait time is more important than using the lowest quantity of raw materials, the wait time may be weighted higher than the number of raw materials. Then the computing device and/or batch executive may rank the sets of equipment in accordance with their respective overall scores and select the highest ranking set of equipment as the optimal set of equipment to use.

At block 2812, the batch process, unit process, the operation, and/or the phase of a batch control recipe, is performed using the determined set of equipment or in accordance with the determined schedule. For example, the computing device and/or batch executive may send control signals to field devices associated with the determined set of equipment to operate in accordance with a batch control algorithm and/or to operate at the scheduled time. In some implementations, the computing device and/or batch executive may communicate with a controller(s) to cause the controller(s) to send the control signals to field devices associated with the determined set of equipment to operate in accordance with a batch control algorithm and/or to operate at the scheduled time.

In addition to the computing device and/or batch executive provisioning, scheduling, and/or controlling batch processes, users may submit process plant search queries related to batch processes and receive process plant search results. For example, users may submit process plant search queries for information regarding which set of equipment was used for a particular batch process or portion thereof, for equipment utilization information for equipment used in batch processes over a particular time period, for determining times when each piece of equipment was in operation or utilized in a batch process, for determining batch recipes that have been executed on a particular set of equipment over a specified period of time, for determining sets of equipment that have been used for a particular batch recipe over a specified period of time, for determining which set of equipment used for a given batch recipe or a portion thereof produced the highest quality output, for determining which set of equipment used for a given batch recipe or a portion thereof produced the product in the shortest amount of production time, for determining which set of equipment used for a given batch recipe or a portion thereof produced the product using the lowest quantity of raw materials, etc.

Figure 29:
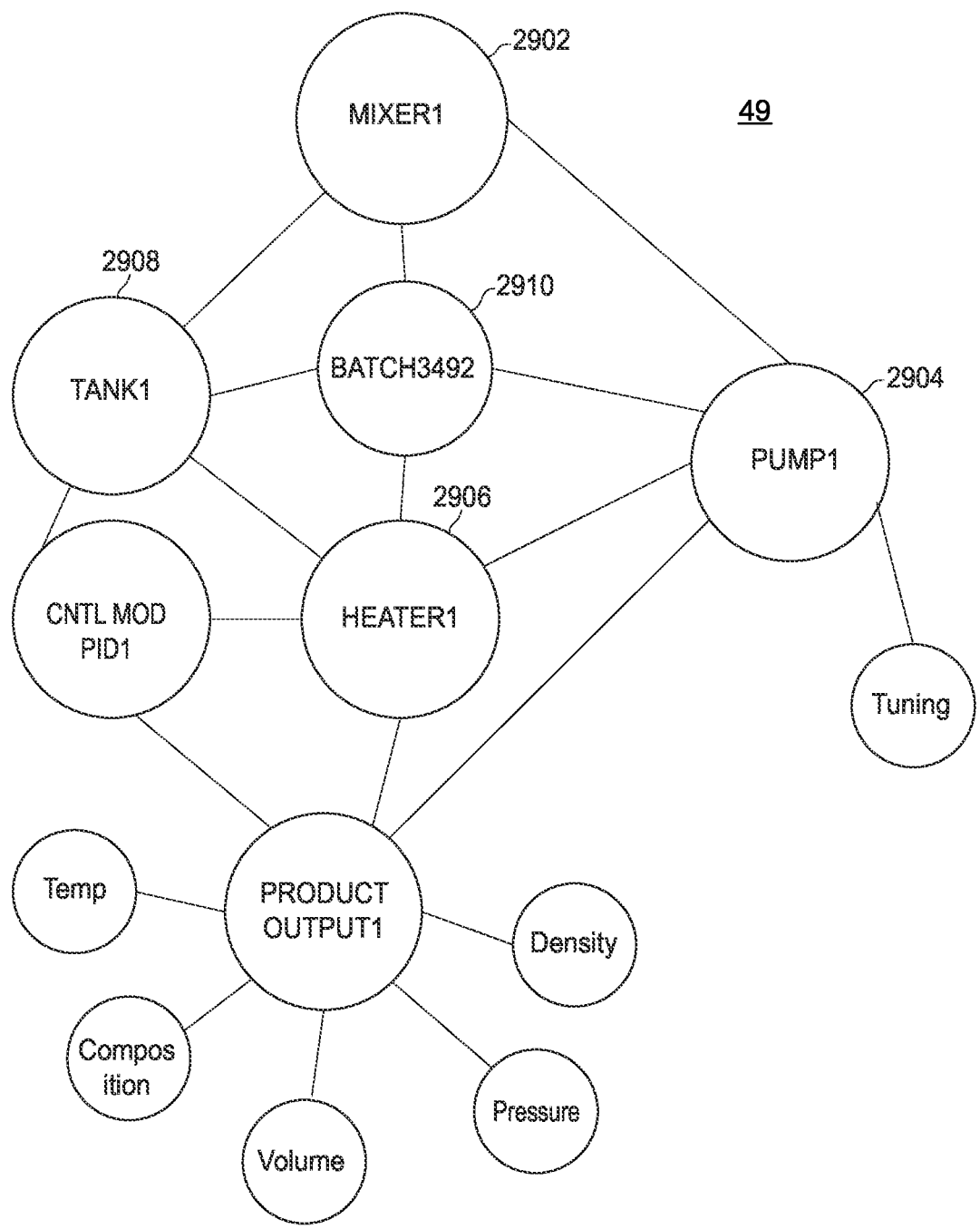
FIG. 29 illustrates another graphical representation of an example portion of a contextual knowledge repository that includes process plant equipment and batch information for the batch processes executed by the process plant equipment.

FIG. 29 illustrates an example portion of the contextual knowledge repository 49 that includes process plant equipment and batch information for the batch processes executed by the process plant equipment. The contextual knowledge repository 49 depicted in FIG. 29 may be a detailed portion of a larger contextual knowledge repository 49 depicted in FIG. 7 and described above which includes additional relationships, process plant entities, and process plant-related data.

As shown in FIG. 29, pieces of process plant equipment 2902-2908 are connected with the batch process 2910 in which they are utilized. For example, Mixer1 (ref. no. 2902), Pump1 (ref. no. 2904), Heater1 (ref. no. 2906), and Tank1 (ref. no. 2908) are each included in a particular batch process identified as Batch3492 (ref. no. 2910). Batch process Batch3492 may have a particular batch recipe (e.g., Proc_saline1), description, area of the process plant in which the batch process is being executed, execution state, current phase being executed, etc., each of which may also be included in the contextual knowledge repository 49. In this manner, a user may query for the set of equipment that was used or is being used for a particular batch or portion thereof. For example, the user may submit a query that includes the batch ID (e.g., Batch3492) and receive search results which include the set of equipment used for Batch3492 (e.g., Mixer1 (ref. no. 2902), Pump1 (ref. no. 2904), Heater1 (ref. no. 2906), and Tank1 (ref. no. 2908)).

As mentioned above, the user may submit queries to determine which sets of equipment were used for particular batch processes or portions thereof in a natural language format or in any suitable format. The user's computing device may then transmit the query to the process plant search engine 806 executing within the process plant search query server 800. For example, the user's computing device may transmit a query for the set of equipment which was used for a particular batch process or a portion thereof.

In response to the query, the process plant search engine 806 may obtain a batch process data set from a knowledge repository 42. The batch process data set may include process data related to batch processes and/or contextual data associated with the process data which may be obtained from the contextual knowledge repository 49. The contextual data may include an alarm status associated with the process data included in a batch process, a batch ID associated with the process data included in a batch process, a type of equipment associated with the process data included in a batch process, an area of the plant associated with the process data included in a batch process, a relationship between a piece of equipment associated with a batch process and one or more other pieces of equipment, relationships between pieces of equipment included in a batch process, pieces of equipment included in particular batch recipes, the raw materials included in particular batch recipes and associated pieces of equipment, equipment utilization information for pieces of equipment associated with batch processes, product quality metrics for products produced by batch processes and their associated pieces of equipment, product production times for products produced by batch processes and their associated pieces of equipment, any suitable combination of these, or any other suitable contextual data.

The process plant search engine 806 may also obtain time-series data generated during the execution of batches is stored in a database, such as the time series database 55. The time-series data may include process parameter values for process parameters related to process plant equipment as a batch process is executing. The time-series data may also include product parameter values for a product being manufactured using the batch process. Additionally, the time-series data may include utilization data for process plant equipment, such as the times in which each piece of process plant equipment is being utilized within batch processes. The time-series data may also include schedule data indicating times at which each piece of process plant equipment is scheduled to be in use as part of a batch or continuous process, and/or times when each piece of process plant equipment is available. The process plant search engine 806 may obtain both the batch process data and the time-series data from the knowledge repository 42.

The process plant search engine 806 then analyzes/parses the process plant search query to identify the subject of the search query, context for the search query, and/or other information in the search query which may be used to filter a data set responsive to the search query. More specifically, the process plant search engine 806 may obtain indications of subjects and filters from a grammar module or plant vocabulary database included in the process plant search query server 800 or communicatively coupled to the process plant search query server 800. The grammar module or plant vocabulary database may store several subjects of process plant search queries and filters which modify the subjects to filter the search results. The grammar module or plant vocabulary database may also store several mappings of terms from process plant search queries which correspond to each subject and/or filter, such as synonyms or nicknames for the subject or filter.

The process plant search engine 806 may then match each of the terms in the process plant search query to one of the subjects or filters. In some implementations, the process plant search engine 806 first identifies one or more terms within the process plant search query which correspond to the subject of the process plant search query. Then the process plant search engine 806 identifies filters which correspond to the remaining terms as well as context which may be used to filter the data set further. The process plant search engine 806 may identify an exact match of one or more terms in the process plant search query to a subject included in the grammar module or plant vocabulary database. Then the process plant search engine 806 identifies batch process data from the obtained batch process data and the time-series data that corresponds to the identified subject.

The process plant search engine 806 then identifies filters from the grammar module or plant vocabulary database which correspond to the remaining terms. The filters may be used to filter the batch process data set obtained in response to the identified subject. For example, when the query is for the set of equipment used for a particular phase of Batch3492, the process plant search engine 806 may filter the set of equipment to include a subset of the equipment used in the particular phase. In another example, when the query is for a set of equipment used for Batch3492, the process plant search engine 806 may obtain batch process data related to Batch3492, and may filter the batch process data to only include a subset of the batch process data which indicates the set of equipment used for Batch3492.

The process plant search engine 806 may then provide the filtered batch process data set as search results to the user. For example, the filtered batch process data set may include an indication of which set of equipment was used for the particular batch or portion thereof.

While FIG. 29 illustrates a few examples of process plant equipment and respective batch information for the batch processes executed by the process plant equipment in the contextual knowledge repository 49, this is for ease of illustration only. The contextual knowledge repository 49 may include any suitable number of pieces of process plant equipment each associated with any suitable number of batch processes.

Figure 30:
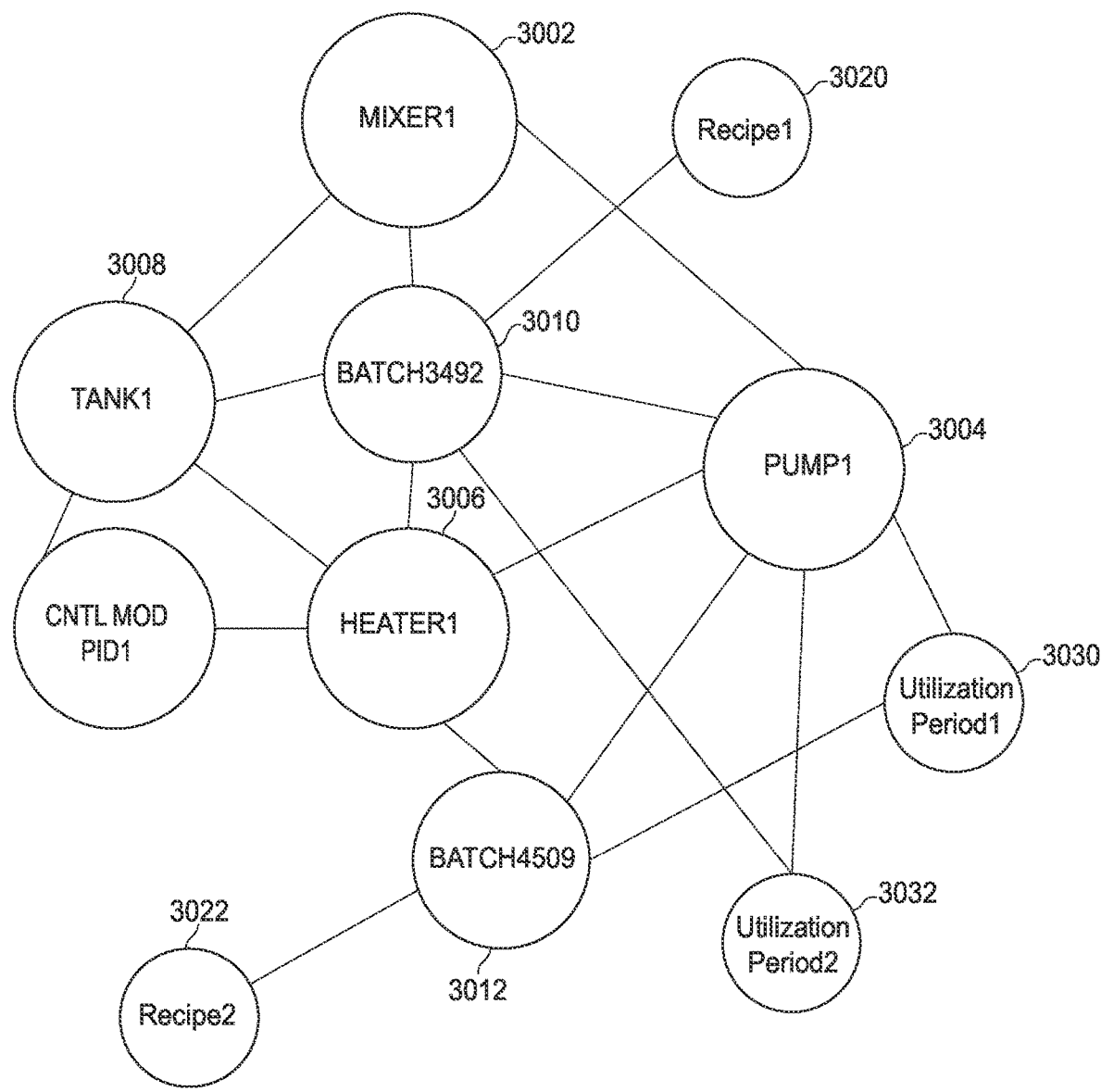
FIG. 30 illustrates yet another graphical representation of an example portion of a contextual knowledge repository that includes process plant equipment, equipment utilization information for the process plant equipment, and batch information for the batch processes executed by the process plant equipment.

FIG. 30 illustrates another example portion of the contextual knowledge repository 49 that includes process plant equipment, equipment utilization information for the process plant equipment, and batch information for the batch processes executed by the process plant equipment. The contextual knowledge repository 49 depicted in FIG. 30 may be a detailed portion of a larger contextual knowledge repository 49 depicted in FIG. 7 and described above which includes additional relationships, process plant entities, and process plant-related data.

As shown in FIG. 30, pieces of process plant equipment 3002-3008 are connected with the batch processes 3010, 3012 in which they are utilized. For example, Mixer1 (ref. no. 3002), Pump1 (ref. no. 3004), Heater1 (ref. no. 3006), and Tank1 (ref. no. 3008) are each included in a particular batch process identified as Batch3492 (ref. no. 3010). Pump1 (ref. no. 3004) and Heater1 (ref. no. 3006) may also be included in another batch process identified as Batch 4509 (ref. no. 3012). Batch process Batch3492 may have a particular batch recipe as Recipe1 (ref. no. 3020), description, area of the process plant in which the batch process is being executed, execution state, current phase being executed, etc., each of which may also be included in the contextual knowledge repository 49. Batch process Batch4509 may also have a particular batch recipe as Recipe2 (ref. no. 3022), description, area of the process plant in which the batch process is being executed, execution state, current phase being executed, etc., each of which may also be included in the contextual knowledge repository 49. Additionally, each piece of equipment 3002-3008 may have associated utilization information. For example, Pump1 (ref. no. 3004) may be included in Batch3492 (ref. no. 3010) for a first utilization period, UtilizationPeriod1 (ref.no. 3030). Pump1 (ref. no. 3004) may also be included in Batch4509 (ref. no. 3012) for a second utilization period, UtilizationPeriod2 (ref.no. 3032).

Each utilization period 3030, 3032 may indicate the start time in which the piece of equipment is being utilized, the end time in which the piece of equipment is being utilized, the duration of the utilization period, the portion or percentage of the utilization period in which the piece of equipment is active, the amount of downtime for the piece of equipment during the utilization period, or any other suitable utilization information.

In this manner, a user may query for equipment utilization information for a piece of process plant equipment, pieces of process plant equipment, a set of process plant equipment corresponding to a particular batch process, or sets of process plant equipment corresponding to batch processes for a desired period. For example, the user may submit a query for how each piece of equipment in a particular process plant was utilized from 12:00 p.m. to 4:00 p.m. on a particular day. The user may receive search results indicating the utilization periods for each piece of equipment in the particular process plant between 12:00 p.m. and 4:00 p.m., the portion or percentage of each utilization period in which the piece of equipment was active, the amount of downtime for the piece of equipment during the utilization period, etc.

The user may also query for times during which a piece of equipment was in operation or being utilized. For example, the user may submit a query for when Pump1 (ref. no. 3004) was utilized over the previous day. The user may receive search results indicating Pump 1 (ref. no. 3004) was utilized during UtilizationPeriod1 (ref.no. 3030) (e.g., from 9 a.m. to 1 p.m. and UtilizationPeriod2 (ref. no. 3032) (e.g., from 2 p.m. to 5 p.m.).

Still further, the user may query for batch recipes that have executed on a set of equipment over a specified period of time. For example, the user may submit a query for the batch recipes that have executed using Pump1 (ref. no. 3004) and/or Heater1 (ref. no. 3006). The user may receive search results indicating that Recipe1 (ref. no. 3020) and Recipe2 (ref. no. 3022) executed using Pump1 (ref. no. 3004) and/or Heater1 (ref. no. 3006).

Additionally, the user may query for sets of equipment that have been used for a particular recipe over a specified period of time. For example, the user may submit a query for the sets of equipment that have been used for Recipe1 (ref. no. 3020). The user may receive search results indicating that one set of equipment was used for Recipe1 (ref. no. 3020) including Mixer1 (ref. no. 3002), Pump1 (ref. no. 3004), Heater1 (ref. no. 3006), and Tank1 (ref. no. 3008).

As mentioned above, the user may submit queries in a natural language format or in any suitable format. The user's computing device may then transmit the query to the process plant search engine 806 executing within the process plant search query server 800. For example, the user's computing device may transmit a query for how each piece of equipment in a particular process plant was utilized from 12:00 p.m. to 4:00 p.m. on a particular day.

In response to the query, the process plant search engine 806 may obtain a batch process data set from a knowledge repository 42. The batch process data set may include process data related to batch processes and/or contextual data associated with the process data which may be obtained from the contextual knowledge repository 49. The contextual data may include an alarm status associated with the process data included in a batch process, a batch ID associated with the process data included in a batch process, a type of equipment associated with the process data included in a batch process, an area of the plant associated with the process data included in a batch process, a relationship between a piece of equipment associated with a batch process and one or more other pieces of equipment, relationships between pieces of equipment included in a batch process, pieces of equipment included in particular batch recipes, the raw materials included in particular batch recipes and associated pieces of equipment, equipment utilization information for pieces of equipment associated with batch processes, product quality metrics for products produced by batch processes and their associated pieces of equipment, product production times for products produced by batch processes and their associated pieces of equipment, any suitable combination of these, or any other suitable contextual data.

The process plant search engine 806 may also obtain time-series data generated during the execution of batches is stored in a database, such as the time series database 55. The time-series data may include process parameter values for process parameters related to process plant equipment as a batch process is executing. The time-series data may also include product parameter values for a product being manufactured using the batch process. Additionally, the time-series data may include utilization data for process plant equipment, such as the times in which each piece of process plant equipment is being utilized within batch processes. The time-series data may also include schedule data indicating times at which each piece of process plant equipment is scheduled to be in use as part of a batch or continuous process, and/or times when each piece of process plant equipment is available. The process plant search engine 806 may obtain both the batch process data and the time-series data from the knowledge repository 42.

The process plant search engine 806 then analyzes/parses the process plant search query to identify the subject of the search query, context for the search query, and/or other information in the search query which may be used to filter a data set responsive to the search query. More specifically, the process plant search engine 806 may obtain indications of subjects and filters from a grammar module or plant vocabulary database included in the process plant search query server 800 or communicatively coupled to the process plant search query server 800. The grammar module or plant vocabulary database may store several subjects of process plant search queries and filters which modify the subjects to filter the search results. The grammar module or plant vocabulary database may also store several mappings of terms from process plant search queries which correspond to each subject and/or filter, such as synonyms or nicknames for the subject or filter.

The process plant search engine 806 may then match each of the terms in the process plant search query to one of the subjects or filters. In some implementations, the process plant search engine 806 first identifies one or more terms within the process plant search query which correspond to the subject of the process plant search query. Then the process plant search engine 806 identifies filters which correspond to the remaining terms as well as context which may be used to filter the data set further. The process plant search engine 806 may identify an exact match of one or more terms in the process plant search query to a subject included in the grammar module or plant vocabulary database. Then the process plant search engine 806 identifies batch process data from the obtained batch process data and the time-series data that corresponds to the identified subject.

The process plant search engine 806 then identifies filters from the grammar module or plant vocabulary database which correspond to the remaining terms. The filters may be used to filter the batch process data set obtained in response to the identified subject. For example, when the query is for how each piece of equipment in a particular process plant was utilized from 12:00 p.m. to 4:00 p.m. on a particular day, the process plant search engine 806 may filter the utilization information for each piece of equipment to include a subset of the utilization information for each piece of equipment from between 12:00 p.m. to 4:00 p.m. on the particular day. In another example, the process plant search engine 806 may obtain batch process data related to each piece of equipment, and may filter the batch process data to only include a subset of the batch process data which includes utilization information.

In yet another example, when the query is for times during which a piece of equipment was in operation or being utilized, the process plant search engine 806 may obtain batch process data related to the piece of equipment. The process plant search engine 806 may filter the batch process data to only include a subset of the batch process data which includes the times in which the piece of equipment was in operation or being utilization.

In another example, when the query is for batch recipes that have executed on a set of equipment over a specified period of time, the process plant search engine 806 may obtain batch process data related to the set of equipment. The process plant search engine 806 may filter the batch process data to only include a subset of the batch process data for the specified period of time. The process plant search engine 806 may further filter the filtered subset of batch process data to include a subset that indicates the batch recipes that have executed on the set of equipment over the specified period of time.

In yet another example, when the query is for sets of equipment that have been used for a particular recipe over a specified period of time, the process plant search engine 806 may obtain batch process data related to the particular recipe. The process plant search engine 806 may filter the batch process data to only include a subset of the batch process data for the specified period of time. The process plant search engine 806 may further filter the filtered subset of batch process data to include a subset that indicates the sets of equipment that have been used for the particular recipe over the specified period of time.

The process plant search engine 806 may then provide the filtered batch process data set as search results to the user. For example, the filtered batch process data set may include the batch recipes that have executed on a set of equipment over a specified period of time.

While FIG. 30 illustrates a few examples of process plant equipment and respective batch information for the batch processes executed by the process plant equipment in the contextual knowledge repository 49, this is for ease of illustration only. The contextual knowledge repository 49 may include any suitable number of pieces of process plant equipment each associated with any suitable number of batch processes.

Figure 31:
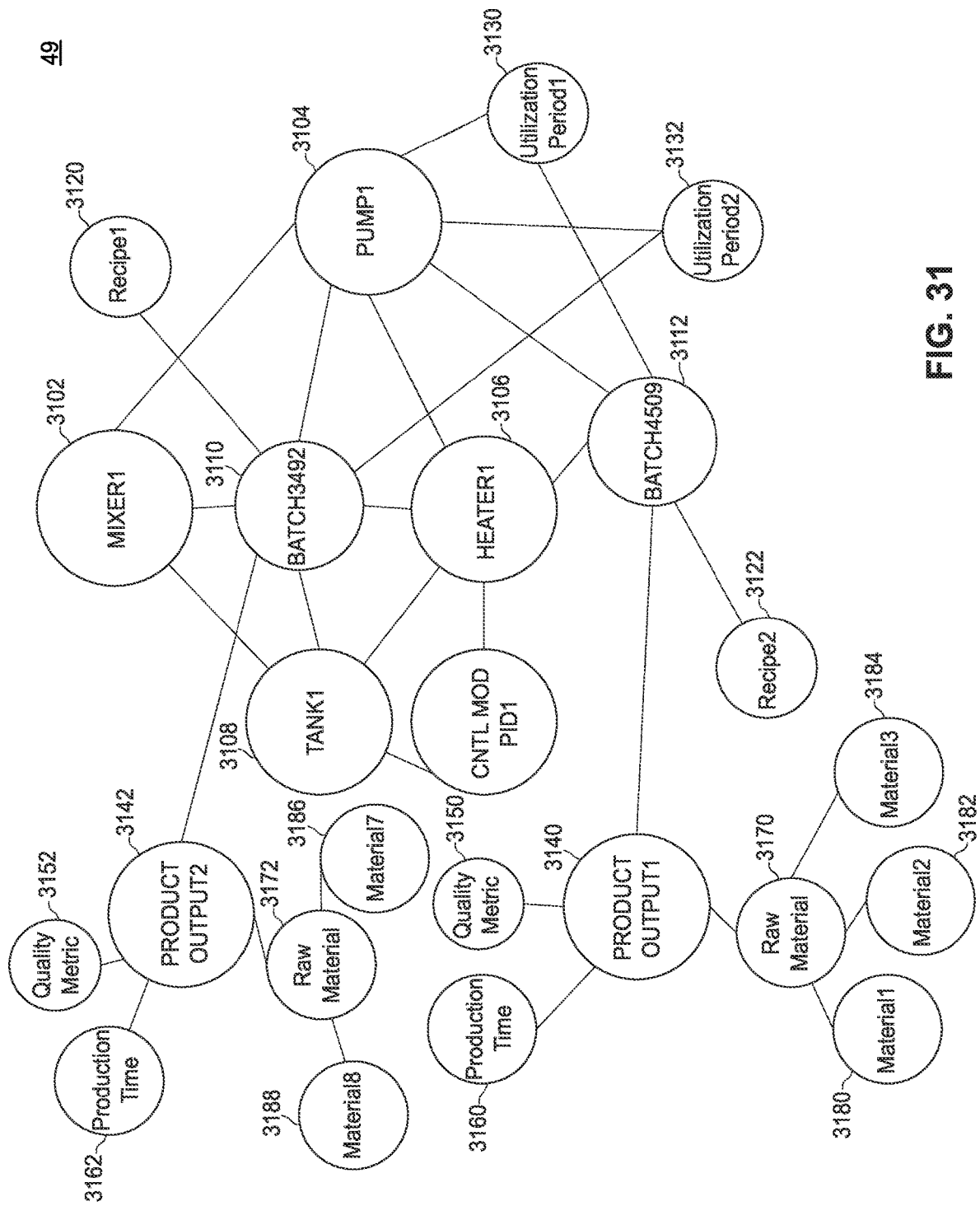
FIG. 31 illustrates another graphical representation of an example portion of a contextual knowledge repository that includes process plant equipment, batch information for the batch processes executed by the process plant equipment, and product information for products manufactured by the process plant equipment according to the batch processes, including a product quality metric for each product, a production time for producing each product, and the raw materials used to produce each product.

FIG. 31 illustrates yet another example portion of the contextual knowledge repository 49 that includes process plant equipment, batch information for the batch processes executed by the process plant equipment, and product information for products manufactured by the process plant equipment according to the batch processes, including a product quality metric for each product, a production time for producing each product, and the raw materials used to produce each product. The contextual knowledge repository 49 depicted in FIG. 31 may be a detailed portion of a larger contextual knowledge repository 49 depicted in FIG. 7 and described above which includes additional relationships, process plant entities, and process plant-related data.

As shown in FIG. 31, pieces of process plant equipment 3102-3108 are connected with the batch processes 3110, 3112 in which they are utilized. For example, Mixer1 (ref. no. 3102), Pump1 (ref. no. 3104), Heater1 (ref. no. 3106), and Tank1 (ref. no. 3108) are each included in a particular batch process identified as Batch3492 (ref. no. 3110). Pump1 (ref. no. 3104) and Heater1 (ref. no. 3106) may also be included in another batch process identified as Batch 4509 (ref. no. 3112). Batch process Batch3492 may have a particular batch recipe as Recipe1 (ref. no. 3120), description, area of the process plant in which the batch process is being executed, execution state, current phase being executed, etc., each of which may also be included in the contextual knowledge repository 49. Batch process Batch4509 may also have a particular batch recipe as Recipe2 (ref. no. 3122), description, area of the process plant in which the batch process is being executed, execution state, current phase being executed, etc., each of which may also be included in the contextual knowledge repository 49. Additionally, each batch process 3110, 3112 may produce a product 3140, 3142. For example, Batch4509 (ref. no. 3112) produces Product Output 1 (ref. no. 3140) and Batch3492 (ref. no. 3110) produces Product Output2 (ref. no. 3142). Each product 3140, 3142 has associated product information such as a product quality metric 3150, 3152 assigned to the product 3140, 3142, a production time 3160 assigned to the product 3140, 3142, 3162, the raw materials 3170, 3172 used to produce the product 3140, 3142, etc.

The product quality metric 3150, 3152 indicates the quality of the product produced by the batch process. The product quality metric 3150, 3152 may be determined based on product parameter data, such as the composition of the product, the volume of the product, the temperature of the product, the density of the product, the pressure in the product, etc. Each product parameter may be compared to a predetermined parameter value or range of values for the product and the product quality metric may be determined based on the amount of similarity of the product to the predetermined parameter values or ranges of values. For example, the product quality metric may be determined based on the Euclidean distance between the product parameter values and the predetermined parameter value or range of values. The product quality metric may be a score for example, from 1-10, 1-100, etc., where the score is inversely proportional to the Euclidean distance. In this manner, products with parameter values that are similar to the predetermined parameter values or ranges of values may be scored higher than products with parameter values that are far off from the predetermined parameter values or ranges of values.

The production time 3160, 3162 for each product 3140, 3142 indicates the amount of time it took to produce the product 3140, 3142 using the set of equipment for the batch process. The raw materials 3170, 3172 used to produce the product 3140, 3142 indicates the quantity of raw materials 3170, 3172 for producing each product and/or a descriptions of the raw materials used to produce the product 3140, 3142. For example, Material1 (ref. no. 3180), Material2 (ref. no. 3182), and Material3 (ref. no. 3184) are used to produce Product Output1 (ref. no. 3140). Material7 (ref. no. 3186) and Material8 (ref. no. 3188) are used to produce Product Output2 (ref. no. 3142).

In this manner, a user may query for the set(s) of equipment used for a given recipe or portion thereof that has produced the highest quality output. For example, the user may submit a query for the set(s) of equipment used for Recipe1 (ref. no. 3120) that has the highest quality output. The user may receive search results indicating that Mixer1 (ref. no. 3102), Pump1 (ref. no. 3104), Heater1 (ref. no. 3106), and Tank1 (ref. no. 3108) produced the highest quality output for Recipe1 (ref. no. 3120). For example, the process plant search engine 806 may compare each of the product quality metrics for the set(s) of equipment used for Recipe1 (ref. no. 3120) to identify the highest product quality metric. The search results may indicate the product quality metric for the set of equipment (e.g., 90 out of 100). In some implementations, the search results may include multiple sets of equipment in a ranked order, where each set of equipment is ranked in accordance with the respective product quality metric for the set of equipment. The process plant search engine 806 may determine a threshold number of sets of equipment to include in the search results. Then the process plant search engine 806 may provide sets of equipment ranked at or above the threshold number in the set of search results with indications of the respective product quality metrics.

The user may also query for the set(s) of equipment used for a given recipe or portion thereof that has produced a product with the best production time. The best production time may be the shortest duration. For example, the user may submit a query for the set(s) of equipment used for Recipe1 (ref. no. 3120) that produces the product in the shortest period of time. The user may receive search results indicating that Mixer1 (ref. no. 3102), Pump1 (ref. no. 3104), Heater1 (ref. no. 3106), and Tank1 (ref. no. 3108) produced the product for Recipe1 (ref. no. 3120) in the shortest period of time. For example, the process plant search engine 806 may compare each of the production times for the set(s) of equipment used for Recipe1 (ref. no. 3120) to identify the shortest production time. The search results may indicate the production time for the set of equipment (e.g., 75 minutes). In some implementations, the search results may include multiple sets of equipment in a ranked order, where each set of equipment is ranked in accordance with the respective production time for the set of equipment. The process plant search engine 806 may determine a threshold number of sets of equipment to include in the search results. Then the process plant search engine 806 may provide sets of equipment ranked at or above the threshold number in the set of search results with indications of the respective production times.

Additionally, the user may query for the set(s) of equipment used for a given recipe or portion thereof that has produced a product using the lowest quantity of raw materials. For example, the user may submit a query for the set(s) of equipment used for Recipe1 (ref. no. 3120) that produces the product using the lowest quantity of raw materials. The user may receive search results indicating that Mixer1 (ref. no. 3102), Pump1 (ref. no. 3104), Heater1 (ref. no. 3106), and Tank1 (ref. no. 3108) produced the product for Recipe1 (ref. no. 3120) using the lowest quantity of raw materials. For example, the process plant search engine 806 may compare each of the quantities of raw materials for the set(s) of equipment used for Recipe1 (ref. no. 3120) to identify the lowest quantity of raw materials. The search results may indicate the quantity of raw material used to produce the product for the set of equipment (e.g., 3). In some implementations, the search results may include multiple sets of equipment in a ranked order, where each set of equipment is ranked in accordance with the respective quantity of raw materials used to produce the product for the set of equipment. The process plant search engine 806 may determine a threshold number of sets of equipment to include in the search results. Then the process plant search engine 806 may provide sets of equipment ranked at or above the threshold number in the set of search results with indications of the respective quantities of raw materials.

As mentioned above, the user may submit queries in a natural language format or in any suitable format. The user's computing device may then transmit the query to the process plant search engine 806 executing within the process plant search query server 800. For example, the user's computing device may transmit a query for the set(s) of equipment used for a given recipe or portion thereof that has produced the highest quality output.

In response to the query, the process plant search engine 806 may obtain a batch process data set from a knowledge repository 42. The batch process data set may include process data related to batch processes and/or contextual data associated with the process data which may be obtained from the contextual knowledge repository 49. The contextual data may include an alarm status associated with the process data included in a batch process, a batch ID associated with the process data included in a batch process, a type of equipment associated with the process data included in a batch process, an area of the plant associated with the process data included in a batch process, a relationship between a piece of equipment associated with a batch process and one or more other pieces of equipment, relationships between pieces of equipment included in a batch process, pieces of equipment included in particular batch recipes, the raw materials included in particular batch recipes and associated pieces of equipment, equipment utilization information for pieces of equipment associated with batch processes, product quality metrics for products produced by batch processes and their associated pieces of equipment, product production times for products produced by batch processes and their associated pieces of equipment, any suitable combination of these, or any other suitable contextual data.

The process plant search engine 806 may also obtain time-series data generated during the execution of batches is stored in a database, such as the time series database 55. The time-series data may include process parameter values for process parameters related to process plant equipment as a batch process is executing. The time-series data may also include product parameter values for a product being manufactured using the batch process. Additionally, the time-series data may include utilization data for process plant equipment, such as the times in which each piece of process plant equipment is being utilized within batch processes. The time-series data may also include schedule data indicating times at which each piece of process plant equipment is scheduled to be in use as part of a batch or continuous process, and/or times when each piece of process plant equipment is available. The process plant search engine 806 may obtain both the batch process data and the time-series data from the knowledge repository 42.

The process plant search engine 806 then analyzes/parses the process plant search query to identify the subject of the search query, context for the search query, and/or other information in the search query which may be used to filter a data set responsive to the search query. More specifically, the process plant search engine 806 may obtain indications of subjects and filters from a grammar module or plant vocabulary database included in the process plant search query server 800 or communicatively coupled to the process plant search query server 800. The grammar module or plant vocabulary database may store several subjects of process plant search queries and filters which modify the subjects to filter the search results. The grammar module or plant vocabulary database may also store several mappings of terms from process plant search queries which correspond to each subject and/or filter, such as synonyms or nicknames for the subject or filter.

The process plant search engine 806 may then match each of the terms in the process plant search query to one of the subjects or filters. In some implementations, the process plant search engine 806 first identifies one or more terms within the process plant search query which correspond to the subject of the process plant search query. Then the process plant search engine 806 identifies filters which correspond to the remaining terms as well as context which may be used to filter the data set further. The process plant search engine 806 may identify an exact match of one or more terms in the process plant search query to a subject included in the grammar module or plant vocabulary database. Then the process plant search engine 806 identifies batch process data from the obtained batch process data and the time-series data that corresponds to the identified subject.

The process plant search engine 806 then identifies filters from the grammar module or plant vocabulary database which correspond to the remaining terms. The filters may be used to filter the batch process data set obtained in response to the identified subject. For example, when the query is for the set(s) of equipment used for a given recipe or portion thereof that has produced the highest quality output, the process plant search engine 806 may obtain product quality metrics for each set of equipment used for the given recipe or portion thereof. The process plant search engine 806 may then filter the product quality metrics to include the highest product quality metric or a subset of product quality metrics ranked above a threshold ranking and the set(s) of equipment corresponding to each product quality metric.

In another example, when the query is for the set(s) of equipment used for a given recipe or portion thereof that has produced in the shortest period of time, the process plant search engine 806 may obtain production times for each set of equipment used for the given recipe or portion thereof. The process plant search engine 806 may then filter the production times to include the shortest production time or a subset of production times ranked above a threshold ranking and the set(s) of equipment corresponding to each production time.

In yet another example, when the query is for the set(s) of equipment used for a given recipe or portion thereof that has produced using the lowest quantity of raw materials, the process plant search engine 806 may obtain a quantity of raw materials for each set of equipment used for the given recipe or portion thereof. The process plant search engine 806 may then filter the quantities of raw materials to include the lowest quantity of raw materials or a subset of the quantities of raw materials ranked above a threshold ranking and the set(s) of equipment corresponding to each quantity.

The process plant search engine 806 may then provide the filtered batch process data set as search results to the user. For example, the filtered batch process data set may include the set(s) of equipment used for a given recipe or portion thereof that has produced the highest quality output.

While FIG. 31 illustrates a few examples of process plant equipment and respective batch information for the batch processes executed by the process plant equipment in the contextual knowledge repository 49, this is for ease of illustration only. The contextual knowledge repository 49 may include any suitable number of pieces of process plant equipment each associated with any suitable number of batch processes.

In some implementations, the process plant search functionality may be provided within an IDE, so that process plant search queries may be performed and process plant search results may be presented within the IDE, such as a web-based IDE which has workflows for data science and machine learning and which provides interactive visualizations of the search results. In this manner, users may customize machine learning models, filter search results and/or time series data, and may customize other aspects of the search functionality.

In some implementations, the system may provide a process plant search module to the IDE for handling process plant search queries within the IDE. For example, the IDE may import a process plant search module to handle process plant search queries and return process plant search results as data frames which can easily be rendered as tables, graphs, charts, or plots.

In other implementations, the system may expose a process plant search application programming interface (API) to the IDE for handling process plant search queries and returning process plant search results to the IDE. For example, the IDE may invoke the process plant search API and provide the process plant search query to the edge gateway system 1 via the process plant search API. The edge gateway system may then obtain a data set responsive to the process plant search query from the knowledge repository 42 (e.g., the contextual knowledge repository 49 and/or the temporal repository 51), and provide a set of process plant search results based on the data set to the IDE via the process plant search API.

In other implementations, the process plant search functionality is provided within plant applications 74, multiplant applications 80, remote plant applications 82, or third-party applications 84.

Smart Search Parameter Life Cycle Management

The enhanced search capabilities described herein may also facilitate management of parameters lifecycle within and among various process plants. In particular, prior art systems provide little or no support for management of parameter lifecycle and, in particular, category-based parameter configurations, across different production sites. Instead, users are left to implement their own solutions, which generally are highly manual and often paper-based. As a result, change tracking and verification processes subsequent to initial plant configuration, intended to ensure traceability and minimize the chance of error, are labor intensive, slow, and inefficient.

Production processes, especially in certain fields such as pharmaceuticals, are typically developed at a pilot plant. The pilot production process often requires expensive and time consuming regulatory approval and qualification and, as such, the process and its parameters are "locked down" once the approval and qualification process is complete. The production sites are then built similar to the pilot site, but are not always identical, as local regulations or equipment availability can cause variations in the precise configuration of a process plant.

Generally, process configurations are defined as control parameters in the control system. These parameters are, in embodiments, categorized based on their purpose. The handling of each parameter category comes with unique requirements. For example, operating parameters are specific to a product and are identical across production sites, tuning parameters are control specific, and equipment parameters are specific to the local equipment and differ between production sites. In regulated or qualified systems, it is important to ensure the integrity of the parameter configurations in order to keep the system qualified. It is also desirable to track parameter modifications throughout the development process and provide means to combine parameter subsets to create desired production configurations. Traceability and change management capture the evolutional aspects of the development process. It is further desired to centralize versioning and storage of system configurations across all production sites to help monitor and understand changes made to any system, help understand and reduce deviations between production system configurations, and generally simplify auditability.

In view of this, in various embodiments, the enhanced search capabilities of the present disclosure may be used in a variety of manners for process parameter lifecycle management. In some embodiments, for example, the enhanced search capabilities may be employed during process configuration. In such embodiments, a series of test process runs may be performed to gather and analyze data with the goal of achieving product specifications at maximum production speed by tracking parameter modifications, and the resulting process values, throughout the development process and providing means to combine parameter subsets to create desired production configurations.

As will be described, in embodiments, the enhanced search capabilities include routines that allow searching and filtering of the knowledge repository and, in particular, the parameter configurations, including the production parameter configurations. In some embodiments, the configurations may be exported into a format (e.g., an FHX file) that can be downloaded to a controller to configure the controller to operate some or all of the equipment in a process plant. In such configurations, the exported file may be transferred to other production sites to ensure that production parameters, which often times are part of a regulatory certification regime, are consistent across process plant environments.

In addition to parameter development, the enhanced search capabilities facilitate enhanced process monitoring, in embodiments. The enhanced search capabilities of the described systems may be employed during process runtime (i.e., while the process is actively executing to produce a product) to monitor the process of parameters that are operating out of normal state. For example, using the enhanced search capabilities, the system can continuously query time series data of selected parameters to perform soft-sensor computation and data filtration. As a result, parameters that are not directly observable/measureable in real time may be developed and implemented as "soft sensors" to provide additional data to operators and/or to provide additional inputs to the control routine. That is, soft sensor values output as a result of the enhanced search capabilities may be real-time inputs to the control routine, improving the operation thereof and resulting in a more well-controlled process and/or a higher-quality product.

In still other embodiments, in addition to allowing for distribution of production parameters across plants, the enhanced search capabilities allow tracking local variations in parameters including operating parameters, tuning parameters, and equipment parameters, and provide traceability, change management, versioning, and branching. These capabilities help refine the process across multiple facilities and equipment lines and can raise alerts when parameter values of a facility are, or are at risk of becoming, outside of regulatory compliance or qualification, which could affect the compliance or qualification of the product or of the facility as a whole.

Figure 32A:
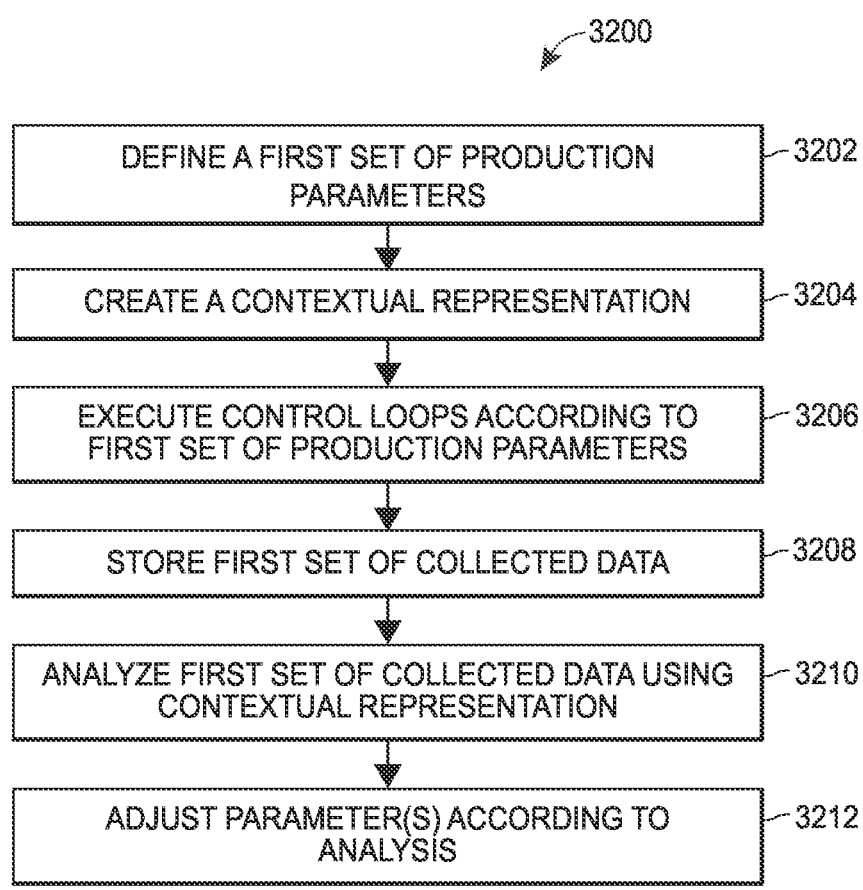
FIG. 32A illustrates a flow diagram of an example method for parameter development.
Figure 32B:
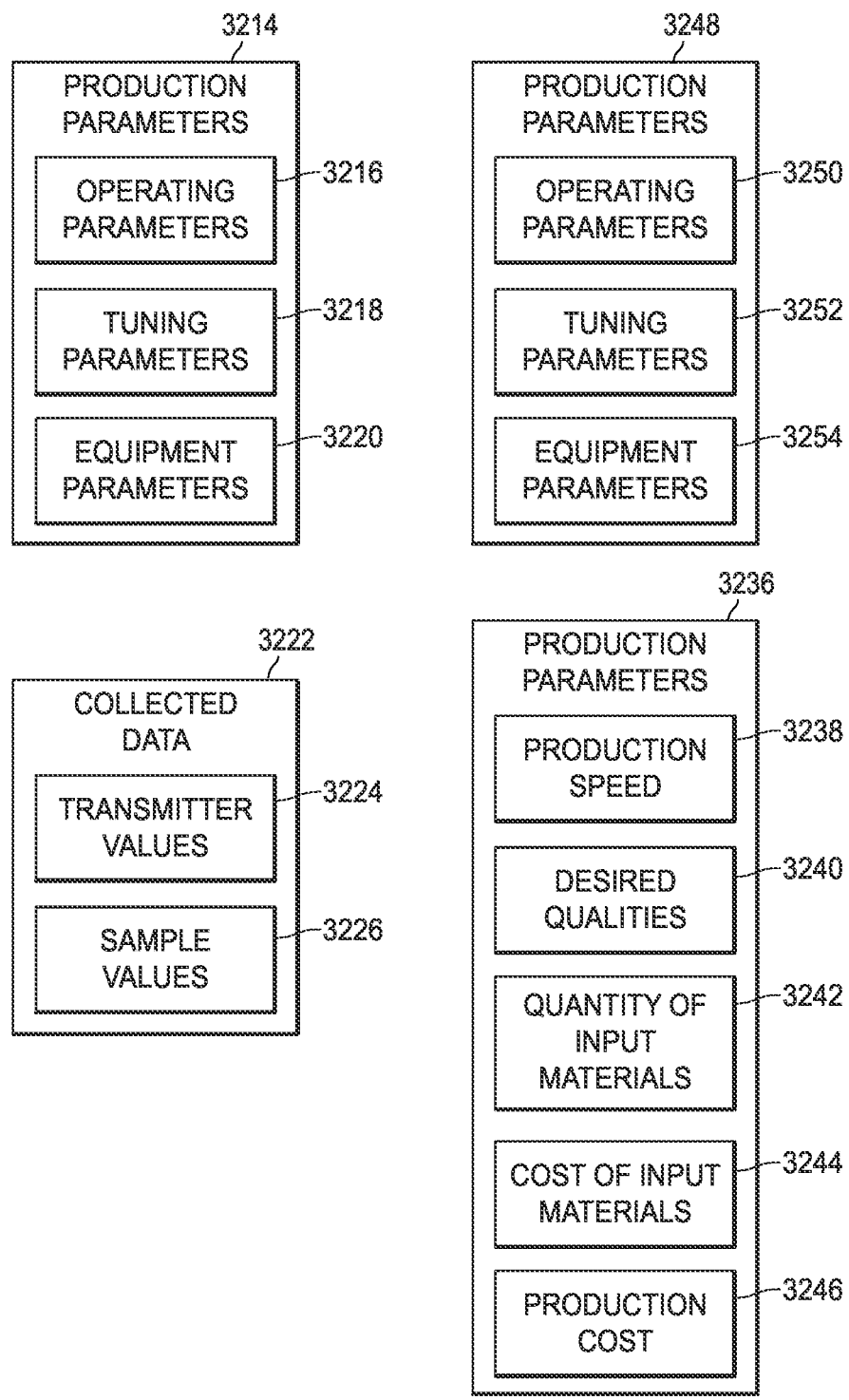
FIG. 32B is a block diagram depicting data that may be associated with the method of FIG. 32A.

FIG. 32A is a flow chart depicting an exemplary method 3200 using the enhanced search capabilities described herein for parameter development. FIG. 32B is a block diagram depicting data, stored in the knowledge repository 42, for example, that may be associated, in whole or in part, with the method 3200. With reference to FIGS. 32A and 32B, in the method 3200, a first set 3214 of production parameters (and, specifically, parameter values) is defined (block 3202). The first set of production parameters, for a plurality of process control devices in the process plant, relate to the production of the associated product, and may include one or more operating parameters 3216, one or more tuning parameters 3218, and one or more equipment parameters 3220. In embodiments, the production parameters are defined by process configuration engineers in the first instance and as, a result, the first set 3214 of production parameters may not be computer generated. However, it is possible that even though the values are not necessarily derived by the system, the data stored as the first set 3214 of production parameters may be captured using an electronic process. For example, and as described elsewhere in this specification, the programming data implemented on the process controller 111 may be exported to the data lake 40, and the contextual knowledge miner 45 may process the controller programming data to extract the parameters values for storage as the first set 3214 of parameters, and to categorize the each parameter of the first set 3214 of production parameters as operating parameters 3216, tuning parameters 3218, and equipment parameters 3220.

Based on the first set 3214 of production parameters, a processor (e.g., the processor 35 executing the contextual knowledge miner 45) creates a contextual representation of the plurality of process control field devices and the first set 3214 of production parameters, and stores the contextual representation in the knowledge repository 42, for example, in the contextual repository 49 and, in embodiments, as graph data 53 in the contextual depository 49 (block 3204).

The method 3200 also includes executing, by the process controller 111, a plurality of control routines 138 including control loops, according to the first set 3214 of production parameters, to create a first test product (block 3206). During the execution of the control routines 138, the controller 111 collects from the process data indicative of the operation of the process, which data may sent to the data lake 40 and/or ingested into and stored in the knowledge repository 42 as a set 3222 of collected data (block 3208). Specifically, the set 3222 of collected data may include transmitter values 3224 (i.e., data received from transmitters coupled to sensors in the field devices or the process plant), sample values 3226 (i.e., data related to product samples and, in particular, to qualities, measured automatically or manually, of the samples), and other data, including external data (e.g., weather station data), user data (e.g., operations staff running the plant), categorical data (e.g., which shift the plant is operating in, unit and equipment station information including which units and equipment are being used), material properties (e.g., sulfur content in crude, etc.), and device status information (e.g., a device needs maintenance). The data in the set 3222 of collected data may be stored as time-series data 55 in the temporal repository 51. Of course, the contextual knowledge miner 45 may also determine, through analysis of the time-series data, one or more relationships, and may store those relationships in the contextual repository 49.

The stored set 3222 of collected data is analyzed and, using the contextual representation of the process control field devices and the first set 3214 of production parameters, the data are analyzed to determine product parameters 3236 associated with the execution of the control loops to create the first test product (block 3210). The determined product parameters 3236 may include a production speed 3238 of the first test product, one or more qualities 3240 of the first test product, a quantity 3242 of one or more input materials consumed to create the first test product, a cost 3244 of one or more input materials consumed to create the first test product, and/or a production cost 3246 to create the first test product.

The method 3200 also includes adjusting one or more of the first set 3214 of production parameters according to the analysis of the first set 3222 of collected data, to create a second set 3248 of production parameters (which can also include operating parameters 3250, tuning parameters 3252, and equipment parameters 3254) (block 3212). The adjustment of the first set 3214 of parameters to create the second set 3248 of parameters may be made in view of manual or automated analyses and, in particular embodiments, is made in view of relationships, stored in the contextual repository 49, indicative of the effects on one or more of the parameters in response to a step change to others of the one or more parameters. The analyses and methods that result in the determined relationships between parameters as a result of step changes will be described below.

In some embodiments, the method 3200 may include iterating the method additional times to create third and greater sets of production parameters based on additional runs of control loops according to additional (e.g., second, etc.) sets of production parameters.

The method 3200 may also include predicting the second set of data resulting from the second set of production parameters during a second execution of the plurality of control loops according to the second set of production parameters and, in embodiments, executing the plurality of control loops according to the second set of production parameters and comparing the predicted second set of data to a collected second set of data.

Other predictions may also be made, in certain implementations, including predictions of one or more quantitative properties of the test product, predictions of production speed, predictions of quantity or cost of input materials, and/or predictions of production cost for the product.

The enhanced search capabilities, in combination with the contextual repository 49, facilitate embodiments in which the method includes receiving a product parameter (e.g., a desired quality of the product, a desired production speed, etc.) and adjusting one or more of the production parameters such that the process and/or the product meet the received product parameter.

Figure 32C:
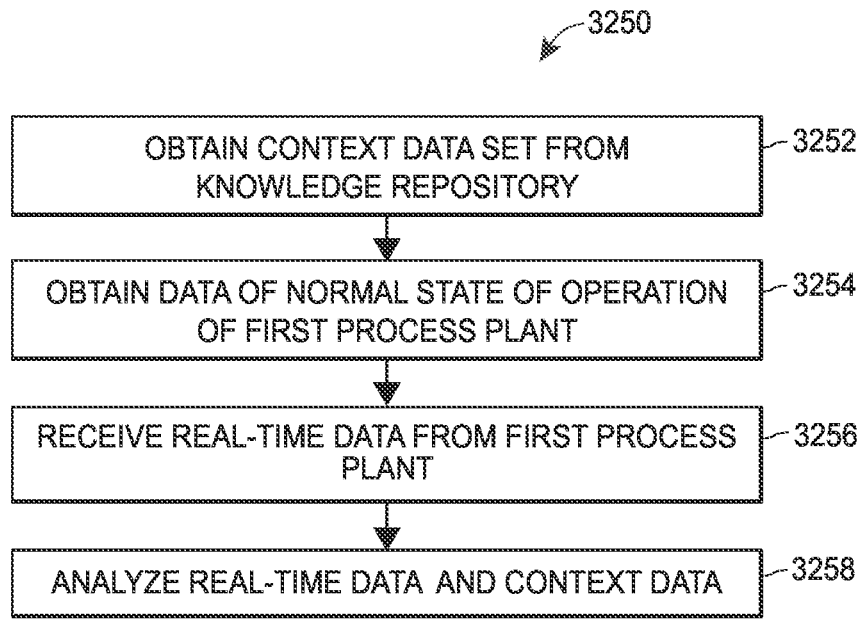
FIG. 32C illustrates a flow diagram of an example method for process monitoring.

FIG. 32C is a flow chart that depicts a method 3250 for process monitoring using the enhanced search capabilities of the system described herein. The method 3250 includes obtaining at a computing device a data set from the knowledge repository 42 and, in particular, obtaining context data from the context repository 49, the context data associated with the process control field devices in a first process plant and indicating relationships between the process control field devices (block 3252). The method 3250 also includes obtaining at the computing device a data set from the knowledge repository 42 and, in particular, obtaining data indicative of a normal state of operation for each of the plurality of parameters in the first process plant (block 3254). The plurality of parameters includes a first set of operating parameters, a first set of tuning parameters, and a first set of equipment parameters. The computing device receives real-time, time-series data from the operation of the first process plant during operation of the process control system (block 3256). In embodiments, the real-time, time-series data may be streamed into the data lake 40, ingested into the knowledge repository 42 and, specifically, the temporal repository 51 as time-series data 55. The time-series data 55 may be continuously queried—using one or more queries that, for example, perform data filtration and/or soft-sensor calculations—in order to produce the time-series data received in the method step at block 3256. The received time-series data related to the plurality of parameters (including any soft-sensor values generated), the data indicative of the normal state of operation for each of the plurality of parameters, and the context data may be analyzed in concert to determine if any of the parameters of the first process plant are operating out of normal state (block 3258).

The continuous querying of the data may be executed by a script, in embodiments. The script may repeat a series of steps instantaneously (e.g., restarting immediately upon completion of execution) or periodically (e.g., every second, every 30 seconds, every 60 seconds, etc.). In an embodiment, the continuous querying may use a most recent period (e.g., 30 minutes) of data for one or more parameters (e.g., feed rates of two materials) to predict the product quality in a later process stage using a pre-trained machine learning model. The script may load and initialize the trained model, retrieve recent time-series parameters, clean the data (e.g., remove outliers), use the machine learning model to predict the soft-sensor value(s), store the soft-sensor values for later visualization, and, in embodiments in which the soft-sensor values are part of one or more control loops, write the soft-sensor values back to the controller.

The context data obtained at block 3252 may be in the form of a graph database (e.g., the graph database 53), and may represent the relationships between the process control field devices and the process control configuration, the relationships between two or more control loops executed by the process controllers, or both.

In embodiments, the method 3250 may also include inputting, in real-time, into a trained AI model, the time-series data from the one or more process controllers and the context data and receiving as output from the trained AI model a real-time prediction of product quality based on the real-time, time-series data. Based on the real-time prediction of product quality output from the trained AI model, the method 3250 may also include adjusting one or more of the plurality of production parameters, which, in turn, may cause the controller to change a value of the one or more production parameters. Alternatively, the trained AI model may output a recommendation of one or more parameters of the plurality of production parameters to adjust.

In some implementations, the method 3250 may also include, as part of obtaining data indicative of the normal state of operation of the plurality of parameters, inputting current parameter data into a model based on the context data to obtain a normal state of the parameters for the current operation of the process.

As will be understood, the method 3250 may also be implemented at each of a plurality of production sites. In so doing, the individual systems may each be monitored for product parameters and/or production parameters that may be out of "normal" state or drifting toward being out of "normal" state. Moreover, by comparing drift between production plants, additional information (e.g., relationships) may be determined by the contextual knowledge miner 45.

As described above, the enhanced search capabilities described herein may also be employed toward the purpose of management of parameters across different production sites. In various methods, the enhanced search capabilities may facilitate distribution of production parameters across plants, tracking of local variations in parameters, and providing traceability, change management, versioning, and branching, in addition to helping refine the process across multiple facilities and equipment lines.

Figure 32D:
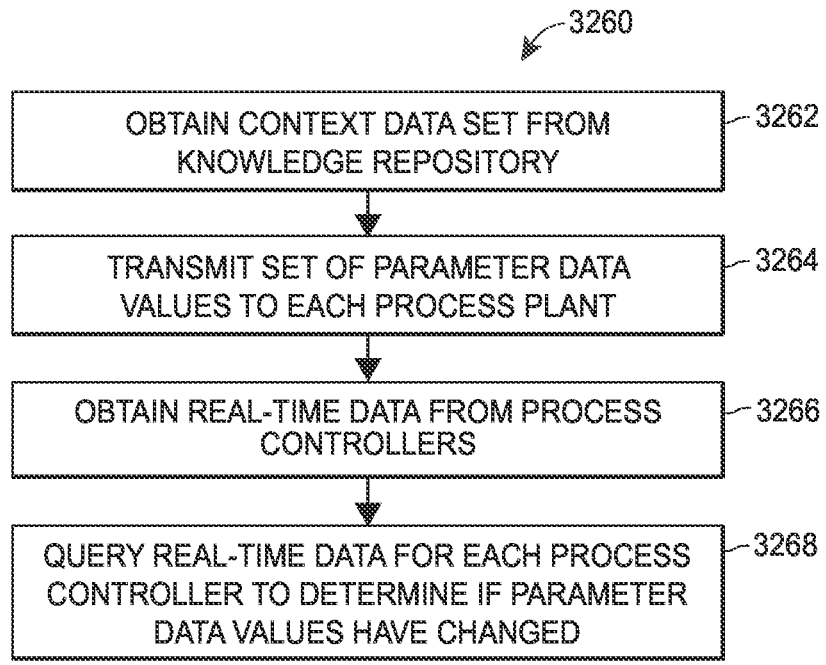
FIG. 32D illustrates a flow diagram of an example method for monitoring parameters across multiple process plants.

With reference to FIG. 32D, a flow chart depicts a method 3260 that can be used in an industrial process control system that includes multiple process plants producing a product. Each of the process plants includes a respective plurality of process control field devices controlled by a respective one or more process controllers to produce the product. In the method 3260, a computing device obtains for each of the process control plants a set of context data set from the knowledge repository 42 and, in particular, from the contextual repository 49 (block 3262). The set of context data is data associated with the process control field devices in the respective process plant and indicates relationships between the process control devices. In embodiments, the context data may also indicate relationships between process control field devices and process control loops and/or between process control loops. The computing device also transmits to each of the process plants a set of parameter data values associated with the production of the product at the respective process plant (block 3264). In embodiments, the set of parameter data values transmitted to each of the process plants is in the form of a file that is downloadable directly to a process controller and that, when executed by the process controller, operates to cause the process plant to operate to produce the product. (An example file would be an FHX file that can be downloaded to a DeltaV™ controller.) In this manner, a set of production parameters may be transmitted to multiple process plant facilities so that each of the process plants is producing an identical product and/or a product that meets requirements to maintain certification or qualification. In some embodiments, the transmitted production parameters may be based, in part, on the context data for the process plant. For example, equipment parameters transmitted to a particular process plant may be based, in part, on the context data indicating the equipment at the respective process plant.

The computing device also obtains, from each of the process plants, real-time, time series data from the respective process controllers during operation of the process control system (block 3266). In some implementations, the received real-time, time-series data may be streamed into the data lake 40, and ingested into the knowledge repository 42 and, specifically, the temporal repository 51 as time-series data 55. The time series data 55 (or, in any event, the received time-series data, however stored) may be queried using the enhanced search capabilities to determine if any of the respective sets of parameter data values have changed (block 3268). Where one or more changes have occurred in any of the sets of parameter data values, the method may include determining one or more of the parameters in the set that has changed and categorizing each of the one or more changed parameters as one of an operating parameter, a tuning parameter, or an equipment parameter. By categorizing the changed parameters, the system (or personnel associated with the system) can determine whether the change is related to equipment (which is specific to the plant) or to the product or control system/routine. Additionally, changed parameters may be assigned version information and stored for future reference.

In embodiments, the method may also comprising querying context data and the time-series data and analyzing the data to computer or determine one or more soft-sensor values that may be used, for example, to characterize or predict some aspect of the operation of the process plant or to characterize or predict some aspect of the product itself. This soft-sensor value may be determined for each of the process plants continuously or periodically.

In some implementations, the context data stored in the contextual repository 49 (e.g., as the graph data 53), may include data indicative of relationships between various parameters. The relationships between parameters may include information about the effects that an increase or decrease (e.g., a step change) in a first parameter may have on a second parameter, information about the effects that a rate of change (e.g., a rise rate or a fall rate) of a first parameter may have on a second parameter, information about the effects that a magnitude of a change of a first parameter may have on a second parameter, etc. The relationships may also include information about the effects of various perturbations (i.e., temporary deviations of a value) of one parameter on another. For instance, the relationships may include information about the effects on one variable caused by a perturbation of a second variable, and may characterize the effects based on any one or more of the following factors, either of the perturbation or the affected variable: perturbation duration, perturbation rise time, perturbation fall time, perturbation magnitude, perturbation rate of change, etc. As will be described below, these relationships may be determined, in part, by employing the enhanced search capabilities described herein.

Introducing Step Changes or Perturbations in Control Parameters in the Process Control System Designing, operating, optimizing, and maintaining a manufacturing site requires or, at a minimum, benefits from, a detailed understanding how a process control system behaves under varying conditions to find one or more optimum configurations for cost-effective, high-speed, production. The problem is analogous to studying a high-dimensional landscape looking for smooth global minima.

Using the enhanced search capabilities described herein, various methods of setpoint manipulation, including perturbation testing and step testing, may be employed to "feel out" a system. In contrast with a step change, which is generally a detectable and sustained change of a setpoint from a first value to a second value, a perturbation may be minimally detectable (e.g., having an amplitude and/or duration just great enough to cause a detectable difference in one or more other parameters) and reversible (e.g., the set point may return to its original value). These tests introduce into the process carefully designed sequences of setpoint changes of varying side and direction and monitor how the changes affect, and propagate through, the system. The sensor values of the resulting signals are recorded at specific points of the process and encode a wealth of information that helps understanding the dynamic properties of a process. To decode the information, various data transformations may be applied. These data transformations may include Fourier transformations, and/or deep learning techniques may be applied to analyze oscillating behaviors, state changes, reflections, and meta patterns.

The applied transformation algorithms themselves may be highly generic and parameterizable, allowing for optimization of the quality of the desired output. Examples include the time-window of a short-time Fourier transformation, the trigger point of a slope detector, or the topology and learning rate of a deep-learning algorithm. While tuning the algorithm parameters is frequently a highly-interactive and experimental process to a data scientist, the enhanced search capabilities of the present system provide a tool that easily combines transformation functions, visualizes results, and interactively tunes algorithm parameters until the output meets expectations.

Figure 33A:
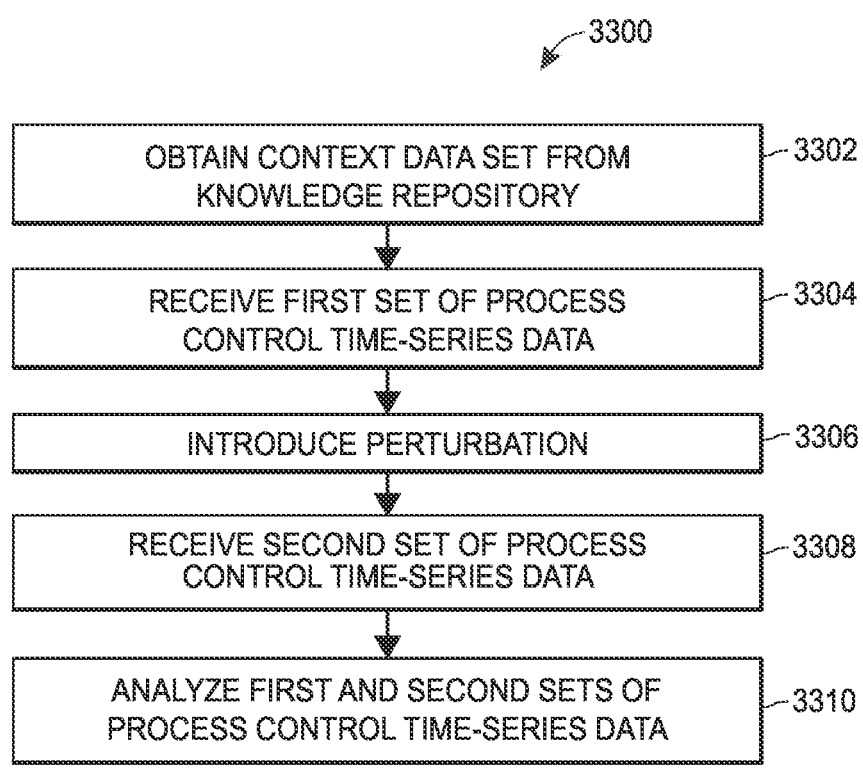
FIG. 33A illustrates a flow diagram of an example method for implementing perturbation testing.

FIG. 33A is a flow chart depicting an example method 3300 that may implement perturbation testing using the enhanced search capabilities. The method 3300 includes obtaining a data set from the knowledge repository 42, which knowledge repository 42 stores process configuration data related to the process and a graph database (e.g., graph data 53) storing contexts associated with the process configuration data (block 3302). A first set of process control data is received and includes time-series data of a plurality of parameters in the process plant, which time-series data were or are collected during operation of the process (block 3304). The method includes causing the process controller to introduce a perturbation in a control parameter of the process plant (block 3306) and receiving a second set of process control data that includes time-series data of the plurality of parameters in the process plant (block 3308). The second set of time-series data includes at least data for a period extending from a time at which the perturbation is introduced, through a later time (e.g., 5 minutes later, 10 minutes later, 1 hour later, etc.). The length of time covered by the second set of time-series data may be dependent, of course, on the type of system, the parameters that are affected by the perturbation, the time frame over which effects may be observed, etc. The first and second sets of process control data are analyzed, using the data set obtained from the knowledge repository, to make a determination related to one or more effects of the perturbation (block 3310), including, for example an effect of the perturbation of the first parameter on one or more second parameters.

In embodiments, the perturbation may be introduced for a time period (e.g., less than five minutes, less than one minute, or less than 30 seconds) and, upon expiration of the time period, the control parameter may be reverted (e.g., the controller may return the control parameter value) to its original value. In embodiments, the method 3300 may include introducing multiple perturbations. For example, the method 3300 may include receiving a third set of time-series process control data, introducing a second perturbation in the same control parameter, receiving a fourth set of time-series process control data, and analyzing the third and fourth sets of time-series data (i.e., data before and after the second perturbation) relative to the determination related to the one or more effects of the first perturbation to determine one or more effects of the second perturbation and, from that determination, to detect and/or characterize drift in a configuration or operation of the process control system. This may be repeated for still further perturbation instances and sets of time-series data.

The determinations of the effects of the perturbations may include: determinations of a maximum perturbation amplitude that can be introduced without pushing a product of the process plant outside of specified production parameters for the product; determinations of a maximum perturbation rate of change that can be introduced without pushing a product of the process plant outside of specified production parameters for the product; determinations of a maximum perturbation duration that can be introduced without pushing a product of the process plant outside of specified production parameters for the product; determination of a propagation time associated with the perturbation, the propagation time defined as an elapsed time between the introduction of perturbation and an effect of the perturbation (i) at an entity of the process plant or (ii) on a downstream parameter of the process plant; and/or determinations of an optimal time following a perturbation to measure a sample of a product at the process plant.

In some implementations, the method 3300 includes introducing a perturbation in a second parameter in the control plant, and receiving time-series process control data of parameters in the process plant, which parameters are analyzed with the previous sets of data (and the context data) to make a determination related to one or more effects of the perturbations of the first and second parameters.

Further, perturbations may be introduced in similar process plants (e.g., process plants running parallel processes to produce the same product). That is, the method 3300 may be repeated at two or more plants, and the one or more effects of identical perturbations of the same parameters in different plants may be compared.

FIGS. 33B through 33J depict various hypothetical example relationships between perturbations of parameter values and the responsive effects of those perturbations on other parameter values. Each of FIGS. 33B through 33J depicts a graph showing parameter values for two parameters, with the Y-axis representing the value of the parameter and the X-axis representing time. In each of the figures, the parameter on top is a parameter into which a perturbation is introduced (e.g., by a change in set point), while the parameter on bottom is a parameter that responds to the introduced perturbation. The two parameters depicted in each figure are not necessarily on the same scale on the Y-axis, but are depicted in the same figure for ease of reference and because they related to each other in time (i.e., on the X-axis). Further, while any given example may depict that a perturbation of a given type in a first parameter causes a given type of responsive deviation in a second parameter, these figures are exemplary only and not intended to be limiting. That is, while a given figure may show that responses to perturbations vary by time (or by amplitude, by rate of change, etc.), in reality, it should be understood that a change in amplitude of a perturbation may result in a response that varies by timing or by rate of change, a change in rate of change of the perturbation may result in a change in amplitude of the response, etc.

Figure 33B:
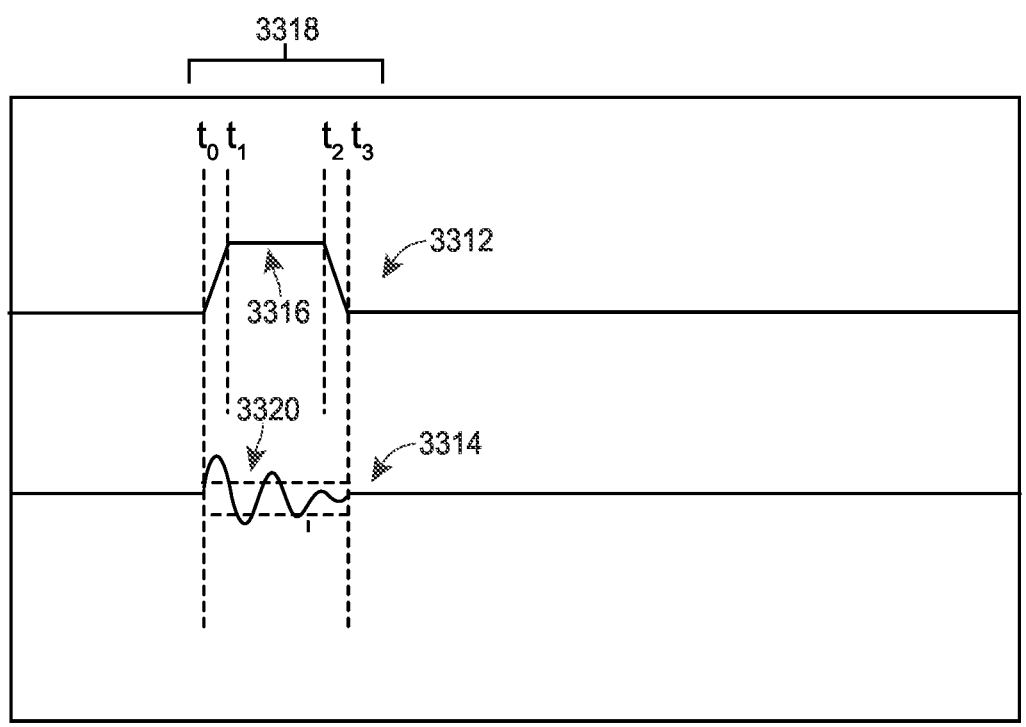
FIGS. 33B through 33J depict example signals illustrating various aspects of perturbation testing.

FIG. 33B depicts example values over time for first and second hypothetical parameter values 3312 and 3314, respectively, in a system. A perturbation 3316 introduced in the first parameter value 3312, occurs over a time period 3318, starting at a time to. The parameter value 3312 rises from time $t_0$ to time $t_1$, remains steady from time $t_1$ to time $t_2$, and falls from time $t_2$ to time $t_3$, reverting at time $t_3$ to the same value as before time $t_0$. FIG. 33B depicts an example in which the introduced perturbation 3316 in the first parameter value 3312 causes a corresponding "ringing" 3320 in the second parameter value 3314 during the time period 3318.

The enhanced search capabilities of the systems described herein facilitate the identification of such cause and effect relationships within process control systems but, more saliently, the time-series data (before and after the introduction of the perturbation) in which such relationships may be captured, can be automatically searched and the relationships identified and stored for later use by AI models or other services. The time-series data can be streamed to the data lake 40 and the contextual knowledge miner 45 may identify the relationships between the perturbation in a first parameter and the effects on one or more second parameters. The relationships may be stored by the contextual knowledge miner 45 in the knowledge repository 42, with the time-series data 55 stored in the temporal repository 51, and the contextual relationships being stored in the contextual repository 49, as graph data 53, in some embodiments. When such relationships have been determined and captured, those relationships can be used for later analysis of similar perturbations toward the identification of and/or characterization of drift in the process control system.

Figure 33C:
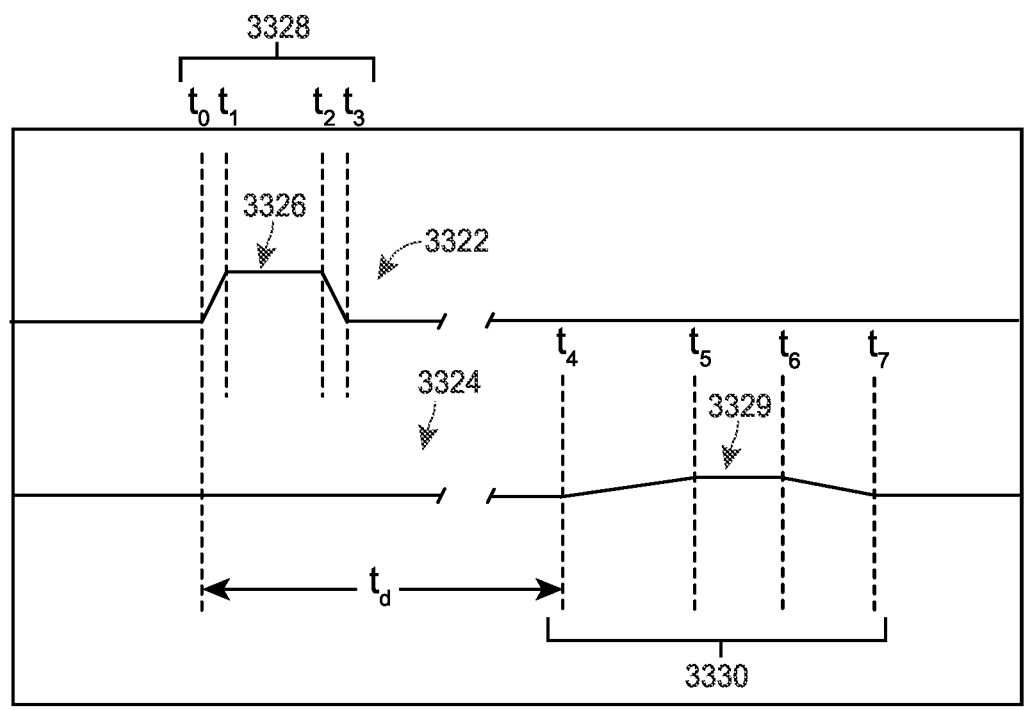
Figure 33D:
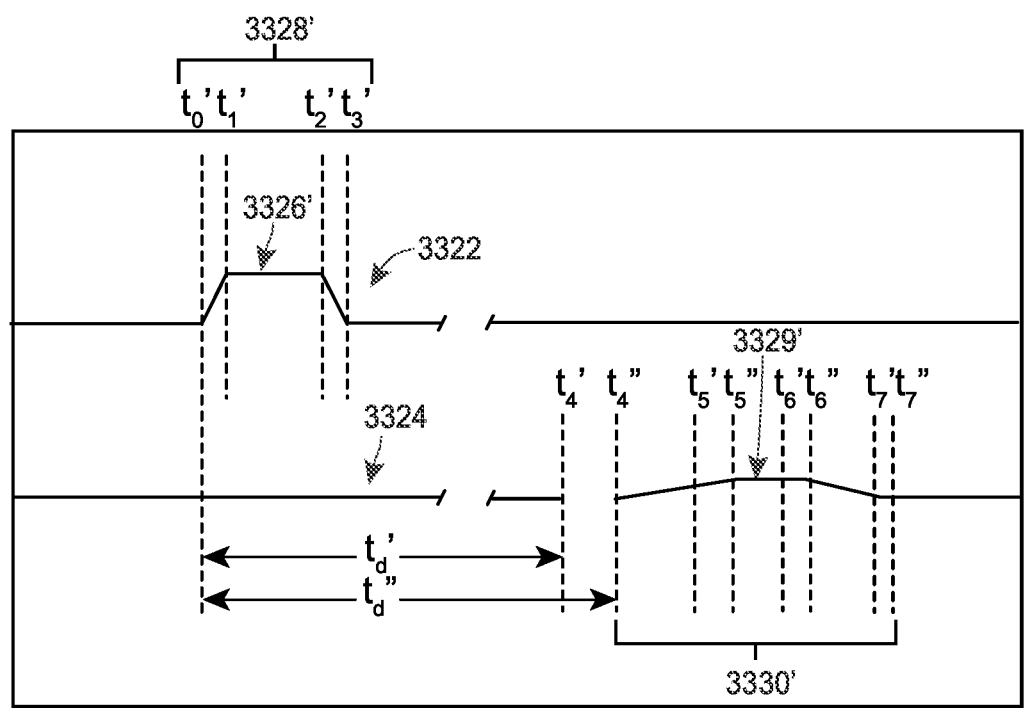

FIGS. 33C and 33D depict example values over time for first and second hypothetical parameter values 3322 and 3324. While FIGS. 33C and 33D depict the example values for the same pair of hypothetical parameters 3322 and 3324, FIG. 33C depicts the values at a first time, while FIG. 33D depicts the values at a second, later time. FIG. 33 shows the values of the first parameter 3322, including an introduced perturbation 3326 over a period 3328 extending between a time $t_0$ and a time $t_3$. The parameter value 3322 rises from time $t_0$ to time $t_1$, remains steady from time $t_1$ to time $t_2$, and falls from time $t_2$ to time $t_3$, reverting at time $t_3$ to the same value as before time to. The values corresponding to the parameter 3324 show a corresponding response 3329 that commences at a time $t_4$, at a time $t_d$ after the commencement of the introduced perturbation 3326 (that is, the time between time $t_0$ and time $t_4$ is $t_d$). A responsive deviation 3328 extends over a period 3330 between the time $t_4$ and a time $t_7$. The parameter value 3324 rises from time $t_4$ to time $t_5$, remains steady from time is to time $t_6$, and falls from time $t_6$ to time $t_7$, reverting at time $t_7$ to the same value as before time $t_4$.

The parameter 3322 is depicted in FIG. 33D as having an introduced perturbation 3326' identical to the introduced perturbation 3326, but occurring at a different time. Specifically, the introduced perturbation 3326' occurs over a period 3328' extending between time $t_0$' and time $t_3$'. The parameter value 3322 rises from time $t_0$' to time $t_1$', remains steady from time $t_1$' to time $t_2$', and falls from time $t_2$' to time $t_3$', reverting at time $t_3$' to the same value as before time $t_0$'. Importantly, the magnitude, duration, rise time, and fall time, of the introduced perturbation 3326' are the same as those of the introduced perturbation 3326 in FIG. 33C. However, FIG. 33D depicts that the second parameter 3324 exhibits a corresponding responsive deviation 3329' that is delayed relative to what occurred in the initial perturbation 3326 depicted in FIG. 33C. In FIG. 33D, the times $t_4$', $t_5$', $t_6$' and $t_7$ ' correspond to the times at which the responsive deviation 3329' would have occurred relative to the perturbation 3326'. However, as can be seen in FIG. 33D, the responsive deviation 3329' is delayed, commencing at a time $t_0$'+$t_d$", rather than at a time $t_0$'+$t_d$', as would have been expected. As a result, the responsive deviation 3329' occurs at a time $t_4$'" and extends through a time $t_7$ ". In addition to the shift in delay time (i.e., that the corresponding deviation 3329' in the parameter 3324 occurs at a time $t_d$'", instead of at the time $t_d$', the period 3330' over which the corresponding deviation 3329' occurs is compressed in FIG. 33D. That is, the time between the time $t_4$' and the time $t_7$' is longer than the time between time $t_4$" and the time $t_7$". Both the delay and the compression may be indicative that the process has drifted between the time period depicted in FIG. 33C and the time period in FIG. 33D. This drift could indicate any number of issues with the process and, in embodiments, the drift and compression may have known relationships (i.e., in the contextual repository 49) to specific causes.

While the example depicted in FIGS. 33C and 33D illustrates the use of the perturbations and responses in combination with the enhanced search capabilities and contextual knowledge to recognize and/or characterize drift in a system (i.e., operation that deviates from initial conditions over time), perturbations in combination with the enhanced search capabilities and contextual knowledge may also be used, in embodiments, to characterize the expected, nominal operation of the system. This characterization may be useful in modeling and, specifically, in machine-learning based modeling, for predicting behavior of various parameters in response to different stimuli.

Figure 33E:
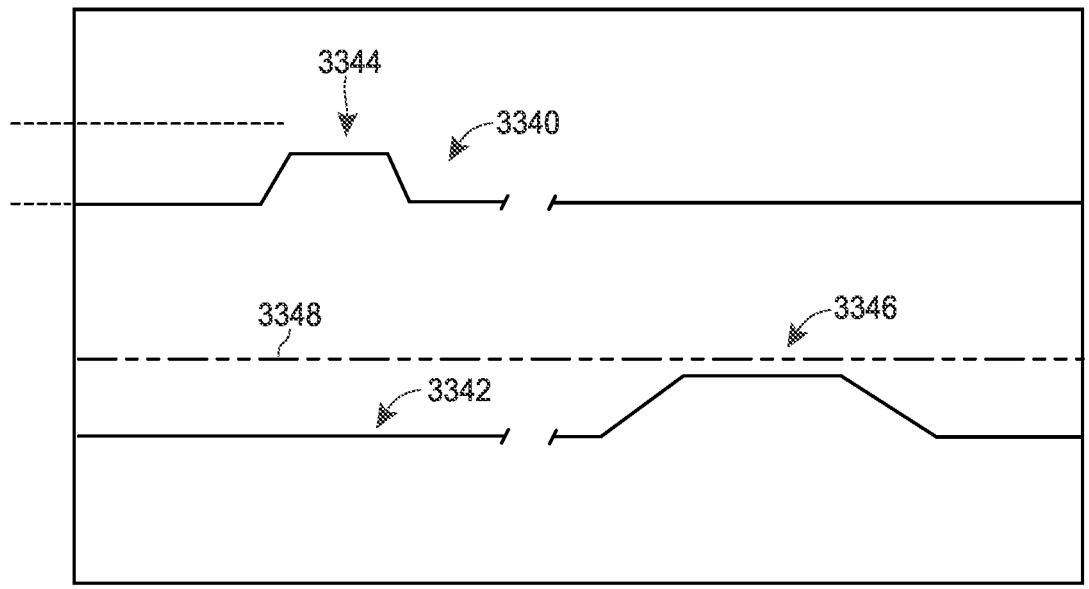
Figure 33F:
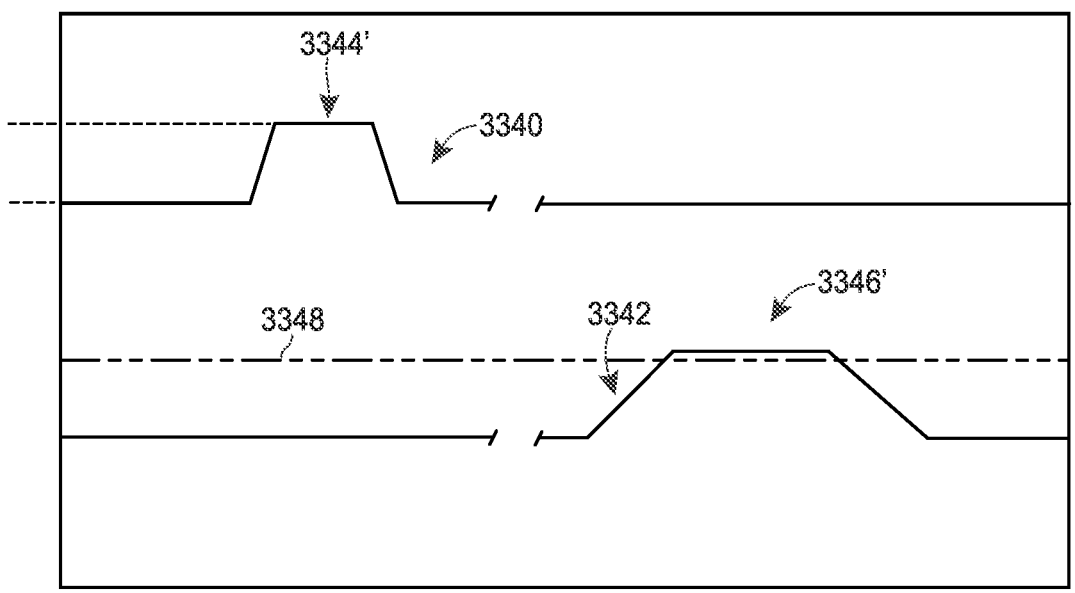

In contrast to the introduction of perturbations for the purpose of detecting and characterizing drift, in which identical perturbations are introduced at different times, characterization of system response to various changes in parameters may be accomplished, in some embodiments, by introducing into the process control system perturbations of various parameters and by varying the characteristics of the introduced perturbations and monitoring, recording, and analyzing the response of the system. FIGS. 33E and 33F illustrate this concept. FIG. 33E depicts values over time for two parameters 3340 and 3342. A first perturbation 3344 is introduced in the parameter 3340, and results in a responsive deviation 3346 in the parameter 3342. In the depicted example, the responsive deviation 3346 results in a maximum value of the parameter 3342 that remains below a hypothetical boundary value (e.g., a value above which the product may no longer be certified/usable) indicated by a line 3348. FIG. 33F depicts values over time for the same two parameters 3340 and 3342, at a different point in time. A second perturbation 3344', having a greater magnitude than the first perturbation 3344, is introduced in the parameter 3340. The second perturbation 3344' results in a second responsive deviation 3346' in the parameter 3342. However, in contrast to responsive deviation 3346 in FIG. 33E, the higher-magnitude perturbation 3344' results in the corresponding responsive deviation 3346' in FIG. 33F exceeding the boundary value 3348. By analyzing these data, which may be streamed to the data lake 40 and ingested into the temporal repository 51, in view of the contextual knowledge stored in the contextual repository 49, the system (e.g., through use of the contextual knowledge miner 45) may determine and document relationships between changes in amplitude of a first parameter and responses of one or more second parameters. As a result, responses to different perturbations may be understood and characterized and the system, allowing the process control system to control the process plant in a manner that maintains key parameter values within acceptable bounds.

Figure 33G:
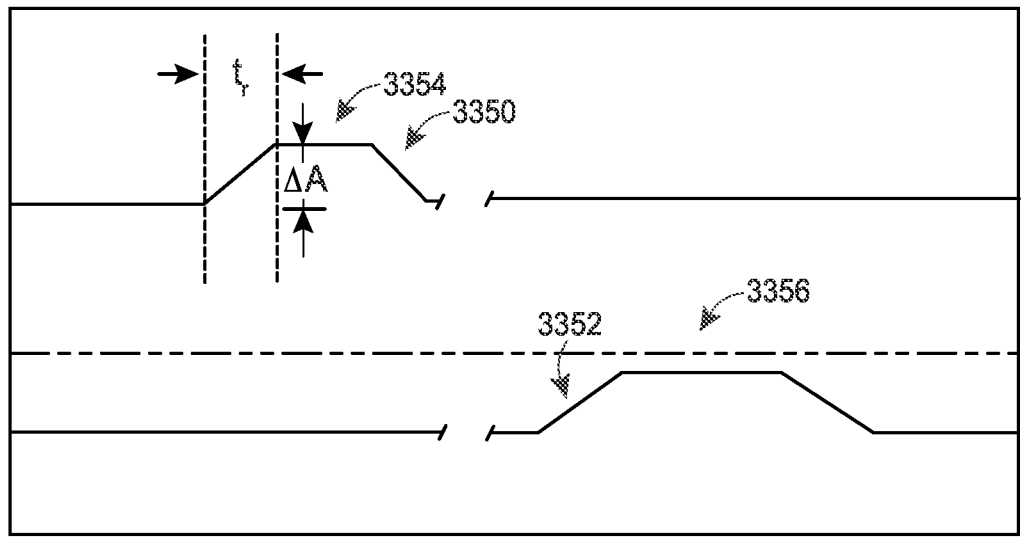
Figure 33H:
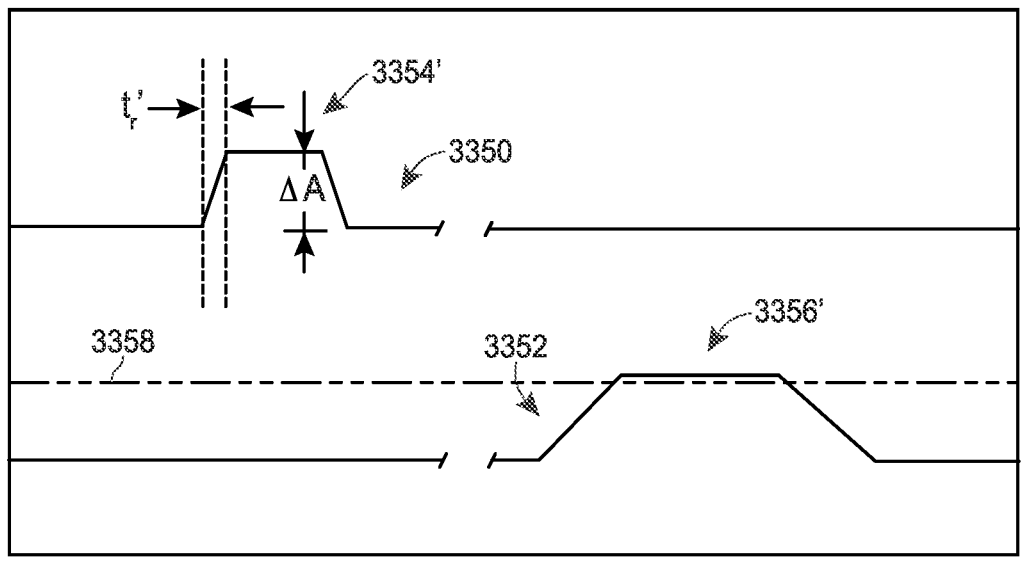

The system, aided by the contextual knowledge miner 45, may also identify and characterize the effects of various rate-of-change values for controlled parameters by analyzing the responses of various other parameters to perturbations. FIGS. 33G and 33H illustrate one such example. FIG. 33G depicts values over time for two parameters 3350 and 3352. A first perturbation 3354 is introduced in the parameter 3350, and results in a responsive deviation 3356 in the parameter 3352. The first perturbation 3354 increases the value of the parameter 3350 by a magnitude, $\Delta A$. The increase in the magnitude of the parameter 3350 occurs over a time period $t_r$, resulting in a first rate-of-change, $\Delta A/t_r$. In the depicted example, the responsive deviation 3356 results in a maximum value of the parameter 3352 that remains below a hypothetical boundary value (e.g., a value above which the product may no longer be certified/usable) indicated by a line 3358. FIG. 33H depicts values over time for the same two parameters 3350 and 3352, at a different point in time. A second perturbation 3354', resulting in a magnitude, $\Delta A$, identical to the first perturbation 3354, is introduced in the parameter 3350, but the increase in the value of the parameter 3352 occurs over a time period $t_r'<t_r$, and therefore results in a higher rate-of-change $\Delta A/t_r'$. The second perturbation 3354' results in a second responsive deviation 3356' in the parameter 3352. However, in contrast to responsive deviation 3356 in FIG. 33G, the higher rate-of-change of the perturbation 3354' results in the corresponding responsive deviation 3356' in FIG. 33H exceeding the boundary value 3358. By analyzing these data, which may be streamed to the data lake 40 and ingested into the temporal repository 51, in view of the contextual knowledge stored in the contextual repository 49, the system (e.g., through use of the contextual knowledge miner 45) may determine and document relationships between changes in rate-of-change of a first parameter and responses of one or more second parameters. As a result, responses to different perturbations may be understood and characterized and the system, allowing the process control system to control the process plant in a manner that maintains key parameter values within acceptable bounds.

Figure 33I:
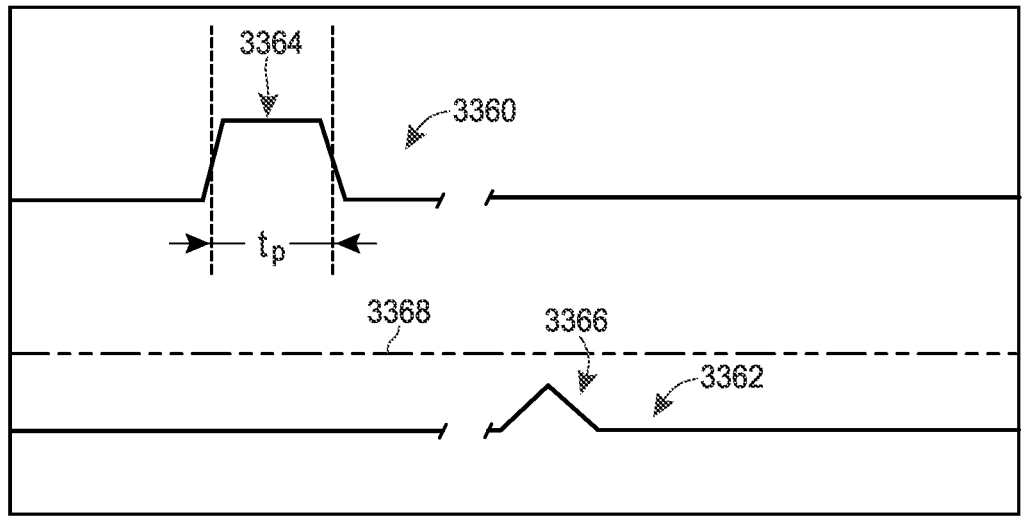
Figure 33J:
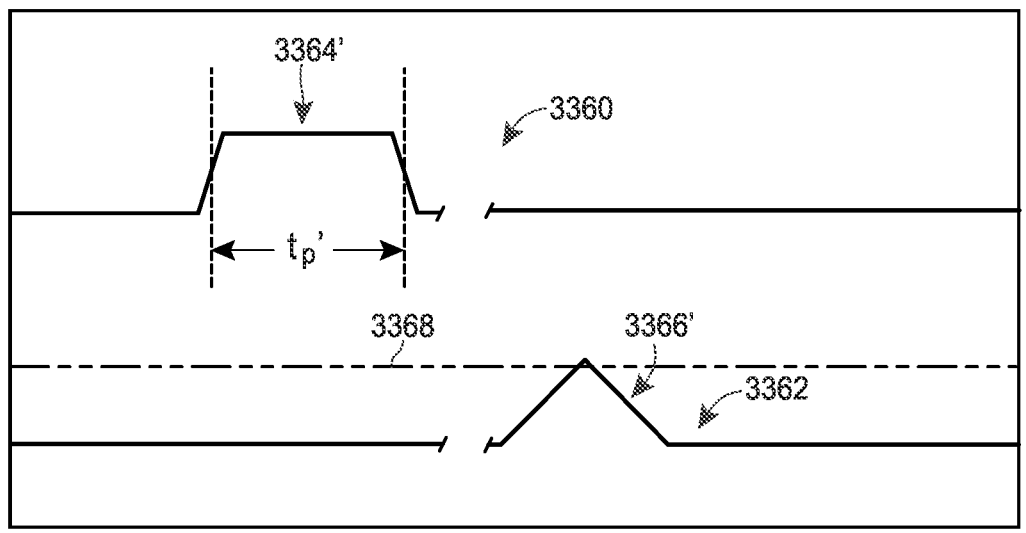

The effects of other characteristics of perturbations may similarly be explored. FIGS. 33I and 33J illustrate yet another example, this time related to differences in duration (as opposed to magnitude, rate-of-change, etc.) of a perturbation. FIG. 33I depicts values over time for two parameters 3360 and 3362. A first perturbation 3364 is introduced in the parameter 3360, and results in a responsive deviation 3366 in the parameter 3362. The first perturbation 3364 increases the value of the parameter 3360 for a period $t_p$. In the depicted example, the responsive deviation 3366 results in a maximum value of the parameter 3362 that remains below a hypothetical boundary value (e.g., a value above which the product may no longer be certified/usable) indicated by a line 3368. FIG. 33J depicts values over time for the same two parameters 3360 and 3362, at a different point in time. A second perturbation 3364', having the same difference in amplitude as the perturbation 3364 and having rates-of-change identical to the perturbation 3364, but having a longer duration $t_p'>t_p$, is introduced in the parameter 3360. The second perturbation 3364' results in a second responsive deviation 3366' in the parameter 3362. However, in contrast to responsive deviation 3366 in FIG. 33I, the longer duration of the perturbation 3364' results in the corresponding responsive deviation 3366' in FIG. 33J exceeding the boundary value 3358.

Each of the examples illustrated in FIGS. 33B through 33J shows a comparison of a response of a single parameter to a perturbation in another individual parameter. However, while not depicted in these examples, it should be explicitly understood that the system may actually monitor multiple/ many/all parameters in the system to determine corresponding responses to perturbation of any other parameter. By introducing a variety of perturbation types in each of a variety of parameters, the process control system may be characterized (i.e., contextual relationships determined and stored) with minimal disruption to the operation of the process plant, and, using the determined and stored contextual relationships, the process control system and, in particular, the algorithms executed by the process controller(s) may be adapted to better control the process to keep various parameters within (sometimes critical) bounds.

Figure 34A:
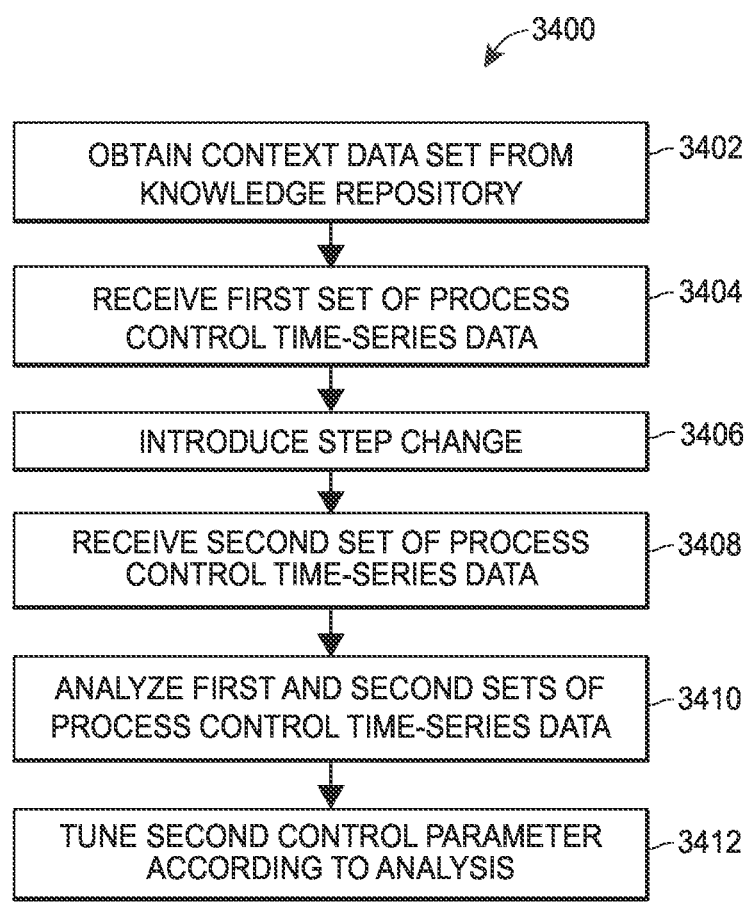
FIG. 34A illustrates a flow diagram of an example method for implementing step testing.

FIG. 34A is a flow chart depicting an example method 3400 that may implement step testing using the enhanced search capabilities. The method 3400 includes obtaining a data set from the knowledge repository 42, which knowledge repository 42 stores process configuration data related to the process and a graph database (e.g., graph data 53) storing contexts associated with the process configuration data (block 3402). A first set of process control data is received and includes time-series data of a plurality of parameters in the process plant, which time-series data were or are collected during operation of the process (block 3404). The method includes causing the process controller to introduce a step change in a control parameter of the process plant (block 3406) and receiving a second set of process control data that includes time-series data of the plurality of parameters in the process plant (block 3408). The second set of time-series data includes at least data for a period extending from a time at which the step change is introduced, through a later time (e.g., 5 minutes later, 10 minutes later, 1 hour later, etc.). The length of time covered by the second set of time-series data may be dependent, of course, on the type of system, the parameters that are affected by the step change, the time frame over which effects may be observed, etc. The first and second sets of process control data are analyzed, using the data set obtained from the knowledge repository, to make a determination related to one or more effects of the step change (block 3410), including, for example an effect of the step change of the first parameter on one or more second parameters.

As with the method 3300 related to introduction of perturbations, the method 3400 may be employed to characterize and/or detect drift in a process over time by introducing identical step changes at different times and analyzing the system response. The analysis of step changes according to the method 3400 may also be used, in embodiments, to determine what types of step changes (what magnitudes, rates-of-change, etc.) can be tolerated by the system without pushing the system outside of specified production parameters. Propagation times of effects may also be measured using the method 3400, and the time it takes for a step change in one parameter to have an effect on one or more other parameters or entities of the process plant measured. As will be described, these measurements may, in part, be used to determine optimal (or non-optimal) product (or byproduct, or material) sampling times. Still further, the method 3400 may be used to determine or predict a tuned value of a second control parameter in response to a particular step change in a first parameter, allowing for the process as a whole to be maintained in a better state by proactively adjusting one or more second parameters when a step change is required to be made in a first parameter, rather than waiting to observe the effect on the second parameter of the step change before tuning the second parameter.

The method 3400 may also include the use of similar or identical step changes at multiple process plants to detect and/or characterize differences between the process plants. In embodiments, such step changes may be used to determine whether one or more parameters have been changed at a process plant from a set of parameters initially disseminated, approved, certified, and/or implemented at the process plant.

Figure 34B:
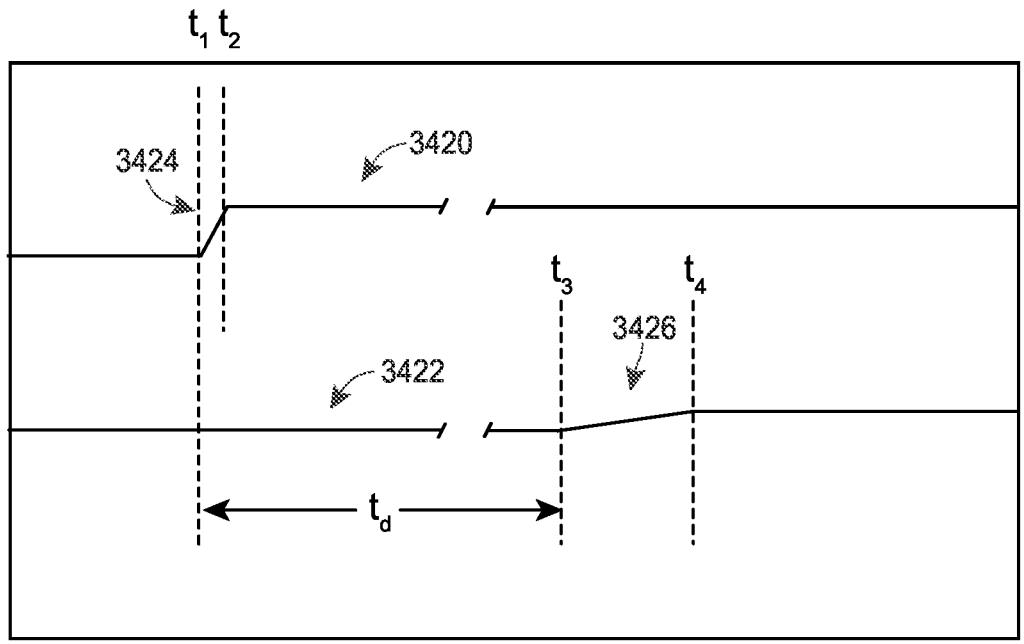
FIGS. 34B through 34I depict example signals illustrating various aspects of step testing.

FIGS. 34B through 33G depict various hypothetical example relationships between step changes applied to parameter values and the responsive effects of those step changes on other parameter values. Each of FIGS. 34B through 34G depicts a graph showing parameter values for two parameters, with the Y-axis representing the value of the parameter and the X-axis representing time. In each of the figures, the parameter on top is a parameter for which a step change is introduced (e.g., by a change in set point), while the parameter on bottom is a parameter that responds to the introduced step change. The two parameters depicted in each figure are not necessarily on the same scale on the Y-axis, but are depicted in the same figure for ease of reference and because they related to each other in time (i.e., on the X-axis). Further, while any given example may depict that a step change of a given type applied to a first parameter causes a given type of responsive deviation in a second parameter, these figures are exemplary only and not intended to be limiting. That is, while a given figure may show that responses to step changes vary by time (or by magnitude, by rate of change, etc.), in reality, it should be understood that a change in magnitude of a step change may result in a response that varies by timing or by rate of change, a change in rate of change of the step change may result in a change in magnitude of the response, etc.

Figure 34C:
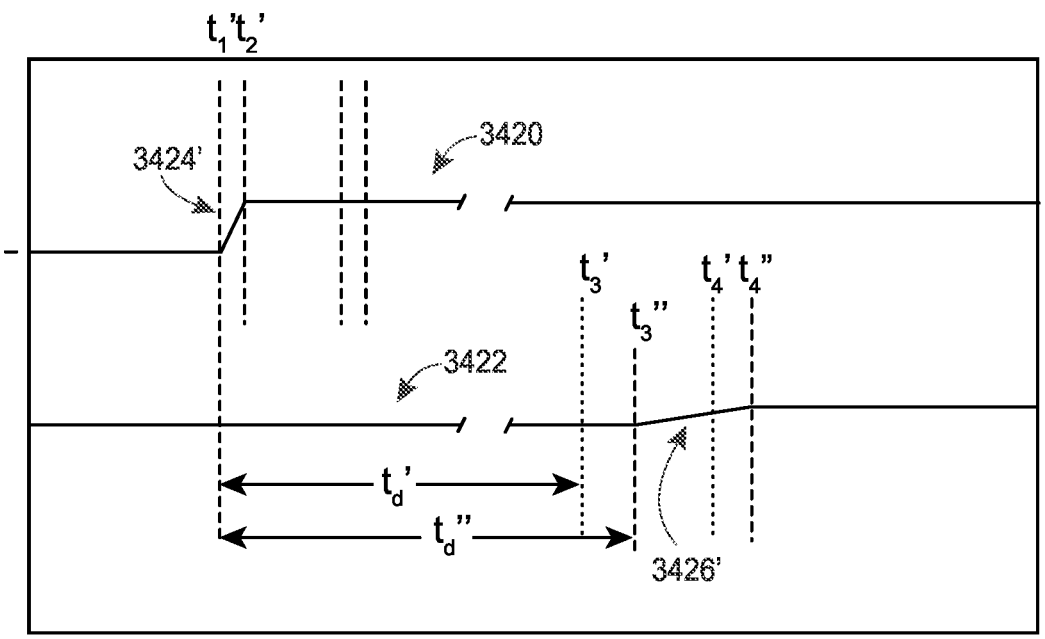

FIGS. 34B and 34C illustrate the detection of process drift by introduction of a step change. In the FIG. 34B, values over time for two parameters 3420 and 3422 are depicted. A step change 3424 is introduced to the parameter 3420 at a time $t_1$, causing the value of the parameter 3420 to rise from an initial value to a new value between the time $t_1$ and a time $t_2$. At a time $t_3$, delayed from the initiation of the step change by a time $t_d$, the parameter 3422 exhibits a responsive deviation 3426 as a result of the step change 3424. The value of the parameter 3422 increases from the time $t_3$ to a time $t_4$, before reaching a new steady state. At a later time, illustrated in FIG. 34C, also depicting the values over time of the parameters 3420 and 3422, a step change 3424', identical to the step change 3424 (i.e., having the same magnitude and rise time of the step change 3424), is initiated at a time $t_1'$, and the value of the parameter 3420 increases from the time $t_1'$ to a time $t_2'$. Based on the results of the step change 3424 depicted in FIG. 34B, the commencement of a deviation responsive to the step change would be expected at a time $t_3'$ approximately a time $t_d'$ after the initiation of the step change 3424'. However, as illustrated in FIG. 34C, the illustrated system has drifted, and the deviation responsive to the step change 3424' at time $t_1'$ commences at a time $t_3''$, at a time $t_d''$ after the time $t_1'$. The parameter 3422 increases between the time $t_3''$ and a time $t_4''$, before reaching a new steady state value at the time $t_4''$. The delay (i.e., the difference between $t_d$ and $t_d'$) may be indicative that the process has drifted between the time period depicted in FIG. 34B and the time period in FIG. 34C. This drift could indicate any number of issues with the process and, in embodiments, the drift and compression may have known relationships (i.e., in the contextual repository 49) to specific causes.

While the example depicted in FIGS. 34B and 34C illustrates the use of the step changes and responses in combination with the enhanced search capabilities and contextual knowledge to recognize and/or characterize drift in a system (i.e., operation that deviates from initial conditions over time), step changes in combination with the enhanced search capabilities and contextual knowledge may also be used, in embodiments, to characterize the expected, nominal operation of the system. This characterization may be useful in modeling and, specifically, in machine-learning based modeling, for predicting behavior of various parameters in response to different stimuli.

Figure 34D:
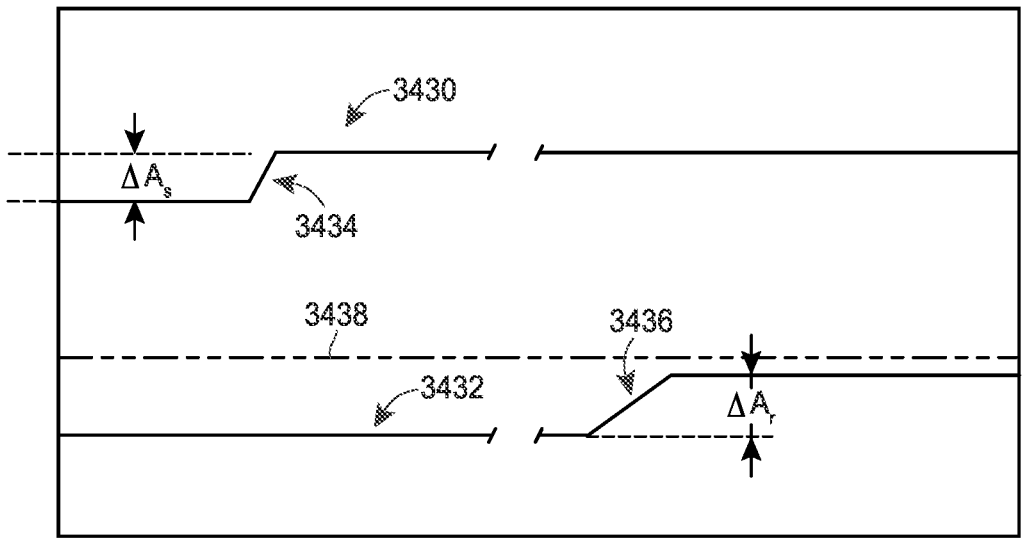
Figure 34E:
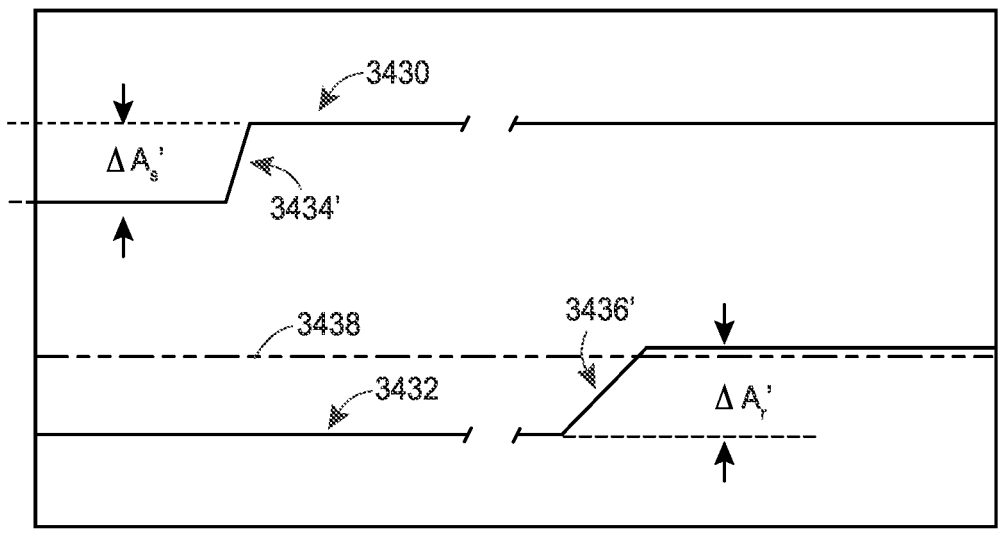

In contrast to the introduction of step changes for the purpose of detecting and characterizing drift, in which identical step changes are introduced at different times, characterization of system response to various changes in parameters may be accomplished, in some embodiments, by introducing into the process control system step changes of various parameters and by varying the characteristics of the introduced step changes and monitoring, recording, and analyzing the response of the system. FIGS. 34D and 34E illustrate this concept. FIG. 34D depicts values over time for two parameters 3430 and 3432. A first step change 3434 is introduced in the parameter 3430. The first step change 3434 increases the value of the parameter 3434 by a magnitude $\Delta A_s$, and results in a responsive deviation 3436 in the parameter 3432 and, specifically, an increase in the value of the parameter 3432 by a magnitude $\Delta A_r$. In the depicted example, the responsive deviation 3436 results in a maximum value of the parameter 3432 that remains below a hypothetical boundary value (e.g., a production value above which the product may no longer be certified/usable) indicated by a line 3438. FIG. 34E depicts values over time for the same two parameters 3430 and 3432, at a different point in time. A second perturbation 3434', having a greater magnitude than the first perturbation 3434, is introduced in the parameter 3430, increasing the value of the parameter 3430 by a magnitude $\Delta A_s'$. The second perturbation 3434' results in a second responsive deviation 3436' in the parameter 3342, the second responsive deviation 3436' increasing the value of the parameter 3432 by a magnitude $\Delta A_r'$. However, in contrast to responsive deviation 3436 in FIG. 34D, the higher-magnitude perturbation 3434' results in the corresponding responsive deviation 3436' in FIG. 34E exceeding the boundary value 3438. By analyzing these data, which may be streamed to the data lake 40 and ingested into the temporal repository 51, in view of the contextual knowledge stored in the contextual repository 49, the system (e.g., through use of the contextual knowledge miner 45) may determine and document relationships between changes in amplitude of a first parameter and responses of one or more second parameters. As a result, responses to different step changes may be understood and characterized and the system, allowing the process control system to control the process plant in a manner that maintains key parameter values within acceptable bounds.

Figure 34F:
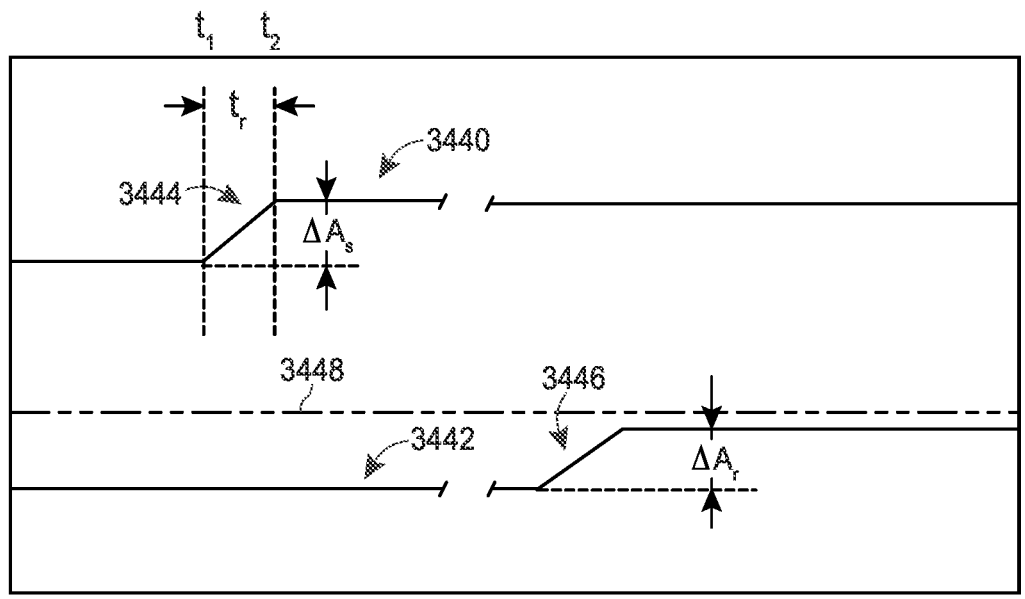
Figure 34G:
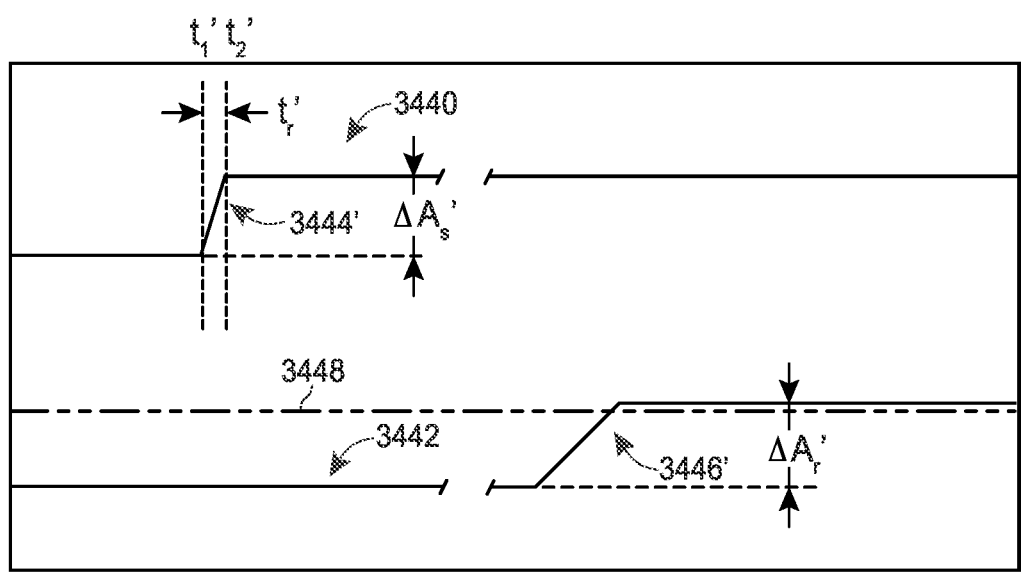

The system, aided by the contextual knowledge miner 45, may also identify and characterize the effects of various rate-of-change values for controlled parameters by analyzing the responses of various other parameters to step changes. FIGS. 34F and 34G illustrate one such example. FIG. 34F depicts values over time for two parameters 3440 and 3442. A first step change 3444 is introduced in the parameter 3440, and results in a responsive deviation 3446 in the parameter 3442. The first step change 3444 increases the value of the parameter 3440 by a magnitude $\Delta A_s$. The increase in the magnitude of the parameter 3440 occurs over a time period $t_r$, resulting in a first rate-of-change, $\Delta A_s/t_r$. In the depicted example, the responsive deviation 3446, having a magnitude $\Delta A_r$, results in a new steady state value of the parameter 3442 that remains below a hypothetical production value (e.g., a value above which the product may no longer be certified/usable) indicated by a line 3448. FIG. 34G depicts values over time for the same two parameters 3440 and 3442, at a different point in time. A second step change 3444', increases the value of the parameter 3440 by a magnitude, $\Delta A_s'$, identical to the first step change 3444, is introduced in the parameter 3440, but the increase in the value of the parameter 3442 occurs over a time period $t_r'<t_r$, and therefore results in a higher rate-of-change $\Delta A_s'/t_r'$. The second step change 3444' results in a second responsive deviation 3446' in the parameter 3442, having a magnitude $\Delta A_r'$. However, in contrast to responsive deviation 3446 in FIG. 34G, the higher rate-of-change of the step change 3444' results in the corresponding responsive deviation 3446' in FIG. 34G exceeding the boundary value 3448. By analyzing these data, which may be streamed to the data lake 40 and ingested into the temporal repository 51, in view of the contextual knowledge stored in the contextual repository 49, the system (e.g., through use of the contextual knowledge miner 45) may determine and document relationships between changes in rate-of-change of a first parameter and responses of one or more second parameters. As a result, responses to different step changes may be understood and characterized and the system, allowing the process control system to control the process plant in a manner that maintains key parameter values within acceptable bounds.

Each of the examples illustrated in FIGS. 34B through 34G shows a comparison of a response of a single parameter to a step change in another individual parameter. However, while not depicted in these examples, it should be explicitly understood that the system may actually monitor multiple/many/all parameters in the system to determine corresponding responses to a step change of any other parameter. By introducing a variety of step change types in each of a variety of parameters, the process control system may be characterized (i.e., contextual relationships determined and stored) with minimal disruption to the operation of the process plant, and, using the determined and stored contextual relationships, the process control system and, in particular, the algorithms executed by the process controller(s) may be adapted to better control the process to keep various parameters within (sometimes critical) bounds.

Figure 34H:
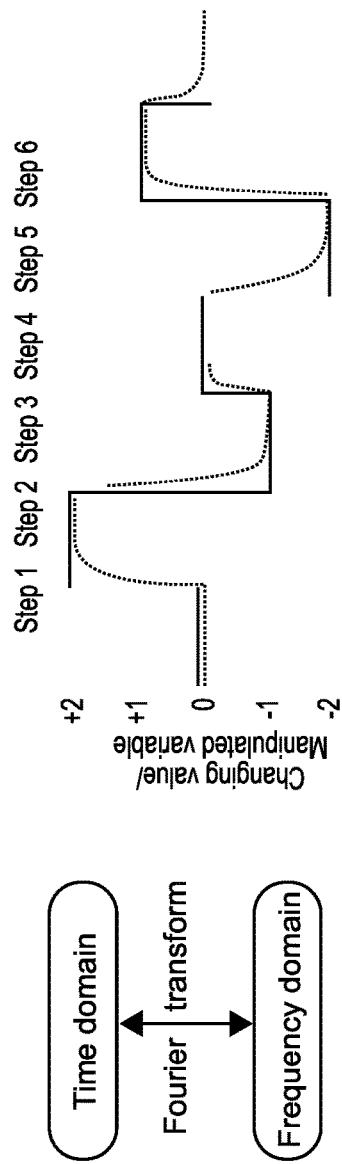
Figure 34I:
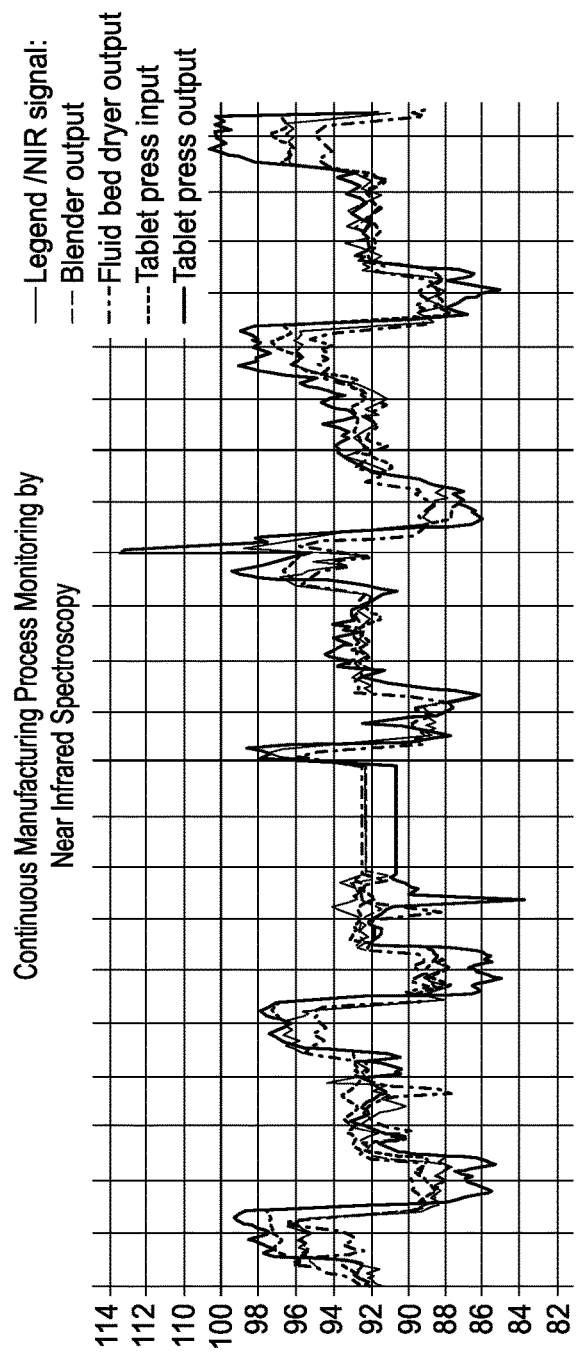

In further embodiments, multiple step changes of varying magnitudes and directions may be performed in sequence, as depicted in FIG. 34H. FIG. 34I shows, for a variety of parameters, the resulting propagated signals from the step test. Still further, in any of the methods related to introduction of step changes or perturbations of parameters, the system may be excited in the time domain, with time-series data captured, stored, and analyzed to mine for relationships between parameters. The value of these time-domain excitations, and the collected time-series data, may be enhanced by use of frequency domain analysis to analyze the whole spectrum of frequencies that results from the perturbations and/or step changes.

Figure 35A:
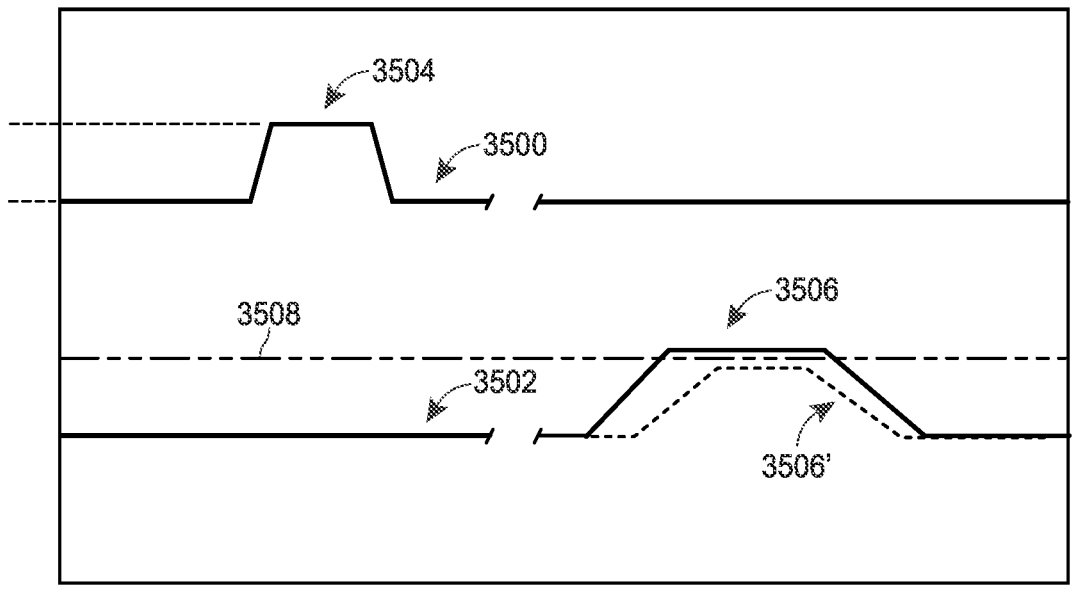
FIGS. 35A and 35B illustrate the use of perturbation and step testing to inform tuning of parameters to maintain a process within certain operational bounds or states.
Figure 35B:
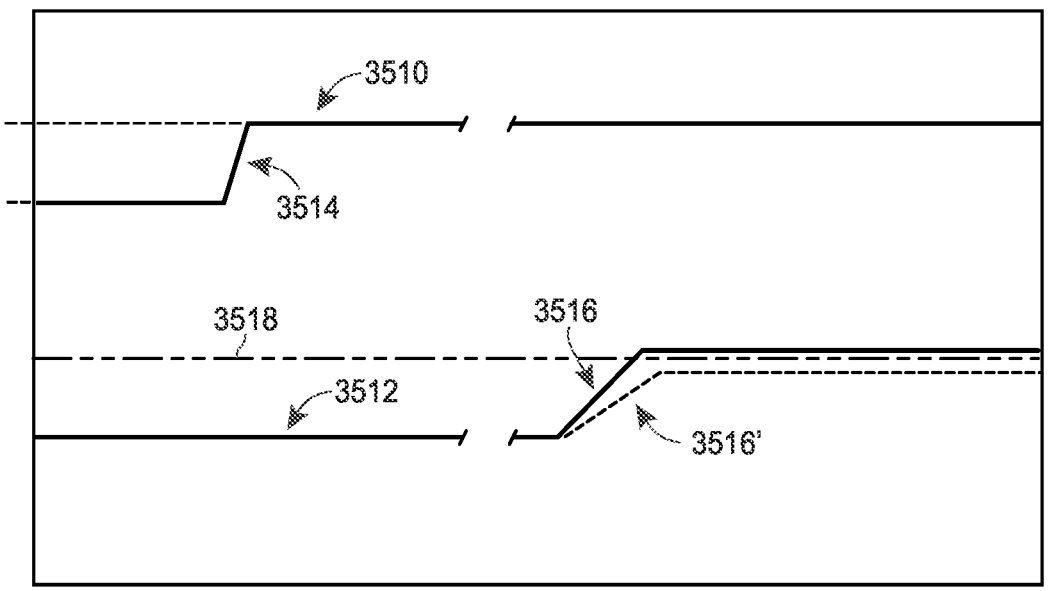

FIGS. 35A through 35D illustrate additional concepts related to the use of perturbations and step changes to detect and characterize various aspects of the process control system operation. Generally, FIGS. 35A and 35B illustrate that the methods described above, which facilitate understanding and prediction of responses of parameters to perturbations and step changes may be employed to inform tuning of parameters to maintain the process within certain operational bounds or states. In FIG. 35A, values over time for two parameters 3500 and 3502 are illustrated. A perturbation 3504 occurs in the parameter 3500 that, in the absence of other adjustments, would result in a responsive deviation 3506 in the parameter 3502, which deviation 3506 would push the parameter 3502 above a maximal acceptable value 3508. However, using the knowledge stored in the contextual repository 49, which indicates that the perturbation 3504 would necessarily cause the response 3506, the system can adjust one or more other parameters (e.g., tuning parameters) to proactively and preemptively tune the process such that the parameter 3502 instead exhibits a moderated response 3506' that keeps the maximum value of the parameter 3502 within acceptable bounds. FIG. 35B depicts a similar example for a step change. Values over time for two parameters 3510 and 3512 are illustrated in FIG. 35B. A step change 3514 occurs in the parameter 3510 that, in the absence of other adjustments, would result in a responsive deviation 3516 in the parameter 3512. The deviation 3516, absent some tuning or adjustment, would push the parameter 3512 above a maximal acceptable value 3518. However, using the knowledge stored in the contextual repository 49, which indicates that the step change 3514 would necessarily cause the response 3516, the system can adjust one or more other parameters (e.g., tuning parameters) to proactively and preemptively tune the process such that the parameter 3512 instead exhibits a moderated response 3516' that keeps the maximum value of the parameter 3512 within acceptable bounds.

Figure 35C:
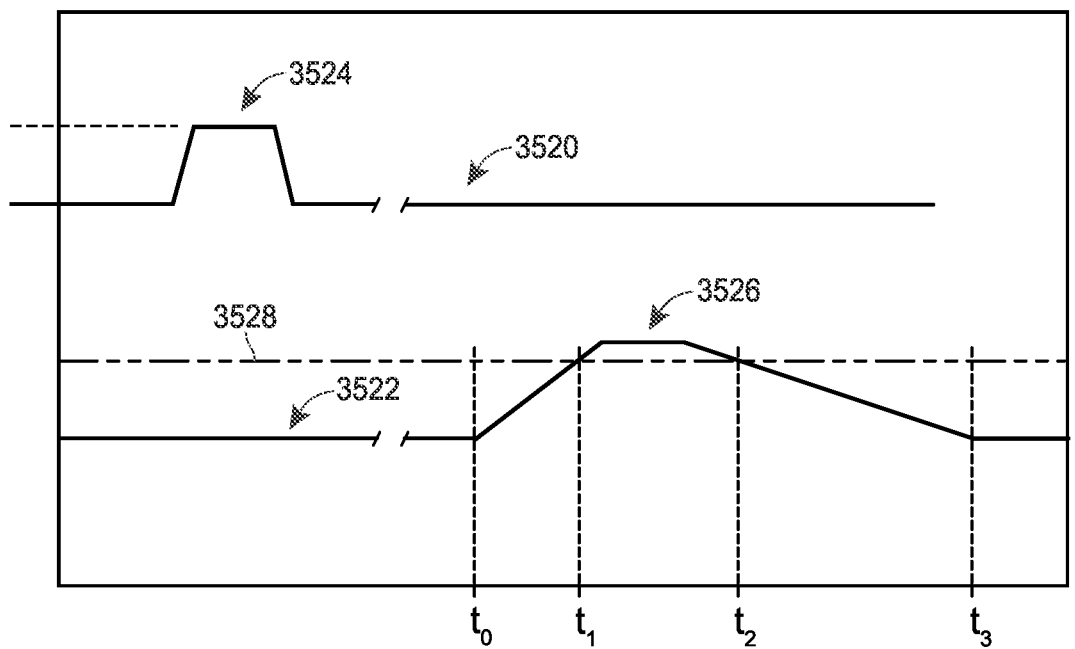
FIGS. 35C and 35D illustrate the use of perturbation and step testing to inform optimal sampling and/or testing times for parameters, products, or product intermediaries.
Figure 35D:
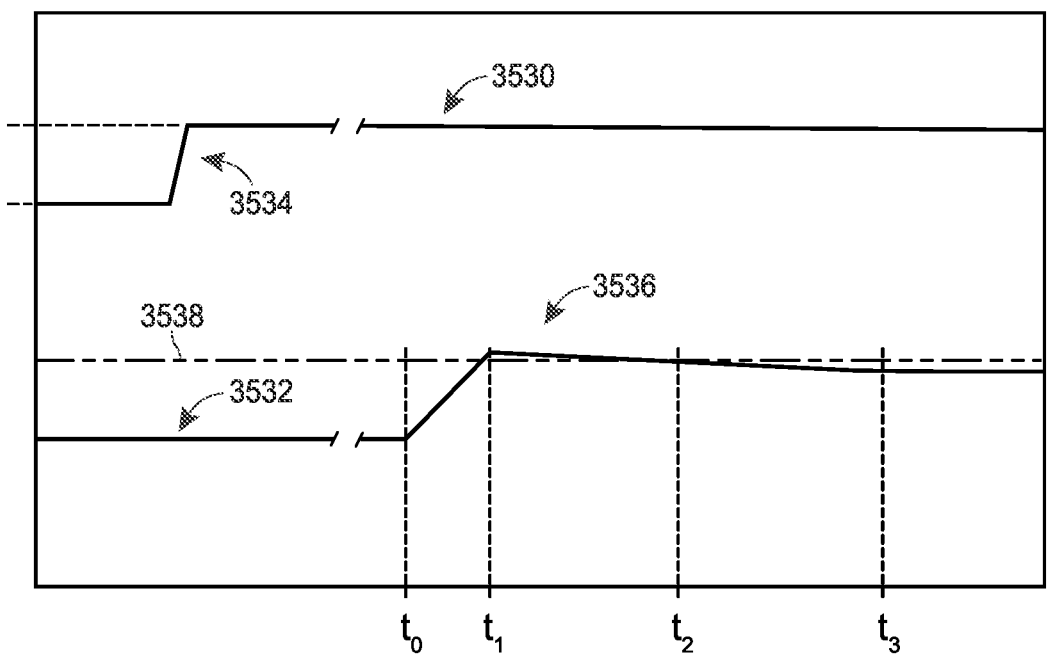

FIGS. 35C and 35D illustrate that the methods described above, which facilitate understanding and prediction of responses of parameters to perturbations and step changes may be employed to determine optimal times for sampling of parameters, products, or product intermediaries (i.e., materials used in the product or in the course of being manufactured into the product). The sampling in question may be sampling by a sensor of the process plant, may be an automated sampling and analysis unit, or may be performed manually (e.g., by extracting from the process a physical sample of material and performing a test/analysis of measureable physical properties of the sampled material). FIG. 35C illustrates values over time for two parameters 3520 and 3522. The parameter 3522 may be a process parameter that is required to be within certain bounds when sampled or may be a product parameter that must be within certain bounds when sampled. A perturbation 3524 of the parameter 3520 occurs at a first time (not indicated) and, sometime later, at a time to, the parameter 3522 commences a responsive deviation 3526. The value of the parameter 3526 rises for a first period, exceeding a boundary condition 3528 (e.g., a maximum allowable value for the parameter) at a time $t_1$. The parameter 3526 eventually begins to decrease, returning at a time $t_2$ to a value that is below the boundary condition 3528, before reverting to its pre-deviation value at a time $t_3$.

As can be seen, the perturbation tests described above may result in contextual knowledge stored in the contextual repository 49, that allows the system to predict the period (e.g., between the times $t_1$ and $t_2$) during which the sampled parameter will be outside of the boundary 3528, allowing the optimal (e.g., before time $t_1$ or after time $t_2$ for times at which the parameter 3522 is below the boundary condition 3528; before time $t_0$ or after time $t_3$ for times at which the parameter 3522 is at its nominal value, etc.) sampling time $t_0$ be determined in advance.

FIG. 35D illustrates a similar concept with regard to step changes. In FIG. 35D, a first parameter 3530 undergoes a step change 3534 at a first time (not indicated). At some later time t0, the step change 3534 in the parameter 3530 results in the commencement of a responsive change 3536 in a second parameter 3532. As illustrated in FIG. 35D, after commencing at a time to, the responsive change 3536 may overshoot its new steady state value, rising above a boundary condition value 3538 between a time $t_1$ and a time $t_2$, before settling to the new steady state value at a time $t_3$. As can be seen, the step change tests described above may result in contextual knowledge stored in the contextual repository 49, that allows the system to predict the period (e.g., between the times $t_1$ and $t_2$) during which the sampled parameter 3532 will be outside of the boundary 3538, allowing the optimal (e.g., before time $t_1$ or after time $t_2$ for times at which the parameter 3532 is below the boundary condition 3538; before time $t_0$ or after time $t_3$ for times at which the parameter 3532 is at its steady state value, etc.) sampling time $t_0$ be determined in advance and, potentially, reducing wasted product.

When implemented in software, any of the applications, services, and engines described herein may be stored in any tangible, non-transitory computer readable memory such as on a magnetic disk, a laser disk, solid state memory device, molecular memory storage device, or other storage medium, in a RAM or ROM of a computer or processor, etc. Although the example systems disclosed herein are disclosed as including, among other components, software and/or firmware executed on hardware, it should be noted that such systems are merely illustrative and should not be considered as limiting. For example, it is contemplated that any or all of these hardware, software, and firmware components could be embodied exclusively in hardware, exclusively in software, or in any combination of hardware and software. Accordingly, while the example systems described herein are described as being implemented in software executed on a processor of one or more computer devices, persons of ordinary skill in the art will readily appreciate that the examples provided are not the only way to implement such systems.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

The particular features, structures, and/or characteristics of any specific embodiment may be combined in any suitable manner and/or in any suitable combination with one and/or more other embodiments, including the use of selected features with or without corresponding use of other features. In addition, many modifications may be made to adapt a particular application, situation and/or material to the essential scope or spirit of the present invention. It is to be understood that other variations and/or modifications of the embodiments of the present invention described and/or illustrated herein are possible in light of the teachings herein and should be considered part of the spirit or scope of the present invention. Certain aspects of the invention are described herein as exemplary aspects.

Embodiments of the techniques described in the present disclosure may include any number of the following aspects, either alone or combination:

1A. A method for external devices to securely interact with a process control system of a process plant, the method comprising: obtaining, by an edge gateway system of the process control system during runtime of an industrial process being controlled by the process control system, a data set from a knowledge repository storing process content data related to the industrial process and context data indicative of relationships between the process content data, the data set being responsive to a query of the knowledge repository; providing, by the edge gateway system, the data set to an external application executing on one or more computing devices external to cybersecurity barriers of the process control system; receiving, by the edge gateway system and responsive to the provided data set, an instruction corresponding to the runtime industrial process; and causing, by the edge gateway system, a modification to at least one of an operation or a data store within the cybersecurity barriers of the process control system in accordance with the received instruction.

2A. The method according to aspect 1A, wherein providing the data set to the external application includes providing the data set to a user interface application executing on a computing device of an agent of the process control system or the process plant.

3A. The method according to any one of the preceding aspects, wherein providing the data set to the external application includes providing the data set to a remote process control system application executing on one or more remote computing devices.

4A. The method according to any one of the preceding aspects, wherein providing the data set to the external application includes providing the data set to an enterprise application executing on one or more remote computing devices, the enterprise application provided by an enterprise associated with the process control system.

5A. The method according to any one of the preceding aspects, wherein providing the data set to the external application includes providing the data set to a third-party application provided by a third-party.

6A. The method according to any one of the preceding aspects, wherein providing the data set to the external application includes providing the data set to a soft or smart sensor application.

7A. The method according to any one of the preceding aspects, wherein providing the data set to the external application includes providing the data set to a web client application.

8A. The method according to any one of the preceding aspects, providing the data set to the external application includes providing the data set to an external application executing on a mobile device.

9A. The method according to any one of the preceding aspects, further comprising updating, by the edge gateway system, the knowledge repository to include (i) additional content data indicative of at least one of the query, the data set, the instruction, or the modification, and (ii) additional context data indicative of respective relationships between the at least two of the query, the data set, the instruction, or the modification.

10A. The method according to any one of the preceding aspects, further comprising receiving, by the edge gateway system, a search query, and wherein obtaining the data set from the knowledge repository is responsive to the search query.

11A. The method according to aspect 10A, wherein the query of the knowledge repository is a repository access query, and the method further comprises generating, by the edge gateway system, the repository access query based on the received search query.

12A. The method according to aspect 10A or aspect 11A, wherein receiving the search query includes receiving a natural language search query entered by a user.

13A. The method according to aspect 12A, wherein receiving the natural language search query entered by the user includes receiving a voice natural language search query entered via a microphone.

14A. The method according to aspect 12A or aspect 13A, wherein receiving the natural language search query entered via by the user includes receiving a textual natural language search query entered via a keyboard, a touchscreen, or another text input user interface.

15A. The method according to any one aspects 12A to 14A, further comprising: resolving, by the edge gateway system, a domain of the natural language search query; and querying, by the edge gateway system, the knowledge repository based on the domain, wherein obtaining the data set from the knowledge repository is responsive to the domain-based query.

16A. The method according to aspect 15A, wherein resolving the domain of the natural language search query includes utilizing the knowledge repository to resolve the domain of the natural language search query.

17A. The method according to aspect 15A or aspect 16A, wherein resolving the domain of the natural language search query includes resolving the domain of the natural language search query to a module, a block, a batch name, or another process control entity defined in the process control system.

18A. The method according to aspect 17A, wherein resolving the domain of the natural language search query comprises resolving the domain of the natural language search query further based on an identity of a user of an operator computing device.

19A. The method according to any one aspects 10A to 18A, wherein receiving the search query includes receiving the search query from the external application.

20A. The method according to any one aspects 10A to 18A, wherein receiving the search query includes receiving a search query generated by a web client application.

21A. The method according to any one aspects 10A to 18A, wherein receiving the search query includes receiving a search query that has been automatically generated by a soft or smart sensor application.

22A. The method according to any one of the preceding aspects, wherein receiving the instruction includes receiving the instruction from a remote process control system application executing on one or more remote computing devices.

23A. The method according to any one of the preceding aspects, wherein receiving the instruction includes receiving the instruction from an enterprise application executing on one or more remote computing devices, the enterprise application provided by an enterprise associated with the process control system.

24A. The method according to any one of the preceding aspects, wherein receiving the instruction includes receiving the instruction from a third-party application provided by a third-party.

25A. The method according to any one of the preceding aspects, wherein receiving the instruction includes receiving an instruction that has been automatically generated by a soft or smart sensor application.

26A. The method according to any one of the preceding aspects, wherein receiving the instruction includes receiving the instruction from a web client application.

27A. The method according to any one of the preceding aspects, wherein receiving the instruction includes receiving the instruction from an external application executing on a mobile device.

28A. The method according to any one of the preceding aspects, wherein: receiving the instruction corresponding to the runtime industrial process includes receiving a command to write a data value to the process control system, the data value determined based on the provided data set; and the modification includes the writing of the data value to the data store.

29A. The method according to aspect 28A, wherein the modification further includes a modification to an operation of the process control system based on the written data value.

30A. The method according to aspect 28A or aspect 29A, wherein: receiving the command to write the data value to the process control system comprises receiving a command to change a current data value stored in the data store of the process control system; and the modification includes the changing of the current data value to the data value indicated by the command.

31A. The method according to any one of aspects 28A to 30A, wherein: receiving the command to write the data value to the process control system comprises receiving a command to store a new data value at the process control system; and the modification includes the storing of the new data value.

32A. The method according to any one of aspects 28A to 31A, wherein: receiving the command to write the data value to the process control system comprises receiving a command to display the data value on a user interface of the process control system; and the modification includes the display of the data value on one or more user interfaces of the process control system.

33A. The method according to any one of aspects 28A to 32A, wherein: receiving the command to write the data value to the process control system comprises receiving a response to an alert or an alarm generated by the process control system; and causing the modification includes causing an indication of the response to the alert or the alarm to be delivered to an application, of the process control system, that generated the alert or the alarm.

34A. The method according to any one of aspects 28A to 33A, wherein: receiving the command to write the data value to the process control system comprises receiving a command to store an indication of a triggering condition that, upon occurrence, causes the process control system to generate a notification; and the modification includes the storage, in the data store, of an indication of the triggering condition.

35A. The method according to any one of the preceding aspects, wherein: receiving the instruction corresponding to the runtime industrial process includes receiving a command to modify a runtime operating behavior of the industrial process being controlled by the process control system.

36A. The method according to aspect 35A, wherein receiving the instruction to modify the runtime operating behavior of the industrial process being controlled by the process control system includes receiving a command to stop or start an execution of a batch process being controlled by the process control system.

37A. The method according to aspect 35A or aspect 36A, wherein receiving the instruction to modify the runtime operating behavior of the industrial process being controlled by the process control system includes receiving a command to display a prompt for a batch process being controlled by the process control system.

38A. The method according to any one of aspects 35A to 37A, wherein receiving the instruction to modify the runtime operating behavior of the industrial process includes receiving a command to stop or start an execution of a portion of a continuous process being controlled by the process control system.

39A. The method according to any one of the preceding aspects, wherein receiving the instruction includes receiving the instruction from a user interface application executing on a computing device of an agent of the process control system or process plant.

40A. The method according to aspect 39A, wherein receiving the instruction from the user interface application executing on the agent computing device includes receiving a natural language command entered by the user, and the method further comprises: resolving a domain of the natural language command; and modifying the at least one of the operation or the data store of the process control system in accordance the domain.

41A. The method according to aspect 40A, wherein resolving the domain of the natural language command includes resolving the domain of the natural language command to a module, a block, a batch name, or another process control entity defined in the process control system.

42A. The method according to any one of the preceding aspects, wherein causing the modification to the at least one of the operation or the data store within the cybersecurity barriers of the process control system includes causing an indication of the modification to be delivered, via a plurality of intermediate servers disposed within the cybersecurity barriers of the process control system, to a recipient application or a recipient data store disposed within the cybersecurity barriers of the process control system.

43A. The method according to aspect 42A, wherein: causing the indication of the modification to be delivered via the plurality of intermediate servers includes transmitting the indication of the modification to a plant secured write gatekeeper in communicative connection with the plurality of intermediate servers; and the plant secured write gatekeeper validates the indication of the modification, transmits the indication of the modification to the plurality of intermediate servers when the validation is successful, and initiates a security mitigation procedure in lieu of transmitting the indication of the modification when the validation is not successful.

44A. A computing device for users to securely interact with a process control system of a process plant, the computing device comprising: one or more processors; one or more tangible, non-transitory, computer-readable memories; one or more user interfaces; one or more communication interfaces communicatively connecting the computing device with the process control system via a plurality of different communication paths; and a user interface application comprising computer-executable instructions stored on the one or more memories and executable to cause the computing device to, while the process control system is operating during run-time to control an industrial process: receive a data set obtained from a knowledge repository of the process control system, the knowledge repository storing process content data related to the industrial process and received from the process control system via a first communication path of the plurality of different communication paths, the first communication path being a unidirectional communication path configured to deliver data from process control system, and the knowledge repository further storing context data indicative of relationships between the process content data; present the data set on the one or more user interfaces of the computing device; obtain, via the one or more user interfaces and responsive to the presented data set, a user command to modify at least one of an operation or a data store of the process control system; and cause the user command to be transmitted to the process control system via a second communication path of the plurality of different communication paths, the second communication path being a unidirectional communication path configured to deliver data to the process control system.

45A. The computing device according to aspect 44A, wherein the data set is received by the user interface application in response to a query transmitted from the computing device to a query engine associated with the knowledge repository.

46A. The computing device according to aspect 45A, further comprising another application executing on the computing device, and wherein the another application autonomously generates and transmits the query to the query engine.

47A. The computing device according to aspect 46A, wherein the another application is a remote process plant application, a multi-plant application, a soft sensor application, an analytics application, or another type of application associated with the process plant.

48A. The computing device according to aspect 47A, wherein the another application is not communicatively connected to the one or more user interfaces of the computing device.

49A. The computing device according to any one of aspects 45A to 48A, wherein the user interface application is further configured to receive a user query via the one or more user interfaces of the computing device, and the query transmitted to the query engine is based on the user query.

50A. The computing device according to aspect 49A, wherein the user query is a natural language query.

51A. The computing device according to aspect 50A, wherein the natural language search query is a voice natural language query.

52A. The computing device according to aspect 50A or aspect 51A, wherein the natural language search query is a text natural language search query.

53A. The computing device according to any one of aspects 49A to 52A, wherein the user interface application is further configured to natural language process at least a portion of the user query, and the query transmitted to the query engine includes the at least the portion of the user query which has been natural language-processed.

54A. The computing device according to any one of aspects 49A to 53A, wherein the query engine is configured to natural language process at least some of the user query.

55A. The computing device according to any one of aspects 44A to 54A, wherein the user interface application is a web client or another type of client application executing on the computing device.

56A. The computing device according to any one of aspects 44A to 55A, wherein the computing device is a mobile computing device.

57A. The computing device according to any one of aspects 44A to 56A, wherein the computing device is disposed external to the process control system and external to the process plant.

58A. The computing device according to any one of aspects 44A to 57A, wherein the user command to modify the at least one of the operation or the data store of the process control system includes a command to write a data value to the process control system.

59A. The computing device according to any one of aspects 44A to 58A, wherein the user command to modify the at least one of the operation or the data store of the process control system includes a command to update a current data value stored at the process control system with the data value indicated in the instruction.

60A. The computing device according to aspect 59A, wherein the update to the current data value causes a modification to the operation of the process control system.

61A. The computing device according to any one of aspects 44A to 60A, wherein the user command to modify at least one of the operation or the data store of the process control system includes a command to store a new data value to the data store of the process control system.

62A. The computing device according to any one of aspects 44A to 61A, wherein the user command to modify at least one of the operation or the data store of the process control system includes a command to display a particular data value on one or more user interfaces of the process control system.

63A. The computing device according to any one of aspects 44A to 62A, wherein the user command to modify at least one of the operation or the data store of the process control system includes a command to display a response to an alert or an alarm generated by the process control system.

64A. The computing device according to any one of aspects 44A to 63A, wherein the user command to modify the at least one of the operation or the data store of the process control system includes a command to set a trigger condition that, upon occurrence, triggers the process control system to generate a notification.

65A. The computing device according to any one of aspects 44A to 64A, wherein the user command to modify the at least one of the operation or the data store of the process control system includes a user command to modify a runtime operating behavior of the industrial process being controlled by the process control system.

66A. The computing device according to aspect 65A, wherein the user command to modify the runtime operating behavior of the industrial process includes a user command to start or stop an execution of a batch industrial process.

67A. The computing device according to aspect 65A or aspect 66A, wherein the user command to modify the runtime operating behavior of the industrial process includes a user command to display a prompt for a batch industrial process.

68A. The computing device according to any one of aspects 65A to 67A, wherein the user command to modify the runtime operating behavior of the industrial process includes a user command to start or stop a portion of a continuous industrial process.

69A. The computing device according to any one of aspects 44A to 68A, wherein the second communication path includes a plurality of intermediate servers disposed between the computing device and the process control system.

70A. The computing device according to aspect 69A, wherein each intermediate server of the plurality of intermediate servers respectively validates at least one of the user command or a content of the user command prior to forwarding the user command towards the process control system.

71A. The computing device according to any one of aspects 44A to 70A, wherein the user interface application is executable to cause the computing device further to obtain, from the process control system via the first communication path, a response to the user command.

1B. A method in an industrial process control system executing a batch control algorithm to control a batch process in a process plant, the method comprising: obtaining, by one or more processors, a data set from a knowledge repository storing process data related to the batch process and contexts associated with the process data; receiving, by the one or more processors, a request for process data from the data set, via a user interface of the mobile computing device; identifying, by the one or more processors, process data from the data set that is related to the request; and presenting, by the one or more processors, the identified process data from the data set that is related to the request via the user interface of the mobile computing device based on the contexts associated with the identified process data.

2B. The method according to aspect 1B, wherein presenting the identified process data from the data set that is related to the request via the user interface of the mobile computing device based on the contexts associated with the identified process data includes prioritizing or modifying the presentation of the identified process data based on the contexts associated with the identified process data.

3B. The method according to aspect 2B, wherein prioritizing or modifying the presentation of the identified process data based on the contexts associated with the identified process data includes displaying a first subset of the identified process data based on first contexts associated with the first subset of the identified process data and not displaying a second subset of the identified process data based on second contexts associated with the second subset of the identified process data.

4B. The method according to aspect 2B or aspect 3B, wherein prioritizing or modifying the presentation of the identified process data based on the contexts associated with the identified process data includes displaying a first subset of the identified process data in a first location on a display screen of the mobile computing device based on first contexts associated with the first subset of the identified process data and displaying a second subset of the identified process data in a second location on the display screen of the mobile computing device based on second contexts associated with the second subset of the identified process data.

5B. The method according to any one of aspects 2B to 4B, wherein prioritizing or modifying the presentation of the identified process data based on the contexts associated with the identified process data includes displaying a first subset of the identified process data in a larger size via a display screen of the mobile computing device based on first contexts associated with the first subset of the identified process data and displaying a second subset of the identified process data in a smaller size via the display screen of the mobile computing device based on second contexts associated with the second subset of the identified process data.

6B. The method according to any one of aspects 2B to 5B, wherein prioritizing or modifying the presentation of the identified process data based on the contexts associated with the identified process data includes prioritizing an order of the presentation of the identified process data based on the contexts associated with the identified process data.

7B. The method according to any one of aspects 1B to 6B, wherein the contexts associated with the process data include one or more of: an alarm status associated with the process data, a batch ID associated with the process data, a type of equipment associated with the process data, or an area of the plant associated with the process data.

8B. The method according to any one of aspects 1B to 7B, wherein presenting the identified process data from the data set that is related to the request via the user interface of the mobile computing device based on the contexts associated with the identified process data includes further prioritizing or modifying the presentation of the identified process data based on one or more characteristics associated with the request received via the user interface of the mobile computing device.

9B. The method according to aspect 8B, wherein the one or more characteristics associated with the request include one or more of: words associated with the request, phrases associated with the request, indications of tone associated with the request, or indications of a level of urgency associated with the request.

10B. The method according to aspect 8B or aspect 9B, wherein the one or more characteristics associated with the request include an indication that the request is a verbal request captured by audio sensor associated with the user interface of the mobile computing device.

11B. The method according to any one of aspects 8B to 10B, wherein the one or more characteristics associated with the request include an indication that the request is a text request input via the user interface of the mobile computing device.

12B. The method according to any one of aspects 8B to 11B, wherein the one or more characteristics associated with the request include an indication that the request includes a user selection of one or more selectable elements displayed via the user interface of the mobile computing device.

13B. The method according to any one of aspects 1B to 12B, wherein presenting the identified process data from the data set that is related to the request via the user interface of the mobile computing device based on the contexts associated with the identified process data includes further prioritizing or modifying the presentation of the identified process data based on one or more characteristics associated with a display of the mobile computing device.

14B. The method according to aspect 13B, wherein the indications of one or more characteristics associated with the display of the mobile computing device include indications of one or more of: a type of the mobile computing device, a size of the mobile computing device, or a display screen size of the mobile computing device.

15B. The method according to aspect 13B or aspect 14B, wherein the indications of one or more characteristics associated with the display of the mobile computing device include an indication of whether the identified process data is to be presented via a web browser or a mobile device application.

16B. The method according to any one of aspects 13B to 15B, wherein the indications of one or more characteristics associated with the display of the mobile computing device include an indication of a relative size of a display window via which the identified process data is to be presented on a display screen of the mobile computing device.

17B. A computing device in an industrial process control system executing a batch control algorithm to control a batch process in a process plant, the computing device comprising: one or more processors; one or more tangible, non-transitory, computer-readable memories; one or more user interfaces; a user interface application comprising computer-executable instructions stored on the one or more memories and executable to cause the computing device to, while the process control system is operating during runtime to control an industrial process: obtain a data set from a knowledge repository storing process data related to the batch process and contexts associated with the process data; receive a request for process data from the data set, via a user interface of the mobile computing device; identify process data from the data set that is related to the request; and present the identified process data from the data set that is related to the request via the user interface of the mobile computing device based on the contexts associated with the identified process data.

18B. The computing device according to aspect 17B, wherein the instructions cause the computing device to present the identified process data from the data set that is related to the request via the user interface of the mobile computing device based on the contexts associated with the identified process data by prioritizing or modifying the presentation of the identified process data based on the contexts associated with the identified process data.

19B. The computing device according to aspect 18B, wherein the instructions cause the computing device to prioritize or modify the presentation of the identified process data based on the contexts associated with the identified process data by displaying a first subset of the identified process data based on first contexts associated with the first subset of the identified process data and not displaying a second subset of the identified process data based on second contexts associated with the second subset of the identified process data.

20B. The computing device according to aspect 18B or aspect 19B, wherein the instructions cause the computing device to prioritize or modify the presentation of the identified process data based on the contexts associated with the identified process data by displaying a first subset of the identified process data in a first location on a display screen of the mobile computing device based on first contexts associated with the first subset of the identified process data and displaying a second subset of the identified process data in a second location on the display screen of the mobile computing device based on second contexts associated with the second subset of the identified process data.

21B. The computing device according to any one of aspects 18B to 20B, wherein the instructions cause the computing device to prioritize or modify the presentation of the identified process data based on the contexts associated with the identified process data by displaying a first subset of the identified process data in a larger size via a display screen of the mobile computing device based on first contexts associated with the first subset of the identified process data and displaying a second subset of the identified process data in a smaller size via the display screen of the mobile computing device based on second contexts associated with the second subset of the identified process data.

22B. The computing device according to any one of aspects 18B to 21B, wherein the instructions cause the computing device to prioritize or modify the presentation of the identified process data based on the contexts associated with the identified process data by prioritizing an order of the presentation of the identified process data based on the contexts associated with the identified process data.

23B. The computing device according to any one of aspects 17B to 22B, wherein the contexts associated with the process data include one or more of: an alarm status associated with the process data, a batch ID associated with the process data, a type of equipment associated with the process data, or an area of the plant associated with the process data.

24B. The computing device according to any one of aspects 17B to 23B, wherein the instructions further cause the computing device to present the identified process data from the data set that is related to the request via the user interface of the mobile computing device based on the contexts associated with the identified process data by prioritizing or modifying the presentation of the identified process data based on one or more characteristics associated with the request received via the user interface of the mobile computing device.

25B. The computing device according to aspect 24B, wherein the one or more characteristics associated with the request include one or more of: words associated with the request, phrases associated with the request, indications of tone associated with the request, or indications of a level of urgency associated with the request.

26B. The computing device according to aspect 24B or aspect 25B, wherein the one or more characteristics associated with the request include an indication that the request is a verbal request captured by audio sensor associated with the user interface of the mobile computing device.

27B. The computing device according to any one of aspects 24B to 26B, wherein the one or more characteristics associated with the request include an indication that the request is a text request input via the user interface of the mobile computing device.

28B. The computing device according to any one of aspects 24B to 27B, wherein the one or more characteristics associated with the request include an indication that the request includes a user selection of one or more selectable elements displayed via the user interface of the mobile computing device.

29B. The computing device according to any one of aspects 17B to 28B, wherein the instructions further cause the computing device to present the identified process data from the data set that is related to the request via the user interface of the mobile computing device based on the contexts associated with the identified process data by prioritizing or modifying the presentation of the identified process data based on one or more characteristics associated with a display of the mobile computing device.

30B. The computing device according to aspect 29B, wherein the indications of one or more characteristics associated with the display of the mobile computing device include indications of one or more of: a type of the mobile computing device, a size of the mobile computing device, or a display screen size of the mobile computing device.

31B. The computing device according to aspect 29B or aspect 30B, wherein the indications of one or more characteristics associated with the display of the mobile computing device include an indication of whether the identified process data is to be presented via a web browser or a mobile device application.

32B. The computing device according to any one of aspects 29B to 31B, wherein the indications of one or more characteristics associated with the display of the mobile computing device include an indication of a relative size of a display window via which the identified process data is to be presented on a display screen of the mobile computing device.

1C. A method for providing search results in response to a process plant search query, the method comprising: assigning, by a computing device, categories to process parameters in a knowledge repository in which process plant-related data that describes attributes of process plant entities in a process plant is organized according to semantic relations between the process plant-related data and the process plant entities; receiving, at the computing device, a process plant search query from a user related to one of the categories assigned to process parameters within the process plant; obtaining, by the computing device, a data set responsive to the process plant search query from the knowledge repository based on the assigned categories within the knowledge repository; and providing, by the computing device, a set of search results to the user based on the obtained data set responsive to the process plant search query.

2C. The method according to aspect 1C, wherein the assigned categories include one or more of: tuning parameters, equipment parameters, operating parameters, configuration parameters, instantiation parameters, or calculated parameters.

3C. The method according to aspect 1C or aspect 2C, wherein the process plant search query is for process parameters assigned a particular category and having process parameter values which have changed from configured values.

4C. The method according to any one of aspects 1C to 3C, wherein the process plant search query is for mode parameters which are not in a normal state.

5C. The method according to any one of aspects 1C to 4C, wherein the process plant search query is for time series data indicating changes in one or more process parameter values for one or more process parameters over a particular time period, and providing a set of search results to the user includes: providing, by the computing device, a table or chart indicating the changes in the one or more process parameter values for the one or more process parameters over the particular time period as a search result.

6C. The method according to aspect 5C, wherein the one or more process parameters includes a plurality of process parameters, and providing the table or chart includes combining, by the computing device, multiple instances of time series data indicating the changes in process parameter values for each of the plurality of process parameters into a single table or chart.

7C. The method according to any one of aspects 1C to 6C, wherein the process plant search query is received from an integrated development environment (IDE), and providing the set of search results includes providing, by the computing device, the set of search results for display within the IDE.

8C. The method according to aspect 7C, further comprising: exposing an application programming interface (API) to the IDE for handling process plant search queries for the IDE to provide the process plant search query and receive the set of search results responsive to the process plant search query via the API.

9C. The method according to aspect 7C or aspect 8C, further comprising: providing, to the IDE, a process plant search module for handling process plant search queries within the IDE.

10C. The method according to any one of aspects 7C to 9C, wherein the IDE is configured for a user to generate custom algorithms within the IDE for displaying the process plant-related data.

11C. The method of claim according to any one of aspects 1C to 10C, wherein process plant-related data that describes attributes of the process plant entities includes at least one of: configuration data, run-time data, environmental data, maintenance data, analysis data, or diagnostic data.

12C. The method according to any one of aspects 1C to 11C, wherein the knowledge repository includes duplicates of the process plant-related data generated within the process plant and the computing device does not directly interact with the process plant-related data generated within the process plant.

13C. A computing device for providing search results in response to a process plant search query comprising: one or more processors; a communication unit; and one or more non-transitory computer-readable media coupled to the one or more processors and to the communication unit, the one or more non-transitory computer-readable media storing instructions thereon that, when executed by the one or more processors, cause the computing device to: assign categories to process parameters in a knowledge repository in which process plant-related data that describes attributes of process plant entities in a process plant is organized according to semantic relations between the process plant-related data and the process plant entities; receive a process plant search query from a user related to one of the categories assigned to process parameters within the process plant; obtain a data set responsive to the process plant search query from the knowledge repository based on the assigned categories within the knowledge repository; and provide a set of search results to the user based on the obtained data set responsive to the process plant search query.

14C. The computing device according to aspect 13C, wherein the assigned categories include one or more of: tuning parameters, equipment parameters, operating parameters, configuration parameters, instantiation parameters, or calculated parameters.

15C. The computing device according to aspect 13C or aspect 14C, wherein the process plant search query is for process parameters assigned a particular category and having process parameter values which have changed from configured values.

16C. The computing device according to any one of aspects 13C to 15C, wherein the process plant search query is for mode parameters which are not in a normal state.

17C. The computing device according to any one of aspects 13C to 15C, wherein the process plant search query is for time series data indicating changes in one or more process parameter values for one or more process parameters over a particular time period, and to provide a set of search results to the user, the instructions cause the computing device to: provide a table or chart indicating the changes in the one or more process parameter values for the one or more process parameters over the particular time period as a search result.

18C. The computing device according to aspect 17C, wherein the one or more process parameters includes a plurality of process parameters, and to provide the table or chart, the instructions cause the computing device to combine multiple instances of time series data indicating the changes in process parameter values for each of the plurality of process parameters into a single table or chart.

19C. The computing device according to any one of aspects 13C to 18C, wherein the process plant search query is received from an integrated development environment (IDE), and the set of search results are provided for display within the IDE.

20C. The computing device according to aspect 19C, wherein the instructions further cause the computing device to: expose an application programming interface (API) to the IDE for handling process plant search queries for the IDE to provide the process plant search query and receive the set of search results responsive to the process plant search query via the API.

21C. The computing device according to aspect 19C or aspect 20C, wherein the instructions further cause the computing device to: provide, to the IDE, a process plant search module for handling process plant search queries within the IDE.

22C. The computing device according to any one of aspects 13C to 21C, wherein process plant-related data that describes attributes of the process plant entities includes at least one of: configuration data, run-time data, environmental data, maintenance data, analysis data, or diagnostic data.

23C. The computing device according to any one of aspects 13C to 22C, wherein the knowledge repository includes duplicates of the process plant-related data generated within the process plant and the computing device does not directly interact with the process plant-related data generated within the process plant.

24C. An industrial process control system comprising: one or more devices each corresponding to a process plant entity disposed in a process plant and performing a physical function to control an industrial process; a knowledge repository storing process plant-related data that describes attributes of process plant entities in the process plant organized according to semantic relations between the process plant-related data and the process plant entities; one or more computing devices, communicatively coupled to the knowledge repository, the one or more computing devices configured to: receive a process plant search query from a user related to one of a plurality of categories assigned to process parameters within the knowledge repository; obtain a data set responsive to the process plant search query from the knowledge repository based on the assigned categories within the knowledge repository; and provide a set of search results to the user based on the obtained data set responsive to the process plant search query.

25C. The industrial process control system according to aspect 24C, wherein the assigned categories include one or more of: tuning parameters, equipment parameters, operating parameters, configuration parameters, instantiation parameters, or calculated parameters.

26C. The industrial process control system according to aspect 24C or aspect 25C, wherein the one or more computing devices are further configured to expose an application programming interface (API) for handling process plant search queries, such that the one or more computing devices receive the process plant search query from another application or computing device via the API and the one or more computing devices provide the set of search results to the other application or computing device via the API.

27C. The industrial process control system according to any one of aspects 24C to 26C, wherein the one or more computing devices are further configured to: identify context for the process plant search query using the knowledge repository based on relationships between a process plant entity related to the process plant search query and one or more other process plant entities; identify one or more filters for filtering the data set according to the context; and filter the data set according to the one or more filters.

28C. The industrial process control system according to aspect 27C, wherein context of the process plant search query includes the relationship between the process plant entity and the one or more other process plant entities, an organizational role of the user, a location of the user, a time of the process plant search query, or previous process plant search queries from the user.

29C. The industrial process control system according to aspect 27C or aspect 28C, wherein the set of search results include process parameters responsive to the contextual process plant search query ranked in order of importance.

30C. The industrial process control system according to any one of aspects 24C to 29C, wherein the set of search results include a graph or chart representing process parameter values over time responsive to the process plant search query.

31C. The industrial process control system according to any one of aspects 24C to 30C, wherein the one or more computing devices are further configured to: analyze one or more terms within the process plant search query to identify a process parameter category included in the process plant search query; obtain the data set from the knowledge repository including process plant-related data corresponding to the process parameter category; analyze one or more remaining terms within the process plant search query to identify one or more filters for filtering the data set; filter the data set according to the one or more filters; and provide the set of search results to the user according to the filtered data set.

32C. The industrial process control system according to any one of aspects 24C to 31C, wherein the one or more computing devices are further configured to: receive a request to store the process plant search query or the set of search results responsive to the process plant search query; and store the process plant search query or the set of search results in the knowledge repository.

33C. The industrial process control system according to aspect 32C, wherein the set of search results are a first set of search results and the one or more computing devices are further configured to: receive a request to retrieve the process plant search query or the first set of search results responsive to the process plant search query from the knowledge repository; obtain the process plant search query or the first set of search results; and provide a second set of search results using (i) at least a portion of the stored, first set of search results or (ii) at least a portion of a data set responsive to the stored process plant search query.

34C. The industrial process control system according to aspect 32C or aspect 33C, wherein the one or more computing devices are further configured to: receive an indication of a tag associated with the process plant search query or the set of search results; and store the tag in association with the process plant search query or the set of search results in the knowledge repository.

35C. The industrial process control system according to aspect 34C, wherein the set of search results are a first set of search results and the one or more computing devices are further configured to: receive a subsequent process plant search query including the tag; and provide a second set of search results including (i) at least a portion of the stored, first set of search results or (ii) at least a portion of a data set responsive to the stored process plant search query.

1D. A method for tagging process plant search queries or process plant search results, the method comprising: receiving, at a computing device, a process plant search query from a user related to one or more process plant entities within a process plant; providing, by the computing device, a first set of search results to the user responsive to the process plant search query; receiving, at the computing device, a request to store the first set of search results responsive to the process plant search query; receiving, at the computing device, an indication of a tag, which when included in a subsequent process plant search query, causes the computing device to retrieve the stored first set of search results; receiving, at the computing device, a subsequent process plant search query including the tag; and providing, by the computing device, a second set of search results including at least a portion of the stored, first set of search results.

2D. The method according to aspect 1D, wherein providing the second set of search results includes: filtering, by the computing device, the stored, first set of search results according to one or more terms in the subsequent process plant search query to generate the second set of search results.

3D. The method according to aspect 1D or aspect 2D, further comprising: storing, by the computing device, the indication of the tag in a knowledge repository in which process plant-related data that describes attributes of process plant entities is organized according to semantic relations between the process plant-related data and the process plant entities.

4D. The method according to aspect 3D, wherein receiving the subsequent process plant search query includes: receiving a search query for the tag; obtaining the tag from the knowledge repository in response to the search query; and providing an indication of the tag for display to the user.

5D. The method according to any one of aspects 1D to 4D, wherein the user is a first user, the indication of the tag is received from the first user and stored in association with the first set of search results, and the subsequent process plant search query including the tag is received from a second user different from the first user.

6D. The method according to any one of aspects 1D to 5D, wherein the indication of the tag is received from the user and stored in association with the first set of search results, and the subsequent process plant search query including the tag is received from the same user.

7D. The method according to any one of aspects 1D to 6D, further comprising: receiving, at the computing device, a request to store the process plant search query; and receiving, at the computing device, an indication of another tag to be stored in association with the process plant search query, which when included in a subsequent process plant search query, causes the computing device to retrieve a data set responsive to the stored, process plant search query.

8D. The method according to any one of aspects 1D to 7D, further comprising: associating, by the computing device, a particular tag with a data set; storing, by the computing device, the particular tag in the knowledge repository in association with the data set.

9D. The method according to aspect 8D, wherein the data set represents a material composition, weather data, or time series data.

10D. A computing device for tagging process plant search queries or process plant search results comprising: one or more processors; a communication unit; and one or more non-transitory computer-readable media coupled to the one or more processors and to the communication unit, the one or more non-transitory computer-readable media storing instructions thereon that, when executed by the one or more processors, cause the computing device to: receive a process plant search query from a user related to one or more process plant entities within a process plant; provide a first set of search results to the user responsive to the process plant search query; receive a request to store the first set of search results responsive to the process plant search query; receive an indication of a tag, which when included in a subsequent process plant search query, causes the computing device to retrieve the stored, first set of search results; receive a subsequent process plant search query including the tag; and provide a second set of search results including at least a portion of the stored, first set of search results.

11D. The computing device according to aspect 10D, wherein to provide the second set of search results, the instructions cause the computing device to: filter the stored, first set of search results according to one or more terms in the subsequent process plant search query to generate the second set of search results.

12D. The computing device according to aspect 10D or aspect 11D, wherein the instructions further cause the computing device to: store the indication of the tag in a knowledge repository in which process plant-related data that describes attributes of process plant entities is organized according to semantic relations between the process plant-related data and the process plant entities.

13D. The computing device according to aspect 12D, wherein to receive the subsequent process plant search query, the instructions cause the computing device to: receive a search query for the tag; obtain the tag from the knowledge repository in response to the search query; and provide an indication of the tag for display to the user.

14D. The computing device according to any one of aspects 10D to 13D, wherein the user is a first user, the indication of the tag is received from the first user and stored in association with the first set of search results, and the subsequent process plant search query including the tag is received from a second user different from the first user.

15D. The computing device according to any one of aspects 10D to 14D, wherein the indication of the tag is received from the user and stored in association with the first set of search results, and the subsequent process plant search query including the tag is received from the same user.

16D. The computing device according to any one of aspects 10D to 15D, wherein the instructions further cause the computing device to: receive a request to store the process plant search query; and receive an indication of another tag to be stored in associated with the process plant search query, which when included in a subsequent process plant search query, causes the computing device to retrieve a data set responsive to the stored, process plant search query.

17D. The computing device according to any one of aspects 10D to 16D, wherein the instructions further cause the computing device to: associate a particular tag with a data set; and store the particular tag in the knowledge repository in association with the data set.

18D. The computing device according to aspect 17D, wherein the data set represents a material composition, weather data, or time series data.

19D. A method for tagging process plant search queries or process plant search results, the method comprising: storing, by a computing device, a tag in association with at least one of: (i) a first process plant search query related to one or more process plant entities within a process plant, or (ii) a first set of search results responsive to the first process plant search query; receiving, at the computing device, a second process plant search query including the tag; and providing, by the computing device, a second set of search results responsive to the second process plant search query, wherein the second set of search results are obtained by at least one of: retrieving at least a portion of the stored, first set of search results corresponding to the tag, or retrieving at least a portion of a data set responsive to the stored, first process plant search query corresponding to the tag.

20D. The method according to aspect 19D, wherein the second process plant search query includes the tag and one or more additional terms, and providing the second set of search results includes: filtering, by the computing device, the stored, first set of search results or the data set according to the one or more additional terms to generate the second set of search results.

21D. The method according to aspect 19D or aspect 20D, wherein the second process plant search query includes the tag without any additional terms, and providing the second set of search results includes providing at least one of: the stored, first set of search results corresponding to the tag, or the data set responsive to the stored, first process plant search query corresponding to the tag.

22D. The method according to any one of aspects 19D to 21D, further comprising: storing, by the computing device, the tag in a knowledge repository in which process plant-related data that describes attributes of process plant entities is organized according to semantic relations between the process plant-related data and the process plant entities.

23D. The method according to aspect 22D, wherein receiving the second process plant search query includes: receiving a search query for the tag; obtaining the tag from the knowledge repository in response to the search query; and providing an indication of the tag for display to a user.

1E. A method for monitoring a state of a process plant entity in a process plant, the method comprising: obtaining, at a computing device, historical process parameter data from a knowledge repository in which process plant-related data that describes attributes of process plant entities in a process plant is organized according to semantic relations between the process plant-related data and the process plant entities; obtaining, at the computing device from the knowledge repository, indications of states of a plurality of process plant entities at times in which the historical process parameter data was generated, each of the plurality of process plant entities performing a physical function to control an industrial process in the process plant; training, by the computing device, a machine learning model to identify an abnormal condition in a process plant entity using (i) the historical process parameter data corresponding to the plurality of process plant entities, (ii) one or more relationships between the plurality of process plant entities indicated in the knowledge repository, and (ii) indications of whether each of the plurality of process plant entities experienced an abnormal condition; obtaining, at a computing device, process parameter data for a process plant entity and one or more relationships between the process plant entity and other process plant entities in the process plant; applying, by the computing device, the process parameter data for the process plant entity and the one or more relationships to the machine learning model to determine a predicted state of the process plant entity; and providing, by the computing device, an indication of the predicted state of the process plant entity for display on a user interface.

2E. The method according to aspect 1E, wherein training the machine learning includes: automatically identifying, by the computing device, one or more process parameters related to the plurality of process plant entities; and obtaining, by the computing device, the historical process parameter data associated with the one or more process parameters for training the machine learning model.

3E. The method according to aspect 1E or aspect 2E, further comprising: automatically identifying, by the computing device, a change to the predicted state of the process plant entity by applying the process parameter data for the process plant entity and the one or more relationships to the machine learning model; and automatically providing, by the computing device, a report on the change to the predicted state of the process plant entity for display on the user interface.

4E. The method according to any one of aspects 1E to 3E, wherein the machine learning model is provided to an integrated development environment (IDE), and the process parameter data is obtained from the IDE and applied to the machine learning model to determine the predicted state of the process plant entity.

5E. The method according to aspect 4E, wherein the IDE is configured for a user to generate custom machine learning algorithms or train custom machine learning models.

6E. The method according to aspect 4E or aspect 5E, wherein the indication of the predicted state of the process plant entity is provided for display as a visualization within the IDE.

7E. The method according to any one of aspects 1E to 6E, further comprising: determining an actual state of the process plant entity; providing the process parameter data and the actual state of the process plant entity to the machine learning model for further training.

8E. The method according to any one of aspects 1E to 7E, wherein training the machine learning model using the one or more relationships between the plurality of process plant entities indicated in the knowledge repository includes: identifying an upstream or downstream process plant entity to a particular process plant entity; identifying changes in the historical process parameter data between the upstream or downstream process plant entity and the particular process plant entity; and training the machine learning model based on the changes in the historical process parameter data between the upstream or downstream process plant entity and the particular process plant entity.

9E. The method according to any one of aspects 1E to 8E, further comprising: receiving, at a computing device, a process plant search query from a user; identifying a request for a prediction of a state of a process plant entity included in the process plant search query; identifying process parameter data for the process plant entity to apply to a machine learning model based on the process plant search query; identifying the machine learning model based on the request for the prediction of the state of the process plant entity; and providing the indication of the predicted state of the process plant entity as a search result responsive to the process plant search query.

10E. The method according to aspect 9E, further comprising: adjusting the machine learning model based on the process plant search query.

11E. The method according to aspect 9E or aspect 10E, further comprising: identifying context for the process plant search query; identifying one or more filters for adjusting the machine learning model or the process parameter data applied to the machine learning model according to the context; and adjusting the machine learning model or the process parameter data according to the context.

12E. The method according to any one of aspects 1E to 11E, wherein process plant-related data that describes attributes of the process plant entities includes at least one of: configuration data, run-time data, environmental data, maintenance data, analysis data, or diagnostic data.

13E. The method according to any one of aspects 1E to 12E, wherein the knowledge repository includes duplicates of the process plant-related data generated within the process plant and the computing device does not directly interact with the process plant-related data generated within the process plant.

14E. The method according to any one of aspects 1E to 13E, further comprising: assigning categories to process parameters in the knowledge repository; wherein the machine learning model is trained using historical process parameter data for a particular category of process parameters.

15E. The method according to any one of aspects 1E to 14E, further comprising: providing the predicted state of the process plant entity to the process plant or a change to a set point value in the process plant based on the predicted state using a plurality of servers which each validate data representative of the predicted state of the process plant entity or the change to the set point value before writing the data back to the process plant so that the computing device does not directly write to the process plant.

16E. The method according to aspect 15E, wherein each of the plurality of servers validates the data by comparing the data to a threshold range of set point values and verifies that the data is within the threshold range.

17E. A computing device for monitoring a state of a process plant entity in a process plant, the computing device comprising: one or more processors; and a non-transitory computer-readable medium coupled to the one or more processors, the one or more non-transitory computer-readable medium storing instructions thereon that, when executed by the one or more processors, cause the computing device to: obtain historical process parameter data from a knowledge repository in which process plant-related data that describes attributes of process plant entities in a process plant is organized according to semantic relations between the process plant-related data and the process plant entities; obtain, from the knowledge repository, indications of states of a plurality of process plant entities at times in which the historical process parameter data was generated, each of the plurality of process plant entities performing a physical function to control an industrial process in the process plant; train a machine learning model to identify an abnormal condition in a process plant entity using (i) the historical process parameter data corresponding to the plurality of process plant entities, (ii) one or more relationships between the plurality of process plant entities indicated in the knowledge repository, and (ii) indications of whether each of the plurality of process plant entities experienced an abnormal condition; obtain process parameter data for a process plant entity and one or more relationships between the process plant entity and other process plant entities in the process plant; apply the process parameter data for the process plant entity and the one or more relationships to the machine learning model to determine a predicted state of the process plant entity; and provide an indication of the predicted state of the process plant entity for display on a user interface.

18E. The computing device according to aspect 17E, wherein to train the machine learning model, the instructions cause the computing device to: automatically identify one or more process parameters related to the plurality of process plant entities; and obtain the historical process parameter data associated with the one or more process parameters for training the machine learning model.

19E. The computing device according to aspect 17E or aspect 18E, wherein the instructions further cause the computing device to: automatically identify a change to the predicted state of the process plant entity by applying the process parameter data for the process plant entity and the one or more relationships to the machine learning model; and automatically provide a report on the change to the predicted state of the process plant entity for display on the user interface.

20E. The computing device according to any one of aspects 17E to 19E, wherein the machine learning model is provided to an integrated development environment (IDE), and the process parameter data is obtained from the IDE and applied to the machine learning model to determine the predicted state of the process plant entity.

21E. The computing device according to aspect 20E, wherein the IDE is configured for a user to generate custom machine learning algorithms or train custom machine learning models.

22E. The computing device according to aspect 20E or aspect 21E, wherein the indication of the predicted state of the process plant entity is provided for display as a visualization within the IDE.

23E. The computing device according to any one of aspects 17E to 22E, wherein the instructions further cause the computing device to: determine an actual state of the process plant entity; and provide the process parameter data and the actual state of the process plant entity to the machine learning model for further training.

24E. The computing device according to any one of aspects 17E to 23E, wherein to train the machine learning model using the one or more relationships between the plurality of process plant entities indicated in the knowledge repository, the instructions cause the computing device to: identify an upstream or downstream process plant entity to a particular process plant entity; identify changes in the historical process parameter data between the upstream or downstream process plant entity and the particular process plant entity; and train the machine learning model based on the changes in the historical process parameter data between the upstream or downstream process plant entity and the particular process plant entity.

25E. The computing device according to any one of aspects 17E to 24E, wherein the instructions further cause the computing device to: receive a process plant search query from a user; identify a request for a prediction of a state of a process plant entity included in the process plant search query; identify process parameter data for the process plant entity to apply to a machine learning model based on the process plant search query; identify the machine learning model based on the request for the prediction of the state of the process plant entity; and provide the indication of the predicted state of the process plant entity as a search result responsive to the process plant search query.

26E. The computing device according to aspect 25E, wherein the instructions further cause the computing device to: adjust the machine learning model based on the process plant search query.

27E. The computing device according to aspect 25E or aspect 26E, wherein the instructions further cause the computing device to: identify context for the process plant search query; identify one or more filters for adjusting the machine learning model or the process parameter data applied to the machine learning model according to the context; and adjust the machine learning model or the process parameter data according to the context.

28E. The computing device according to any one of aspects 17E to 27E, wherein process plant-related data that describes attributes of the process plant entities includes at least one of: configuration data, run-time data, environmental data, maintenance data, analysis data, or diagnostic data.

29E. The computing device according to any one of aspects 17E to 28E, wherein the knowledge repository includes duplicates of the process plant-related data generated within the process plant and the computing device does not directly interact with the process plant-related data generated within the process plant.

30E. The computing device according to any one of aspects 17E to 29E, wherein the instructions further cause the computing device to: assign categories to process parameters in the knowledge repository; wherein the machine learning model is trained using historical process parameter data for a particular category of process parameters.

31E. The computing device according to any one of aspects 17E to 30E, wherein the instructions further cause the computing device to: provide the predicted state of the process plant entity to the process plant or a change to a set point value in the process plant based on the predicted state using a plurality of servers which each validate data representative of the predicted state of the process plant entity or the change to the set point value before writing the data back to the process plant so that the computing device does not directly write to the process plant.

32E. The method according to aspect 31E, wherein each of the plurality of servers validates the data by comparing the data to a threshold range of set point values and verifies that the data is within the threshold range.

1F. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, from a batch executive executing the batch control algorithm, at the one or more computing devices, the obtained data set and the set of time-series data, to determine (i) a state of one or more pieces of equipment, (ii) a schedule, or (iii) both a state of one or more pieces of equipment and a schedule; receiving, at the batch executive from the one or more computing devices, a set of query results; and determining, by the batch executive executing the batch control algorithm, (a) a set of equipment to use for a batch procedure, unit procedure, operation, and/or phase of a batch control recipe, (b) a schedule associated with the batch procedure, unit procedure, operation, and/or phase of the batch control recipe, or (c) both a set of equipment to use, and a schedule, for the batch procedure, unit procedure, operation, and/or phase of the batch control recipe.

2F. The method according to aspect 1F, further comprising: performing the batch procedure, unit procedure, operation, and/or phase of the batch control recipe using the set of determined set of equipment or in accordance with the determined schedule.

3F. The method according to aspect 1F or aspect 2F, wherein obtaining contexts associated with the process data includes obtaining one or more of: an alarm status associated with the process data, a batch ID associated with the process data, a type of equipment associated with the process data, an area of the plant associated with the process data, or a relationship between a piece of equipment associated with the batch process and one or more other pieces of equipment.

4F. The method according to any one of aspects 1F to 3F, wherein determining the set of equipment to use for the batch procedure, unit procedure, operation, and/or phase of the batch control recipe includes determining an optimal set of equipment based on the process data related to the batch process, the contexts associated with the process data, and the states of the one or more pieces of equipment.

5F. The method according to any one of aspects 1F to 4F, further comprising: determining when each piece of equipment in the set of equipment will be available for use.

6F. The method according to aspect 5F, wherein determining the schedule associated with the batch procedure, unit procedure, operation, and/or phase of the batch control recipe includes determining the schedule based on times when each piece of equipment in the set of equipment will be available for use.

7F. The method according to aspect 6F, further comprising: determining when a phase of the batch control recipe will be complete; and determining that a piece of equipment associated with the phase of the batch control recipe will be available at a time when the phase is complete.

8F. The method according to aspect 6F or aspect 7F, wherein determining the schedule includes determining the schedule to minimize wait times for each piece of equipment during the batch procedure or between batch procedures.

9F. An industrial process control system controlling a batch process in an operating process plant, the system comprising: one or more process controllers executing a batch control algorithm for producing a product in the process plant; a plurality of process control field devices operating according to the batch control algorithm executed by the one or more controllers to produce the product; a knowledge repository storing (i) process configuration data related to the batch process and (ii) a graph database storing contexts associated with the process configuration data; one or more computing devices, communicatively coupled to the knowledge repository and to the one or more process controllers, the one or more computing devices configured to: obtain a data set from the knowledge repository related to the batch process; store, in a database, a set of time-series data generated during execution of one or more batches; query the obtained data set and the set of time-series data, to determine (i) a state of one or more pieces of equipment, (ii) a schedule, or (iii) both a state of one or more pieces of equipment and a schedule; receive a set of query results; and determine (a) a set of equipment to use for a batch procedure, unit procedure, operation, and/or phase of a batch control recipe, (b) a schedule associated with the batch procedure, unit procedure, operation, and/or phase of the batch control recipe, or (c) both a set of equipment to use, and a schedule, for the batch procedure, unit procedure, operation, and/or phase of the batch control recipe.

10F. The industrial process control system according to aspect 9F, wherein the one or more computing devices are further configured to: cause the one or more process controllers to perform the batch procedure, unit procedure, operation, and/or phase of the batch control recipe using the set of determined set of equipment or in accordance with the determined schedule by controlling operation of the plurality of process control field devices.

11F. The industrial process control system according to aspect 9F or aspect 10F, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

12F. The industrial process control system according to any one of aspects 9F to 11F, wherein the set of equipment is an optimal set of equipment determined based on the process configuration data related to the batch process, the contexts associated with the process configuration data, and the states of the one or more pieces of equipment.

13F. The industrial process control system according to any one of aspects 9F to 12F, wherein the one or more computing devices are further configured to: determine when each piece of equipment in the set of equipment will be available for use.

14F. The industrial process control system according to aspect 13F, wherein the schedule associated with the batch procedure, unit procedure, operation, and/or phase of the batch control recipe is determined based on times when each piece of equipment in the set of equipment will be available for use.

15F. The industrial process control system according to aspect 14F, wherein the one or more computing devices are further configured to: determine when a phase of the batch control recipe will be complete; and determine that a piece of equipment associated with the phase of the batch control recipe will be available at a time when the phase is complete.

16F. The industrial process control system according to aspect 14F or aspect 15F, wherein the schedule is determined to minimize wait times for each piece of equipment during the batch procedure or between batch procedures.

17F. A computing device for executing a batch control algorithm to control a batch process in a process plant, the computing device comprising: one or more processors; and a non-transitory computer-readable medium coupled to the one or more processors, the one or more non-transitory computer-readable medium storing instructions thereon that, when executed by the one or more processors, cause the computing device to: obtain a data set from a knowledge repository storing process data related to the batch process and contexts associated with the process data; store, in a database, a set of time-series data generated during execution of one or more batches; query the obtained data set and the set of time-series data, to determine (i) a state of one or more pieces of equipment, (ii) a schedule, or (iii) both a state of one or more pieces of equipment and a schedule; receive a set of query results; and determine (a) a set of equipment to use for a batch procedure, unit procedure, operation, and/or phase of a batch control recipe, (b) a schedule associated with the batch procedure, unit procedure, operation, and/or phase of the batch control recipe, or (c) both a set of equipment to use, and a schedule, for the batch procedure, unit procedure, operation, and/or phase of the batch control recipe.

18F. The computing device according to aspect 17F, wherein the instructions further cause the computing device to: cause one or more process controllers to perform the batch procedure, unit procedure, operation, and/or phase of the batch control recipe using the set of determined set of equipment or in accordance with the determined schedule by controlling operation of a plurality of process control field devices.

19F. The computing device according to aspect 17F or aspect 18F, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

20F. The computing device according to any one of aspects 17F to 19F, wherein the set of equipment is an optimal set of equipment determined based on the process configuration data related to the batch process, the contexts associated with the process configuration data, and the states of the one or more pieces of equipment.

21F. The computing device according to any one of aspects 17F to 20F, wherein the instructions further cause the computing device to: determine when each piece of equipment in the set of equipment will be available for use.

22F. The computing device according to aspect 21F, wherein the schedule associated with the batch procedure, unit procedure, operation, and/or phase of the batch control recipe is determined based on times when each piece of equipment in the set of equipment will be available for use.

23F. The computing device according to aspect 22F, wherein the instructions further cause the computing device to: determine when a phase of the batch control recipe will be complete; and determine that a piece of equipment associated with the phase of the batch control recipe will be available at a time when the phase is complete.

24F. The computing device according to aspect 23F, wherein the schedule is determined to minimize wait times for each piece of equipment during the batch procedure or between batch procedures.

1G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine which of a plurality of sets of equipment was used for a particular batch or portion thereof; and providing, by the one or more computing devices, a set of results indicating which set of equipment was used for the particular batch or portion thereof.

2G. The method according to aspect 1G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

3G. The method of according to aspect 1G or aspect 2G, wherein querying the obtained data set and the set of time-series data includes: identifying one or more filters for filtering the obtained data set and the set of time-series data according to the contexts; and filtering the obtained data set and the set of time-series data according to the one or more filters to determine which of the plurality of sets of equipment was used for the particular batch or portion thereof.

4G. The method according to any one of aspects 1G to 3G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

5G. The method according to aspect 4G, wherein the one or more filters includes a filter for data indicating the set of equipment used for the particular batch or portion thereof.

6G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine for each of one or more sets of equipment an equipment utilization of a desired period; and providing, by the one or more computing devices, a set of results indicating the equipment utilization for each of the one or more sets of equipment over the desired period.

7G. The method according to aspect 6G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

8G. The method according to aspect 6G or aspect 7G, wherein querying the obtained data set and the set of time-series data includes: identifying one or more filters for filtering the obtained data set and the set of time-series data according to the contexts; and filtering the obtained data set and the set of time-series data according to the one or more filters to determine the equipment utilization of the desired period for each of the one or more sets of equipment.

9G. The method according to any one of aspects 6G to 8G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

10G. The method according to aspect 9G, wherein the one or more filters includes a filter for data indicating the equipment utilization for each of the one or more sets of equipment over the desired period.

11G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine one or more times during which a piece of equipment was in operation or being utilized; and providing, by the one or more computing devices, a set of results indicating the one or more times during which the piece of equipment was in operation or was being utilized.

12G. The method according to aspect 11G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

13G. The method according to aspect 11G or aspect 12G, wherein querying the obtained data set and the set of time-series data includes: identifying one or more filters for filtering the obtained data set and the set of time-series data according to the contexts; and filtering the obtained data set and the set of time-series data according to the one or more filters to determine the one or more times during which the piece of equipment was in operation or was being utilized.

14G. The method according to any one of aspects 11G to 13G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

15G. The method according to aspect 14G, wherein the one or more filters includes a filter for data indicating the one or more times during which the piece of equipment was in operation or was being utilized.

16G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine one or more recipes that have executed on a set of equipment over a specified period of time; and providing, by the one or more computing devices, a set of results indicating the one or more recipes that have executed on the set of equipment over the specified period of time.

17G. The method according to aspect 16G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

18G. The method according to aspect 16G or aspect 17G, wherein querying the obtained data set and the set of time-series data includes: identifying one or more filters for filtering the obtained data set and the set of time-series data according to the contexts; and filtering the obtained data set and the set of time-series data according to the one or more filters to determine the one or more recipes that have executed on the set of equipment over the specified period of time.

19G. The method according to any one of aspects 16G to 18G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

20G. The method according to aspect 19G, wherein the one or more filters includes a filter for data indicating the one or more recipes that have executed on the set of equipment over the specified period of time.

21G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine one or more sets of equipment that have been used for a particular recipe over a specified period of time; and providing, by the one or more computing devices, a set of results indicating the one or more sets of equipment that have been used for the particular recipe over the specified period of time.

22G. The method according to aspect 21G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

23G. The method according to aspect 21G or aspect 22G, wherein querying the obtained data set and the set of time-series data includes: identifying one or more filters for filtering the obtained data set and the set of time-series data according to the contexts; and filtering the obtained data set and the set of time-series data according to the one or more filters to determine the one or more sets of equipment that have been used for the particular recipe over the specified period of time.

24G. The method according to any one of aspects 21G to 23G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

25G. The method according to aspect 24G, wherein the one or more filters includes a filter for data indicating the one or more sets of equipment that have been used for the particular recipe over the specified period of time.

26G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine for a given recipe or portion thereof, which set of equipment used for that recipe has produced the highest quality output; and providing, by the one or more computing devices, a set of results indicating the set of equipment that has produced the highest quality output for the given recipe or portion thereof.

27G. The method according to aspect 26G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

28G. The method according to aspect 26G or aspect 27G, wherein querying the obtained data set and the set of time-series data includes: identifying one or more filters for filtering the obtained data set and the set of time-series data according to the contexts; and filtering the obtained data set and the set of time-series data according to the one or more filters to determine the set of equipment that has produced the highest quality output for the given recipe or portion thereof.

29G. The method according to any one of aspects 26G to 28G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

30G. The method according to aspect 29G, wherein the one or more filters includes a filter for data indicating the set of equipment that has produced the highest quality output for the given recipe or portion thereof.

31G. The method according to any one of aspects 26G to 30G, wherein each product produced by the given recipe is assigned a quality metric, the quality metric is stored in the knowledge repository and associated with a set of equipment used to produce the product, and determining the set of equipment used for the recipe that has produced the highest quality output includes comparing the quality metrics for each set of equipment used for the recipe to determine the set of equipment that has produced the highest quality output.

32G. The method according to aspect 31G, wherein determining the set of equipment used for the recipe that has produced the highest quality output includes: determining a threshold number of sets of equipment to include in the set of search results; ranking each set of equipment in accordance with the assigned quality metric for the set of equipment; and providing sets of equipment ranked at or above the threshold number in the set of results.

33G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine for a given recipe or portion thereof, which set of equipment used for that recipe has the best production time; and providing, by the one or more computing devices, a set of results indicating the set of equipment that has the best production time for the given recipe or portion thereof.

34G. The method according to aspect 33G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

35G. The method according to aspect 33G or aspect 34G, wherein querying the obtained data set and the set of time-series data includes: identifying one or more filters for filtering the obtained data set and the set of time-series data according to the contexts; and filtering the obtained data set and the set of time-series data according to the one or more filters to determine the set of equipment that has the best production time for the given recipe or portion thereof..

36G. The method according to any one of aspects 33G to 35G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

37G. The method according to aspect 36G, wherein the one or more filters includes a filter for data indicating the set of equipment that has the best production time for the given recipe or portion thereof.

38G. The method according to any one of aspects 33G to 37G, wherein each product produced by the given recipe is assigned a production time, the production time is stored in the knowledge repository and associated with a set of equipment used to produce the product, and determining the set of equipment used for the recipe that has the best production time includes comparing the production times for each set of equipment used for the recipe to determine the set of equipment that has produced the product over a shortest period of time.

39G. The method according to aspect 38G, wherein determining the set of equipment used for the recipe that has the best production time includes: determining a threshold number of sets of equipment to include in the set of search results; ranking each set of equipment in accordance with the assigned production time for the set of equipment; and providing sets of equipment ranked at or above the threshold number in the set of results.

40G. A method in an industrial process control system executing a batch control algorithm to control a batch process in a process plant, the method comprising: obtaining, by one or more computing devices, a data set from a knowledge repository storing process data related to the batch process and contexts associated with the process data; storing, in a database, a set of time-series data generated during execution of one or more batches; querying, at the one or more computing devices, the obtained data set and the set of time-series data to determine for a given recipe or portion thereof, which set of equipment used for that recipe requires the lowest quantity of raw materials; and providing, by the one or more computing devices, a set of results indicating the set of equipment, used for the given recipe, that requires the lowest quantity of raw materials.

41G. The method according to aspect 40G, wherein contexts associated with the process data include one or more of: an alarm status associated with the process data, a batch ID associated with the process data, a type of equipment associated with the process data, an area of the plant associated with the process data, or a relationship between a piece of equipment associated with the batch process and one or more other pieces of equipment.

42G. The method according to aspect 40G or aspect 41G, wherein querying the obtained data set and the set of time-series data includes: identifying one or more filters for filtering the obtained data set and the set of time-series data according to the contexts; and filtering the obtained data set and the set of time-series data according to the one or more filters to determine the set of equipment, used for the given recipe, that requires the lowest quantity of raw materials.

43G. The method according to any one of aspects 40G to 42G, further comprising: receiving a process plant search query related to the batch process; analyzing one or more terms within the process plant search query to identify the batch process included in the process plant search query; obtaining the data set from the knowledge repository including process data corresponding to the batch process; analyzing one or more remaining terms within the process plant search query to identify one or more filters for filtering the data set; filtering the data set according to the one or more filters; and providing the set of search results to the user according to the filtered data set.

44G. The method according to aspect 43G, wherein the one or more filters includes a filter for data indicating the set of equipment, used for the given recipe, that requires the lowest quantity of raw materials.

45G. The method according to any one of aspects 40G to 44G, wherein the quantity of raw materials used to produce each product is determined, the quantity of raw materials used to produce the product is stored in the knowledge repository and associated with a set of equipment used to produce the product, and determining the set of equipment used for the recipe that requires the lowest quantity of raw materials includes comparing the quantities of raw materials used for each set of equipment used for the recipe to determine the set of equipment that has produced the product with the lowest quantity of raw materials.

46G. The method according to aspect 45G, wherein determining the set of equipment used for the recipe that has the lowest quantity of raw materials includes: determining a threshold number of sets of equipment to include in the set of search results; ranking each set of equipment in accordance with the quantity of raw materials used to produce the product for the set of equipment; and providing sets of equipment ranked at or above the threshold number in the set of results.

1H. A method in an industrial process control system comprising a plurality of process control field devices controlled by one or more process controllers, the method comprising: defining, for the plurality of process control field devices, a first set of production parameters for producing a product, the first set of production parameters including a first set of operating parameters, a first set of tuning parameters, and a first set of equipment parameters; creating, by one or more computing devices, based on the first set of production parameters, a contextual representation of the plurality of process control field devices and the first set of production parameters, the contextual representation stored in a data repository; executing, by the one or more controllers, a plurality of control loops according to the first set of production parameters, to create a first test product; storing, in the data repository, a first set of data collected during the execution of the plurality of control loops according to the first set of production parameters, the first set of data comprising time series data related to the first set of parameters and indicative of the operation of process control system; analyzing, by one or more computing devices, and using the contextual representation, the first set of data collected during the execution of the plurality of process control loops, to determine: one or more qualities of the first test product, a production speed for the first test product, a quantity or cost of input materials for the first test product, and/or a production cost of the first test product; and adjusting one or more of the first set of production parameters, according to the analysis of the first set of data, to create a second set of production parameters.

2H. A method according to aspect 1H, wherein the contextual representation of the plurality of process control field devices and the first set of production parameters comprises a graph database.

3H. A method according to aspect 1H or aspect 2H, the method further comprising: defining, for the plurality of process control field devices, the second set of production parameters for producing the product, the second set of production parameters including a second set of operating parameters, a second set of tuning parameters, and a second set of equipment parameters; creating, by the one or more computing devices, based on the second set of production parameters, a second contextual representation of the plurality of process control field devices and the second set of production parameters, the second contextual representation stored in a data repository; executing, by the one or more controllers, a plurality of control loops according to the second set of production parameters, to create a second test product; storing, in the data repository, a second set of data collected during the execution of the plurality of control loops according to the second set of production parameters, the second set of data comprising time series data related to the second set of parameters and indicative of the operation of process control system; analyzing, by one or more computing devices, and using the contextual representations, the second set of data collected during the execution of the plurality of process control loops, to determine: one or more qualities of the second test product, a production speed for the second test product, a quantity or cost of input materials for the second test product, and/or a production cost of the second test product; and adjusting one or more of the second set of production parameters, according to the analysis of the first and second sets of data, to create a third set of production parameters.

4H. A method according to any one of aspects 1H to 3H, the method further comprising predicting a second set of data resulting from the second set of production parameters during a second execution of the plurality of control loops according to the second set of production parameters.

5H. A method according to any one of aspects 1H to 4H, the method further comprising predicting one or more qualities of a second test product resulting from execution the plurality of control loops according to the second set of production parameters.

6H. A method according to any one of aspects 1H to 5H, the method further comprising predicting a production speed of a second test product resulting from execution the plurality of control loops according to the second set of production parameters.

7H. A method according to any one of aspects 1H to 6H, the method further comprising predicting a quantity or cost of input materials for a second test product resulting from execution the plurality of control loops according to the second set of production parameters.

8H. A method according to any one of aspects 1H to 7H, the method further comprising predicting a production cost for a second test product resulting from execution the plurality of control loops according to the second set of production parameters.

9H. A method according to any one of aspects 1H to 8H, the method further comprising: receiving an input of one or more of the following product parameters: one or more desired qualities of the second test product, a desired production speed for the second test product, a desired quantity or cost of input materials for the second test product, and a desired production cost of the second test product; and wherein adjusting the one or more of the first set of production parameters to create the second set of production parameters comprises predicting the second set of production parameters that will meet the received one or more product parameters.

10H. A method according to any one of aspects 1H to 9H, further comprising: receiving a natural-language input query related to the first data set; analyzing the input query using, in part, the contextual representation of the plurality of process control field devices and the first set of production parameters; outputting a query response.

11H. An industrial process control system controlling an operating process plant, the system comprising: one or more process controllers executing a control algorithm for producing a product in the process plant; a plurality of process control field devices operating according to the control algorithm executed by the one or more controllers to produce the product; a knowledge repository storing (i) process configuration data related to the industrial process and (ii) a graph database storing contexts associated with the process configuration data; one or more computing devices, communicatively coupled to the knowledge repository and to the one or more process controllers, the one or more computing devices configured to: receive a first set of production parameters for producing the product, the first set of production parameters including a first set of operating parameters, a first set of tuning parameters, and a first set of equipment parameters; cause the one or more process controllers to execute a plurality of control loops according to the first set of production parameters, to create a first test product; store, in the data repository, a first set of data collected during the execution of the plurality of control loops according to the first set of production parameters, the first set of data comprising time series data related to the first set of parameters and indicative of the operation of process control system; analyze, using the contextual representation, the first set of data collected during the execution of the plurality of process control loops, to determine a product parameter including: one or more qualities of the first test product, a production speed for the first test product, a quantity or cost of input materials for the first test product, and/or a production cost of the first test product; and output one or more visual representations of the determined product parameter or parameters.

12H. A system according to aspect 11H, wherein the one or more computing devices are further configured to adjust one or more of the first set of production parameters, according to the analysis of the first set of data, to create a second set of production parameters.

13H. A system according to aspect 11H or aspect 12H, wherein the one or more computing devices are further configured to: receive, for the plurality of process control field devices, the second set of production parameters for producing the product, the second set of production parameters including a second set of operating parameters, a second set of tuning parameters, and a second set of equipment parameters; create, based on the second set of production parameters, a second contextual representation of the plurality of process control field devices and the second set of production parameters, the second contextual representation stored in a data repository; cause the one or more process controllers to execute a plurality of control loops according to the second set of production parameters, to create a second test product; store, in the data repository, a second set of data collected during the execution of the plurality of control loops according to the second set of production parameters, the second set of data comprising time series data related to the second set of parameters and indicative of the operation of process control system; analyze, using the contextual representations, the second set of data collected during the execution of the plurality of process control loops, to determine: one or more qualities of the second test product, a production speed for the second test product, a quantity or cost of input materials for the second test product, and/or a production cost of the second test product; and adjust one or more of the second set of production parameters, according to the analysis of the first and second sets of data, to create a third set of production parameters.

14H. A system according to any one of aspects 11H to 13H, wherein the one or more computing devices are further configured to predict a second set of data resulting from the second set of production parameters during a second execution of the plurality of control loops according to the second set of production parameters.

15H. A system according to any one of aspects 11H to 14H, wherein the one or more computing devices are further configured to predict one or more qualities of a second test product resulting from execution the plurality of control loops according to the second set of production parameters.

16H. A system according to any one of aspects 11H to 15H, wherein the one or more computing devices are further configured to predict a production speed of a second test product resulting from execution the plurality of control loops according to the second set of production parameters.

17H. A system according to any one of aspects 11H to 16H, wherein the one or more computing devices are further configured to predict a quantity or cost of input materials for a second test product resulting from execution the plurality of control loops according to the second set of production parameters.

18H. A system according to any one of aspects 11H to 17H, wherein the one or more computing devices are further configured to predict a production cost for a second test product resulting from execution the plurality of control loops according to the second set of production parameters.

19H. A system according to any one of aspects 11H to 18H, wherein the one or more computing devices are further configured to: receive an input of one or more of the following product parameters: one or more desired qualities of the second test product, a desired production speed for the second test product, a desired quantity or cost of input materials for the second test product, and a desired production cost of the second test product; and wherein adjusting the one or more of the first set of production parameters to create the second set of production parameters comprises predicting the second set of production parameters that will meet the received one or more product parameters.

20H. A system according to any one of aspects 11H to 19H, wherein the one or more computing devices are further configured to: receive a natural-language input query related to the first data set; analyze the input query using, in part, the contextual representation of the plurality of process control field devices and the first set of production parameters; output a query response.

1I. A method in an industrial process control system comprising a plurality of process control field devices controlled by one or more process controllers, the method comprising: obtaining, by one or more computing devices, a data set from a knowledge repository storing context data associated with the process control field devices in a first process plant, the context data indicating relationships between the process control field devices; obtaining, by the one or more computing devices, data indicative of a normal state of operation for each of a plurality of parameters in the first process plant, the plurality of parameters including a first set of operating parameters, a first set of tuning parameters, and a first set of equipment parameters; receiving, by the one or more computing devices, real-time, time-series data from the operation of the first process plant, during operation of the process control system; analyzing the received time-series data related to the plurality of parameters, the data indicative of the normal state of operation for each of the plurality of parameters, and the context data, to determine if any of the parameters in the first process plant are operating out of normal state.

2I. A method according to aspect 1I, wherein the context data comprise a graph database.

3I. A method according to aspect 2I, wherein the graph database represents the relationships between the process control field devices and a process control configuration.

4I. A method according to aspect 2I or aspect 3I, wherein the graph database represents the relationships between the two or more control loops executed by the one or more process controllers.

5I. A method according to any one of aspects 1I to 4I, further comprising: receiving a natural-language input query related to the time-series data; analyzing the input query using, in part, the context data indicating the relationships between the process control field devices; outputting a query response.

6I. A method according to any one of aspects 1I to 5I, further comprising: inputting, in real-time, into a trained AI model the time-series data from the one or more process controllers and the context data; and receiving from the trained AI model a real-time prediction of product quality based on the time-series data.

7I. A method according to aspect 6I, further comprising: adjusting one or more of the plurality of parameters according to the real-time prediction of product quality.

8I. A method according to aspect 7I, wherein adjusting one or more of the plurality of product parameters according to the real-time prediction of product quality comprises causing, by the one or more computing devices, the one or more process controllers to change a value of the one or more of the plurality of production parameters.

9I. A method according to aspect 7I or aspect 8I, further comprising receiving, from the trained AI model a recommendation of one or more parameters of the plurality of parameters to adjust.

10I. A method according to any one of aspects 1I to 9I, wherein obtaining data indicative of a normal state of operation of each of the plurality of parameters comprises inputting current parameter data into a model based on the context data to obtain a normal state of the parameters in view of the current operation of the process.

11I. A method according to any one of aspects 1I to 10I, further comprising: determining, by the one or more computing devices, one or more soft sensor values, the soft sensor values comprising values predicted or calculated according to the plurality of parameters, the context data, and the received time-series data.

12I. A method according to aspect 11I, wherein the analyzing step further includes analyzing the determined one or more soft sensor values.

13I. A method according to aspect 11I or aspect 12I, wherein determining one or more soft sensor values comprises continuously querying the time-series data.

14I. A method according to any one of aspects 1I to 13I, further comprising: obtaining, by the one or more computing devices, a data set from a knowledge repository storing context data associated with the process control field devices in a second process plant, the context data indicating relationships between process control field devices in the second process plant; obtaining, by the one or more computing devices, data indicative of a normal state of operation for each of a second plurality of parameters in the second process plant, the second plurality of parameters in the second process plant including a second set of operating parameters, a second set of tuning parameters, and a second set of equipment parameters; receiving, by the one or more computing devices, real-time, time-series data of the operation of the second process plant, during operation of the process control system; analyzing the received time-series data related to the second plurality of parameters, the data indicative of the normal state of operation for each of the second plurality of parameters, and the context data, to determine if any of the parameters in the second process plant are operating out of normal state.

15I. An industrial control system controlling an operating process plant, the system comprising: one or more process controllers executing a control algorithm for producing a product in a first process plant; a plurality of process control field devices operating in the first process plant according to the control algorithm executed by the one or more process controllers to produce the product; a knowledge repository storing (i) process configuration data related to the industrial process and (ii) a graph database storing contexts associated with the process configuration data; one or more computing devices, communicatively coupled to the knowledge repository, the one or more computing devices configured to: obtain a data set from the knowledge repository; obtain data indicative of a normal state of operation for each of a plurality of parameters in the first process plant, the plurality of parameters including a first set of operating parameters, a first set of tuning parameters, and a first set of equipment parameters; receive real-time, time-series data during operation of the process control system; analyze the received time-series data related to the plurality of parameters, the data indicative of the normal state of operation for each of the plurality of parameters, and the context data, to determine if any of the parameters in the first process plant are operating out of normal state.

16I. A system according to aspect 15I, wherein the graph database represents the relationships between the process control field devices and a process control configuration.

17I. A system according to aspect 15I or aspect 16I, wherein the graph database represents the relationships between two or more control loops executed by the one or more process controllers.

18I. A system according to any one of aspects 15I to 17I, wherein the one or more computing devices are further configured to: receive a natural-language input query related to the time-series data; analyze the input query using, in part, the context data indicating the relationships between the process control field devices; output a query response.

19I. A system according to any one of aspects 15I to 18I, wherein the one or more computing devices are further configured to: input, in real-time, into a trained AI model the time-series data from the one or more process controllers and the context data; and receive from the trained AI model a real-time prediction of product quality based on the time-series data.

20I. A system according to any one of aspects 15I to 19I, wherein the one or more computing devices are further configured to adjust one or more of the plurality of parameters according to the real-time prediction of product quality.

21I. A system according to aspect 20I, wherein adjusting one or more of the plurality of product parameters according to the real-time prediction of product quality comprises causing the one or more process controllers to change a value of the one or more of the plurality of product parameters.

22I. A system according to aspect 20I or aspect 21I, wherein the one or more computing devices is further configured to receive from the trained AI model a recommendation of one or more parameters of the plurality of parameters to adjust.

23I. A system according to any one of aspects 15I to 22I, wherein obtaining data indicative of a normal state of operation of each of the plurality of parameters comprises inputting current parameter data into a model based on the context data to obtain a normal state of the parameters in view of the current operation of the process.

24I. A system according to any one of aspects 15I to 23I, wherein the one or more computing devices are further configured to: determine one or more soft sensor values, the soft sensor values comprising values predicted or calculated according to the plurality of parameters, the context data, and the received time-series data.

25I. A system according to aspect 24I, wherein the analysis of the received time-series data includes analyzing the determined one or more soft sensor values.

26I. A system according to aspect 24I or aspect 25I, wherein determining one or more soft sensor values comprises continuously querying the time-series data.

27I. A system according to any one of aspects 15I to 26I, wherein the one or more computing devices are further configured to: obtain a data set from a knowledge repository storing context data associated with the process control field devices in a second process plant, the context data indicating relationships between process control field devices in the second process plant; obtain data indicative of a normal state of operation for each of a second plurality of parameters in the second process plant, the second plurality of parameters in the second process plant including a second set of operating parameters, a second set of tuning parameters, and a second set of equipment parameters; receive real-time, time-series data of the operation of the second process plant, during operation of the process control system; analyze the received time-series data related to the second plurality of parameters, the data indicative of the normal state of operation for each of the second plurality of parameters, and the context data, to determine if any of the parameters in the second process plant are operating out of normal state.

1J. A method in an industrial process control system comprising a plurality of process control plants producing a product, each of the process plants, in turn, comprising a respective plurality of process control field devices controlled by a respective one or more process controllers to produce the product, the method comprising: obtaining for each of the process control plants, by one or more computing devices, a data set from a knowledge repository storing context data associated with the process control field devices in the respective process plant, the context data indicating relationships between the process control field devices; transmitting to each of the process plants, from the one or more computing devices, a set of parameter data values associated with the production of the product at the respective process plant; obtaining, from each of the process plants, at the one or more computing devices, real-time, time series data from the respective one or more process controllers, during operation of the process control system; and querying the obtained, real-time, time series data for each of the process plants to determine if any of the respective sets of parameter data values has changed.

2J. A method according to aspect 1J, wherein the knowledge repository storing context data comprises a graph database.

3J. A method according to aspect 1J or 2J, further comprising: receiving a natural-language input query related to the time-series data; analyzing the input query using, in part, the context data indicating the relationships between the process control field devices; and outputting a query response.

4J. A method according to any one of aspects 1J to 3J, wherein the context data further indicate relationships between process control field devices and control loops.

5J. A method according to any one of aspects 1J to 4J, wherein the context data further indicate relationships between a plurality of control loops.

6J. A method according to any one of aspects 1J to 5J, further comprising, when the query determines that one or more of the respective sets of parameter data values has changed: storing the set of parameter data values that has changed; and assigning versioning information to the changed set of parameter data values.

7J. A method according to any one of aspects 1J to 6J, further comprising storing in a central database parameter data values for each of the plurality of process control plants.

8J. A method according to any one of aspects 1J to 7J, further comprising executing one or more queries of the context data and the time-series data, continuously or periodically, to create one or more corresponding soft-sensor parameters for each of the plurality of process control plants.

9J. A method according to aspect 8J, wherein the one or more soft-sensor parameters comprises a predicted value.

10J. A method according to any one of aspects 1J to 9J, further comprising, for a set of parameter data values that has changed: determining one or more of the parameters in the set that has changed; and categorizing each of the one or more changed parameters as one of an operating parameter, a tuning parameter, or an equipment parameter.

11J. A method according to aspect 10J, further comprising: determining, using the context data, the real-time, time-series data, and the values of the one or more changed parameters, whether the one or more changed parameters will result in the process or the product being out of a certification or qualification state.

12J. A system comprising: a plurality of industrial process control systems, each controlling a respective operating process plant, each of the process control systems comprising: one or more process controllers executing a control algorithm for producing a product in the respective process plant; and a plurality of process control field devices operating in the respective process plant according to the control algorithm executed by the one or more process controllers to produce the product; a knowledge repository storing (i) process configuration data related to each of the plurality of industrial process control systems and (ii) a graph database storing contexts associated with the process configuration data of each of the plurality of industrial process control systems; one or more computing devices, communicatively coupled to the knowledge repository, the one or more computing devices configured to: obtain for each of the process control plants a data set from the knowledge repository, the data set comprising context data indicating relationships between the process control field devices; transmit to each of the process plants a set of parameter data values associated with the production of the product at the respective process plant; obtain from each of the process plants real-time, time-series data from the respective one or more process controllers during operation of the process control system; and query the obtained, real-time, time-series data for each of the process plants to determine if any of the respective sets of parameter data values has changed.

13J. A system according to aspect 12J, wherein the one or more computing devices are further configured to: receive a national-language input query related to the time-series data; analyze the input query using, in part, the context data indicating the relationships between the process control field devices; and output a query response.

14J. A system according to aspect 12J or aspect 13J, wherein the context data further indicate relationships between process control field devices and control loops.

15J. A system according to any one of aspects 12J to 14J, wherein the context data further indicate relationships between a plurality of control loops.

16J. A system according to any one of aspects 12J to 15J, wherein the one or more computing devices are further configured, when the query determines that one or more of the respective sets of parameter data values has changed, to: store the set of parameter data values that has changed; and assign versioning information to the changed set of parameter data values.

17J. A system according to any one of aspects 12J to 16J, wherein the one or more computing devices are further configured to store in a central database parameter data values for each of the plurality of process control plants.

18J. A system according to any one of aspects 12J to 17J, wherein the one or more computing devices are further configured to execute one or more queries of the context data and the time-series data, continuously or periodically, to create one or more corresponding soft-sensor parameters for each of the plurality of process control plants.

19J. A system according to aspect 18J, wherein the one or more soft-sensor parameters comprises a predicted value.

20J. A system according to any one of aspects 12J to 19J, wherein the one or more computing devices are further configured, for a set of parameter data values that has changed to: determine one or more of the parameters in the set that has changed; and categorize each of the one or more changed parameters as one of an operating parameter, a tuning parameter, or an equipment parameter.

21J. A system according to claim 20J, wherein the one or more computing devices are further configured to determine, using the context data, the real-time, time-series data, and the values of the one or more changed parameters, whether the one or more changed parameters will result in the process or the product being out of a certification or qualification state.

1K. A method in an industrial process control system controlling an operating process plant, the method comprising: obtaining, by one or more computing devices, a data set from a knowledge repository storing process configuration data related to the industrial process and a graph database storing contexts associated with the process configuration data; receiving, by the one or more computing devices, a first set of process control data, the first set of process control data comprising time-series data of a plurality of parameters in the process plant; introducing a perturbation in a control parameter of the process plant; receiving, by the one or more computing devices, a second set of process control data, the second set of process control data comprising time-series data of the plurality of parameters in the process plant; and analyzing, by the one or more computing devices, the first and second sets of process control data, using the data set obtained from the knowledge repository, to make a determination related to one or more effects of the perturbation.

2K. A method according to aspect 1K, wherein introducing the perturbation in the control parameter comprises introducing a perturbation configured to be minimally detectable.

3K. A method according to aspect 1K or aspect 2K, wherein introducing the perturbation in the control parameter comprises introducing a reversible perturbation.

4K. A method according to any one of aspects 1K to 3K, wherein introducing the perturbation in the control parameter comprises introducing a reversible perturbation for a time period of less than five minutes and, after the time period, reverting the control parameter to the value of the control parameter prior to the introduction of the perturbation.

5K. A method according to any one of aspects 1K to 4K, wherein introducing the perturbation in the control parameter comprises introducing a reversible perturbation for a time period of less than one minute and, after the time period, reverting the control parameter to the value of the control parameter prior to the introduction of the perturbation.

6K. A method according to any one of aspects 1K to 5K, wherein introducing the perturbation in the control parameter comprises introducing a reversible perturbation for a time period of less than 30 seconds and, after the time period, reverting the control parameter to the value of the control parameter prior to the introduction of the perturbation.

7K. A method according to any one of aspects 1K to 6K, wherein introducing the perturbation in the control parameter comprises introducing a first perturbation, the method further comprising: receiving, by the one or more computing devices, a third set of process control data, the third set of process control data comprising time-series data of the plurality of parameters in the process plant; introducing a second perturbation in the control parameter of the process plant; receiving, by the one or more computing devices, a fourth set of process control data, the fourth set of process control data comprising time-series data of the plurality of parameters in the process plant; and analyzing, by the one or more computing devices, the third and fourth sets of process control data, using the data set obtained from the knowledge repository, relative to the determination related to the one or more effects of the first perturbation, to determine one or more effects of the second perturbation and, from that determination, to detect and/or characterize drift in a configuration or operation of the industrial process control system.

8K. A method according to aspect 7K, further comprising: receiving, by the one or more computing devices, a fifth set of process control data, the fifth set of process control data comprising time-series data of the plurality of parameters in the process plant; introducing a third perturbation in the control parameter of the process plant; receiving, by the one or more computing devices, a sixth set of process control data, the sixth set of process control data comprising time-series data of the plurality of parameters in the process plant; and analyzing, by the one or more computing devices, the fifth and sixth sets of process control data, using the data set obtained from the knowledge repository, relative to the determination related to the one or more effects of the first and second perturbations, to determine one or more effects of the third perturbation and, from that determination, to detect and/or characterize drift in a configuration or operation of the industrial process control system.

9K. A method according to any one of aspects 1K to 8K, wherein the determination related to the one or more effects of the perturbation comprises a determination of a maximum perturbation amplitude that can be introduced without pushing a product of the process plant outside of specified production parameters for the product.

10K. A method according to any one of aspects 1K to 9K, wherein the determination related to the one or more effects of the perturbation comprises a determination of a maximum perturbation rate-of-change that can be introduced without pushing a product of the process plant outside of specified production parameters for the product.

11K. A method according to any one of aspects 1K to 10K, wherein the determination related to the one or more effects of the perturbation comprises a determination of a maximum perturbation duration that can be introduced without pushing a product of the process plant outside of specified production parameters for the product.

12K. A method according to any one of aspects 1K to 11K, wherein the determination related to the one or more effects of the perturbation comprises a determination of a propagation time associated with the perturbation, the propagation time defined as an elapsed time between the introduction of perturbation and an effect of the perturbation (i) at an entity of the process plant or (ii) on a downstream parameter of the process plant.

13K. A method according to any one of aspects 1K to 12K, wherein the perturbation in the control parameter is a perturbation in a first control parameter, the method further comprising: introducing a perturbation in a second control parameter of the process plant; receiving, by the one or more computing devices, a third set of process control data, the third set of process control data comprising time-series data of the plurality of parameters in the process plant; and analyzing, by the one or more computing devices, the first, second, and third sets of process control data, using the data set obtained from the knowledge repository, to make a determination related to one or more effects of the perturbations of the first and second control parameters.

14K. A method according to any one of aspects 1K to 13K, wherein the operating process plant is a first process plant, the method further comprising: obtaining, by the one or more computing devices, a data set from a knowledge repository storing process data related to the industrial process operating in a second process plant and a second graph database storing contexts associated with the process data in the second process plant; receiving, by the one or more computing devices, a third set of process control data, the third set of process control data comprising time-series data of the plurality of parameters in the second process plant; introducing the perturbation in a control parameter of the second process plant, the control parameter of the second process plant corresponding to the control parameter in the first process plant; receiving, by the one or more computing devices, a fourth set of process control data, the fourth set of process control data comprising time-series data of the plurality of parameters in the second process plant; analyzing, by the one or more computing devices, the third and fourth sets of process control data, using the data set obtained from the knowledge repository, to make a determination related to one or more effects of the perturbation in the second process plant; and comparing the one or more effects on the first process plant of the first perturbation to the one or more effects on the second process plant of the perturbation in the second process plant.

15K. A method according to any one of aspects 1K to 14K, wherein the determination related to the one or more effects of the perturbation comprises a determination of an optimal time following a perturbation to measure a sample of a product of the process plant.

16K. A method according to any one of aspects 1K to 15K, wherein introducing, by the one or more computing devices, the perturbation in the control parameter of the process plant comprises causing a process controller controlling the operation of the process plant to introduce the perturbation.

17K. An industrial process control system controlling an operating process plant, the system comprising: one or more process controllers executing a control algorithm for producing a product in the process plant; a plurality of process control devices operating according to the control algorithm executed by the one or more controllers to produce the product; a knowledge repository storing (i) process configuration data related to the industrial process and (ii) a graph database storing contexts associated with the process configuration data; one or more computing devices, communicatively coupled to the knowledge repository and to the one or more process controllers, the one or more computing devices configured to: obtain a data set from the knowledge repository, the data set comprising the process configuration data and the graph database; receive a first set of process control data, the first set of process control data comprising time-series data of a plurality of parameters in the process plant; cause the one or more process controllers to introduce a perturbation in a control parameter of the process plant; receive a second set of process control data, the second set of process control data comprising time-series data of the plurality of parameters in the process plant after the introduction of the perturbation; and analyze the first and second sets of process control data, using the data set obtained from the knowledge repository, to make a determination related to one or more effects of the perturbation.

18K. An industrial process control system according to aspect 17K, wherein the perturbation introduced is configured to be minimally detectable.

19K. An industrial process control system according to aspect 17K or aspect 18K, wherein the perturbation is a reversible perturbation.

20K. An industrial process control system according to any one of aspects 17K to 19K, wherein the reversible perturbation continues for a time period of less than five minutes and, after the time period, reverts the control parameter to the value of the control parameter prior to the introduction of the perturbation.

21K. An industrial process control system according to any one of aspects 17K to 20K, wherein the reversible perturbation continues for a time period of less than one minute and, after the time period, reverts the control parameter to the value of the control parameter prior to the introduction of the perturbation.

22K. An industrial process control system according to any one of aspects 17K to 21K, wherein the reversible perturbation continues for a time period of less than 30 seconds and, after the time period, reverts the control parameter to the value of the control parameter prior to the introduction of the perturbation.

23K. An industrial process control system according to any one of aspects 17K to 22K, wherein the perturbation in the control parameter comprises a first perturbation, and wherein the one or more computing devices are further configured to: receive a third set of process control data comprising time-series data of the plurality of parameters in the process plant; cause the one or more process controllers to introduce a second perturbation in the control parameter of the process plant; receive a fourth set of process control data comprising time-series data of the plurality of parameters in the process plant after introduction of the second perturbation; and analyze the third and fourth sets of process control data, using the data set obtained from the knowledge repository, relative to the determination related to the one or more effects of the first perturbation, to determine one or more effects of the second perturbation and, from that determination, to detect and/or characterize drift in a configuration or operation of the industrial process control system.

24K. An industrial process control system according to aspect 23K, wherein the one or more computing devices are further configured to: receive a fifth set of process control data comprising time-series data of the plurality of parameters in the process plant; cause the one or more process controllers to introduce a third perturbation in the control parameter of the process plant; receive a sixth set of process control data comprising time-series data of the plurality of parameters in the process plant after introduction of the third perturbation; and analyze the fifth and sixth sets of process control data, using the data set obtained from the knowledge repository, relative to the determination related to the one or more effects of the first and second perturbations, to determine one or more effects of the third perturbation and, from that determination, to detect and/or characterize drift in a configuration or operation of the industrial process control system.

25K. An industrial process control system according to any one of aspects 17K to 24K, wherein the determination related to the one or more effects of the perturbation comprises a determination of a maximum perturbation amplitude that can be introduced without pushing a product of the process plant outside of specified production parameters for the product.

26K. An industrial process control system according any one of aspects 17K to 25K, wherein the determination related to the one or more effects of the perturbation comprises a determination of a maximum perturbation rate-of-change that can be introduced without pushing a product of the process plant outside of specified production parameters for the product.

27K. An industrial process control system according to any one of aspects 17K to 26K, wherein the determination related to the one or more effects of the perturbation comprises a determination of a maximum perturbation duration that can be introduced without pushing a product of the process plant outside of specified production parameters for the product.

28K. An industrial process control system according to any one of aspects 17K to 27K, wherein the determination related to the one or more effects of the perturbation comprises a determination of a propagation time associated with the perturbation, the propagation time defined as an elapsed time between the introduction of perturbation and an effect of the perturbation (i) at an entity of the process plant or (ii) on a downstream parameter of the process plant.

29K. An industrial process control system according to any one of aspects 17K to 28K, wherein the perturbation in the control parameter is a perturbation in a first control parameter, and wherein the one or more computing devices are further configured to: cause the one or more process controllers to introduce a perturbation in a second control parameter of the process plant; receive a third set of process control data comprising time-series data of the plurality of parameters in the process plant after introduction of the perturbation in the second control parameter; and analyze the first, second, and third sets of process control data, using the data set obtained from the knowledge repository, to make a determination related to one or more effects of the perturbations of the first and second control parameters.

30K. An industrial process control system according to any one of aspects 17K to 29K, wherein the operating process plant is a first process plant, and wherein the one or more computing devices are further configured to: obtain a data set from a knowledge repository storing process data related to the industrial process operating in a second process plant and contexts associated with the process data in the second process plant; receive a third set of process control data comprising time-series data of a plurality of parameters in the second process plant; cause one or more process controllers to introduce the perturbation in a control parameter of the second process plant, the control parameter of the second process plant corresponding to the control parameter of the first process plant; receive a fourth set of process control data comprising time-series data of the plurality of parameters in the second process plant after introduction of the perturbation in the second process plant; analyze the third and fourth sets of process control data, using the data set obtained from the knowledge repository, to make a determination related to one or more effects of the perturbation in the second process plant; and compare the one or more effects on the first process plant of the first perturbation to the one or more effects on the second process plant of the perturbation in the second process plant.

31K. An industrial process control system according to any one of aspects 17K to 30K, wherein the determination related to the one or more effects of the perturbation comprises a determination of an optimal time following a perturbation to measure a sample of a product of the process plant.

1L. A method in an industrial process control system controlling an operating process plant, the method comprising: obtaining, by one or more computing devices, a data set from a knowledge repository storing process configuration data related to the industrial process and a graph database storing contexts associated with the process configuration data; receiving, by the one or more computing devices, a first set of process control data, the first set of process control data comprising time-series data of a plurality of parameters in the process plant; introducing a first step change in a first control parameter of the process plant; receiving, by the one or more computing devices, a second set of process control data, the first set of process control data comprising time-series data of a plurality of parameters in the process plant; analyzing, by the one or more computing devices, the first and second sets of process control data, using the data set obtained from the knowledge repository, to make a determination related to one or more effects of the step change; and tuning a second control parameter of the process plant according to the determination related to the one or more effects of the step change.

2L. A method according to aspect 1L, the method further comprising: receiving, by the one or more computing devices, a third set of process control data, the third set of process control data comprising time-series data of the plurality of parameters in the process plant; introducing a second step change in the control parameter of the process plant; receiving, by the one or more computing devices, a fourth set of process control data, the fourth set of process control data comprising time-series data of the plurality of parameters in the process plant; and analyzing, by the one or more computing devices, the third and fourth sets of process control data, using the data set obtained from the knowledge repository, relative to the determination related to the one or more effects of the first step change, to determine one or more effects of the second step change and, from that determination, to detect and/or characterize drift in a configuration or operation of the industrial process control system.

3L. A method according to aspect 2L, further comprising: receiving, by the one or more computing devices, a fifth set of process control data, the fifth set of process control data comprising time-series data of the plurality of parameters in the process plant; introducing a third step change in the control parameter of the process plant; receiving, by the one or more computing devices, a sixth set of process control data, the sixth set of process control data comprising time-series data of the plurality of parameters in the process plant; and analyzing, by the one or more computing devices, the fifth and sixth sets of process control data, using the data set obtained from the knowledge repository, relative to the determination related to the one or more effects of the first and second step changes, to determine one or more effects of the third step change and, from that determination, to detect and/or characterize effects of the control parameter on the process plant.

4L. A method according to any one of aspects 1L to 3L, wherein the determination related to the one or more effects of the step change comprises a determination of a maximum step change amplitude that can be introduced without pushing a product of the process plant outside of specified production parameters for the product.

5L. A method according to any one of aspects 1L to 4L, wherein the determination related to the one or more effects of the step change comprises a determination of a maximum step change rate-of-change that can be introduced without pushing a product of the process plant outside of specified production parameters for the product.

6L. A method according to any one of aspects 1L to 6L, wherein the determination related to the one or more effects of the step change comprises a determination of a propagation time associated with the step change, the propagation time defined as an elapsed time between the introduction of the step change and an effect of the step change (i) at an entity of the process plant or (ii) on a downstream parameter of the process plant.

7L. A method according to any one of aspects 1L to 6L, further comprising: predicting, for a second step change in the first control parameter, a predicted tuned value for the second control parameter of the process plant.

8L. A method according to any one of aspects 1L to 7L, wherein the determination related to the one or more effects of the step change comprises a determination of an optimal time following a step change to measure a sample of a product of the process plant.

9L. A method according to any one of aspects 1L to 8L, wherein the operating process plant is a first operating process plant, the method further comprising: receiving, by the one or more computing devices, a third set of process control data, the third set of process control data comprising time-series data of the plurality of parameters in the second process plant; introducing a second step change in a control parameter of the second process plant, the control parameter of the second process plant corresponding to the control parameter of the first process plant; receiving, by the one or more computing devices, a fourth set of process control data, the fourth set of process control data comprising time-series data of the plurality of parameters in the second process plant; analyzing, by the one or more computing devices, the third and fourth sets of process control data, using the data set obtained from the knowledge repository, relative to the determination related to the one or more effects of the first step change, to determine one or more effects of the second step change; and comparing the one or more effects of the first step change on the first process plant to the one or more effects of the second step change on the second process plant.

10L. A method according to aspect 9L, further comprising: detecting, from the comparison of the one or more effects of the first step change on the first process plant to the one or more effects of the second step change on the second process plant, that a configuration of either the first process plant or the second process plant has been altered from an approved configuration.

11L. An industrial process control system controlling an operating process plant, the system comprising: one or more process controllers executing a control algorithm for producing a product in the process plant; a plurality of process control devices operating according to the control algorithm executed by the one or more controllers to produce the product; a knowledge repository storing (i) process configuration data related to the industrial process and (ii) a graph database storing contexts associated with the process configuration data; one or more computing devices, communicatively coupled to the knowledge repository and to the one or more process controllers, the one or more computing devices configured to: obtain a data set from the knowledge repository, the data set comprising the process configuration data and the graph database; receive a first set of process control data, the first set of process control data comprising time-series data of a plurality of parameters in the process plant; cause the one or more process controllers to introduce a first step change in a first control parameter of the process plant; receive a second set of process control data, the first set of process control data comprising time-series data of a plurality of parameters in the process plant; analyze the first and second sets of process control data, using the data set obtained from the knowledge repository, to make a determination related to one or more effects of the step change; and tune a second control parameter of the process plant according to the determination related to the one or more effects of the step change.

12L. A system according to aspect 11L, wherein the one or more computing devices are further configured to: receive a third set of process control data, the third set of process control data comprising time-series data of the plurality of parameters in the process plant; cause the one or more process controllers to introduce a second step change in the control parameter of the process plant; receive a fourth set of process control data, the fourth set of process control data comprising time-series data of the plurality of parameters in the process plant; and analyze the third and fourth sets of process control data, using the data set obtained from the knowledge repository, relative to the determination related to the one or more effects of the first step change, to determine one or more effects of the second step change and, from that determination, to detect and/or characterize drift in a configuration or operation of the industrial process control system.

13L. A system according to aspect 12L, wherein the one or more computing devices are further configured to: receive a fifth set of process control data, the fifth set of process control data comprising time-series data of the plurality of parameters in the process plant; cause the one or more process controllers to introduce a third step change in the control parameter of the process plant; receive a sixth set of process control data, the sixth set of process control data comprising time-series data of the plurality of parameters in the process plant; and analyze the fifth and sixth sets of process control data, using the data set obtained from the knowledge repository, relative to the determination related to the one or more effects of the first and second step changes, to determine one or more effects of the third step change and, from that determination, to detect and/or characterize effects of the control parameter on the process plant.

14L. A system according to any one of aspects 11L to 13L, wherein the determination related to the one or more effects of the step change comprises a determination of a maximum step change amplitude that can be introduced without pushing a product of the process plant outside of specified production parameters for the product.

15L. A system according to any one of aspects 11L to 14L, wherein the determination related to the one or more effects of the step change comprises a determination of a maximum step change rate-of-change that can be introduced without pushing a product of the process plant outside of specified production parameters for the product.

16L. A system according to any one of aspects 11L to 15L, wherein the determination related to the one or more effects of the step change comprises a determination of a propagation time associated with the step change, the propagation time defined as an elapsed time between the introduction of the step change and an effect of the step change (i) at an entity of the process plant or (ii) on a downstream parameter of the process plant.

17L. A system according to any one of aspects 11L to 16L, further comprising: predicting, for a second step change in the first control parameter, a predicted tuned value for the second control parameter of the process plant.

18L. A system according to any one of aspects 11L to 17L, wherein the determination related to the one or more effects of the step change comprises a determination of an optimal time following a step change to measure a sample of a product of the process plant.

19L. A system according to any one of aspects 11L to 18L, wherein the operating process plant is a first operating process plant, and wherein the one or more computing devices are further configured to: receive a third set of process control data, the third set of process control data comprising time-series data of the plurality of parameters in the second process plant; cause one or more process controllers in the second process plant to introduce a second step change in a control parameter of the second process plant, the control parameter of the second process plant corresponding to the control parameter of the first process plant; receive a fourth set of process control data, the fourth set of process control data comprising time-series data of the plurality of parameters in the second process plant; analyze the third and fourth sets of process control data, using the data set obtained from the knowledge repository, relative to the determination related to the one or more effects of the first step change, to determine one or more effects of the second step change; and compare the one or more effects of the first step change on the first process plant to the one or more effects of the second step change on the second process plant.

20L. A system according to aspect 19L, wherein the one or more computing devices are further configured to: detect, from the comparison of the one or more effects of the first step change on the first process plant to the one or more effects of the second step change on the second process plant, that a configuration of either the first process plant or the second process plant has been altered from an approved configuration.

What is claimed:

1. A method in an industrial process control system executing a batch control algorithm to control a batch process in a process plant, the method comprising:
    obtaining, by one or more processors, a data set from a knowledge repository storing process data and contexts associated with the process data, wherein the contexts associated with the process data include one or more of:
    a type of equipment associated with the process data,
    an area of the process plant associated with the process data,
    a relationship between a piece of equipment associated with the batch process associated with the process data and one or more other pieces of equipment,
    relationships between pieces of equipment included in the batch process associated with the process data,
    pieces of equipment included in particular batch recipes associated with the process data, or
    equipment utilization information for pieces of equipment associated with batch processes associated with the process data;
    receiving, by the one or more processors, a query for information regarding a batch control algorithm in the process plant for controlling field devices in the process plant to execute a batch process, via a user interface of a mobile computing device;
    identifying, by the one or more processors, process data from the data set that is related to the query;
    presenting, by the one or more processors, the identified process data from the data set that is related to the query via the user interface of the mobile computing device based on the contexts associated with the identified process data; and
    executing the batch control algorithm to control the batch process in the process plant by sending control signals to the field devices to operate in accordance with the batch control algorithm.

2. The method of claim 1, wherein presenting the identified process data from the data set that is related to the query via the user interface of the mobile computing device based on the contexts associated with the identified process data includes prioritizing or modifying the presentation of the identified process data based on the contexts associated with the identified process data.

3. The method of claim 2, wherein prioritizing or modifying the presentation of the identified process data based on the contexts associated with the identified process data includes displaying a first subset of the identified process data based on first contexts associated with the first subset of the identified process data and not displaying a second subset of the identified process data based on second contexts associated with the second subset of the identified process data.

4. The method of claim 2, wherein prioritizing or modifying the presentation of the identified process data based on the contexts associated with the identified process data includes displaying a first subset of the identified process data in a first location on a display screen of the mobile computing device based on first contexts associated with the first subset of the identified process data and displaying a second subset of the identified process data in a second location on the display screen of the mobile computing device based on second contexts associated with the second subset of the identified process data.

5. The method of claim 2, wherein prioritizing or modifying the presentation of the identified process data based on the contexts associated with the identified process data includes displaying a first subset of the identified process data in a larger size via a display screen of the mobile computing device based on first contexts associated with the first subset of the identified process data and displaying a second subset of the identified process data in a smaller size via the display screen of the mobile computing device based on second contexts associated with the second subset of the identified process data.

6. The method of claim 2, wherein prioritizing or modifying the presentation of the identified process data based on the contexts associated with the identified process data includes prioritizing an order of the presentation of the identified process data based on the contexts associated with the identified process data.

7. The method of claim 1, wherein presenting the identified process data from the data set that is related to the query via the user interface of the mobile computing device based on the contexts associated with the identified process data includes further prioritizing or modifying the presentation of the identified process data based on one or more characteristics associated with the query received via the user interface of the mobile computing device.

8. The method of claim 7, wherein the one or more characteristics associated with the query include one or more of: words associated with the query, phrases associated with the query, indications of tone associated with the query, or indications of a level of urgency associated with the query.

9. The method of claim 7, wherein the one or more characteristics associated with the query include an indication that the query is a verbal request captured by audio sensor associated with the user interface of the mobile computing device.

10. The method of claim 7, wherein the one or more characteristics associated with the query include an indication that the query is a text request input via the user interface of the mobile computing device.

11. The method of claim 7, wherein the one or more characteristics associated with the query include an indication that the query includes a user selection of one or more selectable elements displayed via the user interface of the mobile computing device.

12. The method of claim 1, wherein presenting the identified process data from the data set that is related to the query via the user interface of the mobile computing device based on the contexts associated with the identified process data includes further prioritizing or modifying the presentation of the identified process data based on one or more characteristics associated with a display of the mobile computing device.

13. The method of claim 12, wherein the indications of one or more characteristics associated with the display of the mobile computing device include indications of one or more of: a type of the mobile computing device, a size of the mobile computing device, or a display screen size of the mobile computing device.

14. The method of claim 12, wherein the indications of one or more characteristics associated with the display of the mobile computing device include an indication of whether the identified process data is to be presented via a web browser or a mobile device application.

15. The method of claim 12, wherein the indications of one or more characteristics associated with the display of the mobile computing device include an indication of a relative size of a display window via which the identified process data is to be presented on a display screen of the mobile computing device.

16. A computing device in an industrial process control system executing a batch control algorithm to control a batch process in a process plant, the computing device comprising:
  one or more processors;
  one or more tangible, non-transitory, computer-readable memories;
  one or more user interfaces;
  a user interface application comprising computer-executable instructions stored on the one or more memories and executable to cause the computing device to, while the process control system is operating during run-time to control an industrial process:
    obtain a data set from a knowledge repository storing process data and contexts associated with the process data, wherein the contexts associated with the process data include one or more of:
      a type of equipment associated with the process data,
      an area of the process plant associated with the process data,
      a relationship between a piece of equipment associated with the batch process associated with the process data and one or more other pieces of equipment,
      relationships between pieces of equipment included in the batch process associated with the process data,
      pieces of equipment included in particular batch recipes associated with the process data, or
      equipment utilization information for pieces of equipment associated with batch processes associated with the process data;
    receive a query for information regarding a batch control algorithm in the process plant for controlling field devices in the process plant to execute a batch process, via a user interface of a mobile computing device;
    identify process data from the data set that is related to the query;
    present the identified process data from the data set that is related to the query via the user interface of the mobile computing device based on the contexts associated with the identified process data; and
    execute the batch control algorithm to control the batch process in the process plant by sending control signals to the field devices to operate in accordance with the batch control algorithm.

17. The computing device of claim 16, wherein the instructions cause the computing device to present the identified process data from the data set that is related to the query via the user interface of the mobile computing device based on the contexts associated with the identified process data by prioritizing or modifying the presentation of the identified process data based on the contexts associated with the identified process data.

18. The computing device of claim 17, wherein the instructions cause the computing device to prioritize or modify the presentation of the identified process data based on the contexts associated with the identified process data by displaying a first subset of the identified process data based on first contexts associated with the first subset of the identified process data and not displaying a second subset of the identified process data based on second contexts associated with the second subset of the identified process data.

19. The computing device of claim 17, wherein the instructions cause the computing device to prioritize or modify the presentation of the identified process data based on the contexts associated with the identified process data by displaying a first subset of the identified process data in a first location on a display screen of the mobile computing device based on first contexts associated with the first subset of the identified process data and displaying a second subset of the identified process data in a second location on the display screen of the mobile computing device based on second contexts associated with the second subset of the identified process data.

20. The computing device of claim 17, wherein the instructions cause the computing device to prioritize or modify the presentation of the identified process data based on the contexts associated with the identified process data by displaying a first subset of the identified process data in a larger size via a display screen of the mobile computing device based on first contexts associated with the first subset of the identified process data and displaying a second subset of the identified process data in a smaller size via the display screen of the mobile computing device based on second contexts associated with the second subset of the identified process data.

21. The computing device of claim 17, wherein the instructions cause the computing device to prioritize or modify the presentation of the identified process data based on the contexts associated with the identified process data by prioritizing an order of the presentation of the identified process data based on the contexts associated with the identified process data.

22. The computing device of claim 16, wherein the instructions further cause the computing device to present the identified process data from the data set that is related to the query via the user interface of the mobile computing device based on the contexts associated with the identified process data by prioritizing or modifying the presentation of the identified process data based on one or more characteristics associated with the query received via the user interface of the mobile computing device.

23. The computing device of claim 22, wherein the one or more characteristics associated with the query include one or more of: words associated with the query, phrases associated with the query, indications of tone associated with the query, or indications of a level of urgency associated with the query.

24. The computing device of claim 22, wherein the one or more characteristics associated with the query include an indication that the query is a verbal query captured by audio sensor associated with the user interface of the mobile computing device.

25. The computing device of claim 22, wherein the one or more characteristics associated with the query include an indication that the query is a text request input via the user interface of the mobile computing device.

26. The computing device of claim 22, wherein the one or more characteristics associated with the query include an indication that the query includes a user selection of one or more selectable elements displayed via the user interface of the mobile computing device.

27. The computing device of claim 16, wherein the instructions further cause the computing device to present the identified process data from the data set that is related to the query via the user interface of the mobile computing device based on the contexts associated with the identified process data by prioritizing or modifying the presentation of the identified process data based on one or more characteristics associated with a display of the mobile computing device.

28. The computing device of claim 27, wherein the indications of one or more characteristics associated with the display of the mobile computing device include indications of one or more of: a type of the mobile computing device, a size of the mobile computing device, or a display screen size of the mobile computing device.

29. The computing device of claim 27, wherein the indications of one or more characteristics associated with the display of the mobile computing device include an indication of whether the identified process data is to be presented via a web browser or a mobile device application.

30. The computing device of claim 27, wherein the indications of one or more characteristics associated with the display of the mobile computing device include an indication of a relative size of a display window via which the identified process data is to be presented on a display screen of the mobile computing device.

* * * * *